(12) United States Patent
Cao et al.

(10) Patent No.: US 10,836,837 B2
(45) Date of Patent: Nov. 17, 2020

(54) WET MILLING PROCESS

(71) Applicant: Novozymes A/S, Bagsvaerd (DK)

(72) Inventors: Yi Cao, Beijing (CN); James Lavigne, Wake Forest, NC (US); Bernardo Vidal, Jr., Wake Forest, NC (US); Thomas Patrick Gibbons, Wake Forest, NC (US); Chee-Leong Soong, Raleigh, NC (US); Brian R. Scott, West Sacramento, CA (US); Randall Scott Deinhammer, Wake Forest, NC (US); Zhen Long, Beijing (CN); Michael John Akerman, Wake Forest, NC (US); Xinyu Shen, Wake Forest, NC (US); Yu Zhang, Beijing (CN)

(73) Assignee: Novozymes A/S, Bagsvaerd (DK)

( * ) Notice: Subject to any disclaimer, the term of this patent is extended or adjusted under 35 U.S.C. 154(b) by 0 days.

(21) Appl. No.: 15/773,083

(22) PCT Filed: Nov. 25, 2016

(86) PCT No.: PCT/CN2016/107282
§ 371 (c)(1),
(2) Date: May 2, 2018

(87) PCT Pub. No.: WO2017/088820
PCT Pub. Date: Jun. 1, 2017

(65) Prior Publication Data
US 2019/0002592 A1    Jan. 3, 2019

(30) Foreign Application Priority Data
Nov. 26, 2015 (WO) ............... PCT/CN2015/095621

(51) Int. Cl.
*C08B 30/04* (2006.01)
*C08B 30/02* (2006.01)
*C08H 99/00* (2010.01)

(52) U.S. Cl.
CPC ............ *C08B 30/044* (2013.01); *C08B 30/02* (2013.01); *C08H 99/00* (2013.01)

(58) Field of Classification Search
None
See application file for complete search history.

(56) References Cited

U.S. PATENT DOCUMENTS

| | | |
|---|---|---|
| 5,066,218 A | 11/1991 | Silver |
| 5,693,518 A | 12/1997 | Kofod |
| 6,562,340 B1 | 5/2003 | Bedford |
| 6,566,125 B2 | 5/2003 | Johnston |
| 2008/0171360 A1 | 7/2008 | Lange |
| 2008/0274527 A1 | 11/2008 | Soerensen |
| 2009/0117630 A1 | 5/2009 | Olsen |
| 2011/0086408 A1 | 4/2011 | Power et al. |
| 2011/0111453 A1* | 5/2011 | McBrayer ............ C12N 9/2437 435/41 |

FOREIGN PATENT DOCUMENTS

| | | |
|---|---|---|
| CN | 101166830 A | 4/2008 |
| WO | 1994/021785 A1 | 9/1994 |
| WO | 1996/023062 A1 | 8/1996 |
| WO | 2002/00731 A1 | 1/2002 |
| WO | 2002/00910 A2 | 1/2002 |
| WO | 2002/00911 A1 | 1/2002 |
| WO | 2002/02644 A1 | 1/2002 |
| WO | WO200200731 * | 1/2002 |
| WO | 2005/059084 A1 | 6/2005 |
| WO | 2006/125438 A1 | 11/2006 |
| WO | 2009/018537 A2 | 2/2009 |
| WO | 2009/108941 A2 | 9/2009 |
| WO | 2011/057140 A1 | 5/2011 |
| WO | 2011/153516 A2 | 12/2011 |
| WO | WO2012103288 * | 8/2012 |
| WO | 2013/182669 A2 | 12/2013 |
| WO | 2014/202716 A1 | 12/2014 |

OTHER PUBLICATIONS

Chica et al. Curr Opin Biotechnol. Aug. 2005;16(4):378-84. (Year: 2005).*
Singh et al. Curr Protein Pept Sci. 2017, 18, 1-11 (Year: 2017).*
Jordan et al. Biochem. J. (2012) 442, 241-252 (Year: 2012).*
Sakamoto et al., Appl. Microbiol. Biotechnol., vol. 90, pp. 137-146 (2011).
Sakamoto et al., UniProt Accession No. B5MGR2 (2014).
Hashimoto et al, 2003, J Biosci Bioeng, vol. 95, No. 2, pp. 164-169.
Ichikawa et al, 2011, EBI Accession No. E4NJK0.
Soerensen et al, 2007, EBI Accession No. CS459135.
Liu et al, 2014, Uniprot accession No. S7ZW00.
Nielsen et al, 2018, Uniprot accession No. A0A1V6NXM6.
Rantanen et al, 2007, Carbohydrate polymers 68, 350-359.

(Continued)

*Primary Examiner* — Christian L Fronda

(74) *Attorney, Agent, or Firm* — Elias Lambiris

(57) ABSTRACT

A process for treating crop kernels is comprised of the steps of a) soaking kernels in water to produce soaked kernels; b) grinding the soaked kernels; c) treating the soaked kernels in the presence of an effective amount of GH62 polypeptide having arabinofuranosidase activity or a GH43 polypeptide having arabinofuranosidase activity, wherein step c) is performed before, during or after step b).

19 Claims, No Drawings

Specification includes a Sequence Listing.

(56) References Cited

OTHER PUBLICATIONS

Wahl et al, 1987, Molecular hybridization of immobilized nucleic acids 152, 399-407.
Agger et al, 2010, J Agric Food Chem, vol. 58, pp. 6141-6148.
Gao et al, 2012, Grain Distribution Technology, vol. 6, pp. 36-42.
Huismann et al, 2000, Carbo Poly, vol. 43, pp. 269-279.
Johnston et al, 2004, Cereal Chem, vol. 81, pp. 626-632.
Popper et al, 2010, Plant Physiol, vol. 153, pp. 373-383.
Kaur et al., Microbial Biotechnology, vol. 8, No. 3, pp. 419-433 (2014).

\* cited by examiner

SEQUENCE LISTING

```
<160> NUMBER OF SEQ ID NOS: 119

<210> SEQ ID NO 1
<211> LENGTH: 9
<212> TYPE: PRT
<213> ORGANISM: Artificial Sequence
<220> FEATURE:
<223> OTHER INFORMATION: Conserved motif:
      [H/Y][L/M]F[F/S][A/C/H/S/T/V][A/D/G/N/R]D[D/E/N]G
<220> FEATURE:
<221> NAME/KEY: misc_feature
<222> LOCATION: (1)..(1)
<223> OTHER INFORMATION: The amino acid in position 1 of the conserved
      motif is either histidine (His, H) or tyrosine (Tyr, Y).
<220> FEATURE:
<221> NAME/KEY: misc_feature
```

```
<222> LOCATION: (2)..(2)
<223> OTHER INFORMATION: The amino acid in position 2 of the conserved
      motif is either leucine (Leu, L) or methionine (Met, M).
<220> FEATURE:
<221> NAME/KEY: misc_feature
<222> LOCATION: (4)..(4)
<223> OTHER INFORMATION: The amino acid in position 4 of the conserved
      motif is either phenylalanine (Phy, F) or serine (Ser, S).
<220> FEATURE:
<221> NAME/KEY: misc_feature
<222> LOCATION: (5)..(5)
<223> OTHER INFORMATION: The amino acid in position 5 of the conserved
      motif is either alanine (Ala, A), cysteine (Cys, C), histidine
      (His, H), serine (Ser, S), threonine (Thr, T) or valine (Val, V).
<220> FEATURE:
<221> NAME/KEY: misc_feature
<222> LOCATION: (6)..(6)
<223> OTHER INFORMATION: The amino acid in position 6 of the conserved
      motif is either alanine (Ala, A), aspartic acid (Asp, D), glycine
      (Gly, G), asparagine (Asn, N) or arginine (Arg, R).
<220> FEATURE:
<221> NAME/KEY: misc_feature
<222> LOCATION: (8)..(8)
<223> OTHER INFORMATION: The amino acid in position 8 of the conserved
      motif is either aspartic acid (Asp, D), glutamic acid (Glu, E) or
      asparagine (Asn, N).

<400> SEQUENCE: 1

Xaa Xaa Phe Xaa Xaa Xaa Asp Xaa Gly
1               5

<210> SEQ ID NO 2
<211> LENGTH: 9
<212> TYPE: PRT
<213> ORGANISM: Artificial Sequence
<220> FEATURE:
<223> OTHER INFORMATION: Conserved motif: [H/Y]LF[F/S][A/S/V][A/D/G]DNG
<220> FEATURE:
<221> NAME/KEY: misc_feature
<222> LOCATION: (1)..(1)
<223> OTHER INFORMATION: The amino acid in position 1 of the conserved
      motif is either histidine (His, H) or tyrosine (Tyr, Y).
<220> FEATURE:
<221> NAME/KEY: misc_feature
<222> LOCATION: (4)..(4)
<223> OTHER INFORMATION: The amino acid in position 4 of the conserved
      motif is either phenylalanine (Phy, F) or serine (Ser, S).
<220> FEATURE:
<221> NAME/KEY: misc_feature
<222> LOCATION: (5)..(5)
<223> OTHER INFORMATION: The amino acid in position 5 of the conserved
      motif is either Alanine (Ala, A), Serine (Ser, S) or Valine (Val,
      V).
<220> FEATURE:
<221> NAME/KEY: misc_feature
<222> LOCATION: (6)..(6)
<223> OTHER INFORMATION: The amino acid in position 6 of the conserved
      motif is either Alanine (Ala, A), aspartic acid (Asp, D) or
      Glycine (Gly, G).

<400> SEQUENCE: 2

Xaa Leu Phe Xaa Xaa Xaa Asp Asn Gly
1               5

<210> SEQ ID NO 3
<211> LENGTH: 9
<212> TYPE: PRT
<213> ORGANISM: Artificial Sequence
<220> FEATURE:
<223> OTHER INFORMATION: Conserved motif: YLFF[A/V][A/G]DNG
<220> FEATURE:
<221> NAME/KEY: misc_feature
<222> LOCATION: (5)..(5)
<223> OTHER INFORMATION: The amino acid in position 5 of the conserved
      motif is either Alanine (Ala, A) or Valine (Val, V).
```

```
<220> FEATURE:
<221> NAME/KEY: misc_feature
<222> LOCATION: (6)..(6)
<223> OTHER INFORMATION: The amino acid in position 6 of the conserved
      motif is either Alanine (Ala, A) or Glycine (Gly, G).

<400> SEQUENCE: 3

Tyr Leu Phe Phe Xaa Xaa Asp Asn Gly
1               5

<210> SEQ ID NO 4
<211> LENGTH: 9
<212> TYPE: PRT
<213> ORGANISM: Artificial Sequence
<220> FEATURE:
<223> OTHER INFORMATION: Conserved motif: YLFFAGDNG

<400> SEQUENCE: 4

Tyr Leu Phe Phe Ala Gly Asp Asn Gly
1               5

<210> SEQ ID NO 5
<211> LENGTH: 9
<212> TYPE: PRT
<213> ORGANISM: Artificial Sequence
<220> FEATURE:
<223> OTHER INFORMATION: Conserved motif: [H/Y]LFSSDDNG
<220> FEATURE:
<221> NAME/KEY: misc_feature
<222> LOCATION: (1)..(1)
<223> OTHER INFORMATION: The amino acid in position 1 of the conserved
      motif is either histidine (His, H) or tyrosine (Tyr, Y).

<400> SEQUENCE: 5

Xaa Leu Phe Ser Ser Asp Asp Asn Gly
1               5

<210> SEQ ID NO 6
<211> LENGTH: 9
<212> TYPE: PRT
<213> ORGANISM: Artificial Sequence
<220> FEATURE:
<223> OTHER INFORMATION: Conserved motif: YLFSSDDNG

<400> SEQUENCE: 6

Tyr Leu Phe Ser Ser Asp Asp Asn Gly
1               5

<210> SEQ ID NO 7
<211> LENGTH: 987
<212> TYPE: DNA
<213> ORGANISM: Penicillium capsulatum
<220> FEATURE:
<221> NAME/KEY: CDS
<222> LOCATION: (1)..(984)
<220> FEATURE:
<221> NAME/KEY: sig_peptide
<222> LOCATION: (1)..(78)
<220

```
aca tat agc tgg aca tca act agc gct tta gcg aat ccc aag ccc ggg      144
Thr Tyr Ser Trp Thr Ser Thr Ser Ala Leu Ala Asn Pro Lys Pro Gly
         10                  15                  20 tgg aca gca atc aag gat ttt acc aat gtg gtc ttc aat aac agg cat      192
Trp Thr Ala Ile Lys Asp Phe Thr Asn Val Val Phe Asn Asn Arg His
     25                  30                  35 gtc gtc tat gca tct acc acc gac aca agt ggg aac tac ggc gca atg      240
Val Val Tyr Ala Ser Thr Thr Asp Thr Ser Gly Asn Tyr Gly Ala Met
 40                  45                  50 agc ttc ggt gtc ttt tcg gat tgg cct ggc atg gca tct gcg agc caa      288
Ser Phe Gly Val Phe Ser Asp Trp Pro Gly Met Ala Ser Ala Ser Gln
55                  60                  65                  70 aac gca ttg agc ttt gca gcc gtc gca ccc acc ttg ttc tac ttt cag      336
Asn Ala Leu Ser Phe Ala Ala Val Ala Pro Thr Leu Phe Tyr Phe Gln
             75                  80                  85 cca aaa agt ata tgg gtt ctg gcc tat caa tgg ggc tct agc acg ttt      384
Pro Lys Ser Ile Trp Val Leu Ala Tyr Gln Trp Gly Ser Ser Thr Phe
         90                  95                 100 acc tac cga aca tca agt gat ccc acc aat gcc tat gga tgg tca tcg      432
Thr Tyr Arg Thr Ser Ser Asp Pro Thr Asn Ala Tyr Gly Trp Ser Ser
     105                 110                 115 gag caa gcc ctt ttc tct ggg aaa gtt acc ggc tcg agc act ggc gcc      480
Glu Gln Ala Leu Phe Ser Gly Lys Val Thr Gly Ser Ser Thr Gly Ala
 120                 125                 130 att gat cag aca ctt atc ggt gac gcc acg cat atg tat ctt ttc ttt      528
Ile Asp Gln Thr Leu Ile Gly Asp Ala Thr His Met Tyr Leu Phe Phe
135                 140                 145                 150 gcc gga gac aat ggc aaa ata tat cgc tct agc atg ccc atc agc aat      576
Ala Gly Asp Asn Gly Lys Ile Tyr Arg Ser Ser Met Pro Ile Ser Asn
             155                 160                 165 ttc cct gga aac ttt gga aca gtg tca gag gtg gta cta agt gac act      624
Phe Pro Gly Asn Phe Gly Thr Val Ser Glu Val Val Leu Ser Asp Thr
         170                 175                 180 cag aat aat cta ttt gag gcg gtc caa gtg tac act gtg aaa ggt caa      672
Gln Asn Asn Leu Phe Glu Ala Val Gln Val Tyr Thr Val Lys Gly Gln
     185                 190                 195 aac cag tac ctg atg atc gtt gag gca att gga tca gaa ggg cgg tat      720
Asn Gln Tyr Leu Met Ile Val Glu Ala Ile Gly Ser Glu Gly Arg Tyr
 200                 205                 210 ttc cgt tca ttc act gcc agc agt ctt ggt ggt ttg tgg act gcc cag      768
Phe Arg Ser Phe Thr Ala Ser Ser Leu Gly Gly Leu Trp Thr Ala Gln
215                 220                 225                 230 gca gca agc gag act aag ccc ttt gct ggt aaa gcc aat agc ggt gca      816
Ala Ala Ser Glu Thr Lys Pro Phe Ala Gly Lys Ala Asn Ser Gly Ala
             235                 240                 245 acc tgg acc aac gac atc agt cac ggc gat ttg gtt cgt tcc aac cct      864
Thr Trp Thr Asn Asp Ile Ser His Gly Asp Leu Val Arg Ser Asn Pro
         250                 255                 260 gac caa aca atg acg atc gat cca tgc aac ctg caa ttc ctc tac cag      912
Asp Gln Thr Met Thr Ile Asp Pro Cys Asn Leu Gln Phe Leu Tyr Gln
     265                 270                 275 gga cga aat cct ggc gca agt ggc aac tac aat acc tta ccg tgg agg      960
Gly Arg Asn Pro Gly Ala Ser Gly Asn Tyr Asn Thr Leu Pro Trp Arg
 280                 285                 290 ccg ggt gtg ctc act ttg aat aat taa                                  987
Pro Gly Val Leu Thr Leu Asn Asn
295                 300
```

<210> SEQ ID NO 8

```
<211> LENGTH: 328
<212> TYPE: PRT
<213> ORGANISM: Penicillium capsulatum

<400> SEQUENCE: 8

Met Arg Phe Phe Gln Ala Lys Ala Gly Leu Ile Ser Ser Gly Ile Thr
    -25                 -20                 -15

Leu Leu Ala Ser Val Pro Val Val Ile Ala Asn Cys Ala Leu Pro Ser
-10                  -5                  -1  1                5

Thr Tyr Ser Trp Thr Ser Thr Ser Ala Leu Ala Asn Pro Lys Pro Gly
            10                  15                  20

Trp Thr Ala Ile Lys Asp Phe Thr Asn Val Val Phe Asn Asn Arg His
                25                  30                  35

Val Val Tyr Ala Ser Thr Thr Asp Thr Ser Gly Asn Tyr Gly Ala Met
 40                      45                  50

Ser Phe Gly Val Phe Ser Asp Trp Pro Gly Met Ala Ser Ala Ser Gln
 55                  60                  65                  70

Asn Ala Leu Ser Phe Ala Ala Val Ala Pro Thr Leu Pro Tyr Phe Gln
                 75                  80                  85

Pro Lys Ser Ile Trp Val Leu Ala Tyr Gln Trp Gly Ser Ser Thr Phe
             90                  95                  100

Thr Tyr Arg Thr Ser Ser Asp Pro Thr Asn Ala Tyr Gly Trp Ser Ser
         105                 110                 115

Glu Gln Ala Leu Phe Ser Gly Lys Val Thr Gly Ser Ser Thr Gly Ala
 120                 125                 130

Ile Asp Gln Thr Leu Ile Gly Asp Ala Thr His Met Tyr Leu Phe Phe
135                 140                 145                 150

Ala Gly Asp Asn Gly Lys Ile Tyr Arg Ser Ser Met Pro Ile Ser Asn
                 155                 160                 165

Phe Pro Gly Asn Phe Gly Thr Val Ser Glu Val Leu Ser Asp Thr
             170                 175                 180

Gln Asn Asn Leu Phe Glu Ala Val Gln Val Tyr Thr Val Lys Gly Gln
                 185                 190                 195

Asn Gln Tyr Leu Met Ile Val Glu Ala Ile Gly Ser Glu Gly Arg Tyr
200                 205                 210

Phe Arg Ser Phe Thr Ala Ser Ser Leu Gly Gly Leu Trp Thr Ala Gln
215                 220                 225                 230

Ala Ala Ser Glu Thr Lys Pro Phe Ala Gly Lys Ala Asn Ser Gly Ala
                 235                 240                 245

Thr Trp Thr Asn Asp Ile Ser His Gly Asp Leu Val Arg Ser Asn Pro
                 250                 255                 260

Asp Gln Thr Met Thr Ile Asp Pro Cys Asn Leu Gln Phe Leu Tyr Gln
                 265                 270                 275

Gly Arg Asn Pro Gly Ala Ser Gly Asn Tyr Asn Thr Leu Pro Trp Arg
 280                 285                 290

Pro Gly Val Leu Thr Leu Asn Asn
295                 300

<210> SEQ ID NO 9
<211> LENGTH: 302
<212> TYPE: PRT
<213> ORGANISM: Penicillium capsulatum

<400> SEQUENCE: 9

Asn Cys Ala Leu Pro Ser Thr Tyr Ser Trp Thr Ser Thr Ser Ala Leu
1               5                   10                  15
```

```
Ala Asn Pro Lys Pro Gly Trp Thr Ala Ile Lys Asp Phe Thr Asn Val
            20                  25                  30

Val Phe Asn Asn Arg His Val Tyr Ala Ser Thr Thr Asp Thr Ser
        35                  40                  45

Gly Asn Tyr Gly Ala Met Ser Phe Gly Val Phe Ser Asp Trp Pro Gly
 50                  55                  60

Met Ala Ser Ala Ser Gln Asn Ala Leu Ser Phe Ala Ala Val Ala Pro
 65                  70                  75                  80

Thr Leu Phe Tyr Phe Gln Pro Lys Ser Ile Trp Val Leu Ala Tyr Gln
                 85                  90                  95

Trp Gly Ser Ser Thr Phe Thr Tyr Arg Thr Ser Ser Asp Pro Thr Asn
                100                 105                 110

Ala Tyr Gly Trp Ser Ser Glu Gln Ala Leu Phe Ser Gly Lys Val Thr
            115                 120                 125

Gly Ser Ser Thr Gly Ala Ile Asp Gln Thr Leu Ile Gly Asp Ala Thr
130                 135                 140

His Met Tyr Leu Phe Phe Ala Gly Asp Asn Gly Lys Ile Tyr Arg Ser
145                 150                 155                 160

Ser Met Pro Ile Ser Asn Phe Pro Gly Asn Phe Gly Thr Val Ser Glu
                165                 170                 175

Val Val Leu Ser Asp Thr Gln Asn Asn Leu Phe Glu Ala Val Gln Val
            180                 185                 190

Tyr Thr Val Lys Gly Gln Asn Gln Tyr Leu Met Ile Val Glu Ala Ile
            195                 200                 205

Gly Ser Glu Gly Arg Tyr Phe Arg Ser Phe Thr Ala Ser Ser Leu Gly
210                 215                 220

Gly Leu Trp Thr Ala Gln Ala Ala Ser Glu Thr Lys Pro Phe Ala Gly
225                 230                 235                 240

Lys Ala Asn Ser Gly Ala Thr Trp Thr Asn Asp Ile Ser His Gly Asp
                245                 250                 255

Leu Val Arg Ser Asn Pro Asp Gln Thr Met Thr Ile Asp Pro Cys Asn
                260                 265                 270

Leu Gln Phe Leu Tyr Gln Gly Arg Asn Pro Gly Ala Ser Gly Asn Tyr
                275                 280                 285

Asn Thr Leu Pro Trp Arg Pro Gly Val Leu Thr Leu Asn Asn
290                 295                 300
```

<210> SEQ ID NO 10
<211> LENGTH: 990
<212> TYPE: DNA
<213> ORGANISM: Penicillium aurantiogriseum
<220> FEATURE:
<221> NAME/KEY: CDS
<222> LOCATION: (1)..(987)
<220> FEATURE:
<221> NAME/KEY: sig_peptide
<222> LOCATION: (1)..(78)
<220> FEATURE:
<221> NAME/KEY: mat_peptide
<222> LOCATION: (79)..(987)

<400> SEQUENCE: 10

```
atg aaa ttc tcc aag gca aaa gct ggc ctg gtg tca tct ggc atg ctg    48
Met Lys Phe Ser Lys Ala Lys Ala Gly Leu Val Ser Ser Gly Met Leu
    -25                 -20                 -15 ttg ctc gca tca gta cca gtt gcc gtc gcc gac tgc gcg ctt cca tca    96
Leu Leu Ala Ser Val Pro Val Ala Val Ala Asp Cys Ala Leu Pro Ser
-10                  -5              -1   1                5
```

```
act tat act tgg aca tca act ggc gct cta gcg aat cca aag tcc gga      144
Thr Tyr Thr Trp Thr Ser Thr Gly Ala Leu Ala Asn Pro Lys Ser Gly
            10                  15                  20 tgg acc gca atc aag gat ttc acc aac gtt gtt gtt aac aat aag cat      192
Trp Thr Ala Ile Lys Asp Phe Thr Asn Val Val Val Asn Asn Lys His
        25                  30                  35 ctc gta tat gca tca acc acc gac gca agt ggg aac tac ggc gcg atg      240
Leu Val Tyr Ala Ser Thr Thr Asp Ala Ser Gly Asn Tyr Gly Ala Met
40                  45                  50 aac ttc ggt ccc ttt tcg gat tgg tct ggc atg gca act gcg agt caa      288
Asn Phe Gly Pro Phe Ser Asp Trp Ser Gly Met Ala Thr Ala Ser Gln
55                  60                  65                  70 atc aaa acg agc ttt aac gct gtt gcg ccc act ttg ttc tac ttc cag      336
Ile Lys Thr Ser Phe Asn Ala Val Ala Pro Thr Leu Phe Tyr Phe Gln
            75                  80                  85 cca aag gac att tgg gtc ata gcc tac caa tgg ggc tca agc acg ttt      384
Pro Lys Asp Ile Trp Val Ile Ala Tyr Gln Trp Gly Ser Ser Thr Phe
        90                  95                  100 acc tat cga aca tca agt gat cct acc aat gcc aat gga tgg tca tcg      432
Thr Tyr Arg Thr Ser Ser Asp Pro Thr Asn Ala Asn Gly Trp Ser Ser
105                 110                 115 gag caa gcc ctt ttt tcc ggg aag atc acc gcc ccg gat gct gct att      480
Glu Gln Ala Leu Phe Ser Gly Lys Ile Thr Ala Pro Asp Ala Ala Ile
120                 125                 130 gat cag acc gtt atc ggt gac tct acg cac atg tac ctt ttc ttc gct      528
Asp Gln Thr Val Ile Gly Asp Ser Thr His Met Tyr Leu Phe Phe Ala
135                 140                 145                 150 ggg gac aat ggc aag atc tat cgc agc agc atg tct atc gac aag ttc      576
Gly Asp Asn Gly Lys Ile Tyr Arg Ser Ser Met Ser Ile Asp Lys Phe
                155                 160                 165 cct gga aac ttc gga aca agt tcg gaa ata gta ctg agt ggc gct agg      624
Pro Gly Asn Phe Gly Thr Ser Ser Glu Ile Val Leu Ser Gly Ala Arg
            170                 175                 180 aac gac ctg ttc gaa gca gtt caa gtg tac act gtt aag ggt cag aac      672
Asn Asp Leu Phe Glu Ala Val Gln Val Tyr Thr Val Lys Gly Gln Asn
        185                 190                 195 aag tac ctt atg ctt gtc gaa gca att gga gca caa ggg cag cgg tat      720
Lys Tyr Leu Met Leu Val Glu Ala Ile Gly Ala Gln Gly Gln Arg Tyr
200                 205                 210 ttc cgt tca ttc gtc tcc agc agt ctc ggc ggt aag tgg gaa ccg cag      768
Phe Arg Ser Phe Val Ser Ser Ser Leu Gly Gly Lys Trp Glu Pro Gln
215                 220                 225                 230 gca gca agc gag agc aag ccc ttc gcc gga aaa gcc aat gtc ggt gca      816
Ala Ala Ser Glu Ser Lys Pro Phe Ala Gly Lys Ala Asn Val Gly Ala
                235                 240                 245 acc tgg acc aag gac ttc agt cac ggt gat ttg gtt cga acc aac cct      864
Thr Trp Thr Lys Asp Phe Ser His Gly Asp Leu Val Arg Thr Asn Pro
            250                 255                 260 gac caa aca atg acc gtc gat cca tgc aac ctg caa ctc ctc tac cag      912
Asp Gln Thr Met Thr Val Asp Pro Cys Asn Leu Gln Leu Leu Tyr Gln
        265                 270                 275 gga cgg gat ccc acc gcc acc agt agt aac tac aat acc ata ccg tgg      960
Gly Arg Asp Pro Thr Ala Thr Ser Ser Asn Tyr Asn Thr Ile Pro Trp
280                 285                 290 cag ccc gcc gtt ctc acc ctg aag aag taa                              990
Gln Pro Ala Val Leu Thr Leu Lys Lys
295                 300
```

<210> SEQ ID NO 11

<211> LENGTH: 329
<212> TYPE: PRT
<213> ORGANISM: Penicillium aurantiogriseum

<400> SEQUENCE: 11

```
Met Lys Phe Ser Lys Ala Lys Ala Gly Leu Val Ser Ser Gly Met Leu
    -25                 -20                 -15

Leu Leu Ala Ser Val Pro Val Ala Val Ala Asp Cys Ala Leu Pro Ser
-10                  -5                  -1   1                5

Thr Tyr Thr Trp Thr Ser Thr Gly Ala Leu Ala Asn Pro Lys Ser Gly
                10                  15                  20

Trp Thr Ala Ile Lys Asp Phe Thr Asn Val Val Asn Asn Lys His
                25                  30                  35

Leu Val Tyr Ala Ser Thr Thr Asp Ala Ser Gly Asn Tyr Gly Ala Met
    40                  45                  50

Asn Phe Gly Pro Phe Ser Asp Trp Ser Gly Met Ala Thr Ala Ser Gln
55                  60                  65                  70

Ile Lys Thr Ser Phe Asn Ala Val Ala Pro Thr Leu Phe Tyr Phe Gln
                75                  80                  85

Pro Lys Asp Ile Trp Val Ile Ala Tyr Gln Trp Gly Ser Ser Thr Phe
                90                  95                  100

Thr Tyr Arg Thr Ser Ser Asp Pro Thr Asn Ala Asn Gly Trp Ser Ser
                105                 110                 115

Glu Gln Ala Leu Phe Ser Gly Lys Ile Thr Ala Pro Asp Ala Ala Ile
    120                 125                 130

Asp Gln Thr Val Ile Gly Asp Ser Thr His Met Tyr Leu Phe Phe Ala
135                 140                 145                 150

Gly Asp Asn Gly Lys Ile Tyr Arg Ser Ser Met Ser Ile Asp Lys Phe
                155                 160                 165

Pro Gly Asn Phe Gly Thr Ser Ser Glu Ile Val Leu Ser Gly Ala Arg
                170                 175                 180

Asn Asp Leu Phe Glu Ala Val Gln Val Tyr Thr Val Lys Gly Gln Asn
                185                 190                 195

Lys Tyr Leu Met Leu Val Glu Ala Ile Gly Ala Gln Gly Gln Arg Tyr
200                 205                 210

Phe Arg Ser Phe Val Ser Ser Leu Gly Gly Lys Trp Glu Pro Gln
215                 220                 225                 230

Ala Ala Ser Glu Ser Lys Pro Phe Ala Lys Ala Asn Val Gly Ala
                235                 240                 245

Thr Trp Thr Lys Asp Phe Ser His Gly Asp Leu Val Arg Thr Asn Pro
                250                 255                 260

Asp Gln Thr Met Thr Val Asp Pro Cys Asn Leu Gln Leu Leu Tyr Gln
                265                 270                 275

Gly Arg Asp Pro Thr Ala Thr Ser Ser Asn Tyr Asn Thr Ile Pro Trp
                280                 285                 290

Gln Pro Ala Val Leu Thr Leu Lys Lys
295                 300
```

<210> SEQ ID NO 12
<211> LENGTH: 303
<212> TYPE: PRT
<213> ORGANISM: Penicillium aurantiogriseum

<400> SEQUENCE: 12

```
Asp Cys Ala Leu Pro Ser Thr Tyr Thr Trp Thr Ser Thr Gly Ala Leu
1               5                   10                  15
```

Ala Asn Pro Lys Ser Gly Trp Thr Ala Ile Lys Asp Phe Thr Asn Val
            20                  25                  30

Val Val Asn Asn Lys His Leu Val Tyr Ala Ser Thr Thr Asp Ala Ser
        35                  40                  45

Gly Asn Tyr Gly Ala Met Asn Phe Gly Pro Phe Ser Asp Trp Ser Gly
    50                  55                  60

Met Ala Thr Ala Ser Gln Ile Lys Thr Ser Phe Asn Ala Val Ala Pro
65                  70                  75                  80

Thr Leu Phe Tyr Phe Gln Pro Lys Asp Ile Trp Val Ile Ala Tyr Gln
                85                  90                  95

Trp Gly Ser Ser Thr Phe Thr Tyr Arg Thr Ser Ser Pro Thr Asn
            100                 105                 110

Ala Asn Gly Trp Ser Ser Glu Gln Ala Leu Phe Ser Gly Lys Ile Thr
        115                 120                 125

Ala Pro Asp Ala Ala Ile Asp Gln Thr Val Ile Gly Asp Ser Thr His
    130                 135                 140

Met Tyr Leu Phe Phe Ala Gly Asp Asn Gly Lys Ile Tyr Arg Ser Ser
145                 150                 155                 160

Met Ser Ile Asp Lys Phe Pro Gly Asn Phe Gly Thr Ser Ser Glu Ile
                165                 170                 175

Val Leu Ser Gly Ala Arg Asn Asp Leu Phe Glu Ala Val Gln Val Tyr
            180                 185                 190

Thr Val Lys Gly Gln Asn Lys Tyr Leu Met Leu Val Glu Ala Ile Gly
        195                 200                 205

Ala Gln Gly Gln Arg Tyr Phe Arg Ser Phe Val Ser Ser Ser Leu Gly
    210                 215                 220

Gly Lys Trp Glu Pro Gln Ala Ala Ser Glu Ser Lys Pro Phe Ala Gly
225                 230                 235                 240

Lys Ala Asn Val Gly Ala Thr Trp Thr Lys Asp Phe Ser His Gly Asp
                245                 250                 255

Leu Val Arg Thr Asn Pro Asp Gln Thr Met Thr Val Asp Pro Cys Asn
            260                 265                 270

Leu Gln Leu Leu Tyr Gln Gly Arg Asp Pro Thr Ala Thr Ser Ser Asn
        275                 280                 285

Tyr Asn Thr Ile Pro Trp Gln Pro Ala Val Leu Thr Leu Lys Lys
    290                 295                 300

<210> SEQ ID NO 13
<211> LENGTH: 1212
<212> TYPE: DNA
<213> ORGANISM: Artificial Sequence
<220> FEATURE:
<223> OTHER INFORMATION: codon optimised DNA sequence
<220> FEATURE:
<221> NAME/KEY: CDS
<222> LOCATION: (1)..(1209)
<220> FEATURE:
<221> NAME/KEY: sig_peptide
<222> LOCATION: (1)..(63)
<220> FEATURE:
<221> NAME/KEY: mat_peptide
<222> LOCATION: (64)..(1209)

<400> SEQUENCE: 13 atg atc ttg tcg gcg aag atg ctc gga gcg att ctc ttg gag ttg gcc    48
Met Ile Leu Ser Ala Lys Met Leu Gly Ala Ile Leu Leu Glu Leu Ala
    -20                 -15                 -10 ctc aca gca gca gcg cag cag act ctc tac ggc cag tgt gga ggc aac    96

```
Leu Thr Ala Ala Ala Gln Gln Thr Leu Tyr Gly Gln Cys Gly Gly Asn
 -5          -1   1               5                    10 ggc tgg aca gga ccc acc cag tgt gtg tcg gga gcc tgt tgt cag atc    144
Gly Trp Thr Gly Pro Thr Gln Cys Val Ser Gly Ala Cys Cys Gln Ile
             15                  20                  25 cag aac ccc tgg tat tcg cag tgt ctc cct ggc tcc tgt tcc ccc tcc    192
Gln Asn Pro Trp Tyr Ser Gln Cys Leu Pro Gly Ser Cys Ser Pro Ser
         30                  35                  40 acc act ttg aca cgg gtc aca aca acc gca aca tcc act gca tcc aca    240
Thr Thr Leu Thr Arg Val Thr Thr Thr Ala Thr Ser Thr Ala Ser Thr
     45                  50                  55 gcc act tcc ggc aca gga ggc tcc ttg ccc tcg tcc ttc aag tgg tcg    288
Ala Thr Ser Gly Thr Gly Gly Ser Leu Pro Ser Ser Phe Lys Trp Ser
 60                  65                  70                  75 tcg tcc gga ccc ttg gtc gac cct aag aac gac ggt cga ggc atc gca    336
Ser Ser Gly Pro Leu Val Asp Pro Lys Asn Asp Gly Arg Gly Ile Ala
                 80                  85                  90 gcg ttg aaa gat ccg tcg atc gtc gag gtc gat ggc aca tat cac gtg    384
Ala Leu Lys Asp Pro Ser Ile Val Glu Val Asp Gly Thr Tyr His Val
             95                 100                 105 ttc gca tcg act gca act tcg gca ggc tac aac atg gtg tat ttc aac    432
Phe Ala Ser Thr Ala Thr Ser Ala Gly Tyr Asn Met Val Tyr Phe Asn
         110                 115                 120 ttc acc gat ttc aac cag gca aac aac gca ccc ttc ttc tat ttg gac    480
Phe Thr Asp Phe Asn Gln Ala Asn Asn Ala Pro Phe Phe Tyr Leu Asp
     125                 130                 135 aaa tcg cct att ggc tcg gga tac cga gcc gca ccc cag gtc ttc ttc    528
Lys Ser Pro Ile Gly Ser Gly Tyr Arg Ala Ala Pro Gln Val Phe Phe
140                 145                 150                 155 ttc aag ccc cag aac ttg tgg tac ctc gtc tac cag aac ggc aac gca    576
Phe Lys Pro Gln Asn Leu Trp Tyr Leu Val Tyr Gln Asn Gly Asn Ala
                 160                 165                 170 gcc tac tcg acc aac aaa gat atc tcc aac cct gca ggc tgg tcc gca    624
Ala Tyr Ser Thr Asn Lys Asp Ile Ser Asn Pro Ala Gly Trp Ser Ala
             175                 180                 185 ccc aag aca ttc tac tcg tcg cag ccc tcg atc atc aca gag aac atc    672
Pro Lys Thr Phe Tyr Ser Ser Gln Pro Ser Ile Ile Thr Glu Asn Ile
         190                 195                 200 ggt aac ggt tac tgg gtc gat atg tgg gtc atc tgt gat tcg gcc aac    720
Gly Asn Gly Tyr Trp Val Asp Met Trp Val Ile Cys Asp Ser Ala Asn
     205                 210                 215 tgt cac ttg ttc tcg tcc gac gat aac ggc cat ttg tac cgc tcg cag    768
Cys His Leu Phe Ser Ser Asp Asp Asn Gly His Leu Tyr Arg Ser Gln
220                 225                 230                 235 acg acg ttg gcg aac ttc ccc aac ggt atg acc aac aca gtg atc gcg    816
Thr Thr Leu Ala Asn Phe Pro Asn Gly Met Thr Asn Thr Val Ile Ala
                 240                 245                 250 atg cag gac tcg aac ccc aac aac ttg ttc gag gca tcc aac gtc tac    864
Met Gln Asp Ser Asn Pro Asn Asn Leu Phe Glu Ala Ser Asn Val Tyr
             255                 260                 265 cat gtg gga ggc ggt aag tat ctc ctc att gtc gag gcc atc ggc tcc    912
His Val Gly Gly Gly Lys Tyr Leu Leu Ile Val Glu Ala Ile Gly Ser
         270                 275                 280 gga ggc gac cga tac ttc cgg tcg tgg acg tcg acg tcc ctc act ggt    960
Gly Gly Asp Arg Tyr Phe Arg Ser Trp Thr Ser Thr Ser Leu Thr Gly
     285                 290                 295 acc tgg act gca ctc gca gca tcg gaa tcg aac cct ttc gca ggt gcc   1008
Thr Trp Thr Ala Leu Ala Ala Ser Glu Ser Asn Pro Phe Ala Gly Ala
300                 305                 310                 315
```

```
aag aac gtg gcc ttc tcc ggc aac gtc tgg acc aaa tcc atc tcg cac      1056
Lys Asn Val Ala Phe Ser Gly Asn Val Trp Thr Lys Ser Ile Ser His
            320                 325                 330 gga gag atg atc cga gac cag gtg gat cag acc ttg aca atc tcc ccg      1104
Gly Glu Met Ile Arg Asp Gln Val Asp Gln Thr Leu Thr Ile Ser Pro
335                 340                 345 tgt aag ctc agg tac ttg tac cag ggc gtc gat ccg gca gca acc ggt      1152
Cys Lys Leu Arg Tyr Leu Tyr Gln Gly Val Asp Pro Ala Ala Thr Gly
        350                 355                 360 aac tac aac tcg ttg ccg tgg aag ctc gcg ctc ctc acg cag acg aac      1200
Asn Tyr Asn Ser Leu Pro Trp Lys Leu Ala Leu Leu Thr Gln Thr Asn
    365                 370                 375 tcg gca tgt tga                                                      1212
Ser Ala Cys
380
```

<210> SEQ ID NO 14
<211> LENGTH: 403
<212> TYPE: PRT
<213> ORGANISM: Artificial Sequence
<220> FEATURE:
<223> OTHER INFORMATION: Synthetic Construct

<400> SEQUENCE: 14

```
Met Ile Leu Ser Ala Lys Met Leu Gly Ala Ile Leu Leu Glu Leu Ala
    -20                 -15                 -10

Leu Thr Ala Ala Ala Gln Gln Thr Leu Tyr Gly Gln Cys Gly Gly Asn
 -5                  -1  1               5                  10

Gly Trp Thr Gly Pro Thr Gln Cys Val Ser Gly Ala Cys Cys Gln Ile
             15                  20                  25

Gln Asn Pro Trp Tyr Ser Gln Cys Leu Pro Gly Ser Cys Ser Pro Ser
         30                  35                  40

Thr Thr Leu Thr Arg Val Thr Thr Ala Thr Ser Thr Ala Ser Thr
     45                  50                  55

Ala Thr Ser Gly Thr Gly Gly Ser Leu Pro Ser Ser Phe Lys Trp Ser
60                  65                  70                  75

Ser Ser Gly Pro Leu Val Asp Pro Lys Asn Asp Gly Arg Gly Ile Ala
                 80                  85                  90

Ala Leu Lys Asp Pro Ser Ile Val Glu Val Asp Gly Thr Tyr His Val
             95                 100                 105

Phe Ala Ser Thr Ala Thr Ser Ala Gly Tyr Asn Met Val Tyr Phe Asn
         110                 115                 120

Phe Thr Asp Phe Asn Gln Ala Asn Asn Ala Pro Phe Phe Tyr Leu Asp
     125                 130                 135

Lys Ser Pro Ile Gly Ser Gly Tyr Arg Ala Ala Pro Gln Val Phe Phe
140                 145                 150                 155

Phe Lys Pro Gln Asn Leu Trp Tyr Leu Val Tyr Gln Asn Gly Asn Ala
                 160                 165                 170

Ala Tyr Ser Thr Asn Lys Asp Ile Ser Asn Pro Ala Gly Trp Ser Ala
             175                 180                 185

Pro Lys Thr Phe Tyr Ser Ser Gln Pro Ser Ile Ile Thr Glu Asn Ile
         190                 195                 200

Gly Asn Gly Tyr Trp Val Asp Met Trp Val Ile Cys Asp Ser Ala Asn
     205                 210                 215

Cys His Leu Phe Ser Ser Asp Asp Asn Gly His Leu Tyr Arg Ser Gln
220                 225                 230                 235

Thr Thr Leu Ala Asn Phe Pro Asn Gly Met Thr Asn Thr Val Ile Ala
```

-continued

```
                240                 245                 250
Met Gln Asp Ser Asn Pro Asn Asn Leu Phe Glu Ala Ser Asn Val Tyr
            255                 260                 265

His Val Gly Gly Gly Lys Tyr Leu Leu Ile Val Glu Ala Ile Gly Ser
        270                 275                 280

Gly Gly Asp Arg Tyr Phe Arg Ser Trp Thr Ser Ser Leu Thr Gly
    285                 290                 295

Thr Trp Thr Ala Leu Ala Ala Ser Glu Ser Asn Pro Phe Ala Gly Ala
300                 305                 310                 315

Lys Asn Val Ala Phe Ser Gly Asn Val Trp Thr Lys Ser Ile Ser His
            320                 325                 330

Gly Glu Met Ile Arg Asp Gln Val Asp Gln Thr Leu Thr Ile Ser Pro
        335                 340                 345

Cys Lys Leu Arg Tyr Leu Tyr Gln Gly Val Asp Pro Ala Ala Thr Gly
    350                 355                 360

Asn Tyr Asn Ser Leu Pro Trp Lys Leu Ala Leu Leu Thr Gln Thr Asn
365                 370                 375

Ser Ala Cys
380

<210> SEQ ID NO 15
<211> LENGTH: 382
<212> TYPE: PRT
<213> ORGANISM: Aspergillus clavatus

<400> SEQUENCE: 15

Gln Gln Thr Leu Tyr Gly Gln Cys Gly Gly Asn Gly Trp Thr Gly Pro
1               5                   10                  15

Thr Gln Cys Val Ser Gly Ala Cys Cys Gln Ile Gln Asn Pro Trp Tyr
            20                  25                  30

Ser Gln Cys Leu Pro Gly Ser Cys Ser Pro Ser Thr Thr Leu Thr Arg
        35                  40                  45

Val Thr Thr Ala Thr Ser Thr Ala Ser Thr Ala Thr Ser Gly Thr
    50                  55                  60

Gly Gly Ser Leu Pro Ser Ser Phe Lys Trp Ser Ser Gly Pro Leu
65                  70                  75                  80

Val Asp Pro Lys Asn Asp Gly Arg Gly Ile Ala Ala Leu Lys Asp Pro
                85                  90                  95

Ser Ile Val Glu Val Asp Gly Thr Tyr His Val Phe Ala Ser Thr Ala
            100                 105                 110

Thr Ser Ala Gly Tyr Asn Met Val Tyr Phe Asn Phe Thr Asp Phe Asn
        115                 120                 125

Gln Ala Asn Asn Ala Pro Phe Phe Tyr Leu Asp Lys Ser Pro Ile Gly
    130                 135                 140

Ser Gly Tyr Arg Ala Ala Pro Gln Val Phe Phe Lys Pro Gln Asn
145                 150                 155                 160

Leu Trp Tyr Leu Val Tyr Gln Asn Gly Asn Ala Ala Tyr Ser Thr Asn
                165                 170                 175

Lys Asp Ile Ser Asn Pro Ala Gly Trp Ser Ala Pro Lys Thr Phe Tyr
            180                 185                 190

Ser Ser Gln Pro Ser Ile Ile Thr Glu Asn Ile Gly Asn Gly Tyr Trp
        195                 200                 205

Val Asp Met Trp Val Ile Cys Asp Ser Ala Asn Cys His Leu Phe Ser
    210                 215                 220
```

-continued

```
Ser Asp Asp Asn Gly His Leu Tyr Arg Ser Gln Thr Thr Leu Ala Asn
225                 230                 235                 240

Phe Pro Asn Gly Met Thr Asn Thr Val Ile Ala Met Gln Asp Ser Asn
                245                 250                 255

Pro Asn Asn Leu Phe Glu Ala Ser Asn Val Tyr His Val Gly Gly Gly
            260                 265                 270

Lys Tyr Leu Leu Ile Val Glu Ala Ile Gly Ser Gly Gly Asp Arg Tyr
        275                 280                 285

Phe Arg Ser Trp Thr Ser Thr Ser Leu Thr Gly Thr Trp Thr Ala Leu
    290                 295                 300

Ala Ala Ser Glu Ser Asn Pro Phe Ala Gly Ala Lys Asn Val Ala Phe
305                 310                 315                 320

Ser Gly Asn Val Trp Thr Lys Ser Ile Ser His Gly Glu Met Ile Arg
                325                 330                 335

Asp Gln Val Asp Gln Thr Leu Thr Ile Ser Pro Cys Lys Leu Arg Tyr
            340                 345                 350

Leu Tyr Gln Gly Val Asp Pro Ala Ala Thr Gly Asn Tyr Asn Ser Leu
        355                 360                 365

Pro Trp Lys Leu Ala Leu Leu Thr Gln Thr Asn Ser Ala Cys
    370                 375                 380
```

<210> SEQ ID NO 16
<211> LENGTH: 1188
<212> TYPE: DNA
<213> ORGANISM: Artificial Sequence
<220> FEATURE:
<223> OTHER INFORMATION: codon optimised DNA sequence
<220> FEATURE:
<221> NAME/KEY: CDS
<222> LOCATION: (1)..(1185)
<220> FEATURE:
<221> NAME/KEY: sig_peptide
<222> LOCATION: (1)..(51)
<220> FEATURE:
<221> NAME/KEY: mat_peptide
<222> LOCATION: (52)..(1185)

<400> SEQUENCE: 16

```
atg aag gcg atc gga gcg acc ctc ctc gga ttg gcc ctc gcg gtg cag      48
Met Lys Ala Ile Gly Ala Thr Leu Leu Gly Leu Ala Leu Ala Val Gln
        -15                 -10                  -5 gca cag cag ccg ctc tat gca cag tgt gga ggc aac gga tgg acc ggt      96
Ala Gln Gln Pro Leu Tyr Ala Gln Cys Gly Gly Asn Gly Trp Thr Gly
 -1   1               5                  10                  15 tcg acg cag tgt gtg gca ggt gcc tgt tgt tcg tcc att aac gcc tgg     144
Ser Thr Gln Cys Val Ala Gly Ala Cys Cys Ser Ser Ile Asn Ala Trp
                 20                  25                  30 tac tat cag tgt ttg tcc gga aac tgt atg ccc tcg aca acg atg acg     192
Tyr Tyr Gln Cys Leu Ser Gly Asn Cys Met Pro Ser Thr Thr Met Thr
             35                  40                  45 aca acc gca act agg acc aca tcg acc tcc acg tcc gga ccc acg ggc     240
Thr Thr Ala Thr Arg Thr Thr Ser Thr Ser Thr Ser Gly Pro Thr Gly
         50                  55                  60 tcc ttg cct cct tcc ttc aag tgg tcc tcg acc aac gcc ctc gtg ggt     288
Ser Leu Pro Pro Ser Phe Lys Trp Ser Ser Thr Asn Ala Leu Val Gly
 65                  70                  75 cct aag aac gat ggc cga aac ctc gca ggt atc aaa gat ccg tcc atc     336
Pro Lys Asn Asp Gly Arg Asn Leu Ala Gly Ile Lys Asp Pro Ser Ile
 80                  85                  90                  95 atc gaa gtg gac ggc aca tac cat gtg ttc gcc tcg aca gcg cag gcc     384
Ile Glu Val Asp Gly Thr Tyr His Val Phe Ala Ser Thr Ala Gln Ala
```

|  |  |  |  |  |  |  |  |  |  |  |  |  |  |  |  |
|---|---|---|---|---|---|---|---|---|---|---|---|---|---|---|---|
|  |  |  | 100 |  |  |  | 105 |  |  |  | 110 |  |  |  |  |
| tcc | ggc | tat | aac | ttg | gtc | tac | ttc | aac | ttc | acc | gac | ttc | aac | cag | gca | 432 |
| Ser | Gly | Tyr | Asn | Leu | Val | Tyr | Phe | Asn | Phe | Thr | Asp | Phe | Asn | Gln | Ala |  |
|  |  |  | 115 |  |  |  | 120 |  |  |  | 125 |  |  |  |  |
| ggt | aac | gca | ccc | ttc | ttc | tac | ttg | gat | cag | tcg | ggc | att | ggc | aca | ggt | 480 |
| Gly | Asn | Ala | Pro | Phe | Phe | Tyr | Leu | Asp | Gln | Ser | Gly | Ile | Gly | Thr | Gly |  |
|  |  | 130 |  |  |  |  | 135 |  |  |  | 140 |  |  |  |  |
| tat | cgg | gca | gca | ccc | cag | gtg | ttc | tac | ttc | cag | cct | cag | cag | ttg | tgg | 528 |
| Tyr | Arg | Ala | Ala | Pro | Gln | Val | Phe | Tyr | Phe | Gln | Pro | Gln | Gln | Leu | Trp |  |
|  | 145 |  |  |  |  | 150 |  |  |  |  | 155 |  |  |  |  |
| tac | ctc | atc | ttc | cag | aac | gga | aac | gca | gca | tac | tcg | acc | aac | aag | gat | 576 |
| Tyr | Leu | Ile | Phe | Gln | Asn | Gly | Asn | Ala | Ala | Tyr | Ser | Thr | Asn | Lys | Asp |  |
| 160 |  |  |  |  | 165 |  |  |  |  | 170 |  |  |  |  | 175 |  |
| atc | tcc | aac | cct | gca | ggt | tgg | tcc | gca | ccg | aaa | aac | ttc | ttc | tcc | tcg | 624 |
| Ile | Ser | Asn | Pro | Ala | Gly | Trp | Ser | Ala | Pro | Lys | Asn | Phe | Phe | Ser | Ser |  |
|  |  |  | 180 |  |  |  | 185 |  |  |  | 190 |  |  |  |  |
| gtc | cct | tcc | att | atc | acg | cag | aac | atc | ggt | aac | ggc | tac | tgg | gtc | gat | 672 |
| Val | Pro | Ser | Ile | Ile | Thr | Gln | Asn | Ile | Gly | Asn | Gly | Tyr | Trp | Val | Asp |  |
|  |  |  | 195 |  |  |  | 200 |  |  |  | 205 |  |  |  |  |
| atg | tgg | gtc | atc | tgt | gac | tcg | tcc | aac | tgt | tac | ttg | ttc | tcc | tcg | gat | 720 |
| Met | Trp | Val | Ile | Cys | Asp | Ser | Ser | Asn | Cys | Tyr | Leu | Phe | Ser | Ser | Asp |  |
|  |  |  | 210 |  |  |  | 215 |  |  |  | 220 |  |  |  |  |
| gac | aac | ggc | cat | ctc | tac | cga | tcc | cag | acg | acg | ttg | tcg | aac | ttc | ccc | 768 |
| Asp | Asn | Gly | His | Leu | Tyr | Arg | Ser | Gln | Thr | Thr | Leu | Ser | Asn | Phe | Pro |  |
|  | 225 |  |  |  |  | 230 |  |  |  |  | 235 |  |  |  |  |
| aac | ggc | atg | ggt | aac | acc | gtc | atc | gcc | ctc | tcg | gat | tcc | aac | ccc | aac | 816 |
| Asn | Gly | Met | Gly | Asn | Thr | Val | Ile | Ala | Leu | Ser | Asp | Ser | Asn | Pro | Asn |  |
| 240 |  |  |  |  | 245 |  |  |  |  | 250 |  |  |  |  | 255 |  |
| aac | ttg | ttc | gag | gcc | tcg | aac | gtc | tac | cgg | gtg | ggc | aac | gag | tac | ctc | 864 |
| Asn | Leu | Phe | Glu | Ala | Ser | Asn | Val | Tyr | Arg | Val | Gly | Asn | Glu | Tyr | Leu |  |
|  |  |  | 260 |  |  |  | 265 |  |  |  | 270 |  |  |  |  |
| ctc | atc | gtc | gag | gca | atc | ggt | tcc | gat | gga | aac | agg | tat | ttc | cgc | tcg | 912 |
| Leu | Ile | Val | Glu | Ala | Ile | Gly | Ser | Asp | Gly | Asn | Arg | Tyr | Phe | Arg | Ser |  |
|  |  |  | 275 |  |  |  | 280 |  |  |  | 285 |  |  |  |  |
| tgg | aca | gca | ccg | tcg | ctc | aca | ggt | acg | tgg | aca | ggc | ctc | gca | aac | aca | 960 |
| Trp | Thr | Ala | Pro | Ser | Leu | Thr | Gly | Thr | Trp | Thr | Gly | Leu | Ala | Asn | Thr |  |
|  |  | 290 |  |  |  |  | 295 |  |  |  | 300 |  |  |  |  |
| gaa | gcc | aac | ccc | ttc | gcc | agg | tgg | aac | aac | gtc | gtg | ttc | tcc | ggc | acg | 1008 |
| Glu | Ala | Asn | Pro | Phe | Ala | Arg | Trp | Asn | Asn | Val | Val | Phe | Ser | Gly | Thr |  |
|  | 305 |  |  |  |  | 310 |  |  |  |  | 315 |  |  |  |  |
| gcc | tgg | act | aag | tcg | atc | tcg | cac | ggc | gag | atg | gtg | cga | tcc | cag | gtc | 1056 |
| Ala | Trp | Thr | Lys | Ser | Ile | Ser | His | Gly | Glu | Met | Val | Arg | Ser | Gln | Val |  |
| 320 |  |  |  |  | 325 |  |  |  |  | 330 |  |  |  |  | 335 |  |
| gac | cag | acg | atg | aca | att | tcg | ccg | tgt | aag | ttg | agg | tac | ttg | tat | cag | 1104 |
| Asp | Gln | Thr | Met | Thr | Ile | Ser | Pro | Cys | Lys | Leu | Arg | Tyr | Leu | Tyr | Gln |  |
|  |  |  | 340 |  |  |  | 345 |  |  |  | 350 |  |  |  |  |
| ggc | ttg | tcg | ccc | act | gca | aca | ggc | gac | tat | aac | tcc | ttg | ccc | tgg | aag | 1152 |
| Gly | Leu | Ser | Pro | Thr | Ala | Thr | Gly | Asp | Tyr | Asn | Ser | Leu | Pro | Trp | Lys |  |
|  |  | 355 |  |  |  |  | 360 |  |  |  | 365 |  |  |  |  |
| ttg | gcc | ctc | ctc | acc | cag | aca | aac | tcg | gca | tgt | tag |  |  |  |  | 1188 |
| Leu | Ala | Leu | Leu | Thr | Gln | Thr | Asn | Ser | Ala | Cys |  |  |  |  |  |  |
|  | 370 |  |  |  |  | 375 |  |  |  |  |  |  |  |  |  |  |

<210> SEQ ID NO 17
<211> LENGTH: 395
<212> TYPE: PRT
<213> ORGANISM: Artificial Sequence
<220> FEATURE:
<223> OTHER INFORMATION: Synthetic Construct

<400> SEQUENCE: 17

Met Lys Ala Ile Gly Ala Thr Leu Leu Gly Leu Ala Leu Ala Val Gln
    -15              -10              -5

Ala Gln Gln Pro Leu Tyr Ala Gln Cys Gly Asn Gly Trp Thr Gly
-1  1            5                10                  15

Ser Thr Gln Cys Val Ala Gly Ala Cys Cys Ser Ser Ile Asn Ala Trp
            20              25                  30

Tyr Tyr Gln Cys Leu Ser Gly Asn Cys Met Pro Ser Thr Thr Met Thr
            35              40              45

Thr Thr Ala Thr Arg Thr Thr Ser Thr Ser Thr Ser Gly Pro Thr Gly
        50              55              60

Ser Leu Pro Pro Ser Phe Lys Trp Ser Ser Thr Asn Ala Leu Val Gly
    65              70              75

Pro Lys Asn Asp Gly Arg Asn Leu Ala Gly Ile Lys Asp Pro Ser Ile
80              85              90              95

Ile Glu Val Asp Gly Thr Tyr His Val Phe Ala Ser Thr Ala Gln Ala
                100             105             110

Ser Gly Tyr Asn Leu Val Tyr Phe Asn Phe Thr Asp Phe Asn Gln Ala
            115             120             125

Gly Asn Ala Pro Phe Phe Tyr Leu Asp Gln Ser Gly Ile Gly Thr Gly
        130             135             140

Tyr Arg Ala Ala Pro Gln Val Phe Tyr Phe Gln Pro Gln Gln Leu Trp
145             150             155

Tyr Leu Ile Phe Gln Asn Gly Asn Ala Ala Tyr Ser Thr Asn Lys Asp
160             165             170             175

Ile Ser Asn Pro Ala Gly Trp Ser Ala Pro Lys Asn Phe Phe Ser Ser
                180             185             190

Val Pro Ser Ile Ile Thr Gln Asn Ile Gly Asn Gly Tyr Trp Val Asp
            195             200             205

Met Trp Val Ile Cys Asp Ser Ser Asn Cys Tyr Leu Phe Ser Ser Asp
        210             215             220

Asp Asn Gly His Leu Tyr Arg Ser Gln Thr Thr Leu Ser Asn Phe Pro
    225             230             235

Asn Gly Met Gly Asn Thr Val Ile Ala Leu Ser Asp Ser Asn Pro Asn
240             245             250             255

Asn Leu Phe Glu Ala Ser Asn Val Tyr Arg Val Gly Asn Glu Tyr Leu
            260             265             270

Leu Ile Val Glu Ala Ile Gly Ser Asp Gly Asn Arg Tyr Phe Arg Ser
        275             280             285

Trp Thr Ala Pro Ser Leu Thr Gly Thr Trp Thr Gly Leu Ala Asn Thr
    290             295             300

Glu Ala Asn Pro Phe Ala Arg Trp Asn Asn Val Val Phe Ser Gly Thr
    305             310             315

Ala Trp Thr Lys Ser Ile Ser His Gly Glu Met Val Arg Ser Gln Val
320             325             330             335

Asp Gln Thr Met Thr Ile Ser Pro Cys Lys Leu Arg Tyr Leu Tyr Gln
            340             345             350

Gly Leu Ser Pro Thr Ala Thr Gly Asp Tyr Asn Ser Leu Pro Trp Lys
        355             360             365

Leu Ala Leu Leu Thr Gln Thr Asn Ser Ala Cys
        370             375

<210> SEQ ID NO 18
<211> LENGTH: 378

<212> TYPE: PRT
<213> ORGANISM: Neosartorya fischeri

<400> SEQUENCE: 18

Gln Gln Pro Leu Tyr Ala Gln Cys Gly Gly Asn Gly Trp Thr Gly Ser
1               5                   10                  15

Thr Gln Cys Val Ala Gly Ala Cys Cys Ser Ser Ile Asn Ala Trp Tyr
            20                  25                  30

Tyr Gln Cys Leu Ser Gly Asn Cys Met Pro Ser Thr Thr Met Thr Thr
        35                  40                  45

Thr Ala Thr Arg Thr Thr Ser Thr Ser Thr Ser Gly Pro Thr Gly Ser
    50                  55                  60

Leu Pro Pro Ser Phe Lys Trp Ser Ser Thr Asn Ala Leu Val Gly Pro
65                  70                  75                  80

Lys Asn Asp Gly Arg Asn Leu Ala Gly Ile Lys Asp Pro Ser Ile Ile
                85                  90                  95

Glu Val Asp Gly Thr Tyr His Val Phe Ala Ser Thr Ala Gln Ala Ser
            100                 105                 110

Gly Tyr Asn Leu Val Tyr Phe Asn Phe Thr Asp Phe Asn Gln Ala Gly
        115                 120                 125

Asn Ala Pro Phe Phe Tyr Leu Asp Gln Ser Gly Ile Gly Thr Gly Tyr
    130                 135                 140

Arg Ala Ala Pro Gln Val Phe Tyr Phe Gln Pro Gln Gln Leu Trp Tyr
145                 150                 155                 160

Leu Ile Phe Gln Asn Gly Asn Ala Ala Tyr Ser Thr Asn Lys Asp Ile
                165                 170                 175

Ser Asn Pro Ala Gly Trp Ser Ala Pro Lys Asn Phe Phe Ser Ser Val
            180                 185                 190

Pro Ser Ile Ile Thr Gln Asn Ile Gly Asn Gly Tyr Trp Val Asp Met
        195                 200                 205

Trp Val Ile Cys Asp Ser Ser Asn Cys Tyr Leu Phe Ser Ser Asp Asp
    210                 215                 220

Asn Gly His Leu Tyr Arg Ser Gln Thr Thr Leu Ser Asn Phe Pro Asn
225                 230                 235                 240

Gly Met Gly Asn Thr Val Ile Ala Leu Ser Asp Ser Asn Pro Asn Asn
                245                 250                 255

Leu Phe Glu Ala Ser Asn Val Tyr Arg Val Gly Asn Glu Tyr Leu Leu
            260                 265                 270

Ile Val Glu Ala Ile Gly Ser Asp Gly Asn Arg Tyr Phe Arg Ser Trp
        275                 280                 285

Thr Ala Pro Ser Leu Thr Gly Thr Trp Thr Gly Leu Ala Asn Thr Glu
    290                 295                 300

Ala Asn Pro Phe Ala Arg Trp Asn Asn Val Val Phe Ser Gly Thr Ala
305                 310                 315                 320

Trp Thr Lys Ser Ile Ser His Gly Glu Met Val Arg Ser Gln Val Asp
                325                 330                 335

Gln Thr Met Thr Ile Ser Pro Cys Lys Leu Arg Tyr Leu Tyr Gln Gly
            340                 345                 350

Leu Ser Pro Thr Ala Thr Gly Asp Tyr Asn Ser Leu Pro Trp Lys Leu
        355                 360                 365

Ala Leu Leu Thr Gln Thr Asn Ser Ala Cys
    370                 375

<210> SEQ ID NO 19

```
<211> LENGTH: 996
<212> TYPE: DNA
<213> ORGANISM: Artificial Sequence
<220> FEATURE:
<223> OTHER INFORMATION: codon optimised DNA sequence
<220> FEATURE:
<221> NAME/KEY: CDS
<222> LOCATION: (1)..(993)
<220> FEATURE:
<221> NAME/KEY: sig_peptide
<222> LOCATION: (1)..(60)
<220> FEATURE:
<221> NAME/KEY: mat_peptide
<222> LOCATION: (61)..(993)

<400> SEQUENCE: 19 atg aaa ttg tcc tgt gca ttc gtc gca gtg gca gca ttg gtg gcg acc       48
Met Lys Leu Ser Cys Ala Phe Val Ala Val Ala Ala Leu Val Ala Thr
-20             -15                 -10                 -5 gca gtg gag gcc aac ccc gag acc gaa cga agg cgg tcc tgt gcg ctc       96
Ala Val Glu Ala Asn Pro Glu Thr Glu Arg Arg Arg Ser Cys Ala Leu
            -1   1               5                  10 cct aca aca tat cgg tgg acg tcc tcg gca ccg ctc gcc cag ccc aag      144
Pro Thr Thr Tyr Arg Trp Thr Ser Ser Ala Pro Leu Ala Gln Pro Lys
            15                  20                  25 gat ggc tgg gtc tcc ttg aaa gat ttc act cat gtc ccg tac aac gga      192
Asp Gly Trp Val Ser Leu Lys Asp Phe Thr His Val Pro Tyr Asn Gly
        30                  35                  40 cag cac ttg gtg tat gca tcc tac cat gat tcg acc aag tat gga tcg      240
Gln His Leu Val Tyr Ala Ser Tyr His Asp Ser Thr Lys Tyr Gly Ser
45                  50                  55                  60 atg gca ttc tcc ccc ttc aag cac tgg gca gat atg gcg aca gca acc      288
Met Ala Phe Ser Pro Phe Lys His Trp Ala Asp Met Ala Thr Ala Thr
                65                  70                  75 cag acg gga atg aca cag gca gcc gtg gca ccg acg gtg ttc tac ttc      336
Gln Thr Gly Met Thr Gln Ala Ala Val Ala Pro Thr Val Phe Tyr Phe
            80                  85                  90 aca ccc aaa aag ctc tgg ttc ttg gtg tcc cag tgg ggt tcg gca ccc      384
Thr Pro Lys Lys Leu Trp Phe Leu Val Ser Gln Trp Gly Ser Ala Pro
        95                  100                 105 ttc aca tac cgg act tcg acg gac cct aca aaa gtc aac ggc tgg tcg      432
Phe Thr Tyr Arg Thr Ser Thr Asp Pro Thr Lys Val Asn Gly Trp Ser
110                 115                 120 gca ccc cag ccc ctc ttc acg ggc aaa gtg gca gat tcc ggc aca gga      480
Ala Pro Gln Pro Leu Phe Thr Gly Lys Val Ala Asp Ser Gly Thr Gly
125                 130                 135                 140 ccg atc gat cag aca gtg atc gcg gat gac cgg aag gtc tac ttg ttc      528
Pro Ile Asp Gln Thr Val Ile Ala Asp Asp Arg Lys Val Tyr Leu Phe
            145                 150                 155 ttc gtc gca gac aac gga aag gtg tac cgc aca tcc atg gca att gga      576
Phe Val Ala Asp Asn Gly Lys Val Tyr Arg Thr Ser Met Ala Ile Gly
        160                 165                 170 gac ttc cct gcc aac ttc ggc aca gcc tcc gag gtg att ttg tcg gat      624
Asp Phe Pro Ala Asn Phe Gly Thr Ala Ser Glu Val Ile Leu Ser Asp
    175                 180                 185 acc cag gca aag ttg ttc gaa gca gtc cag gtc tac acc gtg gca ggt      672
Thr Gln Ala Lys Leu Phe Glu Ala Val Gln Val Tyr Thr Val Ala Gly
190                 195                 200 cag aac cag tac ctc atg atc gtg gag gcc cag ggt acc aac gga agg      720
Gln Asn Gln Tyr Leu Met Ile Val Glu Ala Gln Gly Thr Asn Gly Arg
205                 210                 215                 220 tac ttc cgg tcc ttc act gca aac tcg ttg gat gga gag tgg aag gtg      768
Tyr Phe Arg Ser Phe Thr Ala Asn Ser Leu Asp Gly Glu Trp Lys Val
```

```
                      225                 230                 235
cag gca ggc tcg gag tcc gca cct ttc gca ggc aag gcc aac tcg gga    816
Gln Ala Gly Ser Glu Ser Ala Pro Phe Ala Gly Lys Ala Asn Ser Gly
            240                 245                 250 gcg tcc tgg acc aac gat gtc tcc cac ggt gat ctc att agg tcc aac    864
Ala Ser Trp Thr Asn Asp Val Ser His Gly Asp Leu Ile Arg Ser Asn
        255                 260                 265 ccg gat cag aca atg acc atc gat cct tgt cgc ctc cag ctc ctc tac    912
Pro Asp Gln Thr Met Thr Ile Asp Pro Cys Arg Leu Gln Leu Leu Tyr
    270                 275                 280 cag gga cgc gac aag aac aag gtc ccg tcc tat gat ttg gca ccg        960
Gln Gly Arg Asp Lys Asn Lys Val Pro Ser Ser Tyr Asp Leu Ala Pro
285                 290                 295                 300 tat cgc cct ggc ctc ctc acc ttg tat ggc ctc tag                    996
Tyr Arg Pro Gly Leu Leu Thr Leu Tyr Gly Leu
                305                 310

<210> SEQ ID NO 20
<211> LENGTH: 331
<212> TYPE: PRT
<213> ORGANISM: Artificial Sequence
<220> FEATURE:
<223> OTHER INFORMATION: Synthetic Construct

<400> SEQUENCE: 20

Met Lys Leu Ser Cys Ala Phe Val Ala Val Ala Ala Leu Val Ala Thr
-20                 -15                 -10                  -5

Ala Val Glu Ala Asn Pro Glu Thr Glu Arg Arg Ser Cys Ala Leu
        -1  1               5                  10

Pro Thr Thr Tyr Arg Trp Thr Ser Ser Ala Pro Leu Ala Gln Pro Lys
            15                  20                  25

Asp Gly Trp Val Ser Leu Lys Asp Phe Thr His Val Pro Tyr Asn Gly
        30                  35                  40

Gln His Leu Val Tyr Ala Ser Tyr His Asp Ser Thr Lys Tyr Gly Ser
45                  50                  55                  60

Met Ala Phe Ser Pro Phe Lys His Trp Ala Asp Met Ala Thr Ala Thr
                65                  70                  75

Gln Thr Gly Met Thr Gln Ala Ala Val Ala Pro Thr Val Phe Tyr Phe
            80                  85                  90

Thr Pro Lys Lys Leu Trp Phe Leu Val Ser Gln Trp Gly Ser Ala Pro
        95                  100                 105

Phe Thr Tyr Arg Thr Ser Thr Asp Pro Thr Lys Val Asn Gly Trp Ser
    110                 115                 120

Ala Pro Gln Pro Leu Phe Thr Gly Lys Val Ala Asp Ser Gly Thr Gly
125                 130                 135                 140

Pro Ile Asp Gln Thr Val Ile Ala Asp Arg Lys Val Tyr Leu Phe
                145                 150                 155

Phe Val Ala Asp Asn Gly Lys Val Tyr Arg Thr Ser Met Ala Ile Gly
            160                 165                 170

Asp Phe Pro Ala Asn Phe Gly Thr Ala Ser Glu Val Ile Leu Ser Asp
        175                 180                 185

Thr Gln Ala Lys Leu Phe Glu Ala Val Gln Val Tyr Thr Val Ala Gly
    190                 195                 200

Gln Asn Gln Tyr Leu Met Ile Val Glu Ala Gln Gly Thr Asn Gly Arg
205                 210                 215                 220

Tyr Phe Arg Ser Phe Thr Ala Asn Ser Leu Asp Gly Glu Trp Lys Val
                225                 230                 235
```

```
Gln Ala Gly Ser Glu Ser Ala Pro Phe Ala Gly Lys Ala Asn Ser Gly
            240                 245                 250

Ala Ser Trp Thr Asn Asp Val Ser His Gly Asp Leu Ile Arg Ser Asn
        255                 260                 265

Pro Asp Gln Thr Met Thr Ile Asp Pro Cys Arg Leu Gln Leu Leu Tyr
270                 275                 280

Gln Gly Arg Asp Lys Asn Lys Val Pro Ser Ser Tyr Asp Leu Ala Pro
285                 290                 295                 300

Tyr Arg Pro Gly Leu Leu Thr Leu Tyr Gly Leu
                305                 310
```

<210> SEQ ID NO 21
<211> LENGTH: 311
<212> TYPE: PRT
<213> ORGANISM: Ustilago maydis

<400> SEQUENCE: 21

```
Asn Pro Glu Thr Glu Arg Arg Ser Cys Ala Leu Pro Thr Thr Tyr
1               5                   10                  15

Arg Trp Thr Ser Ser Ala Pro Leu Ala Gln Pro Lys Asp Gly Trp Val
                20                  25                  30

Ser Leu Lys Asp Phe Thr His Val Pro Tyr Asn Gly Gln His Leu Val
            35                  40                  45

Tyr Ala Ser Tyr His Asp Ser Thr Lys Tyr Gly Ser Met Ala Phe Ser
        50                  55                  60

Pro Phe Lys His Trp Ala Asp Met Ala Thr Ala Thr Gln Thr Gly Met
65                  70                  75                  80

Thr Gln Ala Ala Val Ala Pro Thr Val Phe Tyr Phe Thr Pro Lys Lys
                85                  90                  95

Leu Trp Phe Leu Val Ser Gln Trp Gly Ser Ala Pro Phe Thr Tyr Arg
            100                 105                 110

Thr Ser Thr Asp Pro Thr Lys Val Asn Gly Trp Ser Ala Pro Gln Pro
        115                 120                 125

Leu Phe Thr Gly Lys Val Ala Asp Ser Gly Thr Gly Pro Ile Asp Gln
    130                 135                 140

Thr Val Ile Ala Asp Asp Arg Lys Val Tyr Leu Phe Val Ala Asp
145                 150                 155                 160

Asn Gly Lys Val Tyr Arg Thr Ser Met Ala Ile Gly Asp Phe Pro Ala
                165                 170                 175

Asn Phe Gly Thr Ala Ser Glu Val Ile Leu Ser Asp Thr Gln Ala Lys
            180                 185                 190

Leu Phe Glu Ala Val Gln Val Tyr Thr Val Ala Gly Gln Asn Gln Tyr
        195                 200                 205

Leu Met Ile Val Glu Ala Gln Gly Thr Asn Gly Arg Tyr Phe Arg Ser
    210                 215                 220

Phe Thr Ala Asn Ser Leu Asp Gly Glu Trp Lys Val Gln Ala Gly Ser
225                 230                 235                 240

Glu Ser Ala Pro Phe Ala Gly Lys Ala Asn Ser Gly Ala Ser Trp Thr
                245                 250                 255

Asn Asp Val Ser His Gly Asp Leu Ile Arg Ser Asn Pro Asp Gln Thr
            260                 265                 270

Met Thr Ile Asp Pro Cys Arg Leu Gln Leu Leu Tyr Gln Gly Arg Asp
        275                 280                 285

Lys Asn Lys Val Pro Ser Ser Tyr Asp Leu Ala Pro Tyr Arg Pro Gly
```

```
                290                 295                 300
Leu Leu Thr Leu Tyr Gly Leu
305                 310

<210> SEQ ID NO 22
<211> LENGTH: 996
<212> TYPE: DNA
<213> ORGANISM: Penicillium oxalicum
<220> FEATURE:
<221> NAME/KEY: CDS
<222> LOCATION: (1)..(993)
<220> FEATURE:
<221> NAME/KEY: sig_peptide
<222> LOCATION: (1)..(87)
<220> FEATURE:
<221> NAME/KEY: mat_peptide
<222> LOCATION: (88)..(993)

<400> SEQUENCE: 22 atg cgt tcc cct atc tct aac ctc gac ctg tgg tcg tct ttc act gtg      48
Met Arg Ser Pro Ile Ser Asn Leu Asp Leu Trp Ser Ser Phe Thr Val
                -25                 -20                 -15 ctt ctc gca tcg gct ggt acc ctt gcg agt gcc gcg tgc ccc gtc ccc      96
Leu Leu Ala Ser Ala Gly Thr Leu Ala Ser Ala Ala Cys Pro Val Pro
        -10                  -5                  -1   1 tcc cag ggt caa tac cgc tgg tct tcc acc ggt gcc ctg gct cag cct     144
Ser Gln Gly Gln Tyr Arg Trp Ser Ser Thr Gly Ala Leu Ala Gln Pro
      5                  10                  15 cag cac ggc tgg act tcc atc aag gac ttc acc aac gtt gtc tac aac     192
Gln His Gly Trp Thr Ser Ile Lys Asp Phe Thr Asn Val Val Tyr Asn
 20                  25                  30                  35 ggc aag cac ctt gtc tac gcc tcc gtg gcc gac tcc aag ggc aac tac     240
Gly Lys His Leu Val Tyr Ala Ser Val Ala Asp Ser Lys Gly Asn Tyr
                 40                  45                  50 cac tcc atg aac ttc ggt ctc ttc agt gac tgg tcc cag atg gcc tcc     288
His Ser Met Asn Phe Gly Leu Phe Ser Asp Trp Ser Gln Met Ala Ser
             55                  60                  65 gcc agc cag aac ccc atg aac ttc aac gct gtc gcc ccg act ctg ttc     336
Ala Ser Gln Asn Pro Met Asn Phe Asn Ala Val Ala Pro Thr Leu Phe
         70                  75                  80 ttc ttc gct ccc aag aac gtc tgg gtt ctc gcc tac cag tgg ggc gcc     384
Phe Phe Ala Pro Lys Asn Val Trp Val Leu Ala Tyr Gln Trp Gly Ala
     85                  90                  95 aac gcc ttc tcc tac cgt acc tcc aac gac ccc gcc aat gcc aat gga     432
Asn Ala Phe Ser Tyr Arg Thr Ser Asn Asp Pro Ala Asn Ala Asn Gly
100                 105                 110                 115 tgg tcg tct gag cac ccg ctg ttc acc gga aag atc gcc aac agc ggt     480
Trp Ser Ser Glu His Pro Leu Phe Thr Gly Lys Ile Ala Asn Ser Gly
                120                 125                 130 acc ggc ccc atc gac cag acc ctg atc ggt gac aac cag aac atg tac     528
Thr Gly Pro Ile Asp Gln Thr Leu Ile Gly Asp Asn Gln Asn Met Tyr
            135                 140                 145 ctg ttc ttc gcc ggt gat aac ggc aag atc tac cgg tcc agc atg ccc     576
Leu Phe Phe Ala Gly Asp Asn Gly Lys Ile Tyr Arg Ser Ser Met Pro
        150                 155                 160 ctc aac aac ttc ccc gga tcc ttc ggc ggt gcc tcc gag gtc atc ctg     624
Leu Asn Asn Phe Pro Gly Ser Phe Gly Gly Ala Ser Glu Val Ile Leu
    165                 170                 175 agc gac acc acc gcc aac ctc ttc gag gcc gtc cag gtc tac aag gtt     672
Ser Asp Thr Thr Ala Asn Leu Phe Glu Ala Val Gln Val Tyr Lys Val
180                 185                 190                 195 gcc ggt gag aac aag tat ctc atg atc gtc gag gcc atg ggt gcc cac     720
Ala Gly Glu Asn Lys Tyr Leu Met Ile Val Glu Ala Met Gly Ala His
```

```
Ala Gly Glu Asn Lys Tyr Leu Met Ile Val Glu Ala Met Gly Ala His
                    200                 205                 210 ggc cgc tac ttc cgc tcc ttc act gcc acc agc ctc aac ggc aag tgg      768
Gly Arg Tyr Phe Arg Ser Phe Thr Ala Thr Ser Leu Asn Gly Lys Trp
            215                 220                 225 acc ctc aac gct ggc tcc gag ggt gct ccc ttc gcc ggc aag gcc aac      816
Thr Leu Asn Ala Gly Ser Glu Gly Ala Pro Phe Ala Gly Lys Ala Asn
                230                 235                 240 agc ggt gct ggc tgg acc aac gac atc agc cac ggt gac ctc gtc cgt      864
Ser Gly Ala Gly Trp Thr Asn Asp Ile Ser His Gly Asp Leu Val Arg
            245                 250                 255 acc aac cct gac cag acc atg acc gtc gac atg tgc aac ctc cag ttc      912
Thr Asn Pro Asp Gln Thr Met Thr Val Asp Met Cys Asn Leu Gln Phe
260                 265                 270                 275 ctg tac cag ggc cgt gac ccc aac gcc aac ccc acc tac aac gct ctg      960
Leu Tyr Gln Gly Arg Asp Pro Asn Ala Asn Pro Thr Tyr Asn Ala Leu
                280                 285                 290 cct tac cgc ccc ggt gtt ctc acc ctg aag cac tag                      996
Pro Tyr Arg Pro Gly Val Leu Thr Leu Lys His
            295                 300

<210> SEQ ID NO 23
<211> LENGTH: 331
<212> TYPE: PRT
<213> ORGANISM: Penicillium oxalicum

<400> SEQUENCE: 23

Met Arg Ser Pro Ile Ser Asn Leu Asp Leu Trp Ser Ser Phe Thr Val
                -25                 -20                 -15

Leu Leu Ala Ser Ala Gly Thr Leu Ala Ser Ala Ala Cys Pro Val Pro
            -10                  -5                  -1   1

Ser Gln Gly Gln Tyr Arg Trp Ser Ser Thr Gly Ala Leu Ala Gln Pro
                  5                  10                  15

Gln His Gly Trp Thr Ser Ile Lys Asp Phe Thr Asn Val Val Tyr Asn
 20                  25                  30                  35

Gly Lys His Leu Val Tyr Ala Ser Val Ala Asp Ser Lys Gly Asn Tyr
                 40                  45                  50

His Ser Met Asn Phe Gly Leu Phe Ser Asp Trp Ser Gln Met Ala Ser
                 55                  60                  65

Ala Ser Gln Asn Pro Met Asn Phe Asn Ala Val Ala Pro Thr Leu Phe
             70                  75                  80

Phe Phe Ala Pro Lys Asn Val Trp Val Leu Ala Tyr Gln Trp Gly Ala
 85                  90                  95

Asn Ala Phe Ser Tyr Arg Thr Ser Asn Asp Pro Ala Asn Ala Asn Gly
100                 105                 110                 115

Trp Ser Ser Glu His Pro Leu Phe Thr Gly Lys Ile Ala Asn Ser Gly
                120                 125                 130

Thr Gly Pro Ile Asp Gln Thr Leu Ile Gly Asp Asn Gln Asn Met Tyr
            135                 140                 145

Leu Phe Phe Ala Gly Asp Asn Gly Lys Ile Tyr Arg Ser Ser Met Pro
        150                 155                 160

Leu Asn Asn Phe Pro Gly Ser Phe Gly Gly Ala Ser Glu Val Ile Leu
165                 170                 175

Ser Asp Thr Thr Ala Asn Leu Phe Glu Ala Val Gln Val Tyr Lys Val
180                 185                 190                 195

Ala Gly Glu Asn Lys Tyr Leu Met Ile Val Glu Ala Met Gly Ala His
                200                 205                 210
```

```
Gly Arg Tyr Phe Arg Ser Phe Thr Ala Thr Ser Leu Asn Gly Lys Trp
            215                 220                 225

Thr Leu Asn Ala Gly Ser Glu Gly Ala Pro Phe Ala Gly Lys Ala Asn
            230                 235                 240

Ser Gly Ala Gly Trp Thr Asn Asp Ile Ser His Gly Asp Leu Val Arg
245                 250                 255

Thr Asn Pro Asp Gln Thr Met Thr Val Asp Met Cys Asn Leu Gln Phe
260                 265                 270                 275

Leu Tyr Gln Gly Arg Asp Pro Asn Ala Asn Pro Thr Tyr Asn Ala Leu
            280                 285                 290

Pro Tyr Arg Pro Gly Val Leu Thr Leu Lys His
            295                 300

<210> SEQ ID NO 24
<211> LENGTH: 302
<212> TYPE: PRT
<213> ORGANISM: Penicillium oxalicum

<400> SEQUENCE: 24

Pro Val Pro Ser Gln Gly Gln Tyr Arg Trp Ser Ser Thr Gly Ala Leu
1               5                   10                  15

Ala Gln Pro Gln His Gly Trp Thr Ser Ile Lys Asp Phe Thr Asn Val
            20                  25                  30

Val Tyr Asn Gly Lys His Leu Val Tyr Ala Ser Val Ala Asp Ser Lys
        35                  40                  45

Gly Asn Tyr His Ser Met Asn Phe Gly Leu Phe Ser Asp Trp Ser Gln
50                  55                  60

Met Ala Ser Ala Ser Gln Asn Pro Met Asn Phe Asn Ala Val Ala Pro
65                  70                  75                  80

Thr Leu Phe Phe Phe Ala Pro Lys Asn Val Trp Val Leu Ala Tyr Gln
                85                  90                  95

Trp Gly Ala Asn Ala Phe Ser Tyr Arg Thr Ser Asn Asp Pro Ala Asn
            100                 105                 110

Ala Asn Gly Trp Ser Ser Glu His Pro Leu Phe Thr Gly Lys Ile Ala
        115                 120                 125

Asn Ser Gly Thr Gly Pro Ile Asp Gln Thr Leu Ile Gly Asp Asn Gln
130                 135                 140

Asn Met Tyr Leu Phe Phe Ala Gly Asp Asn Gly Lys Ile Tyr Arg Ser
145                 150                 155                 160

Ser Met Pro Leu Asn Asn Phe Pro Gly Ser Phe Gly Ala Ser Glu
                165                 170                 175

Val Ile Leu Ser Asp Thr Thr Ala Asn Leu Phe Glu Ala Val Gln Val
            180                 185                 190

Tyr Lys Val Ala Gly Glu Asn Lys Tyr Leu Met Ile Glu Ala Met
        195                 200                 205

Gly Ala His Gly Arg Tyr Phe Arg Ser Phe Thr Ala Thr Ser Leu Asn
210                 215                 220

Gly Lys Trp Thr Leu Asn Ala Gly Ser Glu Gly Ala Pro Phe Ala Gly
225                 230                 235                 240

Lys Ala Asn Ser Gly Ala Gly Trp Thr Asn Asp Ile Ser His Gly Asp
                245                 250                 255

Leu Val Arg Thr Asn Pro Asp Gln Thr Met Thr Val Asp Met Cys Asn
            260                 265                 270

Leu Gln Phe Leu Tyr Gln Gly Arg Asp Pro Asn Ala Asn Pro Thr Tyr
```

```
                275                 280                 285
Asn Ala Leu Pro Tyr Arg Pro Gly Val Leu Thr Leu Lys His
    290                 295                 300

<210> SEQ ID NO 25
<211> LENGTH: 1030
<212> TYPE: DNA
<213> ORGANISM: Talaromyces pinophilus
<220> FEATURE:
<221> NAME/KEY: CDS
<222> LOCATION: (1)..(70)
<220> FEATURE:
<221> NAME/KEY: sig_peptide
<222> LOCATION: (1)..(48)
<220> FEATURE:
<221> NAME/KEY: mat_peptide
<222> LOCATION: (49)..(1027)
<220> FEATURE:
<221> NAME/KEY: CDS
<222> LOCATION: (123)..(1027)

<400> SEQUENCE: 25 atg cat ttc ctc gcc gcg ttg ctc gcg gtt ctg cca ctt gta tct ggg       48
Met His Phe Leu Ala Ala Leu Leu Ala Val Leu Pro Leu Val Ser Gly
    -15                 -10                 -5                  -1 tct cca gta ccc gag aaa cga t gtaagttgta tccacctgaa cagtgaaagc       100
Ser Pro Val Pro Glu Lys Arg
  1               5 tggacggtat tgacaatcac ag cc  gga tgc gca ctt ccc tct acg tac aag      151
                             Ser Gly Cys Ala Leu Pro Ser Thr Tyr Lys
                                          10                  15 tgg aca tcc act ggc ccg ctg gca agc ccc aag tcg ggt ttg gtt gct      199
Trp Thr Ser Thr Gly Pro Leu Ala Ser Pro Lys Ser Gly Leu Val Ala
        20                  25                  30 ctg aga gac tat agc cat gtc atc tac aac ggc caa cat ctc gta tac      247
Leu Arg Asp Tyr Ser His Val Ile Tyr Asn Gly Gln His Leu Val Tyr
    35                  40                  45 gga tcg acc gcc aac aca gct ggc agc tat ggt tcc atg aac ttt ggc      295
Gly Ser Thr Ala Asn Thr Ala Gly Ser Tyr Gly Ser Met Asn Phe Gly
 50                  55                  60                  65 ctg ttt tcg gac tgg tct gag atg tca tct gcc agc caa aac acg atg      343
Leu Phe Ser Asp Trp Ser Glu Met Ser Ser Ala Ser Gln Asn Thr Met
                 70                  75                  80 agc act ggc gcc gtc gct ccc acg atc ttc tac ttt gca cca aag agt      391
Ser Thr Gly Ala Val Ala Pro Thr Ile Phe Tyr Phe Ala Pro Lys Ser
            85                  90                  95 gtc tgg atc ctt gcc tat caa tgg ggt cca tat gcg ttt tcc tac agg      439
Val Trp Ile Leu Ala Tyr Gln Trp Gly Pro Tyr Ala Phe Ser Tyr Arg
       100                 105                 110 act tct acc gat cct tcc aat gcc aat ggc tgg tca tcg cca cag cct      487
Thr Ser Thr Asp Pro Ser Asn Ala Asn Gly Trp Ser Ser Pro Gln Pro
   115                 120                 125 ctt ttc acg gga act att tcc ggc tcc agt acc ggt gtc atc gat cag      535
Leu Phe Thr Gly Thr Ile Ser Gly Ser Ser Thr Gly Val Ile Asp Gln
130                 135                 140                 145 aca gtt att ggc gat agc gaa aac atg tat ctc ttc ttt gct gga gat      583
Thr Val Ile Gly Asp Ser Glu Asn Met Tyr Leu Phe Phe Ala Gly Asp
                150                 155                 160 aat ggc cat att tac cgt gct agc atg ccc att gga gac ttt cct gga      631
Asn Gly His Ile Tyr Arg Ala Ser Met Pro Ile Gly Asp Phe Pro Gly
            165                 170                 175 agt ttc ggc tca gca tcg acg att gtc ctc agc gac tcg act aac aac      679
Ser Phe Gly Ser Ala Ser Thr Ile Val Leu Ser Asp Ser Thr Asn Asn
```

```
ttg ttc gag gcg gta gag gtc tac acc gtc gag ggt caa aat caa tac      727
Leu Phe Glu Ala Val Glu Val Tyr Thr Val Glu Gly Gln Asn Gln Tyr
    195                 200                 205 ctc atg att gtc gag gca att ggt gcc aat gga cgt tat ttc cgc tcc      775
Leu Met Ile Val Glu Ala Ile Gly Ala Asn Gly Arg Tyr Phe Arg Ser
210                 215                 220                 225 ttc aca gct agt agt ctg gga ggc aca tgg acg gcg cag gct tca acc      823
Phe Thr Ala Ser Ser Leu Gly Gly Thr Trp Thr Ala Gln Ala Ser Thr
                230                 235                 240 gag tcc aac cca ttc gct ggc aag gct aac agt ggc gcc acc tgg acc      871
Glu Ser Asn Pro Phe Ala Gly Lys Ala Asn Ser Gly Ala Thr Trp Thr
            245                 250                 255 aac gac atc agc agc ggc gat ttg gtc cgt act aat ccc gat cag aca      919
Asn Asp Ile Ser Ser Gly Asp Leu Val Arg Thr Asn Pro Asp Gln Thr
        260                 265                 270 cag acg atc gat gcc tgc aat cta caa ttc ctc tat caa gga cga tcc      967
Gln Thr Ile Asp Ala Cys Asn Leu Gln Phe Leu Tyr Gln Gly Arg Ser
    275                 280                 285 acc agc tcc ggc ggc gac tac aac ctt ctt cct tac cag cct ggt ctg     1015
Thr Ser Ser Gly Gly Asp Tyr Asn Leu Leu Pro Tyr Gln Pro Gly Leu
290                 295                 300                 305 ttg aca ctt gct tag                                                  1030
Leu Thr Leu Ala
```

<210> SEQ ID NO 26
<211> LENGTH: 325
<212> TYPE: PRT
<213> ORGANISM: Talaromyces pinophilus

<400> SEQUENCE: 26

```
Met His Phe Leu Ala Ala Leu Leu Ala Val Leu Pro Leu Val Ser Gly
    -15                 -10                 -5                  -1

Ser Pro Val Pro Glu Lys Arg Ser Gly Cys Ala Leu Pro Ser Thr Tyr
1                5                  10                  15

Lys Trp Thr Ser Thr Gly Pro Leu Ala Ser Pro Lys Ser Gly Leu Val
                20                  25                  30

Ala Leu Arg Asp Tyr Ser His Val Ile Tyr Asn Gly Gln His Leu Val
            35                  40                  45

Tyr Gly Ser Thr Ala Asn Thr Ala Gly Ser Tyr Gly Ser Met Asn Phe
        50                  55                  60

Gly Leu Phe Ser Asp Trp Ser Glu Met Ser Ser Ala Ser Gln Asn Thr
65                  70                  75                  80

Met Ser Thr Gly Ala Val Ala Pro Thr Ile Phe Tyr Phe Ala Pro Lys
                85                  90                  95

Ser Val Trp Ile Leu Ala Tyr Gln Trp Gly Pro Tyr Ala Phe Ser Tyr
            100                 105                 110

Arg Thr Ser Thr Asp Pro Ser Asn Ala Asn Gly Trp Ser Ser Pro Gln
        115                 120                 125

Pro Leu Phe Thr Gly Thr Ile Ser Gly Ser Ser Thr Gly Val Ile Asp
    130                 135                 140

Gln Thr Val Ile Gly Asp Ser Glu Asn Met Tyr Leu Phe Phe Ala Gly
145                 150                 155                 160

Asp Asn Gly His Ile Tyr Arg Ala Ser Met Pro Ile Gly Asp Phe Pro
                165                 170                 175

Gly Ser Phe Gly Ser Ala Ser Thr Ile Val Leu Ser Asp Ser Thr Asn
            180                 185                 190
```

```
Asn Leu Phe Glu Ala Val Glu Val Tyr Thr Val Glu Gly Gln Asn Gln
            195                 200                 205

Tyr Leu Met Ile Val Glu Ala Ile Gly Ala Asn Gly Arg Tyr Phe Arg
            210                 215                 220

Ser Phe Thr Ala Ser Ser Leu Gly Gly Thr Trp Thr Ala Gln Ala Ser
225                 230                 235                 240

Thr Glu Ser Asn Pro Phe Ala Gly Lys Ala Asn Ser Gly Ala Thr Trp
                245                 250                 255

Thr Asn Asp Ile Ser Ser Gly Asp Leu Val Arg Thr Asn Pro Asp Gln
                260                 265                 270

Thr Gln Thr Ile Asp Ala Cys Asn Leu Gln Phe Leu Tyr Gln Gly Arg
                275                 280                 285

Ser Thr Ser Ser Gly Gly Asp Tyr Asn Leu Leu Pro Tyr Gln Pro Gly
            290                 295                 300

Leu Leu Thr Leu Ala
305

<210> SEQ ID NO 27
<211> LENGTH: 309
<212> TYPE: PRT
<213> ORGANISM: Talaromyces pinophilus

<400> SEQUENCE: 27

Ser Pro Val Pro Glu Lys Arg Ser Gly Cys Ala Leu Pro Ser Thr Tyr
1               5                   10                  15

Lys Trp Thr Ser Thr Gly Pro Leu Ala Ser Pro Lys Ser Gly Leu Val
            20                  25                  30

Ala Leu Arg Asp Tyr Ser His Val Ile Tyr Asn Gly Gln His Leu Val
        35                  40                  45

Tyr Gly Ser Thr Ala Asn Thr Ala Gly Ser Tyr Gly Ser Met Asn Phe
    50                  55                  60

Gly Leu Phe Ser Asp Trp Ser Glu Met Ser Ser Ala Ser Gln Asn Thr
65                  70                  75                  80

Met Ser Thr Gly Ala Val Ala Pro Thr Ile Phe Tyr Phe Ala Pro Lys
                85                  90                  95

Ser Val Trp Ile Leu Ala Tyr Gln Trp Gly Pro Tyr Ala Phe Ser Tyr
            100                 105                 110

Arg Thr Ser Thr Asp Pro Ser Asn Ala Asn Gly Trp Ser Ser Pro Gln
        115                 120                 125

Pro Leu Phe Thr Gly Thr Ile Ser Gly Ser Thr Gly Val Ile Asp
    130                 135                 140

Gln Thr Val Ile Gly Asp Ser Glu Asn Met Tyr Leu Phe Phe Ala Gly
145                 150                 155                 160

Asp Asn Gly His Ile Tyr Arg Ala Ser Met Pro Ile Gly Asp Phe Pro
                165                 170                 175

Gly Ser Phe Gly Ser Ala Ser Thr Ile Val Leu Ser Asp Ser Thr Asn
            180                 185                 190

Asn Leu Phe Glu Ala Val Glu Val Tyr Thr Val Glu Gly Gln Asn Gln
        195                 200                 205

Tyr Leu Met Ile Val Glu Ala Ile Gly Ala Asn Gly Arg Tyr Phe Arg
    210                 215                 220

Ser Phe Thr Ala Ser Ser Leu Gly Gly Thr Trp Thr Ala Gln Ala Ser
225                 230                 235                 240

Thr Glu Ser Asn Pro Phe Ala Gly Lys Ala Asn Ser Gly Ala Thr Trp
```

```
                       245                 250                 255
Thr Asn Asp Ile Ser Ser Gly Asp Leu Val Arg Thr Asn Pro Asp Gln
            260                 265                 270

Thr Gln Thr Ile Asp Ala Cys Asn Leu Gln Phe Leu Tyr Gln Gly Arg
        275                 280                 285

Ser Thr Ser Ser Gly Gly Asp Tyr Asn Leu Leu Pro Tyr Gln Pro Gly
    290                 295                 300

Leu Leu Thr Leu Ala
305

<210> SEQ ID NO 28
<211> LENGTH: 1425
<212> TYPE: DNA
<213> ORGANISM: Streptomyces nitrosporeus
<220> FEATURE:
<221> NAME/KEY: CDS
<222> LOCATION: (1)..(1422)
<220> FEATURE:
<221> NAME/KEY: sig_peptide
<222> LOCATION: (1)..(108)
<220> FEATURE:
<221> NAME/KEY: mat_peptide
<222> LOCATION: (109)..(1422)

<400> SEQUENCE: 28 atg tac aga gga agt ctc agc cgc ggg cgc acg ccc gcg gtg ctc gcc     48
Met Tyr Arg Gly Ser Leu Ser Arg Gly Arg Thr Pro Ala Val Leu Ala
    -35                 -30                 -25 gcc gcg gtc gcg gtc ctg gcg gcg ctg gcg gcg atg ctt gtc gcc acc     96
Ala Ala Val Ala Val Leu Ala Ala Leu Ala Ala Met Leu Val Ala Thr
-20                 -15                 -10                  -5 ccg gcc cag gcg gcc gcc agc ggc gcc ctg cgc ggt gcc ggt tcg ggc    144
Pro Ala Gln Ala Ala Ala Ser Gly Ala Leu Arg Gly Ala Gly Ser Gly
        -1  1               5                  10 cgg tgc gtc gac gtg acg ggc ggc gaa cgg acc gac ggc act acc ctc    192
Arg Cys Val Asp Val Thr Gly Gly Glu Arg Thr Asp Gly Thr Thr Leu
        15                  20                  25 cag ctc tac gac tgc tgg ggc ggg acc aac cag cag tgg acg tcg acg    240
Gln Leu Tyr Asp Cys Trp Gly Gly Thr Asn Gln Gln Trp Thr Ser Thr
    30                  35                  40 gac agc ggc cag ctg acc gtg tac ggc gac aag tgc ctg gac gtt ccg    288
Asp Ser Gly Gln Leu Thr Val Tyr Gly Asp Lys Cys Leu Asp Val Pro
45                  50                  55                  60 ggc cac gcc acc aca ccc ggt acc agg gtg cag atc tgg ggc tgc tcc    336
Gly His Ala Thr Thr Pro Gly Thr Arg Val Gln Ile Trp Gly Cys Ser
                65                  70                  75 ggc ggt gcg aac cag cag tgg cgg gtg aac tcc gac ggc acg gtc gtc    384
Gly Gly Ala Asn Gln Gln Trp Arg Val Asn Ser Asp Gly Thr Val Val
            80                  85                  90 ggc gtg gag tcc ggg ctg tgc ctg gag gcc gcg ggc gcc ggt acg gcc    432
Gly Val Glu Ser Gly Leu Cys Leu Glu Ala Ala Gly Ala Gly Thr Ala
        95                 100                 105 aac ggc aca gcg gtc cag ctc tgg acg tgc aac ggc ggc agc aac cag    480
Asn Gly Thr Ala Val Gln Leu Trp Thr Cys Asn Gly Gly Ser Asn Gln
    110                 115                 120 aag tgg acc ggt ctg ccc gcg acg ccg acg gac ggc acg tgt tcc        528
Lys Trp Thr Gly Leu Pro Ala Thr Pro Thr Asp Gly Thr Cys Ser
125                 130                 135                 140 ctt ccg tcg gcg tac cgg tgg acg tct acg ggc gtg ctg gcg cag ccg    576
Leu Pro Ser Ala Tyr Arg Trp Thr Ser Thr Gly Val Leu Ala Gln Pro
                145                 150                 155
```

```
gcg aac ggg tgg gcc gcg gtg aag gac ttc acc acc gtg acc cac aac        624
Ala Asn Gly Trp Ala Ala Val Lys Asp Phe Thr Thr Val Thr His Asn
            160                 165                 170 ggc aag cac ctg gtc tac gcg tcg aac gtg tcg ggg tcg tcg tac ggt        672
Gly Lys His Leu Val Tyr Ala Ser Asn Val Ser Gly Ser Ser Tyr Gly
        175                 180                 185 tcg atg atg ttc agt ccc ttc acg gac tgg ccg gac atg gcg tcg gcc        720
Ser Met Met Phe Ser Pro Phe Thr Asp Trp Pro Asp Met Ala Ser Ala
    190                 195                 200 ggc cag acg gga atg agc cag gcc gcg gtg gcg ccc acg ctg ttc tac        768
Gly Gln Thr Gly Met Ser Gln Ala Ala Val Ala Pro Thr Leu Phe Tyr
205                 210                 215                 220 ttc gcg ccc aag aac atc tgg gta ctg gcg tac cag tgg ggc gcg tgg        816
Phe Ala Pro Lys Asn Ile Trp Val Leu Ala Tyr Gln Trp Gly Ala Trp
                225                 230                 235 ccc ttc atc tac cgc acg tcg agc aac ccc gcc gac ccc aac ggc tgg        864
Pro Phe Ile Tyr Arg Thr Ser Ser Asn Pro Ala Asp Pro Asn Gly Trp
            240                 245                 250 tcc tcc ccg cag ccg ctg ttc acc ggg agc atc tcc gga tcc gac acc        912
Ser Ser Pro Gln Pro Leu Phe Thr Gly Ser Ile Ser Gly Ser Asp Thr
        255                 260                 265 ggc ccg atc gat cag acc ctg atc gcc gac gga cag aac atg tac ctg        960
Gly Pro Ile Asp Gln Thr Leu Ile Ala Asp Gly Gln Asn Met Tyr Leu
    270                 275                 280 ttc ttc gcc ggt gac aac ggg aag atc tac cgg gcg agc atg ccg atc       1008
Phe Phe Ala Gly Asp Asn Gly Lys Ile Tyr Arg Ala Ser Met Pro Ile
285                 290                 295                 300 ggg aac ttc ccg ggc agc ttc ggc tcg tcg tac acg acg gtc atg agc       1056
Gly Asn Phe Pro Gly Ser Phe Gly Ser Ser Tyr Thr Thr Val Met Ser
                305                 310                 315 gac acg aag gcc aac ctg ttc gag ggc gtc cag gtc tac aag gtc aag       1104
Asp Thr Lys Ala Asn Leu Phe Glu Gly Val Gln Val Tyr Lys Val Lys
            320                 325                 330 gac cgg agc cag tac ctc atg atc gtc gag gcg atg ggt gcg aac ggg       1152
Asp Arg Ser Gln Tyr Leu Met Ile Val Glu Ala Met Gly Ala Asn Gly
        335                 340                 345 cgc tac ttc cgc tcc ttc acg gcc tcc agc ctg aac ggg acg tgg acc       1200
Arg Tyr Phe Arg Ser Phe Thr Ala Ser Ser Leu Asn Gly Thr Trp Thr
    350                 355                 360 ccg cag gcc gcc acc gag agc agc ccc ttc gcg ggc aag gcc aac agc       1248
Pro Gln Ala Ala Thr Glu Ser Ser Pro Phe Ala Gly Lys Ala Asn Ser
365                 370                 375                 380 ggt gcc acc tgg acc aac gac atc agc cac ggc gac ctg gtc cgc gac       1296
Gly Ala Thr Trp Thr Asn Asp Ile Ser His Gly Asp Leu Val Arg Asp
                385                 390                 395 aac ccc gac cag acc atg acc gtc gac ccc tgc aac ctg cgg ttc ctc       1344
Asn Pro Asp Gln Thr Met Thr Val Asp Pro Cys Asn Leu Arg Phe Leu
            400                 405                 410 tac cag ggc aag gcg ccc gac gcg ggc ggc gag tac aac cgg ctg ccg       1392
Tyr Gln Gly Lys Ala Pro Asp Ala Gly Gly Glu Tyr Asn Arg Leu Pro
        415                 420                 425 tgg cgg ccg ggg gtc ctc acc ctg cgg cgc tga                           1425
Trp Arg Pro Gly Val Leu Thr Leu Arg Arg
    430                 435
```

<210> SEQ ID NO 29
<211> LENGTH: 474
<212> TYPE: PRT
<213> ORGANISM: Streptomyces nitrosporeus

<400> SEQUENCE: 29

```
Met Tyr Arg Gly Ser Leu Ser Arg Gly Arg Thr Pro Ala Val Leu Ala
    -35                 -30                 -25
Ala Ala Val Ala Val Leu Ala Ala Leu Ala Ala Met Leu Val Ala Thr
-20                 -15                 -10                  -5
Pro Ala Gln Ala Ala Ala Ser Gly Ala Leu Arg Gly Ala Gly Ser Gly
             -1  1               5                  10
Arg Cys Val Asp Val Thr Gly Gly Glu Arg Thr Asp Gly Thr Thr Leu
             15                  20                  25
Gln Leu Tyr Asp Cys Trp Gly Gly Thr Asn Gln Gln Trp Thr Ser Thr
         30                  35                  40
Asp Ser Gly Gln Leu Thr Val Tyr Gly Asp Lys Cys Leu Asp Val Pro
45                  50                  55                  60
Gly His Ala Thr Thr Pro Gly Thr Arg Val Gln Ile Trp Gly Cys Ser
                 65                  70                  75
Gly Gly Ala Asn Gln Gln Trp Arg Val Asn Ser Asp Gly Thr Val Val
             80                  85                  90
Gly Val Glu Ser Gly Leu Cys Leu Glu Ala Ala Gly Ala Gly Thr Ala
         95                 100                 105
Asn Gly Thr Ala Val Gln Leu Trp Thr Cys Asn Gly Gly Ser Asn Gln
    110                 115                 120
Lys Trp Thr Gly Leu Pro Ala Thr Pro Pro Thr Asp Gly Thr Cys Ser
125                 130                 135                 140
Leu Pro Ser Ala Tyr Arg Trp Thr Ser Thr Gly Val Leu Ala Gln Pro
                145                 150                 155
Ala Asn Gly Trp Ala Ala Val Lys Asp Phe Thr Thr Val Thr His Asn
            160                 165                 170
Gly Lys His Leu Val Tyr Ala Ser Asn Val Ser Gly Ser Ser Tyr Gly
        175                 180                 185
Ser Met Met Phe Ser Pro Phe Thr Asp Trp Pro Asp Met Ala Ser Ala
    190                 195                 200
Gly Gln Thr Gly Met Ser Gln Ala Ala Val Ala Pro Thr Leu Phe Tyr
205                 210                 215                 220
Phe Ala Pro Lys Asn Ile Trp Val Leu Ala Tyr Gln Trp Gly Ala Trp
                225                 230                 235
Pro Phe Ile Tyr Arg Thr Ser Ser Asn Pro Ala Asp Pro Asn Gly Trp
            240                 245                 250
Ser Ser Pro Gln Pro Leu Phe Thr Gly Ser Ile Ser Gly Ser Asp Thr
        255                 260                 265
Gly Pro Ile Asp Gln Thr Leu Ile Ala Asp Gly Gln Asn Met Tyr Leu
    270                 275                 280
Phe Phe Ala Gly Asp Asn Gly Lys Ile Tyr Arg Ala Ser Met Pro Ile
285                 290                 295                 300
Gly Asn Phe Pro Gly Ser Phe Gly Ser Ser Tyr Thr Thr Val Met Ser
                305                 310                 315
Asp Thr Lys Ala Asn Leu Phe Glu Gly Val Gln Val Tyr Lys Val Lys
            320                 325                 330
Asp Arg Ser Gln Tyr Leu Met Ile Val Glu Ala Met Gly Ala Asn Gly
        335                 340                 345
Arg Tyr Phe Arg Ser Phe Thr Ala Ser Ser Leu Asn Gly Thr Trp Thr
    350                 355                 360
Pro Gln Ala Ala Thr Glu Ser Ser Pro Phe Ala Gly Lys Ala Asn Ser
365                 370                 375                 380
```

Gly Ala Thr Trp Thr Asn Asp Ile Ser His Gly Asp Leu Val Arg Asp
                385                 390                 395

Asn Pro Asp Gln Thr Met Thr Val Asp Pro Cys Asn Leu Arg Phe Leu
            400                 405                 410

Tyr Gln Gly Lys Ala Pro Asp Ala Gly Glu Tyr Asn Arg Leu Pro
        415                 420                 425

Trp Arg Pro Gly Val Leu Thr Leu Arg Arg
    430                 435

<210> SEQ ID NO 30
<211> LENGTH: 438
<212> TYPE: PRT
<213> ORGANISM: Streptomyces nitrosporeus

<400> SEQUENCE: 30

Ala Ala Ser Gly Ala Leu Arg Gly Ala Gly Ser Gly Arg Cys Val Asp
1               5                   10                  15

Val Thr Gly Gly Glu Arg Thr Asp Gly Thr Thr Leu Gln Leu Tyr Asp
            20                  25                  30

Cys Trp Gly Gly Thr Asn Gln Gln Trp Thr Ser Thr Asp Ser Gly Gln
        35                  40                  45

Leu Thr Val Tyr Gly Asp Lys Cys Leu Asp Val Pro Gly His Ala Thr
    50                  55                  60

Thr Pro Gly Thr Arg Val Gln Ile Trp Gly Cys Ser Gly Gly Ala Asn
65                  70                  75                  80

Gln Gln Trp Arg Val Asn Ser Asp Gly Thr Val Val Gly Val Glu Ser
                85                  90                  95

Gly Leu Cys Leu Glu Ala Ala Gly Ala Gly Thr Ala Asn Gly Thr Ala
            100                 105                 110

Val Gln Leu Trp Thr Cys Asn Gly Gly Ser Asn Gln Lys Trp Thr Gly
        115                 120                 125

Leu Pro Ala Thr Pro Pro Thr Asp Gly Thr Cys Ser Leu Pro Ser Ala
    130                 135                 140

Tyr Arg Trp Thr Ser Thr Gly Val Leu Ala Gln Pro Ala Asn Gly Trp
145                 150                 155                 160

Ala Ala Val Lys Asp Phe Thr Thr Val Thr His Asn Gly Lys His Leu
                165                 170                 175

Val Tyr Ala Ser Asn Val Ser Gly Ser Ser Tyr Gly Ser Met Met Phe
            180                 185                 190

Ser Pro Phe Thr Asp Trp Pro Asp Met Ala Ser Ala Gly Gln Thr Gly
        195                 200                 205

Met Ser Gln Ala Ala Val Ala Pro Thr Leu Phe Tyr Phe Ala Pro Lys
    210                 215                 220

Asn Ile Trp Val Leu Ala Tyr Gln Trp Gly Ala Trp Pro Phe Ile Tyr
225                 230                 235                 240

Arg Thr Ser Ser Asn Pro Ala Asp Pro Asn Gly Trp Ser Ser Pro Gln
                245                 250                 255

Pro Leu Phe Thr Gly Ser Ile Ser Gly Ser Asp Thr Gly Pro Ile Asp
            260                 265                 270

Gln Thr Leu Ile Ala Asp Gly Gln Asn Met Tyr Leu Phe Phe Ala Gly
        275                 280                 285

Asp Asn Gly Lys Ile Tyr Arg Ala Ser Met Pro Ile Gly Asn Phe Pro
    290                 295                 300

Gly Ser Phe Gly Ser Ser Tyr Thr Val Met Ser Asp Thr Lys Ala
305                 310                 315                 320

```
Asn Leu Phe Glu Gly Val Gln Val Tyr Lys Val Lys Asp Arg Ser Gln
            325                 330                 335

Tyr Leu Met Ile Val Glu Ala Met Gly Ala Asn Gly Arg Tyr Phe Arg
            340                 345                 350

Ser Phe Thr Ala Ser Ser Leu Asn Gly Thr Trp Thr Pro Gln Ala Ala
            355                 360                 365

Thr Glu Ser Ser Pro Phe Ala Gly Lys Ala Asn Ser Gly Ala Thr Trp
            370                 375                 380

Thr Asn Asp Ile Ser His Gly Asp Leu Val Arg Asp Asn Pro Asp Gln
385                 390                 395                 400

Thr Met Thr Val Asp Pro Cys Asn Leu Arg Phe Leu Tyr Gln Gly Lys
                405                 410                 415

Ala Pro Asp Ala Gly Gly Glu Tyr Asn Arg Leu Pro Trp Arg Pro Gly
                420                 425                 430

Val Leu Thr Leu Arg Arg
            435

<210> SEQ ID NO 31
<211> LENGTH: 1422
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(1419)
<220> FEATURE:
<221> NAME/KEY: sig_peptide
<222> LOCATION: (1)..(81)
<220> FEATURE:
<221> NAME/KEY: mat_peptide
<222> LOCATION: (82)..(1419)

<400> SEQUENCE: 31 atg aag aaa ccg ttg ggg aaa att gtc gca agc acc gca cta ctc att        48
Met Lys Lys Pro Leu Gly Lys Ile Val Ala Ser Thr Ala Leu Leu Ile
        -25                 -20                 -15 tct gtt gct ttt agt tca tcg ata gca tca gca cat cat cat cac cat        96
Ser Val Ala Phe Ser Ser Ser Ile Ala Ser Ala His His His His His
    -10                 -5                  -1  1               5 cat cct agg gcc gcc agc ggc gcc ctg cgc ggt gcc ggt tcg ggc cgg       144
His Pro Arg Ala Ala Ser Gly Ala Leu Arg Gly Ala Gly Ser Gly Arg
                10                  15                  20 tgc gtc gac gtg acg ggc ggc gaa cgg acc gac ggc act acc ctc cag       192
Cys Val Asp Val Thr Gly Gly Glu Arg Thr Asp Gly Thr Thr Leu Gln
            25                  30                  35 ctc tac gac tgc tgg ggc ggg acc aac cag cag tgg acg tcg acg gac       240
Leu Tyr Asp Cys Trp Gly Gly Thr Asn Gln Gln Trp Thr Ser Thr Asp
        40                  45                  50 agc ggc cag ctg acc gtg tac ggc gac aag tgc ctg gac gtt ccg ggc       288
Ser Gly Gln Leu Thr Val Tyr Gly Asp Lys Cys Leu Asp Val Pro Gly
    55                  60                  65 cac gcc acc aca ccc ggt acc agg gtg cag atc tgg ggc tgc tcc ggc       336
His Ala Thr Thr Pro Gly Thr Arg Val Gln Ile Trp Gly Cys Ser Gly
70                  75                  80                  85 ggt gcg aac cag cag tgg cgg gtg aac tcc gac ggc acg gtc gtc ggc       384
Gly Ala Asn Gln Gln Trp Arg Val Asn Ser Asp Gly Thr Val Val Gly
                90                  95                  100 gtg gag tcc ggg ctg tgc ctg gag gcc gcg ggc gcc ggt acg gcc aac       432
Val Glu Ser Gly Leu Cys Leu Glu Ala Ala Gly Ala Gly Thr Ala Asn
            105                 110                 115
```

```
ggc aca gcg gtc cag ctc tgg acg tgc aac ggc ggc agc aac cag aag    480
Gly Thr Ala Val Gln Leu Trp Thr Cys Asn Gly Gly Ser Asn Gln Lys
        120                 125                 130 tgg acc ggt ctg ccc gcg acg ccg acg gac ggc acg tgt tcc ctt        528
Trp Thr Gly Leu Pro Ala Thr Pro Thr Asp Gly Thr Cys Ser Leu
    135                 140                 145 ccg tcg gcg tac cgg tgg acg tct acg ggc gtg ctg gcg cag ccg gcg    576
Pro Ser Ala Tyr Arg Trp Thr Ser Thr Gly Val Leu Ala Gln Pro Ala
150                 155                 160                 165 aac ggg tgg gcc gcg gtg aag gac ttc acc acc gtg acc cac aac ggc    624
Asn Gly Trp Ala Ala Val Lys Asp Phe Thr Thr Val Thr His Asn Gly
            170                 175                 180 aag cac ctg gtc tac gcg tcg aac gtg tcg ggg tcg tcg tac ggt tcg    672
Lys His Leu Val Tyr Ala Ser Asn Val Ser Gly Ser Ser Tyr Gly Ser
                185                 190                 195 atg atg ttc agt ccc ttc acg gac tgg ccg gac atg gcg tcg gcc ggc    720
Met Met Phe Ser Pro Phe Thr Asp Trp Pro Asp Met Ala Ser Ala Gly
            200                 205                 210 cag acg gga atg agc cag gcc gcg gtg gcg ccc acg ctg ttc tac ttc    768
Gln Thr Gly Met Ser Gln Ala Ala Val Ala Pro Thr Leu Phe Tyr Phe
        215                 220                 225 gcg ccc aag aac atc tgg gta ctg gcg tac cag tgg ggc gcg tgg ccc    816
Ala Pro Lys Asn Ile Trp Val Leu Ala Tyr Gln Trp Gly Ala Trp Pro
230                 235                 240                 245 ttc atc tac cgc acg tcg agc aac ccc gcc gac ccc aac ggc tgg tcc    864
Phe Ile Tyr Arg Thr Ser Ser Asn Pro Ala Asp Pro Asn Gly Trp Ser
                250                 255                 260 tcc ccg cag ccg ctg ttc acc ggg agc atc tcc gga tcc gac acc ggc    912
Ser Pro Gln Pro Leu Phe Thr Gly Ser Ile Ser Gly Ser Asp Thr Gly
            265                 270                 275 ccg atc gat cag acc ctg atc gcc gac gga cag aac atg tac ctg ttc    960
Pro Ile Asp Gln Thr Leu Ile Ala Asp Gly Gln Asn Met Tyr Leu Phe
        280                 285                 290 ttc gcc ggt gac aac ggg aag atc tac cgg gcg agc atg ccg atc ggg   1008
Phe Ala Gly Asp Asn Gly Lys Ile Tyr Arg Ala Ser Met Pro Ile Gly
    295                 300                 305 aac ttc ccg ggc agc ttc ggc tcg tcg tac acg acg gtc atg agc gac   1056
Asn Phe Pro Gly Ser Phe Gly Ser Ser Tyr Thr Thr Val Met Ser Asp
310                 315                 320                 325 acg aag gcc aac ctg ttc gag ggc gtc cag gtc tac aag gtc aag gac   1104
Thr Lys Ala Asn Leu Phe Glu Gly Val Gln Val Tyr Lys Val Lys Asp
                330                 335                 340 cgg agc cag tac ctc atg atc gtc gag gcg atg ggt gcg aac ggg cgc   1152
Arg Ser Gln Tyr Leu Met Ile Val Glu Ala Met Gly Ala Asn Gly Arg
            345                 350                 355 tac ttc cgc tcc ttc acg gcc tcc agc ctg aac ggg acg tgg acc ccg   1200
Tyr Phe Arg Ser Phe Thr Ala Ser Ser Leu Asn Gly Thr Trp Thr Pro
        360                 365                 370 cag gcc gcc acc gag agc agc ccc ttc gcg ggc aag gcc aac agc ggt   1248
Gln Ala Ala Thr Glu Ser Ser Pro Phe Ala Gly Lys Ala Asn Ser Gly
    375                 380                 385 gcc acc tgg acc aac gac atc agc cac ggc gac ctg gtc cgc gac aac   1296
Ala Thr Trp Thr Asn Asp Ile Ser His Gly Asp Leu Val Arg Asp Asn
390                 395                 400                 405 ccc gac cag acc atg acc gtc gac ccc tgc aac ctg cgg ttc ctc tac   1344
Pro Asp Gln Thr Met Thr Val Asp Pro Cys Asn Leu Arg Phe Leu Tyr
                410                 415                 420 cag ggc aag gcg ccc gac gcg ggc ggc gag tac aac cgg ctg ccg tgg   1392
Gln Gly Lys Ala Pro Asp Ala Gly Gly Glu Tyr Asn Arg Leu Pro Trp
```

```
                    425                 430                 435
cgg ccg ggg gtc ctc acc ctg cgg cgc tga                              1422
Arg Pro Gly Val Leu Thr Leu Arg Arg
    440                 445
```

<210> SEQ ID NO 32
<211> LENGTH: 473
<212> TYPE: PRT
<213> ORGANISM: Artificial Sequence
<220> FEATURE:
<223> OTHER INFORMATION: Synthetic Construct

<400> SEQUENCE: 32

```
Met Lys Lys Pro Leu Gly Lys Ile Val Ala Ser Thr Ala Leu Leu Ile
        -25                 -20                 -15

Ser Val Ala Phe Ser Ser Ile Ala Ser Ala His His His His
        -10                  -5              -1   1               5

His Pro Arg Ala Ala Ser Gly Ala Leu Arg Gly Ala Gly Ser Gly Arg
                 10                  15                  20

Cys Val Asp Val Thr Gly Gly Glu Arg Thr Asp Gly Thr Thr Leu Gln
             25                  30                  35

Leu Tyr Asp Cys Trp Gly Thr Asn Gln Gln Trp Thr Ser Thr Asp
         40                  45                  50

Ser Gly Gln Leu Thr Val Tyr Gly Asp Lys Cys Leu Asp Val Pro Gly
 55                  60                  65

His Ala Thr Thr Pro Gly Thr Arg Val Gln Ile Trp Gly Cys Ser Gly
 70                  75                  80                  85

Gly Ala Asn Gln Gln Trp Arg Val Asn Ser Asp Gly Thr Val Val Gly
                 90                  95                 100

Val Glu Ser Gly Leu Cys Leu Glu Ala Ala Gly Ala Gly Thr Ala Asn
                105                 110                 115

Gly Thr Ala Val Gln Leu Trp Thr Cys Asn Gly Gly Ser Asn Gln Lys
                120                 125                 130

Trp Thr Gly Leu Pro Ala Thr Pro Thr Asp Gly Thr Cys Ser Leu
135                 140                 145

Pro Ser Ala Tyr Arg Trp Thr Ser Thr Gly Val Leu Ala Gln Pro Ala
150                 155                 160                 165

Asn Gly Trp Ala Ala Val Lys Asp Phe Thr Thr Val Thr His Asn Gly
                170                 175                 180

Lys His Leu Val Tyr Ala Ser Asn Val Ser Gly Ser Tyr Gly Ser
                185                 190                 195

Met Met Phe Ser Pro Phe Thr Asp Trp Pro Asp Met Ala Ser Ala Gly
                200                 205                 210

Gln Thr Gly Met Ser Gln Ala Ala Val Ala Pro Thr Leu Phe Tyr Phe
        215                 220                 225

Ala Pro Lys Asn Ile Trp Val Leu Ala Tyr Gln Trp Gly Ala Trp Pro
230                 235                 240                 245

Phe Ile Tyr Arg Thr Ser Ser Asn Pro Ala Asp Pro Asn Gly Trp Ser
                250                 255                 260

Ser Pro Gln Pro Leu Phe Thr Gly Ser Ile Ser Gly Ser Asp Thr Gly
                265                 270                 275

Pro Ile Asp Gln Thr Leu Ile Ala Asp Gly Gln Asn Met Tyr Leu Phe
        280                 285                 290

Phe Ala Gly Asp Asn Gly Lys Ile Tyr Arg Ala Ser Met Pro Ile Gly
    295                 300                 305
```

```
Asn Phe Pro Gly Ser Phe Gly Ser Ser Tyr Thr Val Met Ser Asp
310                 315                 320                 325

Thr Lys Ala Asn Leu Phe Glu Gly Val Gln Val Tyr Lys Val Lys Asp
                330                 335                 340

Arg Ser Gln Tyr Leu Met Ile Val Glu Ala Met Gly Ala Asn Gly Arg
                345                 350                 355

Tyr Phe Arg Ser Phe Thr Ala Ser Ser Leu Asn Gly Thr Trp Thr Pro
                360                 365                 370

Gln Ala Ala Thr Glu Ser Ser Pro Phe Ala Gly Lys Ala Asn Ser Gly
                375                 380                 385

Ala Thr Trp Thr Asn Asp Ile Ser His Gly Asp Leu Val Arg Asp Asn
390                 395                 400                 405

Pro Asp Gln Thr Met Thr Val Asp Pro Cys Asn Leu Arg Phe Leu Tyr
                410                 415                 420

Gln Gly Lys Ala Pro Asp Ala Gly Gly Glu Tyr Asn Arg Leu Pro Trp
                425                 430                 435

Arg Pro Gly Val Leu Thr Leu Arg Arg
                440                 445

<210> SEQ ID NO 33
<211> LENGTH: 446
<212> TYPE: PRT
<213> ORGANISM: Artificial Sequence
<220> FEATURE:
<223> OTHER INFORMATION: Mature sequence with His-tag

<400> SEQUENCE: 33

His His His His His His Pro Arg Ala Ala Ser Gly Ala Leu Arg Gly
1               5                   10                  15

Ala Gly Ser Gly Arg Cys Val Asp Val Thr Gly Gly Glu Arg Thr Asp
                20                  25                  30

Gly Thr Thr Leu Gln Leu Tyr Asp Cys Trp Gly Gly Thr Asn Gln Gln
                35                  40                  45

Trp Thr Ser Thr Asp Ser Gly Gln Leu Thr Val Tyr Gly Asp Lys Cys
                50                  55                  60

Leu Asp Val Pro Gly His Ala Thr Thr Pro Gly Thr Arg Val Gln Ile
65                  70                  75                  80

Trp Gly Cys Ser Gly Gly Ala Asn Gln Gln Trp Arg Val Asn Ser Asp
                85                  90                  95

Gly Thr Val Val Gly Val Glu Ser Gly Leu Cys Leu Glu Ala Ala Gly
                100                 105                 110

Ala Gly Thr Ala Asn Gly Thr Ala Val Gln Leu Trp Thr Cys Asn Gly
                115                 120                 125

Gly Ser Asn Gln Lys Trp Thr Gly Leu Pro Ala Thr Pro Pro Thr Asp
                130                 135                 140

Gly Thr Cys Ser Leu Pro Ser Ala Tyr Arg Trp Thr Ser Thr Gly Val
145                 150                 155                 160

Leu Ala Gln Pro Ala Asn Gly Trp Ala Ala Val Lys Asp Phe Thr Thr
                165                 170                 175

Val Thr His Asn Gly Lys His Leu Val Tyr Ala Ser Asn Val Ser Gly
                180                 185                 190

Ser Ser Tyr Gly Ser Met Met Phe Ser Pro Phe Thr Asp Trp Pro Asp
                195                 200                 205

Met Ala Ser Ala Gly Gln Thr Gly Met Ser Gln Ala Val Ala Pro
210                 215                 220
```

```
Thr Leu Phe Tyr Phe Ala Pro Lys Asn Ile Trp Val Leu Ala Tyr Gln
225                 230                 235                 240

Trp Gly Ala Trp Pro Phe Ile Tyr Arg Thr Ser Ser Asn Pro Ala Asp
                245                 250                 255

Pro Asn Gly Trp Ser Ser Pro Gln Pro Leu Phe Thr Gly Ser Ile Ser
            260                 265                 270

Gly Ser Asp Thr Gly Pro Ile Asp Gln Thr Leu Ile Ala Asp Gly Gln
        275                 280                 285

Asn Met Tyr Leu Phe Phe Ala Gly Asp Asn Gly Lys Ile Tyr Arg Ala
290                 295                 300

Ser Met Pro Ile Gly Asn Phe Pro Gly Ser Phe Gly Ser Ser Tyr Thr
305                 310                 315                 320

Thr Val Met Ser Asp Thr Lys Ala Asn Leu Phe Glu Gly Val Gln Val
                325                 330                 335

Tyr Lys Val Lys Asp Arg Ser Gln Tyr Leu Met Ile Val Glu Ala Met
                340                 345                 350

Gly Ala Asn Gly Arg Tyr Phe Arg Ser Phe Thr Ala Ser Ser Leu Asn
            355                 360                 365

Gly Thr Trp Thr Pro Gln Ala Ala Thr Glu Ser Ser Pro Phe Ala Gly
370                 375                 380

Lys Ala Asn Ser Gly Ala Thr Trp Thr Asn Asp Ile Ser His Gly Asp
385                 390                 395                 400

Leu Val Arg Asp Asn Pro Asp Gln Thr Met Thr Val Asp Pro Cys Asn
                405                 410                 415

Leu Arg Phe Leu Tyr Gln Gly Lys Ala Pro Ala Gly Gly Glu Tyr
            420                 425                 430

Asn Arg Leu Pro Trp Arg Pro Gly Val Leu Thr Leu Arg Arg
            435                 440                 445

<210> SEQ ID NO 34
<211> LENGTH: 1425
<212> TYPE: DNA
<213> ORGANISM: Streptomyces beijiangensis
<220> FEATURE:
<221> NAME/KEY: CDS
<222> LOCATION: (1)..(1422)
<220> FEATURE:
<221> NAME/KEY: sig_peptide
<222> LOCATION: (1)..(108)
<220> FEATURE:
<221> NAME/KEY: mat_peptide
<222> LOCATION: (109)..(1422)

<400> SEQUENCE: 34 atg agc aga cga act ttc agt cgc agg cat cca tct gct gtg ctc gcc    48
Met Ser Arg Arg Thr Phe Ser Arg Arg His Pro Ser Ala Val Leu Ala
    -35                 -30                 -25 gcc gtg atc gcg gct ctg gga gca ttg gcg gcg atg ctc gtc gcc acc    96
Ala Val Ile Ala Ala Leu Gly Ala Leu Ala Ala Met Leu Val Ala Thr
-20                 -15                 -10                 -5 ccg gct cag gcg gct gcc ggc ggc gcc ctg cgc cag gcc gct tcc ggc   144
Pro Ala Gln Ala Ala Ala Gly Gly Ala Leu Arg Gln Ala Ala Ser Gly
            -1  1               5                   10 cgg tgc ctc gat gtg ccg ggc gcc gtc cag acc gac ggt acg tcc gtg   192
Arg Cys Leu Asp Val Pro Gly Ala Val Gln Thr Asp Gly Thr Ser Val
        15                  20                  25 cag atc tat gac tgc tgg agt gga acc aac cag cag tgg acg tcg acg   240
Gln Ile Tyr Asp Cys Trp Ser Gly Thr Asn Gln Gln Trp Thr Ser Thr
    30                  35                  40
```

```
gac gcc aac cag ctc acc gtg tac ggc aac aag tgc ctg gat gtc ccc      288
Asp Ala Asn Gln Leu Thr Val Tyr Gly Asn Lys Cys Leu Asp Val Pro
 45                  50                  55                  60 ggt cac gcc acc acg gcc ggg acc cgg gtg cag ata tgg agc tgt tcc      336
Gly His Ala Thr Thr Ala Gly Thr Arg Val Gln Ile Trp Ser Cys Ser
                     65                  70                  75 ggc ggt gcg aac cag cag tgg agg gtg aac tcc gac ggc acg gtc acc      384
Gly Gly Ala Asn Gln Gln Trp Arg Val Asn Ser Asp Gly Thr Val Thr
             80                  85                  90 ggc gtg gag tca ggg ctg tgc ctg gag gcc gcg ggc gcc gcc acg gcc      432
Gly Val Glu Ser Gly Leu Cys Leu Glu Ala Ala Gly Ala Ala Thr Ala
         95                 100                 105 aac gga acg gcg gtg cag ctg gga acg tgc aac cag gga agc aac cag      480
Asn Gly Thr Ala Val Gln Leu Gly Thr Cys Asn Gln Gly Ser Asn Gln
     110                 115                 120 aaa tgg agc ggt ctg acc ggg acg ccg acg gac ggc tcg tgt tcc          528
Lys Trp Ser Gly Leu Thr Gly Thr Pro Thr Asp Gly Ser Cys Ser
125                 130                 135                 140 ctg ccg tcg acg tac cgc tgg tcg tcg acg ggt gtg ctg gcg cag cct      576
Leu Pro Ser Thr Tyr Arg Trp Ser Ser Thr Gly Val Leu Ala Gln Pro
                     145                 150                 155 gcg aac ggg tgg gcg gcg gtg aag gac ttc acc acc gtg acc tac aac      624
Ala Asn Gly Trp Ala Ala Val Lys Asp Phe Thr Thr Val Thr Tyr Asn
             160                 165                 170 ggc aag cac ctg gtc tac gcc tcg aac gtg tcg gga tcg tcg tac ggc      672
Gly Lys His Leu Val Tyr Ala Ser Asn Val Ser Gly Ser Ser Tyr Gly
         175                 180                 185 tcg atg atg ttc agt ccc ttc acg aac tgg tcg gac atg gcg tcg gcc      720
Ser Met Met Phe Ser Pro Phe Thr Asn Trp Ser Asp Met Ala Ser Ala
     190                 195                 200 ggc cag agc ggg atg agc cag gcc gcg gtg gca ccc acg ctg ttc tac      768
Gly Gln Ser Gly Met Ser Gln Ala Ala Val Ala Pro Thr Leu Phe Tyr
205                 210                 215                 220 ttc gcg ccc aag aac atc tgg gtg ctg gcg tac cag tgg ggc gcg tcg      816
Phe Ala Pro Lys Asn Ile Trp Val Leu Ala Tyr Gln Trp Gly Ala Ser
                     225                 230                 235 ccc ttc gtc tac cgc acg tcg agc gac ccc acc aac ccc aac ggc tgg      864
Pro Phe Val Tyr Arg Thr Ser Ser Asp Pro Thr Asn Pro Asn Gly Trp
             240                 245                 250 tca tca ccg cag cca ctg ttc acc ggg agc atc tcc ggc tcc gac acc      912
Ser Ser Pro Gln Pro Leu Phe Thr Gly Ser Ile Ser Gly Ser Asp Thr
         255                 260                 265 gga ccg atc gac cag acc ctg atc gcc gac ggc cag aac atg tac ctg      960
Gly Pro Ile Asp Gln Thr Leu Ile Ala Asp Gly Gln Asn Met Tyr Leu
     270                 275                 280 ttc ttc gcc ggc gac aac ggc aag atc tac cgg gcg agc atg ccg atc     1008
Phe Phe Ala Gly Asp Asn Gly Lys Ile Tyr Arg Ala Ser Met Pro Ile
285                 290                 295                 300 ggg aac ttc ccg ggc aac ttc ggc tcg tcg tac acg acg gtc atg agc     1056
Gly Asn Phe Pro Gly Asn Phe Gly Ser Ser Tyr Thr Thr Val Met Ser
                     305                 310                 315 gac acc aag gcc aac ctg ttc gag ggc gta cag gtc tac aag gtc cag     1104
Asp Thr Lys Ala Asn Leu Phe Glu Gly Val Gln Val Tyr Lys Val Gln
             320                 325                 330 ggc cag aac cag tac ctc atg atc gtc gag gcg atg ggt gcg aac ggg     1152
Gly Gln Asn Gln Tyr Leu Met Ile Val Glu Ala Met Gly Ala Asn Gly
         335                 340                 345 cgc tac ttc cgc tcc ttc acc gcc tcc agt ctg aac ggg tca tgg gcc     1200
Arg Tyr Phe Arg Ser Phe Thr Ala Ser Ser Leu Asn Gly Ser Trp Ala
     350                 355                 360
```

```
ccg cag gcg gca acc gag agc aac ccc ttc gcg ggc aag gcc aac agc    1248
Pro Gln Ala Ala Thr Glu Ser Asn Pro Phe Ala Gly Lys Ala Asn Ser
365                 370                 375                 380 ggt gcc acc tgg acc aac gac atc agc cac ggg gac ctg gtc cgg ggc    1296
Gly Ala Thr Trp Thr Asn Asp Ile Ser His Gly Asp Leu Val Arg Gly
                385                 390                 395 aac ccg gat cag acc atg acg atc gat cct tgc aac ctg caa ctc ctc    1344
Asn Pro Asp Gln Thr Met Thr Ile Asp Pro Cys Asn Leu Gln Leu Leu
400                 405                 410 tac cag ggg aaa tct ccc acc gcg ggc ggc ccc tac gac caa ctg ccg    1392
Tyr Gln Gly Lys Ser Pro Thr Ala Gly Gly Pro Tyr Asp Gln Leu Pro
            415                 420                 425 tgg cgg cca ggc gtc ctc tcc ctt cag cgc tga                        1425
Trp Arg Pro Gly Val Leu Ser Leu Gln Arg
    430                 435
```

<210> SEQ ID NO 35
<211> LENGTH: 474
<212> TYPE: PRT
<213> ORGANISM: Streptomyces beijiangensis

<400> SEQUENCE: 35

```
Met Ser Arg Arg Thr Phe Ser Arg Arg His Pro Ser Ala Val Leu Ala
    -35                 -30                 -25

Ala Val Ile Ala Ala Leu Gly Ala Leu Ala Ala Met Leu Val Ala Thr
-20                 -15                 -10                  -5

Pro Ala Gln Ala Ala Ala Gly Gly Ala Leu Arg Gln Ala Ala Ser Gly
                -1  1               5                   10

Arg Cys Leu Asp Val Pro Gly Ala Val Gln Thr Asp Gly Thr Ser Val
            15                  20                  25

Gln Ile Tyr Asp Cys Trp Ser Gly Thr Asn Gln Trp Thr Ser Thr
        30                  35                  40

Asp Ala Asn Gln Leu Thr Val Tyr Gly Asn Lys Cys Leu Asp Val Pro
45                  50                  55                  60

Gly His Ala Thr Thr Ala Gly Thr Arg Val Gln Ile Trp Ser Cys Ser
                65                  70                  75

Gly Gly Ala Asn Gln Gln Trp Arg Val Asn Ser Asp Gly Thr Val Thr
            80                  85                  90

Gly Val Glu Ser Gly Leu Cys Leu Glu Ala Ala Gly Ala Ala Thr Ala
        95                  100                 105

Asn Gly Thr Ala Val Gln Leu Gly Thr Cys Asn Gln Gly Ser Asn Gln
110                 115                 120

Lys Trp Ser Gly Leu Thr Gly Thr Pro Pro Thr Asp Gly Ser Cys Ser
125                 130                 135                 140

Leu Pro Ser Thr Tyr Arg Trp Ser Ser Thr Gly Val Leu Ala Gln Pro
                145                 150                 155

Ala Asn Gly Trp Ala Ala Val Lys Asp Phe Thr Thr Val Thr Tyr Asn
            160                 165                 170

Gly Lys His Leu Val Tyr Ala Ser Asn Val Ser Gly Ser Ser Tyr Gly
        175                 180                 185

Ser Met Met Phe Ser Pro Phe Thr Asn Trp Ser Asp Met Ala Ser Ala
190                 195                 200

Gly Gln Ser Gly Met Ser Gln Ala Ala Val Ala Pro Thr Leu Phe Tyr
205                 210                 215                 220

Phe Ala Pro Lys Asn Ile Trp Val Leu Ala Tyr Gln Trp Gly Ala Ser
                225                 230                 235
```

```
Pro Phe Val Tyr Arg Thr Ser Ser Asp Pro Thr Asn Pro Asn Gly Trp
            240                 245                 250

Ser Ser Pro Gln Pro Leu Phe Thr Gly Ser Ile Ser Gly Ser Asp Thr
            255                 260                 265

Gly Pro Ile Asp Gln Thr Leu Ile Ala Asp Gly Gln Asn Met Tyr Leu
            270                 275                 280

Phe Phe Ala Gly Asp Asn Gly Lys Ile Tyr Arg Ala Ser Met Pro Ile
285                 290                 295                 300

Gly Asn Phe Pro Gly Asn Phe Gly Ser Ser Tyr Thr Thr Val Met Ser
                305                 310                 315

Asp Thr Lys Ala Asn Leu Phe Glu Gly Val Gln Val Tyr Lys Val Gln
            320                 325                 330

Gly Gln Asn Gln Tyr Leu Met Ile Val Glu Ala Met Gly Ala Asn Gly
            335                 340                 345

Arg Tyr Phe Arg Ser Phe Thr Ala Ser Ser Leu Asn Gly Ser Trp Ala
            350                 355                 360

Pro Gln Ala Ala Thr Glu Ser Asn Pro Phe Ala Gly Lys Ala Asn Ser
365                 370                 375                 380

Gly Ala Thr Trp Thr Asn Asp Ile Ser His Gly Asp Leu Val Arg Gly
                385                 390                 395

Asn Pro Asp Gln Thr Met Thr Ile Asp Pro Cys Asn Leu Gln Leu Leu
            400                 405                 410

Tyr Gln Gly Lys Ser Pro Thr Ala Gly Gly Pro Tyr Asp Gln Leu Pro
            415                 420                 425

Trp Arg Pro Gly Val Leu Ser Leu Gln Arg
            430                 435

<210> SEQ ID NO 36
<211> LENGTH: 438
<212> TYPE: PRT
<213> ORGANISM: Artificial Sequence
<220> FEATURE:
<223> OTHER INFORMATION: Mature sequence with His-tag

<400> SEQUENCE: 36

Ala Ala Gly Gly Ala Leu Arg Gln Ala Ala Ser Gly Arg Cys Leu Asp
1               5                   10                  15

Val Pro Gly Ala Val Gln Thr Asp Gly Thr Ser Val Gln Ile Tyr Asp
            20                  25                  30

Cys Trp Ser Gly Thr Asn Gln Gln Trp Thr Ser Thr Asp Ala Asn Gln
            35                  40                  45

Leu Thr Val Tyr Gly Asn Lys Cys Leu Asp Val Pro Gly His Ala Thr
    50                  55                  60

Thr Ala Gly Thr Arg Val Gln Ile Trp Ser Cys Ser Gly Gly Ala Asn
65                  70                  75                  80

Gln Gln Trp Arg Val Asn Ser Asp Gly Thr Val Thr Gly Val Glu Ser
                85                  90                  95

Gly Leu Cys Leu Glu Ala Ala Gly Ala Ala Thr Ala Asn Gly Thr Ala
            100                 105                 110

Val Gln Leu Gly Thr Cys Asn Gln Gly Ser Asn Gln Lys Trp Ser Gly
            115                 120                 125

Leu Thr Gly Thr Pro Pro Thr Asp Gly Ser Cys Ser Leu Pro Ser Thr
            130                 135                 140

Tyr Arg Trp Ser Ser Thr Gly Val Leu Ala Gln Pro Ala Asn Gly Trp
145                 150                 155                 160
```

Ala Ala Val Lys Asp Phe Thr Thr Val Thr Tyr Asn Gly Lys His Leu
            165                 170                 175

Val Tyr Ala Ser Asn Val Ser Gly Ser Tyr Gly Ser Met Met Phe
        180                 185                 190

Ser Pro Phe Thr Asn Trp Ser Asp Met Ala Ser Ala Gly Gln Ser Gly
            195                 200                 205

Met Ser Gln Ala Ala Val Ala Pro Thr Leu Phe Tyr Phe Ala Pro Lys
    210                 215                 220

Asn Ile Trp Val Leu Ala Tyr Gln Trp Gly Ala Ser Pro Phe Val Tyr
225                 230                 235                 240

Arg Thr Ser Ser Asp Pro Thr Asn Pro Asn Gly Trp Ser Pro Gln
            245                 250                 255

Pro Leu Phe Thr Gly Ser Ile Ser Gly Ser Asp Thr Gly Pro Ile Asp
            260                 265                 270

Gln Thr Leu Ile Ala Asp Gly Gln Asn Met Tyr Leu Phe Phe Ala Gly
        275                 280                 285

Asp Asn Gly Lys Ile Tyr Arg Ala Ser Met Pro Ile Gly Asn Phe Pro
290                 295                 300

Gly Asn Phe Gly Ser Ser Tyr Thr Thr Val Met Ser Asp Thr Lys Ala
305                 310                 315                 320

Asn Leu Phe Glu Gly Val Gln Val Tyr Lys Val Gln Gly Gln Asn Gln
                325                 330                 335

Tyr Leu Met Ile Val Glu Ala Met Gly Ala Asn Gly Arg Tyr Phe Arg
            340                 345                 350

Ser Phe Thr Ala Ser Ser Leu Asn Gly Ser Trp Ala Pro Gln Ala Ala
    355                 360                 365

Thr Glu Ser Asn Pro Phe Ala Gly Lys Ala Asn Ser Gly Ala Thr Trp
370                 375                 380

Thr Asn Asp Ile Ser His Gly Asp Leu Val Arg Gly Asn Pro Asp Gln
385                 390                 395                 400

Thr Met Thr Ile Asp Pro Cys Asn Leu Gln Leu Leu Tyr Gln Gly Lys
                405                 410                 415

Ser Pro Thr Ala Gly Gly Pro Tyr Asp Gln Leu Pro Trp Arg Pro Gly
            420                 425                 430

Val Leu Ser Leu Gln Arg
        435

<210> SEQ ID NO 37
<211> LENGTH: 1422
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(1419)
<220> FEATURE:
<221> NAME/KEY: sig_peptide
<222> LOCATION: (1)..(81)
<220> FEATURE:
<221> NAME/KEY: mat_peptide
<222> LOCATION: (82)..(1419)

<400> SEQUENCE: 37 atg aag aaa ccg ttg ggg aaa att gtc gca agc acc gca cta ctc att    48
Met Lys Lys Pro Leu Gly Lys Ile Val Ala Ser Thr Ala Leu Leu Ile
        -25                 -20                 -15 tct gtt gct ttt agt tca tcg ata gca tca gca cat cat cat cac cat    96

```
              Ser Val Ala Phe Ser Ser Ile Ala Ser Ala His His His His
                  -10             -5              -1  1               5 cat cct agg gct gcc ggc ggc gcc ctg cgc cag gcc gct tcc ggc cgg        144
His Pro Arg Ala Ala Gly Gly Ala Leu Arg Gln Ala Ala Ser Gly Arg
                10              15              20 tgc ctc gat gtg ccg ggc gcc gtc cag acc gac ggt acg tcc gtg cag        192
Cys Leu Asp Val Pro Gly Ala Val Gln Thr Asp Gly Thr Ser Val Gln
            25              30              35 atc tat gac tgc tgg agt gga acc aac cag cag tgg acg tcg acg gac        240
Ile Tyr Asp Cys Trp Ser Gly Thr Asn Gln Gln Trp Thr Ser Thr Asp
            40              45              50 gcc aac cag ctc acc gtg tac ggc aac aag tgc ctg gat gtc ccc ggt        288
Ala Asn Gln Leu Thr Val Tyr Gly Asn Lys Cys Leu Asp Val Pro Gly
        55              60              65 cac gcc acc acg gcc ggg acc cgg gtg cag ata tgg agc tgt tcc ggc        336
His Ala Thr Thr Ala Gly Thr Arg Val Gln Ile Trp Ser Cys Ser Gly
70              75              80              85 ggt gcg aac cag cag tgg agg gtg aac tcc gac ggc acg gtc acc ggc        384
Gly Ala Asn Gln Gln Trp Arg Val Asn Ser Asp Gly Thr Val Thr Gly
            90              95              100 gtg gag tca ggg ctg tgc ctg gag gcc gcg ggc gcc gcc acg gcc aac        432
Val Glu Ser Gly Leu Cys Leu Glu Ala Ala Gly Ala Ala Thr Ala Asn
            105             110             115 gga acg gcg gtg cag ctg gga acg tgc aac cag gga agc aac cag aaa        480
Gly Thr Ala Val Gln Leu Gly Thr Cys Asn Gln Gly Ser Asn Gln Lys
        120             125             130 tgg agc ggt ctg acc ggg acg ccg ccg acg gac ggc tcg tgt tcc ctg        528
Trp Ser Gly Leu Thr Gly Thr Pro Pro Thr Asp Gly Ser Cys Ser Leu
135             140             145 ccg tcg acg tac cgc tgg tcg tcg acg ggt gtg ctg gcg cag cct gcg        576
Pro Ser Thr Tyr Arg Trp Ser Ser Thr Gly Val Leu Ala Gln Pro Ala
150             155             160             165 aac ggg tgg gcg gcg gtg aag gac ttc acc acc gtg acc tac aac ggc        624
Asn Gly Trp Ala Ala Val Lys Asp Phe Thr Thr Val Thr Tyr Asn Gly
            170             175             180 aag cac ctg gtc tac gcc tcg aac gtg tcg gga tcg tcg tac ggc tcg        672
Lys His Leu Val Tyr Ala Ser Asn Val Ser Gly Ser Ser Tyr Gly Ser
            185             190             195 atg atg ttc agt ccc ttc acg aac tgg tcg gac atg gcg tcg gcc ggc        720
Met Met Phe Ser Pro Phe Thr Asn Trp Ser Asp Met Ala Ser Ala Gly
        200             205             210 cag agc ggg atg agc cag gcc gcg gtg gca ccc acg ctg ttc tac ttc        768
Gln Ser Gly Met Ser Gln Ala Ala Val Ala Pro Thr Leu Phe Tyr Phe
        215             220             225 gcg ccc aag aac atc tgg gtg ctg gcg tac cag tgg ggc gcg tcg ccc        816
Ala Pro Lys Asn Ile Trp Val Leu Ala Tyr Gln Trp Gly Ala Ser Pro
230             235             240             245 ttc gtc tac cgc acg tcg agc gac ccc acc aac ccc aac ggc tgg tca        864
Phe Val Tyr Arg Thr Ser Ser Asp Pro Thr Asn Pro Asn Gly Trp Ser
            250             255             260 tca ccg cag cca ctg ttc acc ggg agc atc tcc ggc tcc gac acc gga        912
Ser Pro Gln Pro Leu Phe Thr Gly Ser Ile Ser Gly Ser Asp Thr Gly
        265             270             275 ccg atc gac cag acc ctg atc gcc gac ggc cag aac atg tac ctg ttc        960
Pro Ile Asp Gln Thr Leu Ile Ala Asp Gly Gln Asn Met Tyr Leu Phe
        280             285             290 ttc gcc ggc gac aac ggc aag atc tac cgg gcg agc atg ccg atc ggg       1008
Phe Ala Gly Asp Asn Gly Lys Ile Tyr Arg Ala Ser Met Pro Ile Gly
295             300             305
```

-continued

| | | |
|---|---|---|
| aac ttc ccg ggc aac ttc ggc tcg tcg tac acg acg gtc atg agc gac<br>Asn Phe Pro Gly Asn Phe Gly Ser Ser Tyr Thr Thr Val Met Ser Asp<br>310               315                 320               325 | 1056 |

```
aac ttc ccg ggc aac ttc ggc tcg tcg tac acg acg gtc atg agc gac    1056
Asn Phe Pro Gly Asn Phe Gly Ser Ser Tyr Thr Thr Val Met Ser Asp
310             315                 320                 325 acc aag gcc aac ctg ttc gag ggc gta cag gtc tac aag gtc cag ggc    1104
Thr Lys Ala Asn Leu Phe Glu Gly Val Gln Val Tyr Lys Val Gln Gly
            330                 335                 340 cag aac cag tac ctc atg atc gtc gag gcg atg ggt gcg aac ggg cgc    1152
Gln Asn Gln Tyr Leu Met Ile Val Glu Ala Met Gly Ala Asn Gly Arg
        345                 350                 355 tac ttc cgc tcc ttc acc gcc tcc agt ctg aac ggg tca tgg gcc ccg    1200
Tyr Phe Arg Ser Phe Thr Ala Ser Ser Leu Asn Gly Ser Trp Ala Pro
    360                 365                 370 cag gcg gca acc gag agc aac ccc ttc gcg ggc aag gcc aac agc ggt    1248
Gln Ala Ala Thr Glu Ser Asn Pro Phe Ala Gly Lys Ala Asn Ser Gly
375                 380                 385 gcc acc tgg acc aac gac atc agc cac ggg gac ctg gtc cgg ggc aac    1296
Ala Thr Trp Thr Asn Asp Ile Ser His Gly Asp Leu Val Arg Gly Asn
390                 395                 400                 405 ccg gat cag acc atg acg atc gat cct tgc aac ctg caa ctc ctc tac    1344
Pro Asp Gln Thr Met Thr Ile Asp Pro Cys Asn Leu Gln Leu Leu Tyr
            410                 415                 420 cag ggg aaa tct ccc acc gcg ggc ggc ccc tac gac caa ctg ccg tgg    1392
Gln Gly Lys Ser Pro Thr Ala Gly Gly Pro Tyr Asp Gln Leu Pro Trp
        425                 430                 435 cgg cca ggc gtc ctc tcc ctt cag cgc tga                            1422
Arg Pro Gly Val Leu Ser Leu Gln Arg
    440                 445

<210> SEQ ID NO 38
<211> LENGTH: 473
<212> TYPE: PRT
<213> ORGANISM: Artificial Sequence
<220> FEATURE:
<223> OTHER INFORMATION: Synthetic Construct

<400> SEQUENCE: 38

Met Lys Lys Pro Leu Gly Lys Ile Val Ala Ser Thr Ala Leu Leu Ile
        -25                 -20                 -15

Ser Val Ala Phe Ser Ser Ile Ala Ser Ala His His His His
    -10                  -5              -1  1                   5

His Pro Arg Ala Ala Gly Gly Ala Leu Arg Gln Ala Ala Ser Gly Arg
                10                  15                  20

Cys Leu Asp Val Pro Gly Ala Val Gln Thr Asp Gly Thr Ser Val Gln
            25                  30                  35

Ile Tyr Asp Cys Trp Ser Gly Thr Asn Gln Gln Trp Thr Ser Thr Asp
        40                  45                  50

Ala Asn Gln Leu Thr Val Tyr Gly Asn Lys Cys Leu Asp Val Pro Gly
    55                  60                  65

His Ala Thr Thr Ala Gly Thr Arg Val Gln Ile Trp Ser Cys Ser Gly
70                  75                  80                  85

Gly Ala Asn Gln Gln Trp Arg Val Asn Ser Asp Gly Thr Val Thr Gly
                90                  95                  100

Val Glu Ser Gly Leu Cys Leu Glu Ala Ala Gly Ala Ala Thr Ala Asn
            105                 110                 115

Gly Thr Ala Val Gln Leu Gly Thr Cys Asn Gln Gly Ser Asn Gln Lys
        120                 125                 130

Trp Ser Gly Leu Thr Gly Thr Pro Pro Thr Asp Gly Ser Cys Ser Leu
    135                 140                 145
```

```
Pro Ser Thr Tyr Arg Trp Ser Ser Thr Gly Val Leu Ala Gln Pro Ala
150                 155                 160                 165

Asn Gly Trp Ala Ala Val Lys Asp Phe Thr Thr Val Thr Tyr Asn Gly
            170                 175                 180

Lys His Leu Val Tyr Ala Ser Asn Val Ser Gly Ser Tyr Gly Ser
        185                 190                 195

Met Met Phe Ser Pro Phe Thr Asn Trp Ser Asp Met Ala Ser Ala Gly
            200                 205                 210

Gln Ser Gly Met Ser Gln Ala Ala Val Ala Pro Thr Leu Phe Tyr Phe
            215                 220                 225

Ala Pro Lys Asn Ile Trp Val Leu Ala Tyr Gln Trp Gly Ala Ser Pro
230                 235                 240                 245

Phe Val Tyr Arg Thr Ser Ser Asp Pro Thr Asn Pro Asn Gly Trp Ser
            250                 255                 260

Ser Pro Gln Pro Leu Phe Thr Gly Ser Ile Ser Gly Ser Asp Thr Gly
            265                 270                 275

Pro Ile Asp Gln Thr Leu Ile Ala Asp Gly Asn Met Tyr Leu Phe
280                 285                 290

Phe Ala Gly Asp Asn Gly Lys Ile Tyr Arg Ala Ser Met Pro Ile Gly
            295                 300                 305

Asn Phe Pro Gly Asn Phe Gly Ser Ser Tyr Thr Thr Val Met Ser Asp
310                 315                 320                 325

Thr Lys Ala Asn Leu Phe Glu Gly Val Gln Val Tyr Lys Val Gln Gly
                330                 335                 340

Gln Asn Gln Tyr Leu Met Ile Val Glu Ala Met Gly Ala Asn Gly Arg
            345                 350                 355

Tyr Phe Arg Ser Phe Thr Ala Ser Ser Leu Asn Gly Ser Trp Ala Pro
            360                 365                 370

Gln Ala Ala Thr Glu Ser Asn Pro Phe Ala Gly Lys Ala Asn Ser Gly
        375                 380                 385

Ala Thr Trp Thr Asn Asp Ile Ser His Gly Asp Leu Val Arg Gly Asn
390                 395                 400                 405

Pro Asp Gln Thr Met Thr Ile Asp Pro Cys Asn Leu Gln Leu Leu Tyr
            410                 415                 420

Gln Gly Lys Ser Pro Thr Ala Gly Pro Tyr Asp Gln Leu Pro Trp
            425                 430                 435

Arg Pro Gly Val Leu Ser Leu Gln Arg
            440                 445

<210> SEQ ID NO 39
<211> LENGTH: 446
<212> TYPE: PRT
<213> ORGANISM: Artificial Sequence
<220> FEATURE:
<223> OTHER INFORMATION: Mature sequence with His-tag

<400> SEQUENCE: 39

His His His His His His Pro Arg Ala Ala Gly Gly Ala Leu Arg Gln
1               5                   10                  15

Ala Ala Ser Gly Arg Cys Leu Asp Val Pro Gly Ala Val Gln Thr Asp
            20                  25                  30

Gly Thr Ser Val Gln Ile Tyr Asp Cys Trp Ser Gly Thr Asn Gln Gln
        35                  40                  45

Trp Thr Ser Thr Asp Ala Asn Gln Leu Thr Val Tyr Gly Asn Lys Cys
    50                  55                  60
```

```
Leu Asp Val Pro Gly His Ala Thr Thr Ala Gly Thr Arg Val Gln Ile
 65                  70                  75                  80

Trp Ser Cys Ser Gly Gly Ala Asn Gln Gln Trp Arg Val Asn Ser Asp
             85                  90                  95

Gly Thr Val Thr Gly Val Glu Ser Gly Leu Cys Leu Glu Ala Ala Gly
            100                 105                 110

Ala Ala Thr Ala Asn Gly Thr Ala Val Gln Leu Gly Thr Cys Asn Gln
        115                 120                 125

Gly Ser Asn Gln Lys Trp Ser Gly Leu Thr Gly Thr Pro Pro Thr Asp
    130                 135                 140

Gly Ser Cys Ser Leu Pro Ser Thr Tyr Arg Trp Ser Thr Gly Val
145                 150                 155                 160

Leu Ala Gln Pro Ala Asn Gly Trp Ala Ala Val Lys Asp Phe Thr Thr
                165                 170                 175

Val Thr Tyr Asn Gly Lys His Leu Val Tyr Ala Ser Asn Val Ser Gly
            180                 185                 190

Ser Ser Tyr Gly Ser Met Met Phe Ser Pro Phe Thr Asn Trp Ser Asp
        195                 200                 205

Met Ala Ser Ala Gly Gln Ser Gly Met Ser Gln Ala Ala Val Ala Pro
210                 215                 220

Thr Leu Phe Tyr Phe Ala Pro Lys Asn Ile Trp Val Leu Ala Tyr Gln
225                 230                 235                 240

Trp Gly Ala Ser Pro Phe Val Tyr Arg Thr Ser Ser Asp Pro Thr Asn
                245                 250                 255

Pro Asn Gly Trp Ser Ser Pro Gln Pro Leu Phe Thr Gly Ser Ile Ser
                260                 265                 270

Gly Ser Asp Thr Gly Pro Ile Asp Gln Thr Leu Ile Ala Asp Gly Gln
    275                 280                 285

Asn Met Tyr Leu Phe Phe Ala Gly Asp Asn Gly Lys Ile Tyr Arg Ala
    290                 295                 300

Ser Met Pro Ile Gly Asn Phe Pro Gly Asn Phe Gly Ser Ser Tyr Thr
305                 310                 315                 320

Thr Val Met Ser Asp Thr Lys Ala Asn Leu Phe Glu Gly Val Gln Val
                325                 330                 335

Tyr Lys Val Gln Gly Gln Asn Gln Tyr Leu Met Ile Val Glu Ala Met
            340                 345                 350

Gly Ala Asn Gly Arg Tyr Phe Arg Ser Phe Thr Ala Ser Ser Leu Asn
        355                 360                 365

Gly Ser Trp Ala Pro Gln Ala Thr Glu Ser Asn Pro Phe Ala Gly
    370                 375                 380

Lys Ala Asn Ser Gly Ala Thr Trp Thr Asn Asp Ile Ser His Gly Asp
385                 390                 395                 400

Leu Val Arg Gly Asn Pro Asp Gln Thr Met Thr Ile Asp Pro Cys Asn
                405                 410                 415

Leu Gln Leu Leu Tyr Gln Gly Lys Ser Pro Thr Ala Gly Gly Pro Tyr
                420                 425                 430

Asp Gln Leu Pro Trp Arg Pro Gly Val Leu Ser Leu Gln Arg
            435                 440                 445

<210> SEQ ID NO 40
<211> LENGTH: 1011
<212> TYPE: DNA
<213> ORGANISM: Aspergillus clavatus
<220> FEATURE:
<221> NAME/KEY: CDS
```

```
<222> LOCATION: (1)..(1008)
<220> FEATURE:
<221> NAME/KEY: sig_peptide
<222> LOCATION: (1)..(54)
<220> FEATURE:
<221> NAME/KEY: mat_peptide
<222> LOCATION: (55)..(1008)

<400> SEQUENCE: 40
```

| | | | | | | | | | | | | | | | | |
|---|---|---|---|---|---|---|---|---|---|---|---|---|---|---|---|---|
| atg | cgg | tcg | atc | ctc | ttc | cta | gtc | act | tcc | acc | ctc | gct | gct | gct | gct | 48 |
| Met | Arg | Ser | Ile | Leu | Phe | Leu | Val | Thr | Ser | Thr | Leu | Ala | Ala | Ala | Ala | |
| | | | -15 | | | | -10 | | | | -5 | | | | | |
| gct | gct | gct | tcc | tta | ccc | aga | agc | ttc | aaa | tgg | agc | tcc | agc | gcc | gcc | 96 |
| Ala | Ala | Ala | Ser | Leu | Pro | Arg | Ser | Phe | Lys | Trp | Ser | Ser | Ser | Ala | Ala | |
| | -1 | 1 | | | 5 | | | | | 10 | | | | | | |
| ctc | gtg | ggc | cct | aag | aac | gat | ggc | cgc | cat | atc | gag | ggc | atc | aag | gat | 144 |
| Leu | Val | Gly | Pro | Lys | Asn | Asp | Gly | Arg | His | Ile | Glu | Gly | Ile | Lys | Asp | |
| 15 | | | | 20 | | | | | 25 | | | | | 30 | | |
| ccc | tcc | atc | gtc | gag | gtg | gac | ggc | acc | tac | cac | gtc | ttc | gct | agc | acc | 192 |
| Pro | Ser | Ile | Val | Glu | Val | Asp | Gly | Thr | Tyr | His | Val | Phe | Ala | Ser | Thr | |
| | | | 35 | | | | | 40 | | | | | 45 | | | |
| gcc | cag | gcc | tcc | ggc | tac | aac | ctg | gtg | tat | ctt | agc | ttc | acc | gac | ttc | 240 |
| Ala | Gln | Ala | Ser | Gly | Tyr | Asn | Leu | Val | Tyr | Leu | Ser | Phe | Thr | Asp | Phe | |
| | | | 50 | | | | | 55 | | | | | 60 | | | |
| aat | aag | gct | cac | ctg | gct | cca | ttc | cac | tac | ctg | gac | cag | acc | cgg | atc | 288 |
| Asn | Lys | Ala | His | Leu | Ala | Pro | Phe | His | Tyr | Leu | Asp | Gln | Thr | Arg | Ile | |
| | | 65 | | | | | 70 | | | | | 75 | | | | |
| ggc | aaa | ggc | tac | cgc | gcc | gcg | cca | cag | gtc | ttc | tac | ttc | aag | ccc | cac | 336 |
| Gly | Lys | Gly | Tyr | Arg | Ala | Ala | Pro | Gln | Val | Phe | Tyr | Phe | Lys | Pro | His | |
| | 80 | | | | | 85 | | | | | 90 | | | | | |
| aaa | ctg | tgg | tat | ctg | gtc | tac | cag | aac | ggc | aac | gca | gcc | tat | tcc | acc | 384 |
| Lys | Leu | Trp | Tyr | Leu | Val | Tyr | Gln | Asn | Gly | Asn | Ala | Ala | Tyr | Ser | Thr | |
| 95 | | | | | 100 | | | | | 105 | | | | | 110 | |
| aac | ccc | gac | atc | agc | aac | ccg | gcc | ggc | tgg | acc | tct | ccg | cag | aac | ttc | 432 |
| Asn | Pro | Asp | Ile | Ser | Asn | Pro | Ala | Gly | Trp | Thr | Ser | Pro | Gln | Asn | Phe | |
| | | | | 115 | | | | | 120 | | | | | 125 | | |
| ttc | agc | ggc | aca | ccc | agc | atc | atc | acc | cac | aac | atg | ggc | cgc | ggc | gcc | 480 |
| Phe | Ser | Gly | Thr | Pro | Ser | Ile | Ile | Thr | His | Asn | Met | Gly | Arg | Gly | Ala | |
| | | | 130 | | | | | 135 | | | | | 140 | | | |
| tgg | gtg | gac | atg | tgg | acc | atc | tgc | gac | aca | cgc | aac | tgc | tac | ctc | ttc | 528 |
| Trp | Val | Asp | Met | Trp | Thr | Ile | Cys | Asp | Thr | Arg | Asn | Cys | Tyr | Leu | Phe | |
| | | | 145 | | | | | 150 | | | | | 155 | | | |
| tcc | tca | gac | gac | aac | gga | cac | ctc | tac | cgc | tcc | cag | aca | tcc | ctg | gcc | 576 |
| Ser | Ser | Asp | Asp | Asn | Gly | His | Leu | Tyr | Arg | Ser | Gln | Thr | Ser | Leu | Ala | |
| | | | 160 | | | | | 165 | | | | | 170 | | | |
| gac | ttc | ccc | cac | ggc | atg | ggc | aac | act | gct | att | gcc | ctc | gca | gac | cgc | 624 |
| Asp | Phe | Pro | His | Gly | Met | Gly | Asn | Thr | Ala | Ile | Ala | Leu | Ala | Asp | Arg | |
| 175 | | | | | 180 | | | | | 185 | | | | | 190 | |
| aac | aag | ttc | agc | ctc | ttc | gaa | gca | tcc | aat | gtc | tac | cac | acc | ggg | gat | 672 |
| Asn | Lys | Phe | Ser | Leu | Phe | Glu | Ala | Ser | Asn | Val | Tyr | His | Thr | Gly | Asp | |
| | | | | 195 | | | | | 200 | | | | | 205 | | |
| gga | agc | tat | ctg | ctc | atc | gtc | gag | gcg | atc | ggc | aac | gac | ggc | cag | cgg | 720 |
| Gly | Ser | Tyr | Leu | Leu | Ile | Val | Glu | Ala | Ile | Gly | Asn | Asp | Gly | Gln | Arg | |
| | | | 210 | | | | | 215 | | | | | 220 | | | |
| tac | ttc | cgc | tcc | tgg | act | gcg | agc | agc | ttg | gcc | ggc | cag | tgg | aag | ccc | 768 |
| Tyr | Phe | Arg | Ser | Trp | Thr | Ala | Ser | Ser | Leu | Ala | Gly | Gln | Trp | Lys | Pro | |
| | | 225 | | | | | 230 | | | | | 235 | | | | |
| ctg | gcg | gat | acc | gag | tcg | aac | ccc | ttc | gcg | cgc | tcg | aac | aat | gtt | gcc | 816 |
| Leu | Ala | Asp | Thr | Glu | Ser | Asn | Pro | Phe | Ala | Arg | Ser | Asn | Asn | Val | Ala | |
| | 240 | | | | | 245 | | | | | 250 | | | | | |
| ttc | gct | aat | ggc | cat | gcc | tgg | acg | aag | agc | atc | agc | cac | ggc | gag | atg | 864 |

```
Phe Ala Asn Gly His Ala Trp Thr Lys Ser Ile Ser His Gly Glu Met
255                 260                 265                 270 atc cga acc cag acg gat cag act atg act atc agc ccg tgc aag ctg      912
Ile Arg Thr Gln Thr Asp Gln Thr Met Thr Ile Ser Pro Cys Lys Leu
                275                 280                 285 cgg tat ctg tac cag ggg gtg gat cct gcg gct aag ggg gat tat aat      960
Arg Tyr Leu Tyr Gln Gly Val Asp Pro Ala Ala Lys Gly Asp Tyr Asn
            290                 295                 300 gcg ctt ccg tgg aag ctg ggc ttg ctg acc cag acg aac tcg gct tgt     1008
Ala Leu Pro Trp Lys Leu Gly Leu Leu Thr Gln Thr Asn Ser Ala Cys
        305                 310                 315 taa                                                                  1011
```

<210> SEQ ID NO 41
<211> LENGTH: 336
<212> TYPE: PRT
<213> ORGANISM: Aspergillus clavatus

<400> SEQUENCE: 41

```
Met Arg Ser Ile Leu Phe Leu Val Thr Ser Thr Leu Ala Ala Ala
            -15                 -10                 -5

Ala Ala Ala Ser Leu Pro Arg Ser Phe Lys Trp Ser Ser Ser Ala Ala
    -1  1               5                  10

Leu Val Gly Pro Lys Asn Asp Gly Arg His Ile Glu Gly Ile Lys Asp
15              20                  25                  30

Pro Ser Ile Val Glu Val Asp Gly Thr Tyr His Val Phe Ala Ser Thr
                35                  40                  45

Ala Gln Ala Ser Gly Tyr Asn Leu Val Tyr Leu Ser Phe Thr Asp Phe
            50                  55                  60

Asn Lys Ala His Leu Ala Pro Phe His Tyr Leu Asp Gln Thr Arg Ile
65                  70                  75

Gly Lys Gly Tyr Arg Ala Ala Pro Gln Val Phe Tyr Phe Lys Pro His
        80                  85                  90

Lys Leu Trp Tyr Leu Val Tyr Gln Asn Gly Asn Ala Ala Tyr Ser Thr
95                  100                 105                 110

Asn Pro Asp Ile Ser Asn Pro Ala Gly Trp Thr Ser Pro Gln Asn Phe
            115                 120                 125

Phe Ser Gly Thr Pro Ser Ile Ile Thr His Asn Met Gly Arg Gly Ala
        130                 135                 140

Trp Val Asp Met Trp Thr Ile Cys Asp Thr Arg Asn Cys Tyr Leu Phe
        145                 150                 155

Ser Ser Asp Asp Asn Gly His Leu Tyr Arg Ser Gln Thr Ser Leu Ala
        160                 165                 170

Asp Phe Pro His Gly Met Gly Asn Thr Ala Ile Ala Leu Ala Asp Arg
175                 180                 185                 190

Asn Lys Phe Ser Leu Phe Glu Ala Ser Asn Val Tyr His Thr Gly Asp
            195                 200                 205

Gly Ser Tyr Leu Leu Ile Val Glu Ala Ile Gly Asn Asp Gly Gln Arg
        210                 215                 220

Tyr Phe Arg Ser Trp Thr Ala Ser Ser Leu Ala Gly Gln Trp Lys Pro
225                 230                 235

Leu Ala Asp Thr Glu Ser Asn Pro Phe Ala Arg Ser Asn Asn Val Ala
        240                 245                 250

Phe Ala Asn Gly His Ala Trp Thr Lys Ser Ile Ser His Gly Glu Met
255                 260                 265                 270
```

Ile Arg Thr Gln Thr Asp Gln Thr Met Thr Ile Ser Pro Cys Lys Leu
            275                 280                 285

Arg Tyr Leu Tyr Gln Gly Val Asp Pro Ala Ala Lys Gly Asp Tyr Asn
        290                 295                 300

Ala Leu Pro Trp Lys Leu Gly Leu Leu Thr Gln Thr Asn Ser Ala Cys
        305                 310                 315

<210> SEQ ID NO 42
<211> LENGTH: 318
<212> TYPE: PRT
<213> ORGANISM: Aspergillus clavatus

<400> SEQUENCE: 42

Ala Ser Leu Pro Arg Ser Phe Lys Trp Ser Ser Ala Ala Leu Val
1               5                   10                  15

Gly Pro Lys Asn Asp Gly Arg His Ile Glu Gly Ile Lys Asp Pro Ser
            20                  25                  30

Ile Val Glu Val Asp Gly Thr Tyr His Val Phe Ala Ser Thr Ala Gln
            35                  40                  45

Ala Ser Gly Tyr Asn Leu Val Tyr Leu Ser Phe Thr Asp Phe Asn Lys
        50                  55                  60

Ala His Leu Ala Pro Phe His Tyr Leu Asp Gln Thr Arg Ile Gly Lys
65                  70                  75                  80

Gly Tyr Arg Ala Ala Pro Gln Val Phe Tyr Phe Lys Pro His Lys Leu
                85                  90                  95

Trp Tyr Leu Val Tyr Gln Asn Gly Asn Ala Ala Tyr Ser Thr Asn Pro
            100                 105                 110

Asp Ile Ser Asn Pro Ala Gly Trp Thr Ser Pro Gln Asn Phe Phe Ser
            115                 120                 125

Gly Thr Pro Ser Ile Ile Thr His Asn Met Gly Arg Gly Ala Trp Val
        130                 135                 140

Asp Met Trp Thr Ile Cys Asp Thr Arg Asn Cys Tyr Leu Phe Ser Ser
145                 150                 155                 160

Asp Asp Asn Gly His Leu Tyr Arg Ser Gln Thr Ser Leu Ala Asp Phe
                165                 170                 175

Pro His Gly Met Gly Asn Thr Ala Ile Ala Leu Ala Asp Arg Asn Lys
            180                 185                 190

Phe Ser Leu Phe Glu Ala Ser Asn Val Tyr His Thr Gly Asp Gly Ser
        195                 200                 205

Tyr Leu Leu Ile Val Glu Ala Ile Gly Asn Asp Gly Gln Arg Tyr Phe
    210                 215                 220

Arg Ser Trp Thr Ala Ser Ser Leu Ala Gly Gln Trp Lys Pro Leu Ala
225                 230                 235                 240

Asp Thr Glu Ser Asn Pro Phe Ala Arg Ser Asn Val Ala Phe Ala
                245                 250                 255

Asn Gly His Ala Trp Thr Lys Ser Ile Ser His Gly Glu Met Ile Arg
            260                 265                 270

Thr Gln Thr Asp Gln Thr Met Thr Ile Ser Pro Cys Lys Leu Arg Tyr
        275                 280                 285

Leu Tyr Gln Gly Val Asp Pro Ala Ala Lys Gly Asp Tyr Asn Ala Leu
    290                 295                 300

Pro Trp Lys Leu Gly Leu Leu Thr Gln Thr Asn Ser Ala Cys
305                 310                 315

<210> SEQ ID NO 43

```
<211> LENGTH: 1035
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(1032)
<220> FEATURE:
<221> NAME/KEY: sig_peptide
<222> LOCATION: (1)..(54)
<220> FEATURE:
<221> NAME/KEY: mat_peptide
<222> LOCATION: (55)..(1032)

<400> SEQUENCE: 43 atg cgg tcg atc ctc ttc cta gtc act tcc acc ctc gct gct gct gct      48
Met Arg Ser Ile Leu Phe Leu Val Thr Ser Thr Leu Ala Ala Ala Ala
        -15                 -10                 -5 gct gct gct tcc tta ccc aga agc ttc aaa tgg agc tcc agc gcc gcc      96
Ala Ala Ala Ser Leu Pro Arg Ser Phe Lys Trp Ser Ser Ser Ala Ala
    -1  1               5                   10 ctc gtg ggc cct aag aac gat ggc cgc cat atc gag ggc atc aag gat     144
Leu Val Gly Pro Lys Asn Asp Gly Arg His Ile Glu Gly Ile Lys Asp
 15              20                  25                  30 ccc tcc atc gtc gag gtg gac ggc acc tac cac gtc ttc gct agc acc     192
Pro Ser Ile Val Glu Val Asp Gly Thr Tyr His Val Phe Ala Ser Thr
                 35                  40                  45 gcc cag gcc tcc ggc tac aac ctg gtg tat ctt agc ttc acc gac ttc     240
Ala Gln Ala Ser Gly Tyr Asn Leu Val Tyr Leu Ser Phe Thr Asp Phe
             50                  55                  60 aat aag gct cac ctg gct cca ttc cac tac ctg gac cag acc cgg atc     288
Asn Lys Ala His Leu Ala Pro Phe His Tyr Leu Asp Gln Thr Arg Ile
         65                  70                  75 ggc aaa ggc tac cgc gcc gcg cca cag gtc ttc tac ttc aag ccc cac     336
Gly Lys Gly Tyr Arg Ala Ala Pro Gln Val Phe Tyr Phe Lys Pro His
     80                  85                  90 aaa ctg tgg tat ctg gtc tac cag aac ggc aac gca gcc tat tcc acc     384
Lys Leu Trp Tyr Leu Val Tyr Gln Asn Gly Asn Ala Ala Tyr Ser Thr
 95                 100                 105                 110 aac ccc gac atc agc aac ccg gcc ggc tgg acc tct ccg cag aac ttc     432
Asn Pro Asp Ile Ser Asn Pro Ala Gly Trp Thr Ser Pro Gln Asn Phe
                115                 120                 125 ttc agc ggc aca ccc agc atc atc acc cac aac atg ggc cgc ggc gcc     480
Phe Ser Gly Thr Pro Ser Ile Ile Thr His Asn Met Gly Arg Gly Ala
            130                 135                 140 tgg gtg gac atg tgg acc atc tgc gac aca cgc aac tgc tac ctc ttc     528
Trp Val Asp Met Trp Thr Ile Cys Asp Thr Arg Asn Cys Tyr Leu Phe
        145                 150                 155 tcc tca gac gac aac gga cac ctc tac cgc tcc cag aca tcc ctg gcc     576
Ser Ser Asp Asp Asn Gly His Leu Tyr Arg Ser Gln Thr Ser Leu Ala
    160                 165                 170 gac ttc ccc cac ggc atg ggc aac act gct att gcc ctc gca gac cgc     624
Asp Phe Pro His Gly Met Gly Asn Thr Ala Ile Ala Leu Ala Asp Arg
175                 180                 185                 190 aac aag ttc agc ctc ttc gaa gca tcc aat gtc tac cac acc ggg gat     672
Asn Lys Phe Ser Leu Phe Glu Ala Ser Asn Val Tyr His Thr Gly Asp
                195                 200                 205 gga agc tat ctg ctc atc gtc gag gcg atc ggc aac gac ggc cag cgg     720
Gly Ser Tyr Leu Leu Ile Val Glu Ala Ile Gly Asn Asp Gly Gln Arg
            210                 215                 220 tac ttc cgc tcc tgg act gcg agc agc ttg gcc ggc cag tgg aag ccc     768
Tyr Phe Arg Ser Trp Thr Ala Ser Ser Leu Ala Gly Gln Trp Lys Pro
```

-continued

```
                  225                 230                 235
ctg gcg gat acc gag tcg aac ccc ttc gcg cgc tcg aac aat gtt gcc    816
Leu Ala Asp Thr Glu Ser Asn Pro Phe Ala Arg Ser Asn Asn Val Ala
    240                 245                 250 ttc gct aat ggc cat gcc tgg acg aag agc atc agc cac ggc gag atg    864
Phe Ala Asn Gly His Ala Trp Thr Lys Ser Ile Ser His Gly Glu Met
255                 260                 265                 270 atc cga acc cag acg gat cag act atg act atc agc ccg tgc aag ctg    912
Ile Arg Thr Gln Thr Asp Gln Thr Met Thr Ile Ser Pro Cys Lys Leu
            275                 280                 285 cgg tat ctg tac cag ggg gtg gat cct gcg gct aag ggg gat tat aat    960
Arg Tyr Leu Tyr Gln Gly Val Asp Pro Ala Ala Lys Gly Asp Tyr Asn
        290                 295                 300 gcg ctt ccg tgg aag ctg ggc ttg ctg acc cag acg aac tcg gct tgt   1008
Ala Leu Pro Trp Lys Leu Gly Leu Leu Thr Gln Thr Asn Ser Ala Cys
    305                 310                 315 cga cat cac cat cac cat cac cca tga                               1035
Arg His His His His His His Pro
    320                 325
```

<210> SEQ ID NO 44
<211> LENGTH: 344
<212> TYPE: PRT
<213> ORGANISM: Artificial Sequence
<220> FEATURE:
<223> OTHER INFORMATION: Synthetic Construct

<400> SEQUENCE: 44

```
Met Arg Ser Ile Leu Phe Leu Val Thr Ser Thr Leu Ala Ala Ala
            -15                 -10                 -5

Ala Ala Ala Ser Leu Pro Arg Ser Phe Lys Trp Ser Ser Ser Ala Ala
 -1  1               5                  10

Leu Val Gly Pro Lys Asn Asp Gly Arg His Ile Glu Gly Ile Lys Asp
15              20                  25                  30

Pro Ser Ile Val Glu Val Asp Gly Thr Tyr His Val Phe Ala Ser Thr
                35                  40                  45

Ala Gln Ala Ser Gly Tyr Asn Leu Val Tyr Leu Ser Phe Thr Asp Phe
            50                  55                  60

Asn Lys Ala His Leu Ala Pro Phe His Tyr Leu Asp Gln Thr Arg Ile
        65                  70                  75

Gly Lys Gly Tyr Arg Ala Ala Pro Gln Val Phe Tyr Phe Lys Pro His
    80                  85                  90

Lys Leu Trp Tyr Leu Val Tyr Gln Asn Gly Asn Ala Ala Tyr Ser Thr
95                  100                 105                 110

Asn Pro Asp Ile Ser Asn Pro Ala Gly Trp Thr Ser Pro Gln Asn Phe
                115                 120                 125

Phe Ser Gly Thr Pro Ser Ile Ile Thr His Asn Met Gly Arg Gly Ala
            130                 135                 140

Trp Val Asp Met Trp Thr Ile Cys Asp Thr Arg Asn Cys Tyr Leu Phe
        145                 150                 155

Ser Ser Asp Asp Asn Gly His Leu Tyr Arg Ser Gln Thr Ser Leu Ala
    160                 165                 170

Asp Phe Pro His Gly Met Gly Asn Thr Ala Ile Ala Leu Ala Asp Arg
175                 180                 185                 190

Asn Lys Phe Ser Leu Phe Glu Ala Ser Asn Val Tyr His Thr Gly Asp
                195                 200                 205

Gly Ser Tyr Leu Leu Ile Val Glu Ala Ile Gly Asn Asp Gly Gln Arg
```

```
            210                 215                 220
Tyr Phe Arg Ser Trp Thr Ala Ser Ser Leu Ala Gly Gln Trp Lys Pro
            225                 230                 235

Leu Ala Asp Thr Glu Ser Asn Pro Phe Ala Arg Ser Asn Asn Val Ala
            240                 245                 250

Phe Ala Asn Gly His Ala Trp Thr Lys Ser Ile Ser His Gly Glu Met
255                 260                 265                 270

Ile Arg Thr Gln Thr Asp Gln Thr Met Thr Ile Ser Pro Cys Lys Leu
            275                 280                 285

Arg Tyr Leu Tyr Gln Gly Val Asp Pro Ala Ala Lys Gly Asp Tyr Asn
            290                 295                 300

Ala Leu Pro Trp Lys Leu Gly Leu Leu Thr Gln Thr Asn Ser Ala Cys
            305                 310                 315

Arg His His His His His Pro
            320                 325

<210> SEQ ID NO 45
<211> LENGTH: 326
<212> TYPE: PRT
<213> ORGANISM: Artificial Sequence
<220> FEATURE:
<223> OTHER INFORMATION: Mature sequence with His-tag

<400> SEQUENCE: 45

Ala Ser Leu Pro Arg Ser Phe Lys Trp Ser Ser Ala Ala Leu Val
1               5                   10                  15

Gly Pro Lys Asn Asp Gly Arg His Ile Glu Gly Ile Lys Asp Pro Ser
            20                  25                  30

Ile Val Glu Val Asp Gly Thr Tyr His Val Phe Ala Ser Thr Ala Gln
            35                  40                  45

Ala Ser Gly Tyr Asn Leu Val Tyr Leu Ser Phe Thr Asp Phe Asn Lys
            50                  55                  60

Ala His Leu Ala Pro Phe His Tyr Leu Asp Gln Thr Arg Ile Gly Lys
65                  70                  75                  80

Gly Tyr Arg Ala Ala Pro Gln Val Phe Tyr Lys Pro His Lys Leu
            85                  90                  95

Trp Tyr Leu Val Tyr Gln Asn Gly Asn Ala Ala Tyr Ser Thr Asn Pro
            100                 105                 110

Asp Ile Ser Asn Pro Ala Gly Trp Thr Ser Pro Gln Asn Phe Phe Ser
            115                 120                 125

Gly Thr Pro Ser Ile Ile Thr His Asn Met Gly Arg Gly Ala Trp Val
            130                 135                 140

Asp Met Trp Thr Ile Cys Asp Thr Arg Asn Cys Tyr Leu Phe Ser Ser
145                 150                 155                 160

Asp Asp Asn Gly His Leu Tyr Arg Ser Gln Thr Ser Leu Ala Asp Phe
            165                 170                 175

Pro His Gly Met Gly Asn Thr Ala Ile Ala Leu Ala Asp Arg Asn Lys
            180                 185                 190

Phe Ser Leu Phe Glu Ala Ser Asn Val Tyr His Thr Gly Asp Gly Ser
            195                 200                 205

Tyr Leu Leu Ile Val Glu Ala Ile Gly Asn Asp Gly Gln Arg Tyr Phe
            210                 215                 220

Arg Ser Trp Thr Ala Ser Ser Leu Ala Gly Gln Trp Lys Pro Leu Ala
225                 230                 235                 240

Asp Thr Glu Ser Asn Pro Phe Ala Arg Ser Asn Asn Val Ala Phe Ala
```

```
                    245                 250                 255
Asn Gly His Ala Trp Thr Lys Ser Ile Ser His Gly Glu Met Ile Arg
            260                 265                 270

Thr Gln Thr Asp Gln Thr Met Thr Ile Ser Pro Cys Lys Leu Arg Tyr
            275                 280                 285

Leu Tyr Gln Gly Val Asp Pro Ala Ala Lys Gly Asp Tyr Asn Ala Leu
        290                 295                 300

Pro Trp Lys Leu Gly Leu Leu Thr Gln Thr Asn Ser Ala Cys Arg His
305                 310                 315                 320

His His His His His Pro
                325

<210> SEQ ID NO 46
<211> LENGTH: 984
<212> TYPE: DNA
<213> ORGANISM: Aspergillus wentii
<220> FEATURE:
<221> NAME/KEY: CDS
<222> LOCATION: (1)..(981)
<220> FEATURE:
<221> NAME/KEY: sig_peptide
<222> LOCATION: (1)..(75)
<220> FEATURE:
<221> NAME/KEY: mat_peptide
<222> LOCATION: (76)..(981)

<400> SEQUENCE: 46 atg aaa ttc ttc aag gcg caa gct ggt gtg cca tct ggc ata ttc ttg       48
Met Lys Phe Phe Lys Ala Gln Ala Gly Val Pro Ser Gly Ile Phe Leu
-25             -20                 -15                 -10 ctc tct ctg gca cca gtt gtc att gcc gac tgc gct ctt ccg tca acc       96
Leu Ser Leu Ala Pro Val Val Ile Ala Asp Cys Ala Leu Pro Ser Thr
            -5                  -1  1               5 tat agc tgg aca tca act ggc tct ctg gca gat cca aag tct gga tgg      144
Tyr Ser Trp Thr Ser Thr Gly Ser Leu Ala Asp Pro Lys Ser Gly Trp
        10                  15                  20 acg gcg ctc aag gat ttt acc aat gtg gtc tcc aac aac aaa cat atc      192
Thr Ala Leu Lys Asp Phe Thr Asn Val Val Ser Asn Asn Lys His Ile
 25                  30                  35 gtc tat gca tca acc act gac gcc agt gga aac tac ggc tcg atg aat      240
Val Tyr Ala Ser Thr Thr Asp Ala Ser Gly Asn Tyr Gly Ser Met Asn
 40                  45                  50                  55 ttt gcc tcc ttt tca gac tgg tct gac atg gca tct gca agt caa gcc      288
Phe Ala Ser Phe Ser Asp Trp Ser Asp Met Ala Ser Ala Ser Gln Ala
                 60                  65                  70 gcg acg agc ttt acg gca gtt gcg ccc act ttg ctc tac ttc cag cca      336
Ala Thr Ser Phe Thr Ala Val Ala Pro Thr Leu Leu Tyr Phe Gln Pro
             75                  80                  85 aag agc atc tgg gtg ctg gcc tac caa tgg ggc tcg agt acg ttt acc      384
Lys Ser Ile Trp Val Leu Ala Tyr Gln Trp Gly Ser Ser Thr Phe Thr
         90                  95                 100 tac cga acg tca agc gat cct acc aat gcc aat gga tgg tca tcc gag      432
Tyr Arg Thr Ser Ser Asp Pro Thr Asn Ala Asn Gly Trp Ser Ser Glu
    105                 110                 115 aaa gct ctt ttc tct gga aag atc acc ggc tcg gac act ggc gcc att      480
Lys Ala Leu Phe Ser Gly Lys Ile Thr Gly Ser Asp Thr Gly Ala Ile
120                 125                 130                 135 gat cag acc ctt atc ggt gac gcc acg aat atg tat ctt ttc ttt gcg      528
Asp Gln Thr Leu Ile Gly Asp Ala Thr Asn Met Tyr Leu Phe Phe Ala
                140                 145                 150 gga gat aac ggc aag atc tat cgg tcg agc atg cca atc gcc aac ttc      576
```

```
      Gly Asp Asn Gly Lys Ile Tyr Arg Ser Ser Met Pro Ile Ala Asn Phe
                      155                 160                 165 cct gga gac ttc gga acg gcg tca gaa gtc gtt ctt agt gac agc cgg      624
Pro Gly Asp Phe Gly Thr Ala Ser Glu Val Val Leu Ser Asp Ser Arg
            170                 175                 180 aac aat ctc ttc gaa gca gtc caa gtt tac acc gtc gaa ggg caa aac      672
Asn Asn Leu Phe Glu Ala Val Gln Val Tyr Thr Val Glu Gly Gln Asn
185                 190                 195 cag tat ctg atg atc gtc gag gca att gga aca aac ggc cgt tat ttc      720
Gln Tyr Leu Met Ile Val Glu Ala Ile Gly Thr Asn Gly Arg Tyr Phe
200                 205                 210                 215 cgt tca ttc acc gcc agc agt ctc gac ggt tcg tgg aca gag cag gca      768
Arg Ser Phe Thr Ala Ser Ser Leu Asp Gly Ser Trp Thr Glu Gln Ala
                220                 225                 230 gcc agc gag aac aat ccc ttc gct gga aag gcc aac agc ggt gcg acc      816
Ala Ser Glu Asn Asn Pro Phe Ala Gly Lys Ala Asn Ser Gly Ala Thr
            235                 240                 245 tgg acc aac gac atc agt cac ggc gat ttg gtt cgc aat aac cct gac      864
Trp Thr Asn Asp Ile Ser His Gly Asp Leu Val Arg Asn Asn Pro Asp
        250                 255                 260 caa aca atg act atc gac cca tgc aac ctg caa ttc ctc tac cag ggg      912
Gln Thr Met Thr Ile Asp Pro Cys Asn Leu Gln Phe Leu Tyr Gln Gly
265                 270                 275 cgc gat gcg agt gcc ggt ggt aac tac aat acc ctg ccg tgg agg cca      960
Arg Asp Ala Ser Ala Gly Gly Asn Tyr Asn Thr Leu Pro Trp Arg Pro
280                 285                 290                 295 ggt gta ctg act ctg aag cac taa                                      984
Gly Val Leu Thr Leu Lys His
                300

<210> SEQ ID NO 47
<211> LENGTH: 327
<212> TYPE: PRT
<213> ORGANISM: Aspergillus wentii

<400> SEQUENCE: 47

Met Lys Phe Phe Lys Ala Gln Ala Gly Val Pro Ser Gly Ile Phe Leu
-25                 -20                 -15                 -10

Leu Ser Leu Ala Pro Val Val Ile Ala Asp Cys Ala Leu Pro Ser Thr
                -5                  -1  1                   5

Tyr Ser Trp Thr Ser Thr Gly Ser Leu Ala Asp Pro Lys Ser Gly Trp
            10                  15                  20

Thr Ala Leu Lys Asp Phe Thr Asn Val Val Ser Asn Asn Lys His Ile
        25                  30                  35

Val Tyr Ala Ser Thr Thr Asp Ala Ser Gly Asn Tyr Gly Ser Met Asn
40                  45                  50                  55

Phe Ala Ser Phe Ser Asp Trp Ser Asp Met Ala Ser Ala Ser Gln Ala
                60                  65                  70

Ala Thr Ser Phe Thr Ala Val Ala Pro Thr Leu Leu Tyr Phe Gln Pro
            75                  80                  85

Lys Ser Ile Trp Val Leu Ala Tyr Gln Trp Gly Ser Ser Thr Phe Thr
        90                  95                  100

Tyr Arg Thr Ser Ser Asp Pro Thr Asn Ala Asn Gly Trp Ser Ser Glu
105                 110                 115

Lys Ala Leu Phe Ser Gly Lys Ile Thr Gly Ser Asp Thr Gly Ala Ile
120                 125                 130                 135

Asp Gln Thr Leu Ile Gly Asp Ala Thr Asn Met Tyr Leu Phe Phe Ala
                140                 145                 150
```

```
Gly Asp Asn Gly Lys Ile Tyr Arg Ser Ser Met Pro Ile Ala Asn Phe
            155                 160                 165

Pro Gly Asp Phe Gly Thr Ala Ser Glu Val Val Leu Ser Asp Ser Arg
        170                 175                 180

Asn Asn Leu Phe Glu Ala Val Gln Val Tyr Thr Val Glu Gly Gln Asn
    185                 190                 195

Gln Tyr Leu Met Ile Val Glu Ala Ile Gly Thr Asn Gly Arg Tyr Phe
200                 205                 210                 215

Arg Ser Phe Thr Ala Ser Ser Leu Asp Gly Ser Trp Thr Glu Gln Ala
                220                 225                 230

Ala Ser Glu Asn Asn Pro Phe Ala Gly Lys Ala Asn Ser Gly Ala Thr
            235                 240                 245

Trp Thr Asn Asp Ile Ser His Gly Asp Leu Val Arg Asn Asn Pro Asp
        250                 255                 260

Gln Thr Met Thr Ile Asp Pro Cys Asn Leu Gln Phe Leu Tyr Gln Gly
    265                 270                 275

Arg Asp Ala Ser Ala Gly Gly Asn Tyr Asn Thr Leu Pro Trp Arg Pro
280                 285                 290                 295

Gly Val Leu Thr Leu Lys His
                300

<210> SEQ ID NO 48
<211> LENGTH: 302
<212> TYPE: PRT
<213> ORGANISM: Aspergillus wentii

<400> SEQUENCE: 48

Asp Cys Ala Leu Pro Ser Thr Tyr Ser Trp Thr Ser Thr Gly Ser Leu
1               5                   10                  15

Ala Asp Pro Lys Ser Gly Trp Thr Ala Leu Lys Asp Phe Thr Asn Val
            20                  25                  30

Val Ser Asn Asn Lys His Ile Val Tyr Ala Ser Thr Thr Asp Ala Ser
        35                  40                  45

Gly Asn Tyr Gly Ser Met Asn Phe Ala Ser Phe Ser Asp Trp Ser Asp
50                  55                  60

Met Ala Ser Ala Ser Gln Ala Ala Thr Ser Phe Thr Ala Val Ala Pro
65                  70                  75                  80

Thr Leu Leu Tyr Phe Gln Pro Lys Ser Ile Trp Val Leu Ala Tyr Gln
                85                  90                  95

Trp Gly Ser Ser Thr Phe Thr Tyr Arg Thr Ser Ser Asp Pro Thr Asn
            100                 105                 110

Ala Asn Gly Trp Ser Ser Glu Lys Ala Leu Phe Ser Gly Lys Ile Thr
        115                 120                 125

Gly Ser Asp Thr Gly Ala Ile Asp Gln Thr Leu Ile Gly Asp Ala Thr
130                 135                 140

Asn Met Tyr Leu Phe Phe Ala Gly Asp Asn Gly Lys Ile Tyr Arg Ser
145                 150                 155                 160

Ser Met Pro Ile Ala Asn Phe Pro Gly Asp Phe Gly Thr Ala Ser Glu
                165                 170                 175

Val Val Leu Ser Asp Ser Arg Asn Asn Leu Phe Glu Ala Val Gln Val
            180                 185                 190

Tyr Thr Val Glu Gly Gln Asn Gln Tyr Leu Met Ile Val Glu Ala Ile
        195                 200                 205

Gly Thr Asn Gly Arg Tyr Phe Arg Ser Phe Thr Ala Ser Ser Leu Asp
```

```
                  210                 215                 220
Gly Ser Trp Thr Glu Gln Ala Ala Ser Glu Asn Asn Pro Phe Ala Gly
225                 230                 235                 240

Lys Ala Asn Ser Gly Ala Thr Trp Thr Asn Asp Ile Ser His Gly Asp
                245                 250                 255

Leu Val Arg Asn Asn Pro Asp Gln Thr Met Thr Ile Asp Pro Cys Asn
                260                 265                 270

Leu Gln Phe Leu Tyr Gln Gly Arg Asp Ala Ser Ala Gly Gly Asn Tyr
            275                 280                 285

Asn Thr Leu Pro Trp Arg Pro Gly Val Leu Thr Leu Lys His
        290                 295                 300

<210> SEQ ID NO 49
<211> LENGTH: 1011
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(1008)
<220> FEATURE:
<221> NAME/KEY: sig_peptide
<222> LOCATION: (1)..(75)
<220> FEATURE:
<221> NAME/KEY: mat_peptide
<222> LOCATION: (76)..(1008)

<400> SEQUENCE: 49 atg aaa ttc ttc aag gcg caa gct ggt gtg cca tct ggc ata ttc ttg      48
Met Lys Phe Phe Lys Ala Gln Ala Gly Val Pro Ser Gly Ile Phe Leu
-25                 -20                 -15                 -10 ctc tct ctg gca cca gtt gtc att gcc gac tgc gct ctt ccg tca acc      96
Leu Ser Leu Ala Pro Val Val Ile Ala Asp Cys Ala Leu Pro Ser Thr
                -5                  -1  1               5 tat agc tgg aca tca act ggc tct ctg gca gat cca aag tct gga tgg     144
Tyr Ser Trp Thr Ser Thr Gly Ser Leu Ala Asp Pro Lys Ser Gly Trp
            10                  15                  20 acg gcg ctc aag gat ttt acc aat gtg gtc tcc aac aac aaa cat atc     192
Thr Ala Leu Lys Asp Phe Thr Asn Val Val Ser Asn Asn Lys His Ile
        25                  30                  35 gtc tat gca tca acc act gac gcc agt gga aac tac ggc tcg atg aat     240
Val Tyr Ala Ser Thr Thr Asp Ala Ser Gly Asn Tyr Gly Ser Met Asn
40                  45                  50                  55 ttt gcc tcc ttt tca gac tgg tct gac atg gca tct gca agt caa gcc     288
Phe Ala Ser Phe Ser Asp Trp Ser Asp Met Ala Ser Ala Ser Gln Ala
                60                  65                  70 gcg acg agc ttt acg gca gtt gcg ccc act ttg ctc tac ttc cag cca     336
Ala Thr Ser Phe Thr Ala Val Ala Pro Thr Leu Leu Tyr Phe Gln Pro
            75                  80                  85 aag agc atc tgg gtg ctg gcc tac caa tgg ggc tcg agt acg ttt acc     384
Lys Ser Ile Trp Val Leu Ala Tyr Gln Trp Gly Ser Ser Thr Phe Thr
        90                  95                  100 tac cga acg tca agc gat cct acc aat gcc aat gga tgg tca tcc gag     432
Tyr Arg Thr Ser Ser Asp Pro Thr Asn Ala Asn Gly Trp Ser Ser Glu
105                 110                 115 aaa gct ctt ttc tct gga aag atc acc ggc tcg gac act ggc gcc att     480
Lys Ala Leu Phe Ser Gly Lys Ile Thr Gly Ser Asp Thr Gly Ala Ile
120                 125                 130                 135 gat cag acc ctt atc ggt gac gcc acg aat atg tat ctt ttc ttt gcg     528
Asp Gln Thr Leu Ile Gly Asp Ala Thr Asn Met Tyr Leu Phe Phe Ala
                140                 145                 150
```

```
gga gat aac ggc aag atc tat cgg tcg agc atg cca atc gcc aac ttc      576
Gly Asp Asn Gly Lys Ile Tyr Arg Ser Ser Met Pro Ile Ala Asn Phe
            155                 160                 165 cct gga gac ttc gga acg gcg tca gaa gtc gtt ctt agt gac agc cgg      624
Pro Gly Asp Phe Gly Thr Ala Ser Glu Val Val Leu Ser Asp Ser Arg
        170                 175                 180 aac aat ctc ttc gaa gca gtc caa gtt tac acc gtc gaa ggg caa aac      672
Asn Asn Leu Phe Glu Ala Val Gln Val Tyr Thr Val Glu Gly Gln Asn
    185                 190                 195 cag tat ctg atg atc gtc gag gca att gga aca aac ggc cgt tat ttc      720
Gln Tyr Leu Met Ile Val Glu Ala Ile Gly Thr Asn Gly Arg Tyr Phe
200                 205                 210                 215 cgt tca ttc acc gcc agc agt ctc gac ggt tcg tgg aca gag cag gca      768
Arg Ser Phe Thr Ala Ser Ser Leu Asp Gly Ser Trp Thr Glu Gln Ala
            220                 225                 230 gcc agc gag aac aat ccc ttc gct gga aag gcc aac agc ggt gcg acc      816
Ala Ser Glu Asn Asn Pro Phe Ala Gly Lys Ala Asn Ser Gly Ala Thr
        235                 240                 245 tgg acc aac gac atc agt cac ggc gat ttg gtt cgc aat aac cct gac      864
Trp Thr Asn Asp Ile Ser His Gly Asp Leu Val Arg Asn Asn Pro Asp
    250                 255                 260 caa aca atg act atc gac cca tgc aac ctg caa ttc ctc tac cag ggg      912
Gln Thr Met Thr Ile Asp Pro Cys Asn Leu Gln Phe Leu Tyr Gln Gly
265                 270                 275 cgc gat gcg agt gcc ggt ggt aac tac aat acc ctg ccg tgg agg cca      960
Arg Asp Ala Ser Ala Gly Gly Asn Tyr Asn Thr Leu Pro Trp Arg Pro
            285                 290                 295
280 ggt gta ctg act ctg aag cac acg cgt gcg cat cac cat cac cat cac     1008
Gly Val Leu Thr Leu Lys His Thr Arg Ala His His His His His His
        300                 305                 310 taa                                                                 1011
```

<210> SEQ ID NO 50
<211> LENGTH: 336
<212> TYPE: PRT
<213> ORGANISM: Artificial Sequence
<220> FEATURE:
<223> OTHER INFORMATION: Synthetic Construct

<400> SEQUENCE: 50

```
Met Lys Phe Phe Lys Ala Gln Ala Gly Val Pro Ser Gly Ile Phe Leu
-25                 -20                 -15                 -10

Leu Ser Leu Ala Pro Val Val Ile Ala Asp Cys Ala Leu Pro Ser Thr
            -5                  -1  1               5

Tyr Ser Trp Thr Ser Thr Gly Ser Leu Ala Asp Pro Lys Ser Gly Trp
        10                  15                  20

Thr Ala Leu Lys Asp Phe Thr Asn Val Val Ser Asn Asn Lys His Ile
25                  30                  35

Val Tyr Ala Ser Thr Thr Asp Ala Ser Gly Asn Tyr Gly Ser Met Asn
40                  45                  50                  55

Phe Ala Ser Phe Ser Asp Trp Ser Asp Met Ala Ser Ala Ser Gln Ala
                60                  65                  70

Ala Thr Ser Phe Thr Ala Val Ala Pro Thr Leu Leu Tyr Phe Gln Pro
            75                  80                  85

Lys Ser Ile Trp Val Leu Ala Tyr Gln Trp Gly Ser Ser Thr Phe Thr
        90                  95                  100

Tyr Arg Thr Ser Ser Asp Pro Thr Asn Ala Asn Gly Trp Ser Ser Glu
105                 110                 115
```

Lys Ala Leu Phe Ser Gly Lys Ile Thr Gly Ser Asp Thr Gly Ala Ile
120                 125                 130                 135

Asp Gln Thr Leu Ile Gly Asp Ala Thr Asn Met Tyr Leu Phe Phe Ala
            140                 145                 150

Gly Asp Asn Gly Lys Ile Tyr Arg Ser Ser Met Pro Ile Ala Asn Phe
            155                 160                 165

Pro Gly Asp Phe Gly Thr Ala Ser Glu Val Val Leu Ser Asp Ser Arg
        170                 175                 180

Asn Asn Leu Phe Glu Ala Val Gln Val Tyr Thr Val Glu Gly Gln Asn
    185                 190                 195

Gln Tyr Leu Met Ile Val Glu Ala Ile Gly Thr Asn Gly Arg Tyr Phe
200                 205                 210                 215

Arg Ser Phe Thr Ala Ser Ser Leu Asp Gly Ser Trp Thr Glu Gln Ala
                220                 225                 230

Ala Ser Glu Asn Asn Pro Phe Ala Gly Lys Ala Asn Ser Gly Ala Thr
            235                 240                 245

Trp Thr Asn Asp Ile Ser His Gly Asp Leu Val Arg Asn Asn Pro Asp
        250                 255                 260

Gln Thr Met Thr Ile Asp Pro Cys Asn Leu Gln Phe Leu Tyr Gln Gly
    265                 270                 275

Arg Asp Ala Ser Ala Gly Gly Asn Tyr Asn Thr Leu Pro Trp Arg Pro
280                 285                 290                 295

Gly Val Leu Thr Leu Lys His Thr Arg Ala His His His His His His
                300                 305                 310

<210> SEQ ID NO 51
<211> LENGTH: 311
<212> TYPE: PRT
<213> ORGANISM: Artificial Sequence
<220> FEATURE:
<223> OTHER INFORMATION: Mature sequence with His-tag

<400> SEQUENCE: 51

Asp Cys Ala Leu Pro Ser Thr Tyr Ser Trp Thr Ser Thr Gly Ser Leu
1               5                   10                  15

Ala Asp Pro Lys Ser Gly Trp Thr Ala Leu Lys Asp Phe Thr Asn Val
            20                  25                  30

Val Ser Asn Asn Lys His Ile Val Tyr Ala Ser Thr Thr Asp Ala Ser
        35                  40                  45

Gly Asn Tyr Gly Ser Met Asn Phe Ala Ser Phe Ser Asp Trp Ser Asp
    50                  55                  60

Met Ala Ser Ala Ser Gln Ala Ala Thr Ser Phe Thr Ala Val Ala Pro
65                  70                  75                  80

Thr Leu Leu Tyr Phe Gln Pro Lys Ser Ile Trp Val Leu Ala Tyr Gln
                85                  90                  95

Trp Gly Ser Ser Thr Phe Thr Tyr Arg Thr Ser Ser Asp Pro Thr Asn
            100                 105                 110

Ala Asn Gly Trp Ser Ser Glu Lys Ala Leu Phe Ser Gly Lys Ile Thr
        115                 120                 125

Gly Ser Asp Thr Gly Ala Ile Asp Gln Thr Leu Ile Gly Asp Ala Thr
    130                 135                 140

Asn Met Tyr Leu Phe Phe Ala Gly Asp Asn Gly Lys Ile Tyr Arg Ser
145                 150                 155                 160

Ser Met Pro Ile Ala Asn Phe Pro Gly Asp Phe Gly Thr Ala Ser Glu
                165                 170                 175

```
Val Val Leu Ser Asp Ser Arg Asn Asn Leu Phe Glu Ala Val Gln Val
            180                 185                 190

Tyr Thr Val Glu Gly Gln Asn Gln Tyr Leu Met Ile Val Glu Ala Ile
            195                 200                 205

Gly Thr Asn Gly Arg Tyr Phe Arg Ser Phe Thr Ala Ser Ser Leu Asp
210                 215                 220

Gly Ser Trp Thr Glu Gln Ala Ala Ser Glu Asn Asn Pro Phe Ala Gly
225                 230                 235                 240

Lys Ala Asn Ser Gly Ala Thr Trp Thr Asn Asp Ile Ser His Gly Asp
            245                 250                 255

Leu Val Arg Asn Asn Pro Asp Gln Thr Met Thr Ile Asp Pro Cys Asn
            260                 265                 270

Leu Gln Phe Leu Tyr Gln Gly Arg Asp Ala Ser Ala Gly Gly Asn Tyr
            275                 280                 285

Asn Thr Leu Pro Trp Arg Pro Gly Val Leu Thr Leu Lys His Thr Arg
            290                 295                 300

Ala His His His His His His
305                 310

<210> SEQ ID NO 52
<211> LENGTH: 1411
<212> TYPE: DNA
<213> ORGANISM: Acrophialophora fusispora
<220> FEATURE:
<221> NAME/KEY: CDS
<222> LOCATION: (1)..(318)
<220> FEATURE:
<221> NAME/KEY: sig_peptide
<222> LOCATION: (1)..(72)
<220> FEATURE:
<221> NAME/KEY: mat_peptide
<222> LOCATION: (73)..(1408)
<220> FEATURE:
<221> NAME/KEY: CDS
<222> LOCATION: (470)..(1298)
<220> FEATURE:
<221> NAME/KEY: CDS
<222> LOCATION: (1392)..(1408)

<400> SEQUENCE: 52 atg aag ttc tcc aaa tcg gat ctc ggc gct gcc gtc gcc ttc ctg gct    48
Met Lys Phe Ser Lys Ser Asp Leu Gly Ala Ala Val Ala Phe Leu Ala
            -20                 -15                 -10 tcg gcc gtc cct ctc gct gaa gcc gcg tgc tcc ttg ccg tcc agc tac    96
Ser Ala Val Pro Leu Ala Glu Ala Ala Cys Ser Leu Pro Ser Ser Tyr
        -5                  -1  1                   5 cgc tgg gca agc acc ggg cca ttg gcc aac ccc aag tca ggc tgg tac   144
Arg Trp Ala Ser Thr Gly Pro Leu Ala Asn Pro Lys Ser Gly Trp Tyr
        10                  15                  20 agt ctc aag gac ttt act cat gtc cct tac aac ggc aag cac ttg gtc   192
Ser Leu Lys Asp Phe Thr His Val Pro Tyr Asn Gly Lys His Leu Val
25                  30                  35                  40 tat gcg tca aac tat gcc gga tcc gcc tac ggc tcc atg aac ttc ggc   240
Tyr Ala Ser Asn Tyr Ala Gly Ser Ala Tyr Gly Ser Met Asn Phe Gly
                45                  50                  55 ctc ttc tcc aac tgg tcc gac atg gcc tcg gcg agt caa aac tct atg   288
Leu Phe Ser Asn Trp Ser Asp Met Ala Ser Ala Ser Gln Asn Ser Met
            60                  65                  70 aat gcg gcc gcc gtc gca ccc acc ctg ttt gtaagtcaga cctttgccgc     338
Asn Ala Ala Ala Val Ala Pro Thr Leu Phe
            75                  80
```

```
tttgctctat ccttaaagcc ttaaggggtt gtcattcctc tggaccctgt ttccgttaaa    398
ctgctcggac aaacaacccc cttcccccca actctccttc cccgaaaaac acatgactga    458
cagctgggca g tac ttt gca cct aag aat atc tgg gta ctt gca tcg cag    508
            Tyr Phe Ala Pro Lys Asn Ile Trp Val Leu Ala Ser Gln
                 85              90                  95 tgg gga gct act ccc ttc ttc tac cgc acg tcg acc gac cct acg aat    556
Trp Gly Ala Thr Pro Phe Phe Tyr Arg Thr Ser Thr Asp Pro Thr Asn
            100                 105                 110 ccc aac agc tgg tcg tcg aac cag ccg ctg ttc acc ggc tcc atc tcg    604
Pro Asn Ser Trp Ser Ser Asn Gln Pro Leu Phe Thr Gly Ser Ile Ser
            115                 120                 125 gac tca tcc act ggg ccc atc gac cag acg ctc att ggt gat gcc aac    652
Asp Ser Ser Thr Gly Pro Ile Asp Gln Thr Leu Ile Gly Asp Ala Asn
            130                 135                 140 tac atg tat ctc ttc ttt gcg ggc gac aac ggc aag att tac cgc tct    700
Tyr Met Tyr Leu Phe Phe Ala Gly Asp Asn Gly Lys Ile Tyr Arg Ser
145                 150                 155 cgg atg ccc atc gga aac ttc ccg ggc agc ttt ggc tca tcc tac gaa    748
Arg Met Pro Ile Gly Asn Phe Pro Gly Ser Phe Gly Ser Ser Tyr Glu
160                 165                 170                 175 gtc atc ctg agc ggc tcg agg aac gat ttc ttc gag gcg gtc cag gtc    796
Val Ile Leu Ser Gly Ser Arg Asn Asp Phe Phe Glu Ala Val Gln Val
                180                 185                 190 tac acc gtg aca ggc caa agc tcg ccg ctg tac ctc atg atc atc gag    844
Tyr Thr Val Thr Gly Gln Ser Ser Pro Leu Tyr Leu Met Ile Ile Glu
                195                 200                 205 agc atc ggt agc aga ggc cgg tac ttc cgc tcc tac acg gcc acc aac    892
Ser Ile Gly Ser Arg Gly Arg Tyr Phe Arg Ser Tyr Thr Ala Thr Asn
            210                 215                 220 ctc ggg ggc tcg tgg tct ccg cag gcc acg agc gag agc tcg ccg ttt    940
Leu Gly Gly Ser Trp Ser Pro Gln Ala Thr Ser Glu Ser Ser Pro Phe
            225                 230                 235 gcc ggg gcc gcg aac agc ggc gcg acc tgg acc aac gac atc agc cac    988
Ala Gly Ala Ala Asn Ser Gly Ala Thr Trp Thr Asn Asp Ile Ser His
240                 245                 250                 255 ggc gac ctg atc cgt agc ggt ccc gac cag act atg cct atc gac ccg   1036
Gly Asp Leu Ile Arg Ser Gly Pro Asp Gln Thr Met Pro Ile Asp Pro
                260                 265                 270 tgc aac ctg cag ctg ctg tac cag ggc ctg gtc ggc acc aac tcc gac   1084
Cys Asn Leu Gln Leu Leu Tyr Gln Gly Leu Val Gly Thr Asn Ser Asp
                275                 280                 285 tac aac aag ctg ccc tac cgg ccc ggc ctc ctg acg ctg cag aac cct   1132
Tyr Asn Lys Leu Pro Tyr Arg Pro Gly Leu Leu Thr Leu Gln Asn Pro
            290                 295                 300 gtg ggc ggc ggt ggc act ccg acc acg acg agc aag ccg ccc gcg       1180
Val Gly Gly Gly Gly Thr Pro Thr Thr Thr Ser Lys Pro Pro Ala
305                 310                 315 acg acg acg tcc acc ggc ggt ggt ggc acc gct cct cag tat gct cag   1228
Thr Thr Thr Ser Thr Gly Gly Gly Gly Thr Ala Pro Gln Tyr Ala Gln
320                 325                 330                 335 tgc ggc ggt cag gga tac acc ggc ccg acg gtg tgc gcc agc ccg tac   1276
Cys Gly Gly Gln Gly Tyr Thr Gly Pro Thr Val Cys Ala Ser Pro Tyr
            340                 345                 350 aag tgc acc tac tct aac cct t gtaagttttt ctgaaattct gttttctttt    1328
Lys Cys Thr Tyr Ser Asn Pro
            355 ctctttgtat ctcttccttt ttcatgatta cattggattg ttgctgacga tatctccaca   1388 tag gg  tat tcc cag tgc ctg taa                                    1411
```

```
            Trp Tyr Ser Gln Cys Leu
                360

<210> SEQ ID NO 53
<211> LENGTH: 388
<212> TYPE: PRT
<213> ORGANISM: Acrophialophora fusispora

<400> SEQUENCE: 53

Met Lys Phe Ser Lys Ser Asp Leu Gly Ala Ala Val Ala Phe Leu Ala
                -20                 -15                 -10

Ser Ala Val Pro Leu Ala Glu Ala Ala Cys Ser Leu Pro Ser Ser Tyr
             -5                  -1   1               5

Arg Trp Ala Ser Thr Gly Pro Leu Ala Asn Pro Lys Ser Gly Trp Tyr
             10                  15                  20

Ser Leu Lys Asp Phe Thr His Val Pro Tyr Asn Gly Lys His Leu Val
 25                  30                  35                  40

Tyr Ala Ser Asn Tyr Ala Gly Ser Ala Tyr Gly Ser Met Asn Phe Gly
                 45                  50                  55

Leu Phe Ser Asn Trp Ser Asp Met Ala Ser Ala Ser Gln Asn Ser Met
                 60                  65                  70

Asn Ala Ala Ala Val Ala Pro Thr Leu Phe Tyr Phe Ala Pro Lys Asn
                 75                  80                  85

Ile Trp Val Leu Ala Ser Gln Trp Gly Ala Thr Pro Phe Phe Tyr Arg
 90                  95                 100

Thr Ser Thr Asp Pro Thr Asn Pro Asn Ser Trp Ser Ser Asn Gln Pro
105                 110                 115                 120

Leu Phe Thr Gly Ser Ile Ser Asp Ser Ser Thr Gly Pro Ile Asp Gln
                125                 130                 135

Thr Leu Ile Gly Asp Ala Asn Tyr Met Tyr Leu Phe Phe Ala Gly Asp
                140                 145                 150

Asn Gly Lys Ile Tyr Arg Ser Arg Met Pro Ile Gly Asn Phe Pro Gly
                155                 160                 165

Ser Phe Gly Ser Ser Tyr Glu Val Ile Leu Ser Gly Ser Arg Asn Asp
170                 175                 180

Phe Phe Glu Ala Val Gln Val Tyr Thr Val Thr Gly Gln Ser Ser Pro
185                 190                 195                 200

Leu Tyr Leu Met Ile Ile Glu Ser Ile Gly Ser Arg Gly Arg Tyr Phe
                205                 210                 215

Arg Ser Tyr Thr Ala Thr Asn Leu Gly Gly Ser Trp Ser Pro Gln Ala
                220                 225                 230

Thr Ser Glu Ser Ser Pro Phe Ala Gly Ala Ala Asn Ser Gly Ala Thr
                235                 240                 245

Trp Thr Asn Asp Ile Ser His Gly Asp Leu Ile Arg Ser Gly Pro Asp
                250                 255                 260

Gln Thr Met Pro Ile Asp Pro Cys Asn Leu Gln Leu Leu Tyr Gln Gly
265                 270                 275                 280

Leu Val Gly Thr Asn Ser Asp Tyr Asn Lys Leu Pro Tyr Arg Pro Gly
                285                 290                 295

Leu Leu Thr Leu Gln Asn Pro Val Gly Gly Gly Thr Pro Thr Thr
                300                 305                 310

Thr Thr Ser Lys Pro Pro Ala Thr Thr Thr Ser Thr Gly Gly Gly Gly
                315                 320                 325

Thr Ala Pro Gln Tyr Ala Gln Cys Gly Gly Gln Gly Tyr Thr Gly Pro
                330                 335                 340
```

```
Thr Val Cys Ala Ser Pro Tyr Lys Cys Thr Tyr Ser Asn Pro Trp Tyr
345                 350                 355                 360

Ser Gln Cys Leu
```

<210> SEQ ID NO 54
<211> LENGTH: 364
<212> TYPE: PRT
<213> ORGANISM: Acrophialophora fusispora

<400> SEQUENCE: 54

```
Ala Cys Ser Leu Pro Ser Ser Tyr Arg Trp Ala Ser Thr Gly Pro Leu
1               5                   10                  15

Ala Asn Pro Lys Ser Gly Trp Tyr Ser Leu Lys Asp Phe Thr His Val
            20                  25                  30

Pro Tyr Asn Gly Lys His Leu Val Tyr Ala Ser Asn Tyr Ala Gly Ser
        35                  40                  45

Ala Tyr Gly Ser Met Asn Phe Gly Leu Phe Ser Asn Trp Ser Asp Met
50              55                  60

Ala Ser Ala Ser Gln Asn Ser Met Asn Ala Ala Val Ala Pro Thr
65                  70                  75                  80

Leu Phe Tyr Phe Ala Pro Lys Asn Ile Trp Val Leu Ala Ser Gln Trp
                85                  90                  95

Gly Ala Thr Pro Phe Phe Tyr Arg Thr Ser Thr Asp Pro Thr Asn Pro
            100                 105                 110

Asn Ser Trp Ser Ser Asn Gln Pro Leu Phe Thr Gly Ser Ile Ser Asp
        115                 120                 125

Ser Ser Thr Gly Pro Ile Asp Gln Thr Leu Ile Gly Ala Asn Tyr
130                 135                 140

Met Tyr Leu Phe Phe Ala Gly Asp Asn Gly Lys Ile Tyr Arg Ser Arg
145                 150                 155                 160

Met Pro Ile Gly Asn Phe Pro Gly Ser Phe Gly Ser Ser Tyr Glu Val
                165                 170                 175

Ile Leu Ser Gly Ser Arg Asn Asp Phe Phe Glu Ala Val Gln Val Tyr
            180                 185                 190

Thr Val Thr Gly Gln Ser Ser Pro Leu Tyr Leu Met Ile Ile Glu Ser
        195                 200                 205

Ile Gly Ser Arg Gly Arg Tyr Phe Arg Ser Tyr Thr Ala Thr Asn Leu
210                 215                 220

Gly Gly Ser Trp Ser Pro Gln Ala Thr Ser Glu Ser Ser Pro Phe Ala
225                 230                 235                 240

Gly Ala Ala Asn Ser Gly Ala Thr Trp Thr Asn Asp Ile Ser His Gly
                245                 250                 255

Asp Leu Ile Arg Ser Gly Pro Asp Gln Thr Met Pro Ile Asp Pro Cys
            260                 265                 270

Asn Leu Gln Leu Leu Tyr Gln Gly Leu Val Gly Thr Asn Ser Asp Tyr
        275                 280                 285

Asn Lys Leu Pro Tyr Arg Pro Gly Leu Leu Thr Leu Gln Asn Pro Val
290                 295                 300

Gly Gly Gly Gly Thr Pro Thr Thr Thr Ser Lys Pro Pro Ala Thr
305                 310                 315                 320

Thr Thr Ser Thr Gly Gly Gly Thr Ala Pro Gln Tyr Ala Gln Cys
                325                 330                 335

Gly Gly Gln Gly Tyr Thr Gly Pro Thr Val Cys Ala Ser Pro Tyr Lys
            340                 345                 350
```

```
Cys Thr Tyr Ser Asn Pro Trp Tyr Ser Gln Cys Leu
        355                 360
```

<210> SEQ ID NO 55
<211> LENGTH: 1438
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(318)
<220> FEATURE:
<221> NAME/KEY: sig_peptide
<222> LOCATION: (1)..(72)
<220> FEATURE:
<221> NAME/KEY: mat_peptide
<222> LOCATION: (73)..(1438)
<220> FEATURE:
<221> NAME/KEY: CDS
<222> LOCATION: (470)..(1298)
<220> FEATURE:
<221> NAME/KEY: CDS
<222> LOCATION: (1392)..(1435)

<400> SEQUENCE: 55

```
atg aag ttc tcc aaa tcg gat ctc ggc gct gcc gtc gcc ttc ctg gct      48
Met Lys Phe Ser Lys Ser Asp Leu Gly Ala Ala Val Ala Phe Leu Ala
            -20                 -15                 -10 tcg gcc gtc cct ctc gct gaa gcc gcg tgc tcc ttg ccg tcc agc tac      96
Ser Ala Val Pro Leu Ala Glu Ala Ala Cys Ser Leu Pro Ser Ser Tyr
         -5                  -1  1                   5 cgc tgg gca agc acc ggg cca ttg gcc aac ccc aag tca ggc tgg tac     144
Arg Trp Ala Ser Thr Gly Pro Leu Ala Asn Pro Lys Ser Gly Trp Tyr
     10                  15                  20 agt ctc aag gac ttt act cat gtc cct tac aac ggc aag cac ttg gtc     192
Ser Leu Lys Asp Phe Thr His Val Pro Tyr Asn Gly Lys His Leu Val
 25                  30                  35                  40 tat gcg tca aac tat gcc gga tcc gcc tac ggc tcc atg aac ttc ggc     240
Tyr Ala Ser Asn Tyr Ala Gly Ser Ala Tyr Gly Ser Met Asn Phe Gly
                 45                  50                  55 ctc ttc tcc aac tgg tcc gac atg gcc tcg gcg agt caa aac tct atg     288
Leu Phe Ser Asn Trp Ser Asp Met Ala Ser Ala Ser Gln Asn Ser Met
             60                  65                  70 aat gcg gcc gcc gtc gca ccc acc ctg ttt gtaagtcaga cctttgccgc       338
Asn Ala Ala Ala Val Ala Pro Thr Leu Phe
         75                  80 tttgctctat ccttaaagcc ttaaggggtt gtcattcctc tggaccctgt ttccgttaaa   398
ctgctcggac aaacaacccc cttccccca actctccttc cccgaaaaac acatgactga    458
cagctgggca g tac ttt gca cct aag aat atc tgg gta ctt gca tcg cag    508
             Tyr Phe Ala Pro Lys Asn Ile Trp Val Leu Ala Ser Gln
                  85                  90                  95 tgg gga gct act ccc ttc ttc tac cgc acg tcg acc gac cct acg aat     556
Trp Gly Ala Thr Pro Phe Phe Tyr Arg Thr Ser Thr Asp Pro Thr Asn
                 100                 105                 110 ccc aac agc tgg tcg tcg aac cag ccg ctg ttc acc ggc tcc atc tcg     604
Pro Asn Ser Trp Ser Ser Asn Gln Pro Leu Phe Thr Gly Ser Ile Ser
             115                 120                 125 gac tca tcc act ggg ccc atc gac cag acg ctc att ggt gat gcc aac     652
Asp Ser Ser Thr Gly Pro Ile Asp Gln Thr Leu Ile Gly Asp Ala Asn
         130                 135                 140 tac atg tat ctc ttc ttt gcg ggc gac aac ggc aag att tac cgc tct     700
Tyr Met Tyr Leu Phe Phe Ala Gly Asp Asn Gly Lys Ile Tyr Arg Ser
     145                 150                 155
```

```
cgg atg ccc atc gga aac ttc ccg ggc agc ttt ggc tca tcc tac gaa     748
Arg Met Pro Ile Gly Asn Phe Pro Gly Ser Phe Gly Ser Ser Tyr Glu
160             165                 170                 175 gtc atc ctg agc ggc tcg agg aac gat ttc ttc gag gcg gtc cag gtc     796
Val Ile Leu Ser Gly Ser Arg Asn Asp Phe Phe Glu Ala Val Gln Val
                180                 185                 190 tac acc gtg aca ggc caa agc tcg ccg ctg tac ctc atg atc atc gag     844
Tyr Thr Val Thr Gly Gln Ser Ser Pro Leu Tyr Leu Met Ile Ile Glu
            195                 200                 205 agc atc ggt agc aga ggc cgg tac ttc cgc tcc tac acg gcc acc aac     892
Ser Ile Gly Ser Arg Gly Arg Tyr Phe Arg Ser Tyr Thr Ala Thr Asn
        210                 215                 220 ctc ggg ggc tcg tgg tct ccg cag gcc acg agc gag agc tcg ccg ttt     940
Leu Gly Gly Ser Trp Ser Pro Gln Ala Thr Ser Glu Ser Ser Pro Phe
    225                 230                 235 gcc ggg gcc gcg aac agc ggc gcg acc tgg acc aac gac atc agc cac     988
Ala Gly Ala Ala Asn Ser Gly Ala Thr Trp Thr Asn Asp Ile Ser His
240                 245                 250                 255 ggc gac ctg atc cgt agc ggt ccc gac cag act atg cct atc gac ccg    1036
Gly Asp Leu Ile Arg Ser Gly Pro Asp Gln Thr Met Pro Ile Asp Pro
                260                 265                 270 tgc aac ctg cag ctg ctg tac cag ggc ctg gtc ggc acc aac tcc gac    1084
Cys Asn Leu Gln Leu Leu Tyr Gln Gly Leu Val Gly Thr Asn Ser Asp
            275                 280                 285 tac aac aag ctg ccc tac cgg ccc ggc ctc ctg acg ctg cag aac cct    1132
Tyr Asn Lys Leu Pro Tyr Arg Pro Gly Leu Leu Thr Leu Gln Asn Pro
        290                 295                 300 gtg ggc ggc ggt ggc act ccg acc acg acc acg agc aag ccg ccc gcg    1180
Val Gly Gly Gly Gly Thr Pro Thr Thr Thr Thr Ser Lys Pro Pro Ala
    305                 310                 315 acg acg acg tcc acc ggc ggt ggt ggc acc gct cct cag tat gct cag    1228
Thr Thr Thr Ser Thr Gly Gly Gly Gly Thr Ala Pro Gln Tyr Ala Gln
320                 325                 330                 335 tgc ggc ggt cag gga tac acc ggc ccg acg gtg tgc gcc agc ccg tac    1276
Cys Gly Gly Gln Gly Tyr Thr Gly Pro Thr Val Cys Ala Ser Pro Tyr
                340                 345                 350 aag tgc acc tac tct aac cct t gtaagttttt ctgaaattct gttttctttt    1328
Lys Cys Thr Tyr Ser Asn Pro
            355 ctctttgtat ctcttccttt ttcatgatta cattggattg ttgctgacga tatctccaca  1388 tag gg tat tcc cag tgc ctg acg cgt gcg cat cac cat cac cat cac    1435
    Trp Tyr Ser Gln Cys Leu Thr Arg Ala His His His His His His
          360                 365                 370 taa                                                                1438

<210> SEQ ID NO 56
<211> LENGTH: 397
<212> TYPE: PRT
<213> ORGANISM: Artificial Sequence
<220> FEATURE:
<223> OTHER INFORMATION: Synthetic Construct

<400> SEQUENCE: 56

Met Lys Phe Ser Lys Ser Asp Leu Gly Ala Ala Val Ala Phe Leu Ala
                -20                 -15                 -10

Ser Ala Val Pro Leu Ala Glu Ala Ala Cys Ser Leu Pro Ser Ser Tyr
            -5                  -1  1                   5

Arg Trp Ala Ser Thr Gly Pro Leu Ala Asn Pro Lys Ser Gly Trp Tyr
        10                  15                  20
```

```
Ser Leu Lys Asp Phe Thr His Val Pro Tyr Asn Gly Lys His Leu Val
 25                  30                  35                  40

Tyr Ala Ser Asn Tyr Ala Gly Ser Ala Tyr Gly Ser Met Asn Phe Gly
                 45                  50                  55

Leu Phe Ser Asn Trp Ser Asp Met Ala Ser Ala Ser Gln Asn Ser Met
             60                  65                  70

Asn Ala Ala Val Ala Pro Thr Leu Phe Tyr Phe Ala Pro Lys Asn
         75                  80                  85

Ile Trp Val Leu Ala Ser Gln Trp Gly Ala Thr Pro Phe Phe Tyr Arg
         90                  95                 100

Thr Ser Thr Asp Pro Thr Asn Pro Asn Ser Trp Ser Ser Asn Gln Pro
105                 110                 115                 120

Leu Phe Thr Gly Ser Ile Ser Asp Ser Ser Thr Gly Pro Ile Asp Gln
                125                 130                 135

Thr Leu Ile Gly Asp Ala Asn Tyr Met Tyr Leu Phe Phe Ala Gly Asp
            140                 145                 150

Asn Gly Lys Ile Tyr Arg Ser Arg Met Pro Ile Gly Asn Phe Pro Gly
            155                 160                 165

Ser Phe Gly Ser Ser Tyr Glu Val Ile Leu Ser Gly Ser Arg Asn Asp
170                 175                 180

Phe Phe Glu Ala Val Gln Val Tyr Thr Val Thr Gly Gln Ser Ser Pro
185                 190                 195                 200

Leu Tyr Leu Met Ile Ile Glu Ser Ile Gly Ser Arg Gly Arg Tyr Phe
                205                 210                 215

Arg Ser Tyr Thr Ala Thr Asn Leu Gly Gly Ser Trp Ser Pro Gln Ala
            220                 225                 230

Thr Ser Glu Ser Ser Pro Phe Ala Gly Ala Ala Asn Ser Gly Ala Thr
            235                 240                 245

Trp Thr Asn Asp Ile Ser His Gly Asp Leu Ile Arg Ser Gly Pro Asp
250                 255                 260

Gln Thr Met Pro Ile Asp Pro Cys Asn Leu Gln Leu Leu Tyr Gln Gly
265                 270                 275                 280

Leu Val Gly Thr Asn Ser Asp Tyr Asn Lys Leu Pro Tyr Arg Pro Gly
                285                 290                 295

Leu Leu Thr Leu Gln Asn Pro Val Gly Gly Gly Thr Pro Thr Thr
            300                 305                 310

Thr Thr Ser Lys Pro Pro Ala Thr Thr Thr Ser Thr Gly Gly Gly Gly
            315                 320                 325

Thr Ala Pro Gln Tyr Ala Gln Cys Gly Gly Gln Gly Tyr Thr Gly Pro
            330                 335                 340

Thr Val Cys Ala Ser Pro Tyr Lys Cys Thr Tyr Ser Asn Pro Trp Tyr
345                 350                 355                 360

Ser Gln Cys Leu Thr Arg Ala His His His His His
                365                 370

<210> SEQ ID NO 57
<211> LENGTH: 373
<212> TYPE: PRT
<213> ORGANISM: Artificial Sequence
<220> FEATURE:
<223> OTHER INFORMATION: Mature sequence with His-tag

<400> SEQUENCE: 57

Ala Cys Ser Leu Pro Ser Ser Tyr Arg Trp Ala Ser Thr Gly Pro Leu
1               5                  10                  15
```

```
Ala Asn Pro Lys Ser Gly Trp Tyr Ser Leu Lys Asp Phe Thr His Val
             20                  25                  30

Pro Tyr Asn Gly Lys His Leu Val Tyr Ala Ser Asn Tyr Ala Gly Ser
         35                  40                  45

Ala Tyr Gly Ser Met Asn Phe Gly Leu Phe Ser Asn Trp Ser Asp Met
 50                  55                  60

Ala Ser Ala Ser Gln Asn Ser Met Asn Ala Ala Val Ala Pro Thr
 65                  70                  75                  80

Leu Phe Tyr Phe Ala Pro Lys Asn Ile Trp Val Leu Ala Ser Gln Trp
                 85                  90                  95

Gly Ala Thr Pro Phe Phe Tyr Arg Thr Ser Thr Asp Pro Thr Asn Pro
             100                 105                 110

Asn Ser Trp Ser Ser Asn Gln Pro Leu Phe Thr Gly Ser Ile Ser Asp
         115                 120                 125

Ser Ser Thr Gly Pro Ile Asp Gln Thr Leu Ile Gly Asp Ala Asn Tyr
130                 135                 140

Met Tyr Leu Phe Phe Ala Gly Asp Asn Gly Lys Ile Tyr Arg Ser Arg
145                 150                 155                 160

Met Pro Ile Gly Asn Phe Pro Gly Ser Phe Gly Ser Tyr Glu Val
                 165                 170                 175

Ile Leu Ser Gly Ser Arg Asn Asp Phe Phe Glu Ala Val Gln Val Tyr
             180                 185                 190

Thr Val Thr Gly Gln Ser Ser Pro Leu Tyr Leu Met Ile Ile Glu Ser
         195                 200                 205

Ile Gly Ser Arg Gly Arg Tyr Phe Arg Ser Tyr Thr Ala Thr Asn Leu
210                 215                 220

Gly Gly Ser Trp Ser Pro Gln Ala Thr Ser Glu Ser Ser Pro Phe Ala
225                 230                 235                 240

Gly Ala Ala Asn Ser Gly Ala Thr Trp Thr Asn Asp Ile Ser His Gly
                 245                 250                 255

Asp Leu Ile Arg Ser Gly Pro Asp Gln Thr Met Pro Ile Asp Pro Cys
             260                 265                 270

Asn Leu Gln Leu Leu Tyr Gln Gly Leu Val Gly Thr Asn Ser Asp Tyr
         275                 280                 285

Asn Lys Leu Pro Tyr Arg Pro Gly Leu Leu Thr Leu Gln Asn Pro Val
290                 295                 300

Gly Gly Gly Gly Thr Pro Thr Thr Thr Ser Lys Pro Pro Ala Thr
305                 310                 315                 320

Thr Thr Ser Thr Gly Gly Gly Thr Ala Pro Gln Tyr Ala Gln Cys
                 325                 330                 335

Gly Gly Gln Gly Tyr Thr Gly Pro Thr Val Cys Ala Ser Pro Tyr Lys
             340                 345                 350

Cys Thr Tyr Ser Asn Pro Trp Tyr Ser Gln Cys Leu Thr Arg Ala His
         355                 360                 365

His His His His
    370

<210> SEQ ID NO 58
<211> LENGTH: 1404
<212> TYPE: DNA
<213> ORGANISM: Streptosporangium sp-60756
<220> FEATURE:
<221> NAME/KEY: CDS
<222> LOCATION: (1)..(1401)
<220> FEATURE:
```

```
<221> NAME/KEY: sig_peptide
<222> LOCATION: (1)..(93)
<220> FEATURE:
<221> NAME/KEY: mat_peptide
<222> LOCATION: (94)..(1401)

<400> SEQUENCE: 58 atg aaa atc ccc cgt ctc cgg ctc tgg ctc tcc gcc ggg gtc gcc gcc      48
Met Lys Ile Pro Arg Leu Arg Leu Trp Leu Ser Ala Gly Val Ala Ala
-30              -25              -20 gcg gtc ggc gtg gtc ggc acg gtc ggc gcg gtg acc gca ccg gcc gcc      96
Ala Val Gly Val Val Gly Thr Val Gly Ala Val Thr Ala Pro Ala Ala
-15              -10              -5               -1   1 ggc gcc gcc gcc gga tgc cgc gtg gac tac acg gtg agc aac cag tgg     144
Gly Ala Ala Ala Gly Cys Arg Val Asp Tyr Thr Val Ser Asn Gln Trp
                5                10               15 ccg ggc ggc ttc ggc gcg aac gtg aac atc acc aac ctc ggc gac ccc     192
Pro Gly Gly Phe Gly Ala Asn Val Asn Ile Thr Asn Leu Gly Asp Pro
             20               25               30 atc aac ggc tgg cgc ctg acc tgg tcg ttc ccc gcg ggg cag acc atc     240
Ile Asn Gly Trp Arg Leu Thr Trp Ser Phe Pro Ala Gly Gln Thr Ile
35               40               45 acc cag ctg tgg agc ggc tcc cac acc cag tcc ggc tcc cag gtc acc     288
Thr Gln Leu Trp Ser Gly Ser His Thr Gln Ser Gly Ser Gln Val Thr
50               55               60               65 gtg acc aac gtg gac tac aac gcc ggc ctc ccc acc ggg ggc agc gcg     336
Val Thr Asn Val Asp Tyr Asn Ala Gly Leu Pro Thr Gly Gly Ser Ala
                 70               75               80 aac ttc ggg ttc aac ggc tcc ttc aac ggc agc aac ccg gca ccg acg     384
Asn Phe Gly Phe Asn Gly Ser Phe Asn Gly Ser Asn Pro Ala Pro Thr
             85               90               95 agc ttc gcc ctc aac ggt gtg acc tgc acc ggc ggc gtg acc gct tcg     432
Ser Phe Ala Leu Asn Gly Val Thr Cys Thr Gly Gly Val Thr Ala Ser
             100              105              110 ccc agc ccg tcc acc agc ccc tcg acc ggc ccg tcg ccg tcg tcc acg     480
Pro Ser Pro Ser Thr Ser Pro Ser Thr Gly Pro Ser Pro Ser Ser Thr
115              120              125 ccg acg tcg ccc ggc acc tgc gct ctt ccg tcg acg tac cgc tgg acg     528
Pro Thr Ser Pro Gly Thr Cys Ala Leu Pro Ser Thr Tyr Arg Trp Thr
130              135              140              145 tcg acg ggc ccg ctg gcg aac ccg aag tcg ggg tgg gtc tcg ctc aag     576
Ser Thr Gly Pro Leu Ala Asn Pro Lys Ser Gly Trp Val Ser Leu Lys
             150              155              160 gac ttc acc aac gtc gtc cac aac ggc aag cac ctc gtc tac gcc acg     624
Asp Phe Thr Asn Val Val His Asn Gly Lys His Leu Val Tyr Ala Thr
             165              170              175 acg cac gac acg ggg acg agc tgg ggc tcg atg aac ttc agc ccc ttc     672
Thr His Asp Thr Gly Thr Ser Trp Gly Ser Met Asn Phe Ser Pro Phe
             180              185              190 acg aac tgg tcc gac atg gcc tcg gcc ggc cag aac aag atg aac ttc     720
Thr Asn Trp Ser Asp Met Ala Ser Ala Gly Gln Asn Lys Met Asn Phe
195              200              205 tcc acc gtc gcg ccc acg ctc ttc tac ttc gcc ccg aag aac atc tgg     768
Ser Thr Val Ala Pro Thr Leu Phe Tyr Phe Ala Pro Lys Asn Ile Trp
210              215              220              225 gtg ctg gcc tac cag tgg ggc ggg acc gcc ttc tcc tac cgg acc tcc     816
Val Leu Ala Tyr Gln Trp Gly Gly Thr Ala Phe Ser Tyr Arg Thr Ser
             230              235              240 agt gac ccc acc aac gcc aac ggc tgg tcg gcg cag cag acc ctc ttc     864
Ser Asp Pro Thr Asn Ala Asn Gly Trp Ser Ala Gln Gln Thr Leu Phe
             245              250              255
```

```
acc gga agc atc tcc ggc tcc gga acc ggg ccc atc gac cag acg ctc    912
Thr Gly Ser Ile Ser Gly Ser Gly Thr Gly Pro Ile Asp Gln Thr Leu
        260                 265                 270 atc ggc gac ggc acc aac atg tac ctg ttc ttc gcc ggg gac aac ggc    960
Ile Gly Asp Gly Thr Asn Met Tyr Leu Phe Phe Ala Gly Asp Asn Gly
    275                 280                 285 aag atc tac cgg gcc agc atg ccg atc ggg aac ttc ccg ggc agc ttc   1008
Lys Ile Tyr Arg Ala Ser Met Pro Ile Gly Asn Phe Pro Gly Ser Phe
290                 295                 300                 305 ggc tcg aac tac acg acg atc atg agc gac acg acg aac aac ctg ttc   1056
Gly Ser Asn Tyr Thr Thr Ile Met Ser Asp Thr Thr Asn Asn Leu Phe
            310                 315                 320 gaa ggg gtc gag gtc tac aag ctc cag ggg cag aac aag tac ctc atg   1104
Glu Gly Val Glu Val Tyr Lys Leu Gln Gly Gln Asn Lys Tyr Leu Met
        325                 330                 335 ctc gtc gag gcg atc ggc tcg cag ggt cgc tac ttc cgc tcg ttc acg   1152
Leu Val Glu Ala Ile Gly Ser Gln Gly Arg Tyr Phe Arg Ser Phe Thr
    340                 345                 350 gcc acc agc ctg gac ggc aca tgg aca ccc cag gcc gcg acc gag ggc   1200
Ala Thr Ser Leu Asp Gly Thr Trp Thr Pro Gln Ala Ala Thr Glu Gly
355                 360                 365 aac ccc ttc gcc ggc aag gcc aac agc ggc gcc acc tgg acc aac gac   1248
Asn Pro Phe Ala Gly Lys Ala Asn Ser Gly Ala Thr Trp Thr Asn Asp
370                 375                 380                 385 atc agc cac ggc gat ctg gtc cgc agc aac ccc gac cag acc aag acc   1296
Ile Ser His Gly Asp Leu Val Arg Ser Asn Pro Asp Gln Thr Lys Thr
            390                 395                 400 gtc gac ccc tgc aac ctg caa ctg ctc tac cag ggc cgc agc ccc aac   1344
Val Asp Pro Cys Asn Leu Gln Leu Leu Tyr Gln Gly Arg Ser Pro Asn
        405                 410                 415 tcc ggt ggc gac tac ggc ctg ctg ccc tac cgg ccg ggg gtg ctg aca   1392
Ser Gly Gly Asp Tyr Gly Leu Leu Pro Tyr Arg Pro Gly Val Leu Thr
    420                 425                 430 ctg cag cgc tga                                                    1404
Leu Gln Arg
    435

<210> SEQ ID NO 59
<211> LENGTH: 467
<212> TYPE: PRT
<213> ORGANISM: Streptosporangium sp-60756

<400> SEQUENCE: 59

Met Lys Ile Pro Arg Leu Arg Leu Trp Leu Ser Ala Gly Val Ala Ala
    -30                 -25                 -20

Ala Val Gly Val Val Gly Thr Val Gly Ala Val Thr Ala Pro Ala Ala
-15                 -10                  -5              -1   1

Gly Ala Ala Ala Gly Cys Arg Val Asp Tyr Thr Val Ser Asn Gln Trp
                5                  10                  15

Pro Gly Gly Phe Gly Ala Asn Val Asn Ile Thr Asn Leu Gly Asp Pro
        20                  25                  30

Ile Asn Gly Trp Arg Leu Thr Trp Ser Phe Pro Ala Gly Gln Thr Ile
    35                  40                  45

Thr Gln Leu Trp Ser Gly Ser His Thr Gln Ser Gly Ser Gln Val Thr
50                  55                  60                  65

Val Thr Asn Val Asp Tyr Asn Ala Gly Leu Pro Thr Gly Gly Ser Ala
                70                  75                  80

Asn Phe Gly Phe Asn Gly Ser Phe Asn Gly Ser Asn Pro Ala Pro Thr
```

```
                85                  90                  95
Ser Phe Ala Leu Asn Gly Val Thr Cys Thr Gly Gly Val Thr Ala Ser
            100                 105                 110

Pro Ser Pro Ser Thr Ser Pro Ser Thr Gly Pro Ser Pro Ser Ser Thr
        115                 120                 125

Pro Thr Ser Pro Gly Thr Cys Ala Leu Pro Ser Thr Tyr Arg Trp Thr
130                 135                 140                 145

Ser Thr Gly Pro Leu Ala Asn Pro Lys Ser Gly Trp Val Ser Leu Lys
                150                 155                 160

Asp Phe Thr Asn Val Val His Asn Gly Lys His Leu Val Tyr Ala Thr
            165                 170                 175

Thr His Asp Thr Gly Thr Ser Trp Gly Ser Met Asn Phe Ser Pro Phe
        180                 185                 190

Thr Asn Trp Ser Asp Met Ala Ser Ala Gly Gln Asn Lys Met Asn Phe
    195                 200                 205

Ser Thr Val Ala Pro Thr Leu Phe Tyr Phe Ala Pro Lys Asn Ile Trp
210                 215                 220                 225

Val Leu Ala Tyr Gln Trp Gly Gly Thr Ala Phe Ser Tyr Arg Thr Ser
                230                 235                 240

Ser Asp Pro Thr Asn Ala Asn Gly Trp Ser Ala Gln Gln Thr Leu Phe
            245                 250                 255

Thr Gly Ser Ile Ser Gly Ser Gly Thr Gly Pro Ile Asp Gln Thr Leu
        260                 265                 270

Ile Gly Asp Gly Thr Asn Met Tyr Leu Phe Phe Ala Gly Asp Asn Gly
    275                 280                 285

Lys Ile Tyr Arg Ala Ser Met Pro Ile Gly Asn Phe Pro Gly Ser Phe
290                 295                 300                 305

Gly Ser Asn Tyr Thr Thr Ile Met Ser Asp Thr Thr Asn Asn Leu Phe
                310                 315                 320

Glu Gly Val Glu Val Tyr Lys Leu Gln Gly Gln Asn Lys Tyr Leu Met
            325                 330                 335

Leu Val Glu Ala Ile Gly Ser Gln Gly Arg Tyr Phe Arg Ser Phe Thr
        340                 345                 350

Ala Thr Ser Leu Asp Gly Thr Trp Thr Pro Gln Ala Ala Thr Glu Gly
    355                 360                 365

Asn Pro Phe Ala Gly Lys Ala Asn Ser Gly Ala Thr Trp Thr Asn Asp
370                 375                 380                 385

Ile Ser His Gly Asp Leu Val Arg Ser Asn Pro Asp Gln Thr Lys Thr
                390                 395                 400

Val Asp Pro Cys Asn Leu Gln Leu Leu Tyr Gln Gly Arg Ser Pro Asn
            405                 410                 415

Ser Gly Gly Asp Tyr Gly Leu Leu Pro Tyr Arg Pro Gly Val Leu Thr
        420                 425                 430

Leu Gln Arg
    435

<210> SEQ ID NO 60
<211> LENGTH: 436
<212> TYPE: PRT
<213> ORGANISM: Streptosporangium sp-60756

<400> SEQUENCE: 60

Ala Gly Ala Ala Ala Gly Cys Arg Val Asp Tyr Thr Val Ser Asn Gln
1               5                   10                  15
```

```
Trp Pro Gly Gly Phe Gly Ala Asn Val Asn Ile Thr Asn Leu Gly Asp
             20                  25                  30

Pro Ile Asn Gly Trp Arg Leu Thr Trp Ser Phe Pro Ala Gly Gln Thr
         35                  40                  45

Ile Thr Gln Leu Trp Ser Gly Ser His Thr Gln Ser Gly Ser Gln Val
     50                  55                  60

Thr Val Thr Asn Val Asp Tyr Asn Ala Gly Leu Pro Thr Gly Gly Ser
65                  70                  75                  80

Ala Asn Phe Gly Phe Asn Gly Ser Phe Asn Gly Ser Asn Pro Ala Pro
                 85                  90                  95

Thr Ser Phe Ala Leu Asn Gly Val Thr Cys Thr Gly Gly Val Thr Ala
             100                 105                 110

Ser Pro Ser Pro Ser Thr Ser Pro Ser Thr Gly Pro Ser Pro Ser Ser
         115                 120                 125

Thr Pro Thr Ser Pro Gly Thr Cys Ala Leu Pro Ser Thr Tyr Arg Trp
     130                 135                 140

Thr Ser Thr Gly Pro Leu Ala Asn Pro Lys Ser Gly Trp Val Ser Leu
145                 150                 155                 160

Lys Asp Phe Thr Asn Val Val His Asn Gly Lys His Leu Val Tyr Ala
                 165                 170                 175

Thr Thr His Asp Thr Gly Thr Ser Trp Gly Ser Met Asn Phe Ser Pro
             180                 185                 190

Phe Thr Asn Trp Ser Asp Met Ala Ser Ala Gly Gln Asn Lys Met Asn
         195                 200                 205

Phe Ser Thr Val Ala Pro Thr Leu Phe Tyr Phe Ala Pro Lys Asn Ile
     210                 215                 220

Trp Val Leu Ala Tyr Gln Trp Gly Gly Thr Ala Phe Ser Tyr Arg Thr
225                 230                 235                 240

Ser Ser Asp Pro Thr Asn Ala Asn Gly Trp Ser Ala Gln Gln Thr Leu
                 245                 250                 255

Phe Thr Gly Ser Ile Ser Gly Ser Gly Thr Gly Pro Ile Asp Gln Thr
             260                 265                 270

Leu Ile Gly Asp Gly Thr Asn Met Tyr Leu Phe Phe Ala Gly Asp Asn
         275                 280                 285

Gly Lys Ile Tyr Arg Ala Ser Met Pro Ile Gly Asn Phe Pro Gly Ser
     290                 295                 300

Phe Gly Ser Asn Tyr Thr Thr Ile Met Ser Asp Thr Thr Asn Asn Leu
305                 310                 315                 320

Phe Glu Gly Val Glu Val Tyr Lys Leu Gln Gly Gln Asn Lys Tyr Leu
                 325                 330                 335

Met Leu Val Glu Ala Ile Gly Ser Gln Gly Arg Tyr Phe Arg Ser Phe
             340                 345                 350

Thr Ala Thr Ser Leu Asp Gly Thr Trp Thr Pro Gln Ala Ala Thr Glu
         355                 360                 365

Gly Asn Pro Phe Ala Gly Lys Ala Asn Ser Gly Ala Thr Trp Thr Asn
     370                 375                 380

Asp Ile Ser His Gly Asp Leu Val Arg Ser Asn Pro Asp Gln Thr Lys
385                 390                 395                 400

Thr Val Asp Pro Cys Asn Leu Gln Leu Leu Tyr Gln Gly Arg Ser Pro
                 405                 410                 415

Asn Ser Gly Gly Asp Tyr Gly Leu Leu Pro Tyr Arg Pro Gly Val Leu
             420                 425                 430

Thr Leu Gln Arg
```

<210> SEQ ID NO 61
<211> LENGTH: 1416
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(1413)
<220> FEATURE:
<221> NAME/KEY: sig_peptide
<222> LOCATION: (1)..(81)
<220> FEATURE:
<221> NAME/KEY: mat_peptide
<222> LOCATION: (82)..(1413)

<400> SEQUENCE: 61

```
atg aag aaa ccg ttg ggg aaa att gtc gca agc acc gca cta ctc att        48
Met Lys Lys Pro Leu Gly Lys Ile Val Ala Ser Thr Ala Leu Leu Ile
        -25                 -20                 -15 tct gtt gct ttt agt tca tcg ata gca tca gca cat cat cat cac cat        96
Ser Val Ala Phe Ser Ser Ser Ile Ala Ser Ala His His His His His
    -10                  -5                  -1   1               5 cat cct agg gcc gga gcc gcc gcc gga tgc cgc gtg gac tac acg gtg       144
His Pro Arg Ala Gly Ala Ala Ala Gly Cys Arg Val Asp Tyr Thr Val
                 10                  15                  20 agc aac cag tgg ccg ggc ggc ttc ggc gcg aac gtg aac atc acc aac       192
Ser Asn Gln Trp Pro Gly Gly Phe Gly Ala Asn Val Asn Ile Thr Asn
             25                  30                  35 ctc ggc gac ccc atc aac ggc tgg cgc ctg acc tgg tcg ttc ccc gcg       240
Leu Gly Asp Pro Ile Asn Gly Trp Arg Leu Thr Trp Ser Phe Pro Ala
         40                  45                  50 ggg cag acc atc acc cag ctg tgg agc ggc tcc cac acc cag tcc ggc       288
Gly Gln Thr Ile Thr Gln Leu Trp Ser Gly Ser His Thr Gln Ser Gly
 55                  60                  65 tcc cag gtc acc gtg acc aac gtg gac tac aac gcc ggc ctc ccc acc       336
Ser Gln Val Thr Val Thr Asn Val Asp Tyr Asn Ala Gly Leu Pro Thr
70                  75                  80                  85 ggg ggc agc gcg aac ttc ggg ttc aac ggc tcc ttc aac ggc agc aac       384
Gly Gly Ser Ala Asn Phe Gly Phe Asn Gly Ser Phe Asn Gly Ser Asn
                 90                  95                 100 ccg gca ccg acg agc ttc gcc ctc aac ggt gtg acc tgc acc ggc ggc       432
Pro Ala Pro Thr Ser Phe Ala Leu Asn Gly Val Thr Cys Thr Gly Gly
            105                 110                 115 gtg acc gct tcg ccc agc ccg tcc acc agc ccc tcg acc ggc ccg tcg       480
Val Thr Ala Ser Pro Ser Pro Ser Thr Ser Pro Ser Thr Gly Pro Ser
        120                 125                 130 ccg tcg tcc acg ccg acg tcg ccc ggc acc tgc gct ctt ccg tcg acg       528
Pro Ser Ser Thr Pro Thr Ser Pro Gly Thr Cys Ala Leu Pro Ser Thr
    135                 140                 145 tac cgc tgg acg tcg acg ggc ccg ctg gcg aac ccg aag tcg ggg tgg       576
Tyr Arg Trp Thr Ser Thr Gly Pro Leu Ala Asn Pro Lys Ser Gly Trp
150                 155                 160                 165 gtc tcg ctc aag gac ttc acc aac gtc gtc cac aac ggc aag cac ctc       624
Val Ser Leu Lys Asp Phe Thr Asn Val Val His Asn Gly Lys His Leu
                170                 175                 180 gtc tac gcc acg acg cac gac acg ggg acg agc tgg ggc tcg atg aac       672
Val Tyr Ala Thr Thr His Asp Thr Gly Thr Ser Trp Gly Ser Met Asn
            185                 190                 195 ttc agc ccc ttc acg aac tgg tcc gac atg gcc tcg gcc ggc cag aac       720
Phe Ser Pro Phe Thr Asn Trp Ser Asp Met Ala Ser Ala Gly Gln Asn
```

```
aag atg aac ttc tcc acc gtc gcg ccc acg ctc ttc tac ttc gcc ccg      768
Lys Met Asn Phe Ser Thr Val Ala Pro Thr Leu Phe Tyr Phe Ala Pro
    215                 220                 225 aag aac atc tgg gtg ctg gcc tac cag tgg ggc ggg acc gcc ttc tcc      816
Lys Asn Ile Trp Val Leu Ala Tyr Gln Trp Gly Gly Thr Ala Phe Ser
230                 235                 240                 245 tac cgg acc tcc agt gac ccc acc aac gcc aac ggc tgg tcg gcg cag      864
Tyr Arg Thr Ser Ser Asp Pro Thr Asn Ala Asn Gly Trp Ser Ala Gln
                250                 255                 260 cag acc ctc ttc acc gga agc atc tcc ggc tcc gga acc ggg ccc atc      912
Gln Thr Leu Phe Thr Gly Ser Ile Ser Gly Ser Gly Thr Gly Pro Ile
            265                 270                 275 gac cag acg ctc atc ggc gac ggc acc aac atg tac ctg ttc ttc gcc      960
Asp Gln Thr Leu Ile Gly Asp Gly Thr Asn Met Tyr Leu Phe Phe Ala
        280                 285                 290 ggg gac aac ggc aag atc tac cgg gcc agc atg ccg atc ggg aac ttc     1008
Gly Asp Asn Gly Lys Ile Tyr Arg Ala Ser Met Pro Ile Gly Asn Phe
    295                 300                 305 ccg ggc agc ttc ggc tcg aac tac acg acg atc atg agc gac acg acg     1056
Pro Gly Ser Phe Gly Ser Asn Tyr Thr Thr Ile Met Ser Asp Thr Thr
310                 315                 320                 325 aac aac ctg ttc gaa ggg gtc gag gtc tac aag ctc cag ggg cag aac     1104
Asn Asn Leu Phe Glu Gly Val Glu Val Tyr Lys Leu Gln Gly Gln Asn
                330                 335                 340 aag tac ctc atg ctc gtc gag gcg atc ggc tcg cag ggt cgc tac ttc     1152
Lys Tyr Leu Met Leu Val Glu Ala Ile Gly Ser Gln Gly Arg Tyr Phe
            345                 350                 355 cgc tcg ttc acg gcc acc agc ctg gac ggc aca tgg aca ccc cag gcc     1200
Arg Ser Phe Thr Ala Thr Ser Leu Asp Gly Thr Trp Thr Pro Gln Ala
        360                 365                 370 gcg acc gag ggc aac ccc ttc gcc ggc aag gcc aac agc ggc gcc acc     1248
Ala Thr Glu Gly Asn Pro Phe Ala Gly Lys Ala Asn Ser Gly Ala Thr
    375                 380                 385 tgg acc aac gac atc agc cac ggc gat ctg gtc cgc agc aac ccc gac     1296
Trp Thr Asn Asp Ile Ser His Gly Asp Leu Val Arg Ser Asn Pro Asp
390                 395                 400                 405 cag acc aag acc gtc gac ccc tgc aac ctg caa ctg ctc tac cag ggc     1344
Gln Thr Lys Thr Val Asp Pro Cys Asn Leu Gln Leu Leu Tyr Gln Gly
                410                 415                 420 cgc agc ccc aac tcc ggt ggc gac tac ggc ctg ctc ccc tac cgg ccg     1392
Arg Ser Pro Asn Ser Gly Gly Asp Tyr Gly Leu Leu Pro Tyr Arg Pro
            425                 430                 435 ggg gtg ctg aca ctg cag cgc tga                                     1416
Gly Val Leu Thr Leu Gln Arg
        440
```

<210> SEQ ID NO 62
<211> LENGTH: 471
<212> TYPE: PRT
<213> ORGANISM: Artificial Sequence
<220> FEATURE:
<223> OTHER INFORMATION: Synthetic Construct

<400> SEQUENCE: 62

```
Met Lys Lys Pro Leu Gly Lys Ile Val Ala Ser Thr Ala Leu Leu Ile
        -25                 -20                 -15

Ser Val Ala Phe Ser Ser Ser Ile Ala Ser Ala His His His His
    -10                  -5                 -1   1              5

His Pro Arg Ala Gly Ala Ala Ala Gly Cys Arg Val Asp Tyr Thr Val
```

-continued

```
                    10                  15                  20
Ser Asn Gln Trp Pro Gly Gly Phe Gly Ala Asn Val Asn Ile Thr Asn
                    25                  30                  35

Leu Gly Asp Pro Ile Asn Gly Trp Arg Leu Thr Trp Ser Phe Pro Ala
                    40                  45                  50

Gly Gln Thr Ile Thr Gln Leu Trp Ser Gly Ser His Thr Gln Ser Gly
            55                  60                  65

Ser Gln Val Thr Val Thr Asn Val Asp Tyr Asn Ala Gly Leu Pro Thr
70                  75                  80                  85

Gly Gly Ser Ala Asn Phe Gly Phe Asn Gly Ser Phe Asn Gly Ser Asn
                90                  95                  100

Pro Ala Pro Thr Ser Phe Ala Leu Asn Gly Val Thr Cys Thr Gly Gly
                105                 110                 115

Val Thr Ala Ser Pro Ser Pro Ser Thr Ser Pro Ser Thr Gly Pro Ser
            120                 125                 130

Pro Ser Ser Thr Pro Thr Ser Pro Gly Thr Cys Ala Leu Pro Ser Thr
        135                 140                 145

Tyr Arg Trp Thr Ser Thr Gly Pro Leu Ala Asn Pro Lys Ser Gly Trp
150                 155                 160                 165

Val Ser Leu Lys Asp Phe Thr Asn Val Val His Asn Gly Lys His Leu
                170                 175                 180

Val Tyr Ala Thr Thr His Asp Thr Gly Thr Ser Trp Gly Ser Met Asn
            185                 190                 195

Phe Ser Pro Phe Thr Asn Trp Ser Asp Met Ala Ser Ala Gly Gln Asn
                200                 205                 210

Lys Met Asn Phe Ser Thr Val Ala Pro Thr Leu Phe Tyr Phe Ala Pro
215                 220                 225

Lys Asn Ile Trp Val Leu Ala Tyr Gln Trp Gly Gly Thr Ala Phe Ser
230                 235                 240                 245

Tyr Arg Thr Ser Ser Asp Pro Thr Asn Ala Asn Gly Trp Ser Ala Gln
                250                 255                 260

Gln Thr Leu Phe Thr Gly Ser Ile Ser Gly Ser Gly Thr Gly Pro Ile
            265                 270                 275

Asp Gln Thr Leu Ile Gly Asp Gly Thr Asn Met Tyr Leu Phe Phe Ala
            280                 285                 290

Gly Asp Asn Gly Lys Ile Tyr Arg Ala Ser Met Pro Ile Gly Asn Phe
            295                 300                 305

Pro Gly Ser Phe Gly Ser Asn Tyr Thr Thr Ile Met Ser Asp Thr Thr
310                 315                 320                 325

Asn Asn Leu Phe Glu Gly Val Glu Val Tyr Lys Leu Gln Gly Gln Asn
                330                 335                 340

Lys Tyr Leu Met Leu Val Glu Ala Ile Gly Ser Gln Gly Arg Tyr Phe
            345                 350                 355

Arg Ser Phe Thr Ala Thr Ser Leu Asp Gly Thr Trp Thr Pro Gln Ala
            360                 365                 370

Ala Thr Glu Gly Asn Pro Phe Ala Gly Lys Ala Asn Ser Gly Ala Thr
        375                 380                 385

Trp Thr Asn Asp Ile Ser His Gly Asp Leu Val Arg Ser Asn Pro Asp
390                 395                 400                 405

Gln Thr Lys Thr Val Asp Pro Cys Asn Leu Gln Leu Leu Tyr Gln Gly
                410                 415                 420

Arg Ser Pro Asn Ser Gly Gly Asp Tyr Gly Leu Leu Pro Tyr Arg Pro
                425                 430                 435
```

Gly Val Leu Thr Leu Gln Arg
        440

<210> SEQ ID NO 63
<211> LENGTH: 444
<212> TYPE: PRT
<213> ORGANISM: Artificial Sequence
<220> FEATURE:
<223> OTHER INFORMATION: Mature sequence with His-tag

<400> SEQUENCE: 63

His His His His His His Pro Arg Ala Gly Ala Ala Gly Cys Arg
1               5                   10                  15

Val Asp Tyr Thr Val Ser Asn Gln Trp Pro Gly Gly Phe Gly Ala Asn
            20                  25                  30

Val Asn Ile Thr Asn Leu Gly Asp Pro Ile Asn Gly Trp Arg Leu Thr
        35                  40                  45

Trp Ser Phe Pro Ala Gly Gln Thr Ile Thr Gln Leu Trp Ser Gly Ser
    50                  55                  60

His Thr Gln Ser Gly Ser Gln Val Thr Val Thr Asn Val Asp Tyr Asn
65                  70                  75                  80

Ala Gly Leu Pro Thr Gly Gly Ser Ala Asn Phe Gly Phe Asn Gly Ser
                85                  90                  95

Phe Asn Gly Ser Asn Pro Ala Pro Thr Ser Phe Ala Leu Asn Gly Val
            100                 105                 110

Thr Cys Thr Gly Gly Val Thr Ala Ser Pro Ser Pro Ser Thr Ser Pro
        115                 120                 125

Ser Thr Gly Pro Ser Pro Ser Ser Thr Pro Thr Ser Pro Gly Thr Cys
    130                 135                 140

Ala Leu Pro Ser Thr Tyr Arg Trp Thr Ser Thr Gly Pro Leu Ala Asn
145                 150                 155                 160

Pro Lys Ser Gly Trp Val Ser Leu Lys Asp Phe Thr Asn Val Val His
                165                 170                 175

Asn Gly Lys His Leu Val Tyr Ala Thr Thr His Asp Thr Gly Thr Ser
            180                 185                 190

Trp Gly Ser Met Asn Phe Ser Pro Phe Thr Asn Trp Ser Asp Met Ala
        195                 200                 205

Ser Ala Gly Gln Asn Lys Met Asn Phe Ser Thr Val Ala Pro Thr Leu
    210                 215                 220

Phe Tyr Phe Ala Pro Lys Asn Ile Trp Val Leu Ala Tyr Gln Trp Gly
225                 230                 235                 240

Gly Thr Ala Phe Ser Tyr Arg Thr Ser Ser Asp Pro Thr Asn Ala Asn
                245                 250                 255

Gly Trp Ser Ala Gln Gln Thr Leu Phe Thr Gly Ser Ile Ser Gly Ser
            260                 265                 270

Gly Thr Gly Pro Ile Asp Gln Thr Leu Ile Gly Asp Gly Thr Asn Met
        275                 280                 285

Tyr Leu Phe Phe Ala Gly Asp Asn Gly Lys Ile Tyr Arg Ala Ser Met
    290                 295                 300

Pro Ile Gly Asn Phe Pro Gly Ser Phe Gly Ser Asn Tyr Thr Thr Ile
305                 310                 315                 320

Met Ser Asp Thr Thr Asn Asn Leu Phe Glu Gly Val Glu Val Tyr Lys
                325                 330                 335

Leu Gln Gly Gln Asn Lys Tyr Leu Met Leu Val Glu Ala Ile Gly Ser
            340                 345                 350

Gln Gly Arg Tyr Phe Arg Ser Phe Thr Ala Thr Ser Leu Asp Gly Thr
        355                 360                 365

Trp Thr Pro Gln Ala Ala Thr Glu Gly Asn Pro Phe Ala Gly Lys Ala
370                 375                 380

Asn Ser Gly Ala Thr Trp Thr Asn Asp Ile Ser His Gly Asp Leu Val
385                 390                 395                 400

Arg Ser Asn Pro Asp Gln Thr Lys Thr Val Asp Pro Cys Asn Leu Gln
                405                 410                 415

Leu Leu Tyr Gln Gly Arg Ser Pro Asn Ser Gly Gly Asp Tyr Gly Leu
            420                 425                 430

Leu Pro Tyr Arg Pro Gly Val Leu Thr Leu Gln Arg
            435                 440

<210> SEQ ID NO 64
<211> LENGTH: 1328
<212> TYPE: DNA
<213> ORGANISM: Acrophialophora fusispora
<220> FEATURE:
<221> NAME/KEY: CDS
<222> LOCATION: (1)..(330)
<220> FEATURE:
<221> NAME/KEY: sig_peptide
<222> LOCATION: (1)..(57)
<220> FEATURE:
<221> NAME/KEY: mat_peptide
<222> LOCATION: (58)..(1325)
<220> FEATURE:
<221> NAME/KEY: CDS
<222> LOCATION: (403)..(655)
<220> FEATURE:
<221> NAME/KEY: CDS
<222> LOCATION: (795)..(948)
<220> FEATURE:
<221> NAME/KEY: CDS
<222> LOCATION: (1100)..(1325)

<400> SEQUENCE: 64

```
atg aag ctt ctc aac tcg ggt atc agc ctg ctg gca ttg gca gtg ggc     48
Met Lys Leu Leu Asn Ser Gly Ile Ser Leu Leu Ala Leu Ala Val Gly
        -15                 -10                 -5 gtc acg gcg cag tgc ccc ttg ccc tcc acc tac cgc tgg aaa tcg aca     96
Val Thr Ala Gln Cys Pro Leu Pro Ser Thr Tyr Arg Trp Lys Ser Thr
        -1  1               5                   10 ggg gtg ctt gcc aac cca aag tcc gga tgg gtg tcc ctc aaa gac ttt    144
Gly Val Leu Ala Asn Pro Lys Ser Gly Trp Val Ser Leu Lys Asp Phe
    15                  20                  25 acc gtc gcg ccg tac aac ggc aag cat ctc gtc tac gct acg acc cac    192
Thr Val Ala Pro Tyr Asn Gly Lys His Leu Val Tyr Ala Thr Thr His
30                  35                  40                  45 gac acg gga tcg agc tgg ggc tcc atg aac ttc ggc ctg ttc agc agc    240
Asp Thr Gly Ser Ser Trp Gly Ser Met Asn Phe Gly Leu Phe Ser Ser
                50                  55                  60 tgg tcc gac atg gcc acg gcc ccc cag aat ggg atg aac cag ggc act    288
Trp Ser Asp Met Ala Thr Ala Pro Gln Asn Gly Met Asn Gln Gly Thr
            65                  70                  75 gtt gcg ccc acc ctg ttc tac ttc aag ccg aag gat atc tgg             330
Val Ala Pro Thr Leu Phe Tyr Phe Lys Pro Lys Asp Ile Trp
        80                  85                  90 gtacgtaatt gcatcccaga cttctttcgt ttcccttcac gatgccatac tcacgagatt    390 cccgtctca ag gtg ctc gcg tat caa tgg ggc ccg acg acc ttc tcc tac    441
              Val Leu Ala Tyr Gln Trp Gly Pro Thr Thr Phe Ser Tyr
                  95                  100
```

```
aag aca tca aag gac ccc acc aat gcg aac ggc tgg ggg tcg gcg cag      489
Lys Thr Ser Lys Asp Pro Thr Asn Ala Asn Gly Trp Gly Ser Ala Gln
105                 110                 115                 120 acc ctc ttc tcg ggg aaa atc tcg ggc tct tcc acc ggc gcc att gac      537
Thr Leu Phe Ser Gly Lys Ile Ser Gly Ser Ser Thr Gly Ala Ile Asp
            125                 130                 135 cag acc gtc att ggc gat gac acc aac atg tac ctc ttc ttc gcc ggc      585
Gln Thr Val Ile Gly Asp Asp Thr Asn Met Tyr Leu Phe Phe Ala Gly
                140                 145                 150 gac aac ggc aag atc tac cgc gcc agc atg ccc atc gac agg ttc ccc      633
Asp Asn Gly Lys Ile Tyr Arg Ala Ser Met Pro Ile Asp Arg Phe Pro
            155                 160                 165 ggc agc ttc ggc gac cag tac c gtacgtccaa tccgagttgt tcattccct        685
Gly Ser Phe Gly Asp Gln Tyr
            170             175 ttctaactgt ctcgtgtgcc ctgggagtcg tgtggcctct tgagaggctt gtttgccact    745
ctcgagacac ccacaaaata ggcatccaat gactgacata gctgggcag ag  acc atc    802
                                                         Gln Thr Ile ctg agc gat agc acc aac aac ttg ttc gag gcc gtc cag gtc tac aag      850
Leu Ser Asp Ser Thr Asn Asn Leu Phe Glu Ala Val Gln Val Tyr Lys
    180                 185                 190 ctc cag ggc ttg aac aag tat ctg atg att gtc gag gcc att ggc agc      898
Leu Gln Gly Leu Asn Lys Tyr Leu Met Ile Val Glu Ala Ile Gly Ser
195                 200                 205                 210 aac ggg cgc tac ttc cgc tct ttc acg gct gac agg ttg gac ggg cag      946
Asn Gly Arg Tyr Phe Arg Ser Phe Thr Ala Asp Arg Leu Asp Gly Gln
            215                 220                 225 tg  gtacgtctat ccgctctcct ttcccccct tttaagcgac tctcatagtc            998
Trp tcggcgtcac cttcccgca aggcgactcc gctcctccca aaccgcccct cctcagcaac    1058
ccaagtaccg taagggtttt ctgactttaa ttcttgcaca g g  acc ccc cag gca    1112
                                                Thr Pro Gln Ala
                                                            230 gcc acc gag agc aat cct ttc gcg ggc aag gca aac agc gga gcg acc     1160
Ala Thr Glu Ser Asn Pro Phe Ala Gly Lys Ala Asn Ser Gly Ala Thr
                235                 240                 245 tgg acc aac gat atc agc cac ggc gag ctg atc cgc gtg agc gcc gac     1208
Trp Thr Asn Asp Ile Ser His Gly Glu Leu Ile Arg Val Ser Ala Asp
        250                 255                 260 cag acc ttt aca gtc gac ccg tgc aac ctg cag ctg ctc tac cag ggc     1256
Gln Thr Phe Thr Val Asp Pro Cys Asn Leu Gln Leu Leu Tyr Gln Gly
265                 270                 275 cgc tcc ccc agc tcg ggc ggc gac tac ggg aag ctg ccg tac cgg ccg     1304
Arg Ser Pro Ser Ser Gly Gly Asp Tyr Gly Lys Leu Pro Tyr Arg Pro
280                 285                 290                 295 ggg ctg ttg acg ctg cag cgt taa                                     1328
Gly Leu Leu Thr Leu Gln Arg
                300
```

<210> SEQ ID NO 65
<211> LENGTH: 321
<212> TYPE: PRT
<213> ORGANISM: Acrophialophora fusispora

<400> SEQUENCE: 65

```
Met Lys Leu Leu Asn Ser Gly Ile Ser Leu Leu Ala Leu Ala Val Gly
            -15                 -10                  -5

Val Thr Ala Gln Cys Pro Leu Pro Ser Thr Tyr Arg Trp Lys Ser Thr
     -1   1               5                  10
```

Gly Val Leu Ala Asn Pro Lys Ser Gly Trp Val Ser Leu Lys Asp Phe
            15                  20                  25

Thr Val Ala Pro Tyr Asn Gly Lys His Leu Val Tyr Ala Thr Thr His
 30                  35                  40                  45

Asp Thr Gly Ser Ser Trp Gly Ser Met Asn Phe Gly Leu Phe Ser Ser
                50                  55                  60

Trp Ser Asp Met Ala Thr Ala Pro Gln Asn Gly Met Asn Gln Gly Thr
             65                  70                  75

Val Ala Pro Thr Leu Phe Tyr Phe Lys Pro Lys Asp Ile Trp Val Leu
             80                  85                  90

Ala Tyr Gln Trp Gly Pro Thr Thr Phe Ser Tyr Lys Thr Ser Lys Asp
     95                 100                 105

Pro Thr Asn Ala Asn Gly Trp Gly Ser Ala Gln Thr Leu Phe Ser Gly
110                 115                 120                 125

Lys Ile Ser Gly Ser Ser Thr Gly Ala Ile Asp Gln Thr Val Ile Gly
                130                 135                 140

Asp Asp Thr Asn Met Tyr Leu Phe Phe Ala Gly Asp Asn Gly Lys Ile
                145                 150                 155

Tyr Arg Ala Ser Met Pro Ile Asp Arg Phe Pro Gly Ser Phe Gly Asp
                160                 165                 170

Gln Tyr Gln Thr Ile Leu Ser Asp Ser Thr Asn Asn Leu Phe Glu Ala
    175                 180                 185

Val Gln Val Tyr Lys Leu Gln Gly Leu Asn Lys Tyr Leu Met Ile Val
190                 195                 200                 205

Glu Ala Ile Gly Ser Asn Gly Arg Tyr Phe Arg Ser Phe Thr Ala Asp
                210                 215                 220

Arg Leu Asp Gly Gln Trp Thr Pro Gln Ala Ala Thr Glu Ser Asn Pro
                225                 230                 235

Phe Ala Gly Lys Ala Asn Ser Gly Ala Thr Trp Thr Asn Asp Ile Ser
                240                 245                 250

His Gly Glu Leu Ile Arg Val Ser Ala Asp Gln Thr Phe Thr Val Asp
    255                 260                 265

Pro Cys Asn Leu Gln Leu Leu Tyr Gln Gly Arg Ser Pro Ser Ser Gly
270                 275                 280                 285

Gly Asp Tyr Gly Lys Leu Pro Tyr Arg Pro Gly Leu Leu Thr Leu Gln
                290                 295                 300

Arg

<210> SEQ ID NO 66
<211> LENGTH: 302
<212> TYPE: PRT
<213> ORGANISM: Acrophialophora fusispora

<400> SEQUENCE: 66

Gln Cys Pro Leu Pro Ser Thr Tyr Arg Trp Lys Ser Thr Gly Val Leu
 1               5                  10                  15

Ala Asn Pro Lys Ser Gly Trp Val Ser Leu Lys Asp Phe Thr Val Ala
                20                  25                  30

Pro Tyr Asn Gly Lys His Leu Val Tyr Ala Thr Thr His Asp Thr Gly
             35                  40                  45

Ser Ser Trp Gly Ser Met Asn Phe Gly Leu Phe Ser Ser Trp Ser Asp
    50                  55                  60

Met Ala Thr Ala Pro Gln Asn Gly Met Asn Gln Gly Thr Val Ala Pro
 65                  70                  75                  80

```
Thr Leu Phe Tyr Phe Lys Pro Lys Asp Ile Trp Val Leu Ala Tyr Gln
                85                  90                  95

Trp Gly Pro Thr Thr Phe Ser Tyr Lys Thr Ser Lys Asp Pro Thr Asn
            100                 105                 110

Ala Asn Gly Trp Gly Ser Ala Gln Thr Leu Phe Ser Gly Lys Ile Ser
        115                 120                 125

Gly Ser Ser Thr Gly Ala Ile Asp Gln Thr Val Ile Gly Asp Asp Thr
    130                 135                 140

Asn Met Tyr Leu Phe Phe Ala Gly Asp Asn Gly Lys Ile Tyr Arg Ala
145                 150                 155                 160

Ser Met Pro Ile Asp Arg Phe Pro Gly Ser Phe Gly Gln Tyr Gln
                165                 170                 175

Thr Ile Leu Ser Asp Ser Thr Asn Asn Leu Phe Glu Ala Val Gln Val
            180                 185                 190

Tyr Lys Leu Gln Gly Leu Asn Lys Tyr Leu Met Ile Val Glu Ala Ile
        195                 200                 205

Gly Ser Asn Gly Arg Tyr Phe Arg Ser Phe Thr Ala Asp Arg Leu Asp
    210                 215                 220

Gly Gln Trp Thr Pro Gln Ala Ala Thr Glu Ser Asn Pro Phe Ala Gly
225                 230                 235                 240

Lys Ala Asn Ser Gly Ala Thr Trp Thr Asn Asp Ile Ser His Gly Glu
                245                 250                 255

Leu Ile Arg Val Ser Ala Asp Gln Thr Phe Thr Val Asp Pro Cys Asn
            260                 265                 270

Leu Gln Leu Leu Tyr Gln Gly Arg Ser Pro Ser Ser Gly Gly Asp Tyr
        275                 280                 285

Gly Lys Leu Pro Tyr Arg Pro Gly Leu Leu Thr Leu Gln Arg
    290                 295                 300

<210> SEQ ID NO 67
<211> LENGTH: 1355
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(330)
<220> FEATURE:
<221> NAME/KEY: sig_peptide
<222> LOCATION: (1)..(57)
<220> FEATURE:
<221> NAME/KEY: mat_peptide
<222> LOCATION: (58)..(1352)
<220> FEATURE:
<221> NAME/KEY: CDS
<222> LOCATION: (403)..(655)
<220> FEATURE:
<221> NAME/KEY: CDS
<222> LOCATION: (795)..(948)
<220> FEATURE:
<221> NAME/KEY: CDS
<222> LOCATION: (1100)..(1352)

<400> SEQUENCE: 67 atg aag ctt ctc aac tcg ggt atc agc ctg ctg gca ttg gca gtg ggc      48
Met Lys Leu Leu Asn Ser Gly Ile Ser Leu Leu Ala Leu Ala Val Gly
            -15                 -10                 -5 gtc acg gcg cag tgc ccc ttg ccc tcc acc tac cgc tgg aaa tcg aca      96
Val Thr Ala Gln Cys Pro Leu Pro Ser Thr Tyr Arg Trp Lys Ser Thr
        -1  1               5                   10
```

| | |
|---|---|
| ggg gtg ctt gcc aac cca aag tcc gga tgg gtg tcc ctc aaa gac ttt<br>Gly Val Leu Ala Asn Pro Lys Ser Gly Trp Val Ser Leu Lys Asp Phe<br>    15                    20                      25 | 144 |
| acc gtc gcg ccg tac aac ggc aag cat ctc gtc tac gct acg acc cac<br>Thr Val Ala Pro Tyr Asn Gly Lys His Leu Val Tyr Ala Thr Thr His<br>30                    35                      40                      45 | 192 |
| gac acg gga tcg agc tgg ggc tcc atg aac ttc ggc ctg ttc agc agc<br>Asp Thr Gly Ser Ser Trp Gly Ser Met Asn Phe Gly Leu Phe Ser Ser<br>              50                      55                      60 | 240 |
| tgg tcc gac atg gcc acg gcc ccc cag aat ggg atg aac cag ggc act<br>Trp Ser Asp Met Ala Thr Ala Pro Gln Asn Gly Met Asn Gln Gly Thr<br>                  65                      70                      75 | 288 |
| gtt gcg ccc acc ctg ttc tac ttc aag ccg aag gat atc tgg<br>Val Ala Pro Thr Leu Phe Tyr Phe Lys Pro Lys Asp Ile Trp<br>      80                    85                      90 | 330 |
| gtacgtaatt gcatcccaga cttctttcgt ttcccttcac gatgccatac tcacgagatt | 390 |
| ccccgtctca ag gtg ctc gcg tat caa tgg ggc ccg acg acc ttc tcc tac<br>                    Val Leu Ala Tyr Gln Trp Gly Pro Thr Thr Phe Ser Tyr<br>                                      95                          100 | 441 |
| aag aca tca aag gac ccc acc aat gcg aac ggc tgg ggg tcg gcg cag<br>Lys Thr Ser Lys Asp Pro Thr Asn Ala Asn Gly Trp Gly Ser Ala Gln<br>105                    110                      115                      120 | 489 |
| acc ctc ttc tcg ggg aaa atc tcg ggc tct tcc acc ggc gcc att gac<br>Thr Leu Phe Ser Gly Lys Ile Ser Gly Ser Ser Thr Gly Ala Ile Asp<br>                        125                      130                      135 | 537 |
| cag acc gtc att ggc gat gac acc aac atg tac ctc ttc ttc gcc ggc<br>Gln Thr Val Ile Gly Asp Asp Thr Asn Met Tyr Leu Phe Phe Ala Gly<br>                    140                      145                      150 | 585 |
| gac aac ggc aag atc tac cgc gcc agc atg ccc atc gac agg ttc ccc<br>Asp Asn Gly Lys Ile Tyr Arg Ala Ser Met Pro Ile Asp Arg Phe Pro<br>                155                      160                      165 | 633 |
| ggc agc ttc ggc gac cag tac c gtacgtccaa tccgagttgt tcattcccct<br>Gly Ser Phe Gly Asp Gln Tyr<br>    170                    175 | 685 |
| ttctaactgt ctcgtgtgcc ctgggagtcg tgtggcctct tgagaggctt gtttgccact | 745 |
| ctcgagacac ccacaaaata ggcatccaat gactgacata gctgggcag ag acc atc<br>                                                                       Gln Thr Ile | 802 |
| ctg agc gat agc acc aac aac ttg ttc gag gcc gtc cag gtc tac aag<br>Leu Ser Asp Ser Thr Asn Asn Leu Phe Glu Ala Val Gln Val Tyr Lys<br>180                    185                      190 | 850 |
| ctc cag ggc ttg aac aag tat ctg atg att gtc gag gcc att ggc agc<br>Leu Gln Gly Leu Asn Lys Tyr Leu Met Ile Val Glu Ala Ile Gly Ser<br>195                    200                      205                      210 | 898 |
| aac ggg cgc tac ttc cgc tct ttc acg gct gac agg ttg gac ggg cag<br>Asn Gly Arg Tyr Phe Arg Ser Phe Thr Ala Asp Arg Leu Asp Gly Gln<br>                    215                      220                      225 | 946 |
| tg gtacgtctat ccgtctcct ttccccccct tttaagcgac tctcatagtc<br>Trp | 998 |
| tcggcgtcac cttccccgca aggcgactcc gctcctccca aaccgcccct cctcagcaac | 1058 |
| ccaagtaccg taagggtttt ctgactttaa ttcttgcaca g g acc ccc cag gca<br>                                                                         Thr Pro Gln Ala<br>                                                                              230 | 1112 |
| gcc acc gag agc aat cct ttc gcg ggc aag gca aac agc gga gcg acc<br>Ala Thr Glu Ser Asn Pro Phe Ala Gly Lys Ala Asn Ser Gly Ala Thr<br>                    235                      240                      245 | 1160 |
| tgg acc aac gat atc agc cac ggc gag ctg atc cgc gtg agc gcc gac<br>Trp Thr Asn Asp Ile Ser His Gly Glu Leu Ile Arg Val Ser Ala Asp<br>                    250                      255                      260 | 1208 |

```
cag acc ttt aca gtc gac ccg tgc aac ctg cag ctg ctc tac cag ggc       1256
Gln Thr Phe Thr Val Asp Pro Cys Asn Leu Gln Leu Leu Tyr Gln Gly
    265             270                 275 cgc tcc ccc agc tcg ggc ggc gac tac ggg aag ctg ccg tac cgg ccg       1304
Arg Ser Pro Ser Ser Gly Gly Asp Tyr Gly Lys Leu Pro Tyr Arg Pro
280             285                 290                 295 ggg ctg ttg acg ctg cag cgt acg cgt gcg cat cac cat cac cat cac       1352
Gly Leu Leu Thr Leu Gln Arg Thr Arg Ala His His His His His His
                300                 305                 310 taa                                                                    1355
```

<210> SEQ ID NO 68
<211> LENGTH: 330
<212> TYPE: PRT
<213> ORGANISM: Artificial Sequence
<220> FEATURE:
<223> OTHER INFORMATION: Synthetic Construct

<400> SEQUENCE: 68

```
Met Lys Leu Leu Asn Ser Gly Ile Ser Leu Leu Ala Leu Ala Val Gly
            -15                 -10                 -5

Val Thr Ala Gln Cys Pro Leu Pro Ser Thr Tyr Arg Trp Lys Ser Thr
        -1  1               5                   10

Gly Val Leu Ala Asn Pro Lys Ser Gly Trp Val Ser Leu Lys Asp Phe
 15                  20                  25

Thr Val Ala Pro Tyr Asn Gly Lys His Leu Val Tyr Ala Thr Thr His
30                  35                  40                  45

Asp Thr Gly Ser Ser Trp Gly Ser Met Asn Phe Gly Leu Phe Ser Ser
                 50                  55                  60

Trp Ser Asp Met Ala Thr Ala Pro Gln Asn Gly Met Asn Gln Gly Thr
                65                  70                  75

Val Ala Pro Thr Leu Phe Tyr Phe Lys Pro Lys Asp Ile Trp Val Leu
             80                  85                  90

Ala Tyr Gln Trp Gly Pro Thr Thr Phe Ser Tyr Lys Thr Ser Lys Asp
 95                 100                 105

Pro Thr Asn Ala Asn Gly Trp Gly Ser Ala Gln Thr Leu Phe Ser Gly
110                 115                 120                 125

Lys Ile Ser Gly Ser Ser Thr Gly Ala Ile Asp Gln Thr Val Ile Gly
                130                 135                 140

Asp Asp Thr Asn Met Tyr Leu Phe Phe Ala Gly Asp Asn Gly Lys Ile
                145                 150                 155

Tyr Arg Ala Ser Met Pro Ile Asp Arg Phe Pro Gly Ser Phe Gly Asp
                160                 165                 170

Gln Tyr Gln Thr Ile Leu Ser Asp Ser Thr Asn Asn Leu Phe Glu Ala
175                 180                 185

Val Gln Val Tyr Lys Leu Gln Gly Leu Asn Lys Tyr Leu Met Ile Val
190                 195                 200                 205

Glu Ala Ile Gly Ser Asn Gly Arg Tyr Phe Arg Ser Phe Thr Ala Asp
                210                 215                 220

Arg Leu Asp Gly Gln Trp Thr Pro Gln Ala Ala Thr Glu Ser Asn Pro
                225                 230                 235

Phe Ala Gly Lys Ala Asn Ser Gly Ala Thr Trp Thr Asn Asp Ile Ser
                240                 245                 250

His Gly Glu Leu Ile Arg Val Ser Ala Asp Gln Thr Phe Thr Val Asp
                255                 260                 265
```

```
Pro Cys Asn Leu Gln Leu Leu Tyr Gln Gly Arg Ser Pro Ser Ser Gly
270                 275                 280                 285

Gly Asp Tyr Gly Lys Leu Pro Tyr Arg Pro Gly Leu Leu Thr Leu Gln
                290                 295                 300

Arg Thr Arg Ala His His His His His His
                305                 310

<210> SEQ ID NO 69
<211> LENGTH: 311
<212> TYPE: PRT
<213> ORGANISM: Artificial Sequence
<220> FEATURE:
<223> OTHER INFORMATION: Mature sequence with His tag

<400> SEQUENCE: 69

Gln Cys Pro Leu Pro Ser Thr Tyr Arg Trp Lys Ser Thr Gly Val Leu
1               5                   10                  15

Ala Asn Pro Lys Ser Gly Trp Val Ser Leu Lys Asp Phe Thr Val Ala
                20                  25                  30

Pro Tyr Asn Gly Lys His Leu Val Tyr Ala Thr Thr His Asp Thr Gly
            35                  40                  45

Ser Ser Trp Gly Ser Met Asn Phe Gly Leu Phe Ser Ser Trp Ser Asp
50                  55                  60

Met Ala Thr Ala Pro Gln Asn Gly Met Asn Gln Gly Thr Val Ala Pro
65                  70                  75                  80

Thr Leu Phe Tyr Phe Lys Pro Lys Asp Ile Trp Val Leu Ala Tyr Gln
                85                  90                  95

Trp Gly Pro Thr Thr Phe Ser Tyr Lys Thr Ser Lys Asp Pro Thr Asn
            100                 105                 110

Ala Asn Gly Trp Gly Ser Ala Gln Thr Leu Phe Ser Gly Lys Ile Ser
        115                 120                 125

Gly Ser Ser Thr Gly Ala Ile Asp Gln Thr Val Ile Gly Asp Asp Thr
    130                 135                 140

Asn Met Tyr Leu Phe Phe Ala Gly Asp Asn Gly Lys Ile Tyr Arg Ala
145                 150                 155                 160

Ser Met Pro Ile Asp Arg Phe Pro Gly Ser Phe Gly Asp Gln Tyr Gln
                165                 170                 175

Thr Ile Leu Ser Asp Ser Thr Asn Asn Leu Phe Glu Ala Val Gln Val
            180                 185                 190

Tyr Lys Leu Gln Gly Leu Asn Lys Tyr Leu Met Ile Val Glu Ala Ile
        195                 200                 205

Gly Ser Asn Gly Arg Tyr Phe Arg Ser Phe Thr Ala Asp Arg Leu Asp
    210                 215                 220

Gly Gln Trp Thr Pro Gln Ala Ala Thr Glu Ser Asn Pro Phe Ala Gly
225                 230                 235                 240

Lys Ala Asn Ser Gly Ala Thr Trp Thr Asn Asp Ile Ser His Gly Glu
                245                 250                 255

Leu Ile Arg Val Ser Ala Asp Gln Thr Phe Thr Val Asp Pro Cys Asn
            260                 265                 270

Leu Gln Leu Leu Tyr Gln Gly Arg Ser Pro Ser Ser Gly Gly Asp Tyr
        275                 280                 285

Gly Lys Leu Pro Tyr Arg Pro Gly Leu Leu Thr Leu Gln Arg Thr Arg
    290                 295                 300

Ala His His His His His His
305                 310
```

<210> SEQ ID NO 70
<211> LENGTH: 384
<212> TYPE: PRT
<213> ORGANISM: Aspergillus aculeatus

<400> SEQUENCE: 70

```
Val Gly Leu Asp Gln Ala Ala Val Ala Lys Gly Leu Gln Tyr Phe Gly
1               5                   10                  15

Thr Ala Thr Asp Asn Pro Glu Leu Thr Asp Ile Pro Tyr Val Thr Gln
            20                  25                  30

Leu Asn Asn Thr Ala Asp Phe Gly Gln Ile Thr Pro Gly Asn Ser Met
        35                  40                  45

Lys Trp Asp Ala Thr Glu Pro Ser Gln Gly Thr Phe Thr Phe Thr Lys
    50                  55                  60

Gly Asp Val Ile Ala Asp Leu Ala Glu Gly Asn Gly Gln Tyr Leu Arg
65                  70                  75                  80

Cys His Thr Leu Val Trp Tyr Asn Gln Leu Pro Ser Trp Val Thr Ser
                85                  90                  95

Gly Thr Trp Thr Asn Ala Thr Leu Thr Ala Ala Leu Lys Asn His Ile
            100                 105                 110

Thr Asn Val Val Ser His Tyr Lys Gly Lys Cys Leu His Trp Asp Val
        115                 120                 125

Val Asn Glu Ala Leu Asn Asp Asp Gly Thr Tyr Arg Thr Asn Ile Phe
    130                 135                 140

Tyr Thr Thr Ile Gly Glu Ala Tyr Ile Pro Ile Ala Phe Ala Ala Ala
145                 150                 155                 160

Ala Ala Ala Asp Pro Asp Ala Lys Leu Phe Tyr Asn Asp Tyr Asn Leu
                165                 170                 175

Glu Tyr Gly Gly Ala Lys Ala Ala Ser Ala Arg Ala Ile Val Gln Leu
            180                 185                 190

Val Lys Asn Ala Gly Ala Lys Ile Asp Gly Val Gly Leu Gln Ala His
        195                 200                 205

Phe Ser Val Gly Thr Val Pro Ser Thr Ser Ser Leu Val Ser Val Leu
    210                 215                 220

Gln Ser Phe Thr Ala Leu Gly Val Glu Val Ala Tyr Thr Glu Ala Asp
225                 230                 235                 240

Val Arg Ile Leu Leu Pro Thr Thr Ala Thr Thr Leu Ala Gln Gln Ser
                245                 250                 255

Ser Asp Phe Gln Ala Leu Val Gln Ser Cys Val Gln Thr Thr Gly Cys
            260                 265                 270

Val Gly Phe Thr Ile Trp Asp Trp Thr Asp Lys Tyr Ser Trp Val Pro
        275                 280                 285

Ser Thr Phe Ser Gly Tyr Gly Ala Ala Leu Pro Trp Asp Glu Asn Leu
    290                 295                 300

Val Lys Lys Pro Ala Tyr Asn Gly Leu Leu Ala Gly Met Gly Val Thr
305                 310                 315                 320

Val Thr Thr Thr Thr Thr Thr Thr Ala Thr Ala Thr Gly Lys Thr
                325                 330                 335

Thr Thr Thr Thr Thr Gly Ala Thr Ser Thr Gly Thr Thr Ala Ala His
            340                 345                 350

Trp Gly Gln Cys Gly Gly Leu Asn Trp Ser Gly Pro Thr Ala Cys Ala
        355                 360                 365

Thr Gly Tyr Thr Cys Thr Tyr Val Asn Asp Tyr Tyr Ser Gln Cys Leu
    370                 375                 380
```

<210> SEQ ID NO 71
<211> LENGTH: 288
<212> TYPE: PRT
<213> ORGANISM: Clostridium acetobutylicum

<400> SEQUENCE: 71

| Ala | Met | Ser | His | Ser | Lys | Phe | Val | Gly | Asn | Ile | Ile | Ala | Gly | Ser | Ile |
|---|---|---|---|---|---|---|---|---|---|---|---|---|---|---|---|
| 1 | | | | 5 | | | | | 10 | | | | | 15 | |

| Pro | Ser | Asn | Phe | Asp | Thr | Tyr | Trp | Asn | Gln | Val | Thr | Pro | Glu | Asn | Ala |
| | | | 20 | | | | | 25 | | | | | 30 | | |

| Thr | Lys | Trp | Gly | Ala | Ile | Glu | Tyr | Gly | Arg | Gly | Asn | Tyr | Asn | Trp | Gly |
| | | 35 | | | | | 40 | | | | | 45 | | | |

| Ser | Ala | Asp | Leu | Ile | Tyr | Asn | Tyr | Ala | Arg | Ser | Lys | Asn | Met | Pro | Phe |
| | 50 | | | | | 55 | | | | | 60 | | | | |

| Lys | Phe | His | Asn | Leu | Val | Trp | Gly | Ser | Gln | Gln | Leu | Thr | Trp | Leu | Ser |
| 65 | | | | | 70 | | | | | 75 | | | | | 80 |

| Asn | Leu | Ser | Pro | Gln | Asp | Gln | Lys | Ser | Glu | Val | Ser | Lys | Trp | Ile | Ala |
| | | | | 85 | | | | | 90 | | | | | 95 | |

| Ala | Ala | Gly | Gln | Arg | Tyr | Ser | Gly | Ser | Ala | Phe | Val | Asp | Val | Val | Asn |
| | | | 100 | | | | | 105 | | | | | 110 | | |

| Glu | Pro | Leu | His | Thr | Gln | Pro | Ser | Tyr | Lys | Asn | Ala | Leu | Gly | Gly | Asp |
| | | 115 | | | | | 120 | | | | | 125 | | | |

| Gly | Ser | Thr | Gly | Tyr | Asp | Trp | Ile | Val | Trp | Ser | Tyr | Gln | Gln | Ala | Arg |
| 130 | | | | | 135 | | | | | 140 | | | | | |

| Lys | Ala | Phe | Pro | Asn | Ser | Lys | Leu | Leu | Ile | Asn | Glu | Tyr | Gly | Ile | Ile |
| 145 | | | | | 150 | | | | | 155 | | | | | 160 |

| Gly | Asp | Pro | Asn | Ala | Ala | Ala | Asn | Tyr | Val | Lys | Ile | Ile | Asn | Val | Leu |
| | | | | 165 | | | | | 170 | | | | | 175 | |

| Lys | Ser | Lys | Gly | Leu | Ile | Asp | Gly | Ile | Gly | Ile | Gln | Cys | His | Tyr | Phe |
| | | | 180 | | | | | 185 | | | | | 190 | | |

| Asn | Met | Asp | Asn | Val | Ser | Val | Gly | Thr | Met | Asn | Tyr | Val | Leu | Asn | Met |
| | | 195 | | | | | 200 | | | | | 205 | | | |

| Leu | Ser | Asn | Thr | Gly | Leu | Pro | Ile | Tyr | Val | Ser | Glu | Leu | Asp | Met | Thr |
| 210 | | | | | 215 | | | | | 220 | | | | | |

| Gly | Asp | Asp | Ser | Thr | Gln | Leu | Ala | Arg | Tyr | Gln | Gln | Lys | Phe | Pro | Val |
| 225 | | | | | 230 | | | | | 235 | | | | | 240 |

| Leu | Tyr | Gln | Asn | Pro | Asn | Val | Lys | Gly | Ile | Thr | Leu | Trp | Gly | Tyr | Met |
| | | | | 245 | | | | | 250 | | | | | 255 | |

| Gln | Gly | Gln | Thr | Trp | Asn | Ser | Gly | Thr | Tyr | Leu | Val | Asn | Ser | Asn | Gly |
| | | | 260 | | | | | 265 | | | | | 270 | | |

| Thr | Glu | Arg | Pro | Ala | Leu | Lys | Trp | Leu | Arg | Ser | Tyr | Leu | Ala | Ser | His |
| | | 275 | | | | | 280 | | | | | 285 | | | |

<210> SEQ ID NO 72
<211> LENGTH: 308
<212> TYPE: PRT
<213> ORGANISM: Aspergillus aculeatus

<400> SEQUENCE: 72

| Asn | Pro | Ile | Glu | Pro | Arg | Gln | Ala | Ser | Val | Ser | Ile | Asp | Ala | Lys | Phe |
|---|---|---|---|---|---|---|---|---|---|---|---|---|---|---|---|
| 1 | | | | 5 | | | | | 10 | | | | | 15 | |

| Lys | Ala | His | Gly | Lys | Lys | Tyr | Leu | Gly | Thr | Ile | Gly | Asp | Gln | Tyr | Thr |
| | | | 20 | | | | | 25 | | | | | 30 | | |

| Leu | Asn | Lys | Asn | Ala | Lys | Thr | Pro | Ala | Ile | Ile | Lys | Ala | Asp | Phe | Gly |
| | | 35 | | | | | 40 | | | | | 45 | | | |

Gln Leu Thr Pro Glu Asn Ser Met Lys Trp Asp Ala Thr Glu Pro Asn
                50                  55                  60

Arg Gly Gln Phe Ser Phe Ser Gly Ser Asp Tyr Leu Val Asn Phe Ala
 65                  70                  75                  80

Gln Ser Asn Gly Lys Leu Ile Arg Gly His Thr Leu Val Trp His Ser
                85                  90                  95

Gln Leu Pro Ser Trp Val Gln Ser Ile Ser Asp Lys Asn Thr Leu Ile
               100                 105                 110

Gln Val Met Gln Asn His Ile Thr Thr Val Met Gln Arg Tyr Lys Gly
               115                 120                 125

Lys Val Tyr Ala Trp Asp Val Val Asn Glu Ile Phe Asn Glu Asp Gly
       130                 135                 140

Ser Leu Cys Gln Ser His Phe Tyr Asn Val Ile Gly Glu Asp Tyr Val
145                 150                 155                 160

Arg Ile Ala Phe Glu Thr Ala Arg Ala Val Asp Pro Asn Ala Lys Leu
                165                 170                 175

Tyr Ile Asn Asp Tyr Asn Leu Asp Ser Ala Ser Tyr Pro Lys Leu Thr
               180                 185                 190

Gly Leu Val Asn His Val Lys Lys Trp Val Ala Ala Gly Val Pro Ile
               195                 200                 205

Asp Gly Ile Gly Ser Gln Thr His Leu Ser Ala Gly Ala Gly Ala Ala
       210                 215                 220

Val Ser Gly Ala Leu Asn Ala Leu Ala Gly Ala Gly Thr Lys Glu Val
225                 230                 235                 240

Ala Ile Thr Glu Leu Asp Ile Ala Gly Ala Ser Ser Thr Asp Tyr Val
                245                 250                 255

Asn Val Val Lys Ala Cys Leu Asn Gln Pro Lys Cys Val Gly Ile Thr
               260                 265                 270

Val Trp Gly Ser Ser Asp Pro Asp Ser Trp Arg Ser Ser Ser Ser Pro
       275                 280                 285

Leu Leu Phe Asp Ser Asn Tyr Asn Pro Lys Ala Ala Tyr Thr Ala Ile
       290                 295                 300

Ala Asn Ala Leu
305

<210> SEQ ID NO 73
<211> LENGTH: 195
<212> TYPE: PRT
<213> ORGANISM: Thermomyces lanuginosus

<400> SEQUENCE: 73

Arg Gln Thr Thr Pro Asn Ser Glu Gly Trp His Asp Gly Tyr Tyr Tyr
  1               5                  10                  15

Ser Trp Trp Ser Asp Gly Gly Ala Gln Ala Thr Tyr Thr Asn Leu Glu
                 20                  25                  30

Gly Gly Thr Tyr Glu Ile Ser Trp Gly Asp Gly Asn Leu Val Gly
           35                  40                  45

Gly Lys Gly Trp Asn Pro Gly Leu Asn Ala Arg Ala Ile His Phe Glu
        50                  55                  60

Gly Val Tyr Gln Pro Asn Gly Asn Ser Tyr Leu Ala Val Tyr Gly Trp
 65                  70                  75                  80

Thr Arg Asn Pro Leu Val Glu Tyr Tyr Ile Val Glu Asn Phe Gly Thr
                 85                  90                  95

Tyr Asp Pro Ser Ser Gly Ala Thr Asp Leu Gly Thr Val Glu Cys Asp

```
            100                 105                 110
Gly Ser Ile Tyr Arg Leu Gly Lys Thr Thr Arg Val Asn Ala Pro Ser
            115                 120                 125

Ile Asp Gly Thr Gln Thr Phe Asp Gln Tyr Trp Ser Val Arg Gln Asp
        130                 135                 140

Lys Arg Thr Ser Gly Thr Val Gln Thr Gly Cys His Phe Asp Ala Trp
145                 150                 155                 160

Ala Arg Ala Gly Leu Asn Val Asn Gly Asp His Tyr Tyr Gln Ile Val
                165                 170                 175

Ala Thr Glu Gly Tyr Phe Ser Ser Gly Tyr Ala Arg Ile Thr Val Ala
            180                 185                 190

Asp Val Gly
        195

<210> SEQ ID NO 74
<211> LENGTH: 203
<212> TYPE: PRT
<213> ORGANISM: Dictyoglomus thermophilum

<400> SEQUENCE: 74

Gln Thr Ser Ile Thr Leu Thr Ser Asn Ala Ser Gly Thr Phe Asp Gly
1               5                   10                  15

Tyr Tyr Tyr Glu Leu Trp Lys Asp Thr Gly Asn Thr Thr Met Thr Val
            20                  25                  30

Tyr Thr Gln Gly Arg Phe Ser Cys Gln Trp Ser Asn Ile Asn Asn Ala
        35                  40                  45

Leu Phe Arg Thr Gly Lys Lys Tyr Asn Gln Asn Trp Gln Ser Leu Gly
    50                  55                  60

Thr Ile Arg Ile Thr Tyr Ser Ala Thr Tyr Asn Pro Asn Gly Asn Ser
65                  70                  75                  80

Tyr Leu Cys Ile Tyr Gly Trp Ser Thr Asn Pro Leu Val Glu Phe Tyr
                85                  90                  95

Ile Val Glu Ser Trp Gly Asn Trp Arg Pro Pro Gly Ala Thr Ser Leu
            100                 105                 110

Gly Gln Val Thr Ile Asp Gly Gly Thr Tyr Asp Ile Tyr Arg Thr Thr
        115                 120                 125

Arg Val Asn Gln Pro Ser Ile Val Gly Thr Ala Thr Phe Asp Gln Tyr
    130                 135                 140

Trp Ser Val Arg Thr Ser Lys Arg Thr Ser Gly Thr Val Thr Val Thr
145                 150                 155                 160

Asp His Phe Arg Ala Trp Ala Asn Arg Gly Leu Asn Leu Gly Thr Ile
                165                 170                 175

Asp Gln Ile Thr Leu Cys Val Glu Gly Tyr Gln Ser Ser Gly Ser Ala
            180                 185                 190

Asn Ile Thr Gln Asn Thr Phe Ser Gln Gly Ser
        195                 200

<210> SEQ ID NO 75
<211> LENGTH: 182
<212> TYPE: PRT
<213> ORGANISM: Paenibacillus Pabuli

<400> SEQUENCE: 75

Thr Asp Tyr Trp Gln Asn Trp Thr Asp Gly Gly Gly Thr Val Asn Ala
1               5                   10                  15

Val Asn Gly Ser Gly Gly Asn Tyr Ser Val Asn Trp Gln Asn Thr Gly
```

```
                    20                  25                  30
Asn Phe Val Val Gly Lys Gly Trp Thr Tyr Gly Thr Pro Asn Arg Val
                35                  40                  45

Val Asn Tyr Asn Ala Gly Val Phe Ser Pro Ser Gly Asn Gly Tyr Leu
        50                  55                  60

Thr Phe Tyr Gly Trp Thr Arg Asn Ala Leu Ile Glu Tyr Tyr Val Val
65                  70                  75                  80

Asp Asn Trp Gly Thr Tyr Arg Pro Thr Gly Tyr Lys Gly Thr Val
                    85                  90                  95

Thr Ser Asp Gly Gly Thr Tyr Asp Ile Tyr Thr Thr Met Arg Tyr Asn
                100                 105                 110

Gln Pro Ser Ile Asp Gly Tyr Ser Thr Phe Pro Gln Tyr Trp Ser Val
            115                 120                 125

Arg Gln Ser Lys Arg Pro Ile Gly Val Asn Ser Gln Ile Thr Phe Gln
        130                 135                 140

Asn His Val Asn Ala Trp Ala Ser Lys Gly Met Tyr Leu Gly Asn Ser
145                 150                 155                 160

Trp Ser Tyr Gln Val Met Ala Thr Glu Gly Tyr Gln Ser Ser Gly Ser
                    165                 170                 175

Ser Asn Val Thr Val Trp
                180

<210> SEQ ID NO 76
<211> LENGTH: 633
<212> TYPE: DNA
<213> ORGANISM: Geobacillus stearothermophilus
<220> FEATURE:
<221> NAME/KEY: CDS
<222> LOCATION: (1)..(630)
<220> FEATURE:
<221> NAME/KEY: sig_peptide
<222> LOCATION: (1)..(81)
<220> FEATURE:
<221> NAME/KEY: mat_peptide
<222> LOCATION: (82)..(633)

<400> SEQUENCE: 76 atg aag tta aag aag aag atg ctt act cta ctc ctg acg gct tcg atg      48
Met Lys Leu Lys Lys Lys Met Leu Thr Leu Leu Leu Thr Ala Ser Met
        -25                 -20                 -15 agt ttc ggt tta ttt ggg gca acc tca agt gca gca acg gat tat tgg      96
Ser Phe Gly Leu Phe Gly Ala Thr Ser Ser Ala Ala Thr Asp Tyr Trp
    -10                 -5              -1  1                   5 caa tat tgg acg gat ggc ggc ggg atg gtg aat gcg gtt aat ggg ccc     144
Gln Tyr Trp Thr Asp Gly Gly Gly Met Val Asn Ala Val Asn Gly Pro
                    10                  15                  20 gga ggc aat tac agt gtt acc tgg caa aat acc ggg aac ttc gtg gtc     192
Gly Gly Asn Tyr Ser Val Thr Trp Gln Asn Thr Gly Asn Phe Val Val
                25                  30                  35 ggc aaa ggc tgg acg gtt gga tcg ccg aat cgg gtg atc aac tac aat     240
Gly Lys Gly Trp Thr Val Gly Ser Pro Asn Arg Val Ile Asn Tyr Asn
            40                  45                  50 gcg ggc atc tgg gaa cct tcg ggg aac ggg tac tta acc ctt tac gga     288
Ala Gly Ile Trp Glu Pro Ser Gly Asn Gly Tyr Leu Thr Leu Tyr Gly
        55                  60                  65 tgg acg agg aac gcg ctg atc gag tat tac gtt gtg gac agc tgg ggg     336
Trp Thr Arg Asn Ala Leu Ile Glu Tyr Tyr Val Val Asp Ser Trp Gly
70                  75                  80                  85 acg tac cgg cct acc ggc aat tac aag gga acg gtg aac agc gac gga     384
Thr Tyr Arg Pro Thr Gly Asn Tyr Lys Gly Thr Val Asn Ser Asp Gly
```

```
              90                  95                 100
gga act tac gat att tat acg acc atg cgt tat aat gca cct tcc att         432
Gly Thr Tyr Asp Ile Tyr Thr Thr Met Arg Tyr Asn Ala Pro Ser Ile
            105                 110                 115 gat ggc acg cag acg ttc caa cag ttc tgg agt gtg cgg caa tcg aaa         480
Asp Gly Thr Gln Thr Phe Gln Gln Phe Trp Ser Val Arg Gln Ser Lys
        120                 125                 130 cga cct acc ggc agc aac gta tcc atc acc ttc agc aat cac gtg aat         528
Arg Pro Thr Gly Ser Asn Val Ser Ile Thr Phe Ser Asn His Val Asn
    135                 140                 145 gcc tgg aga agc aag ggc atg aac ctg ggc agc agc tgg gct tat cag         576
Ala Trp Arg Ser Lys Gly Met Asn Leu Gly Ser Ser Trp Ala Tyr Gln
150                 155                 160                 165 gtt ctg gcg acg gaa ggc tat cag agc agc gga aga tcc aac gtt acg         624
Val Leu Ala Thr Glu Gly Tyr Gln Ser Ser Gly Arg Ser Asn Val Thr
                170                 175                 180 gtt tgg taa                                                             633
Val Trp <210> SEQ ID NO 77
<211> LENGTH: 210
<212> TYPE: PRT
<213> ORGANISM: Geobacillus stearothermophilus

<400> SEQUENCE: 77

Met Lys Leu Lys Lys Lys Met Leu Thr Leu Leu Thr Ala Ser Met
        -25                 -20                 -15

Ser Phe Gly Leu Phe Gly Ala Thr Ser Ser Ala Ala Thr Asp Tyr Trp
    -10                  -5              -1   1                   5

Gln Tyr Trp Thr Asp Gly Gly Met Val Asn Ala Val Asn Gly Pro
                10                  15                  20

Gly Gly Asn Tyr Ser Val Thr Trp Gln Asn Thr Gly Asn Phe Val Val
            25                  30                  35

Gly Lys Gly Trp Thr Val Gly Ser Pro Asn Arg Val Ile Asn Tyr Asn
        40                  45                  50

Ala Gly Ile Trp Glu Pro Ser Gly Asn Gly Tyr Leu Thr Leu Tyr Gly
    55                  60                  65

Trp Thr Arg Asn Ala Leu Ile Glu Tyr Tyr Val Val Asp Ser Trp Gly
70                  75                  80                  85

Thr Tyr Arg Pro Thr Gly Asn Tyr Lys Gly Thr Val Asn Ser Asp Gly
                90                  95                 100

Gly Thr Tyr Asp Ile Tyr Thr Thr Met Arg Tyr Asn Ala Pro Ser Ile
            105                 110                 115

Asp Gly Thr Gln Thr Phe Gln Gln Phe Trp Ser Val Arg Gln Ser Lys
        120                 125                 130

Arg Pro Thr Gly Ser Asn Val Ser Ile Thr Phe Ser Asn His Val Asn
    135                 140                 145

Ala Trp Arg Ser Lys Gly Met Asn Leu Gly Ser Ser Trp Ala Tyr Gln
150                 155                 160                 165

Val Leu Ala Thr Glu Gly Tyr Gln Ser Ser Gly Arg Ser Asn Val Thr
                170                 175                 180

Val Trp

<210> SEQ ID NO 78
<211> LENGTH: 183
<212> TYPE: PRT
<213> ORGANISM: Geobacillus stearothermophilus
```

<400> SEQUENCE: 78

| | | | | | | | | | | | | | | | |
|---|---|---|---|---|---|---|---|---|---|---|---|---|---|---|---|
| Ala | Thr | Asp | Tyr | Trp | Gln | Tyr | Trp | Thr | Asp | Gly | Gly | Met | Val | Asn | |
| 1 | | | | 5 | | | | | 10 | | | | | 15 | |
| Ala | Val | Asn | Gly | Pro | Gly | Gly | Asn | Tyr | Ser | Val | Thr | Trp | Gln | Asn | Thr |
| | | | 20 | | | | | 25 | | | | | 30 | | |
| Gly | Asn | Phe | Val | Val | Gly | Lys | Gly | Trp | Thr | Val | Gly | Ser | Pro | Asn | Arg |
| | | | 35 | | | | 40 | | | | | 45 | | | |
| Val | Ile | Asn | Tyr | Asn | Ala | Gly | Ile | Trp | Glu | Pro | Ser | Gly | Asn | Gly | Tyr |
| | 50 | | | | | 55 | | | | | 60 | | | | |
| Leu | Thr | Leu | Tyr | Gly | Trp | Thr | Arg | Asn | Ala | Leu | Ile | Glu | Tyr | Tyr | Val |
| 65 | | | | | 70 | | | | | 75 | | | | | 80 |
| Val | Asp | Ser | Trp | Gly | Thr | Tyr | Arg | Pro | Thr | Gly | Asn | Tyr | Lys | Gly | Thr |
| | | | | 85 | | | | | 90 | | | | | 95 | |
| Val | Asn | Ser | Asp | Gly | Gly | Thr | Tyr | Asp | Ile | Tyr | Thr | Thr | Met | Arg | Tyr |
| | | | | 100 | | | | | 105 | | | | | 110 | |
| Asn | Ala | Pro | Ser | Ile | Asp | Gly | Thr | Gln | Thr | Phe | Gln | Gln | Phe | Trp | Ser |
| | | | 115 | | | | | 120 | | | | | 125 | | |
| Val | Arg | Gln | Ser | Lys | Arg | Pro | Thr | Gly | Ser | Asn | Val | Ser | Ile | Thr | Phe |
| | 130 | | | | | 135 | | | | | 140 | | | | |
| Ser | Asn | His | Val | Asn | Ala | Trp | Arg | Ser | Lys | Gly | Met | Asn | Leu | Gly | Ser |
| 145 | | | | | 150 | | | | | 155 | | | | | 160 |
| Ser | Trp | Ala | Tyr | Gln | Val | Leu | Ala | Thr | Glu | Gly | Tyr | Gln | Ser | Ser | Gly |
| | | | | 165 | | | | | 170 | | | | | 175 | |
| Arg | Ser | Asn | Val | Thr | Val | Trp | | | | | | | | | |
| | | | | 180 | | | | | | | | | | | |

<210> SEQ ID NO 79
<211> LENGTH: 627
<212> TYPE: DNA
<213> ORGANISM: Artificial Sequence
<220> FEATURE:
<223> OTHER INFORMATION: Synthetic construct
<220> FEATURE:
<221> NAME/KEY: CDS
<222> LOCATION: (1)..(624)
<220> FEATURE:
<221> NAME/KEY: sig_peptide
<222> LOCATION: (1)..(81)
<220> FEATURE:
<221> NAME/KEY: mat_peptide
<222> LOCATION: (82)..(624)

<400> SEQUENCE: 79

| | | | | | | | | | | | | | | | | |
|---|---|---|---|---|---|---|---|---|---|---|---|---|---|---|---|---|
| atg | aag | aaa | ccg | ttg | ggg | aaa | att | gtc | gca | agc | acc | gca | cta | ctc | att | 48 |
| Met | Lys | Lys | Pro | Leu | Gly | Lys | Ile | Val | Ala | Ser | Thr | Ala | Leu | Leu | Ile | |
| | -25 | | | | | -20 | | | | | -15 | | | | | |
| tct | gtt | gct | ttt | agt | tca | tcg | atc | gca | tcg | gct | gac | tat | tgg | caa | tac | 96 |
| Ser | Val | Ala | Phe | Ser | Ser | Ser | Ile | Ala | Ser | Ala | Asp | Tyr | Trp | Gln | Tyr | |
| | -10 | | | | | -5 | | | | -1 | 1 | | | | 5 | |
| tgg | aca | gat | ggt | ggc | ggt | atg | gtt | aac | gct | gtt | aac | ggt | cct | gga | ggc | 144 |
| Trp | Thr | Asp | Gly | Gly | Gly | Met | Val | Asn | Ala | Val | Asn | Gly | Pro | Gly | Gly | |
| | | | 10 | | | | | 15 | | | | | 20 | | | |
| aac | tat | tct | gtt | act | tgg | cag | aac | aca | ggc | aac | ttc | gtt | gtt | ggc | aaa | 192 |
| Asn | Tyr | Ser | Val | Thr | Trp | Gln | Asn | Thr | Gly | Asn | Phe | Val | Val | Gly | Lys | |
| | | 25 | | | | | 30 | | | | | 35 | | | | |
| gga | tgg | acg | gtt | ggt | tct | cct | aac | cgc | gtt | atc | aac | tac | aac | gct | ggc | 240 |
| Gly | Trp | Thr | Val | Gly | Ser | Pro | Asn | Arg | Val | Ile | Asn | Tyr | Asn | Ala | Gly | |
| | | 40 | | | | | 45 | | | | | 50 | | | | |
| atc | tgg | gag | cct | tct | ggc | aac | ggt | tac | ctt | acg | ctt | tac | ggc | tgg | aca | 288 |

```
Ile Trp Glu Pro Ser Gly Asn Gly Tyr Leu Thr Leu Tyr Gly Trp Thr
    55                  60                  65 cgc aac gct ctt atc gag tac tat gtt gtt gac tct tgg ggc act tat         336
Arg Asn Ala Leu Ile Glu Tyr Tyr Val Val Asp Ser Trp Gly Thr Tyr
70                  75                  80                  85 cgc cct acg ggc aac tac aaa ggc acg gta aac tct gat ggt ggc acg         384
Arg Pro Thr Gly Asn Tyr Lys Gly Thr Val Asn Ser Asp Gly Gly Thr
                90                  95                  100 tac gac atc tat aca aca atg cgc tac aac gct cct tct atc gac ggc         432
Tyr Asp Ile Tyr Thr Thr Met Arg Tyr Asn Ala Pro Ser Ile Asp Gly
        105                 110                 115 act cag act ttt caa cag ttt tgg tca gtt cgc caa tct aaa cgc cct         480
Thr Gln Thr Phe Gln Gln Phe Trp Ser Val Arg Gln Ser Lys Arg Pro
    120                 125                 130 aca ggc tct aac gtt tct atc aca ttc tct aac cat gtt aac gct tgg         528
Thr Gly Ser Asn Val Ser Ile Thr Phe Ser Asn His Val Asn Ala Trp
135                 140                 145 cgc tct aaa ggc atg aac ctt ggc agc tca tgg gct tat caa gta ctt         576
Arg Ser Lys Gly Met Asn Leu Gly Ser Ser Trp Ala Tyr Gln Val Leu
150                 155                 160                 165 gca act gag ggc tac caa tct tct gga cgc tct aac gtt aca gta tgg         624
Ala Thr Glu Gly Tyr Gln Ser Ser Gly Arg Ser Asn Val Thr Val Trp
            170                 175                 180 taa                                                                      627

<210> SEQ ID NO 80
<211> LENGTH: 208
<212> TYPE: PRT
<213> ORGANISM: Artificial Sequence
<220> FEATURE:
<223> OTHER INFORMATION: Synthetic Construct

<400> SEQUENCE: 80

Met Lys Lys Pro Leu Gly Lys Ile Val Ala Ser Thr Ala Leu Leu Ile
        -25                 -20                 -15

Ser Val Ala Phe Ser Ser Ser Ile Ala Ser Ala Asp Tyr Trp Gln Tyr
    -10                 -5              -1  1                   5

Trp Thr Asp Gly Gly Gly Met Val Asn Ala Val Asn Gly Pro Gly Gly
                10                  15                  20

Asn Tyr Ser Val Thr Trp Gln Asn Thr Gly Asn Phe Val Val Gly Lys
            25                  30                  35

Gly Trp Thr Val Gly Ser Pro Asn Arg Val Ile Asn Tyr Asn Ala Gly
        40                  45                  50

Ile Trp Glu Pro Ser Gly Asn Gly Tyr Leu Thr Leu Tyr Gly Trp Thr
    55                  60                  65

Arg Asn Ala Leu Ile Glu Tyr Tyr Val Val Asp Ser Trp Gly Thr Tyr
70                  75                  80                  85

Arg Pro Thr Gly Asn Tyr Lys Gly Thr Val Asn Ser Asp Gly Gly Thr
                90                  95                  100

Tyr Asp Ile Tyr Thr Thr Met Arg Tyr Asn Ala Pro Ser Ile Asp Gly
        105                 110                 115

Thr Gln Thr Phe Gln Gln Phe Trp Ser Val Arg Gln Ser Lys Arg Pro
    120                 125                 130

Thr Gly Ser Asn Val Ser Ile Thr Phe Ser Asn His Val Asn Ala Trp
135                 140                 145

Arg Ser Lys Gly Met Asn Leu Gly Ser Ser Trp Ala Tyr Gln Val Leu
150                 155                 160                 165
```

```
Ala Thr Glu Gly Tyr Gln Ser Ser Gly Arg Ser Asn Val Thr Val Trp
                170                 175                 180

<210> SEQ ID NO 81
<211> LENGTH: 181
<212> TYPE: PRT
<213> ORGANISM: Artificial Sequence
<220> FEATURE:
<223> OTHER INFORMATION: Mature sequence

<400> SEQUENCE: 81

Asp Tyr Trp Gln Tyr Trp Thr Asp Gly Gly Gly Met Val Asn Ala Val
1               5                   10                  15

Asn Gly Pro Gly Gly Asn Tyr Ser Val Thr Trp Gln Asn Thr Gly Asn
            20                  25                  30

Phe Val Val Gly Lys Gly Trp Thr Val Gly Ser Pro Asn Arg Val Ile
        35                  40                  45

Asn Tyr Asn Ala Gly Ile Trp Glu Pro Ser Gly Asn Gly Tyr Leu Thr
    50                  55                  60

Leu Tyr Gly Trp Thr Arg Asn Ala Leu Ile Glu Tyr Tyr Val Val Asp
65                  70                  75                  80

Ser Trp Gly Thr Tyr Arg Pro Thr Gly Asn Tyr Lys Gly Thr Val Asn
                85                  90                  95

Ser Asp Gly Gly Thr Tyr Asp Ile Tyr Thr Thr Met Arg Tyr Asn Ala
            100                 105                 110

Pro Ser Ile Asp Gly Thr Gln Thr Phe Gln Gln Phe Trp Ser Val Arg
        115                 120                 125

Gln Ser Lys Arg Pro Thr Gly Ser Asn Val Ser Ile Thr Phe Ser Asn
    130                 135                 140

His Val Asn Ala Trp Arg Ser Lys Gly Met Asn Leu Gly Ser Ser Trp
145                 150                 155                 160

Ala Tyr Gln Val Leu Ala Thr Glu Gly Tyr Gln Ser Ser Gly Arg Ser
                165                 170                 175

Asn Val Thr Val Trp
            180

<210> SEQ ID NO 82
<211> LENGTH: 1026
<212> TYPE: DNA
<213> ORGANISM: Streptomyces beijiangensis
<220> FEATURE:
<221> NAME/KEY: CDS
<222> LOCATION: (1)..(1023)
<220> FEATURE:
<221> NAME/KEY: sig_peptide
<222> LOCATION: (1)..(126)
<220> FEATURE:
<221> NAME/KEY: mat_peptide
<222> LOCATION: (127)..(1023)

<400> SEQUENCE: 82 atg agc gca ccc gtg cca ctg ccc cgc aga cgc aga ccc ggc cgc ttc      48
Met Ser Ala Pro Val Pro Leu Pro Arg Arg Arg Pro Gly Arg Phe
        -40                 -35                 -30 atg acc ctg ctg aga agc tcc tgg gcg atc gcc ctg gcc gcg gtc gcc      96
Met Thr Leu Leu Arg Ser Ser Trp Ala Ile Ala Leu Ala Ala Val Ala
    -25                 -20                 -15 gtg ctg ctg ctg ccc aac gcc gcc agc gcc gac acc gtc gtc aac tcg     144
Val Leu Leu Leu Pro Asn Ala Ala Ser Ala Asp Thr Val Val Asn Ser
-10                 -5              -1  1                   5 aac cag acc ggc acc aac aac ggt tac tac tac tcg cac tgg agc gat     192
```

```
                Asn Gln Thr Gly Thr Asn Asn Gly Tyr Tyr Ser His Trp Ser Asp
                         10                  15                  20 ggc ggc ggc tcg gtg tcg atg acg ctg ggc tcg ggc ggc aac tac ggc        240
Gly Gly Gly Ser Val Ser Met Thr Leu Gly Ser Gly Gly Asn Tyr Gly
             25                  30                  35 tac cag tgg agc aac gtc gga aac ttc gtc ggc ggc aag ggg tgg agc        288
Tyr Gln Trp Ser Asn Val Gly Asn Phe Val Gly Gly Lys Gly Trp Ser
     40                  45                  50 acc ggc gga cgc aag tcc gtg aac tac tcc ggc agt ttc aac ccg tcg        336
Thr Gly Gly Arg Lys Ser Val Asn Tyr Ser Gly Ser Phe Asn Pro Ser
55                  60                  65                  70 ggc aac gcc tac ctc gcg ctc tac ggc tgg acc acc aac ccg ctg gtc        384
Gly Asn Ala Tyr Leu Ala Leu Tyr Gly Trp Thr Thr Asn Pro Leu Val
                 75                  80                  85 gag tac tac gtc gtc gag aac ttc ggc acg tac cgc ccc acc ggc acc        432
Glu Tyr Tyr Val Val Glu Asn Phe Gly Thr Tyr Arg Pro Thr Gly Thr
             90                  95                 100 ttc aag ggc acg gtc acc agc gac gga ggc acc tac gac atc tat gag        480
Phe Lys Gly Thr Val Thr Ser Asp Gly Gly Thr Tyr Asp Ile Tyr Glu
        105                 110                 115 acg acc cgg gtg aac cag ccc tcg atc gag ggc acc aag acc ttc aag        528
Thr Thr Arg Val Asn Gln Pro Ser Ile Glu Gly Thr Lys Thr Phe Lys
    120                 125                 130 cag tac tgg agc gtc cgc cag tcg aag cgg acg ggg ggc acc atc acc        576
Gln Tyr Trp Ser Val Arg Gln Ser Lys Arg Thr Gly Gly Thr Ile Thr
135                 140                 145                 150 acg ggc aac cac ttc gac gcc tgg tcg agc cac ggc atg agc atg ggt        624
Thr Gly Asn His Phe Asp Ala Trp Ser Ser His Gly Met Ser Met Gly
                155                 160                 165 tcc ttc aac tac atg atc atg gcg acc gag ggc tac cag agc agc ggc        672
Ser Phe Asn Tyr Met Ile Met Ala Thr Glu Gly Tyr Gln Ser Ser Gly
            170                 175                 180 agc tcc aac atc acc gtc agc gag ggc agt tcc ggt ggc ggg acg ggc        720
Ser Ser Asn Ile Thr Val Ser Glu Gly Ser Ser Gly Gly Gly Thr Gly
        185                 190                 195 ggt ggc ggc acg ggc ggc ggt acg ggc ggc ggc ggc tcc ggc ggc tgc        768
Gly Gly Gly Thr Gly Gly Gly Thr Gly Gly Gly Gly Ser Gly Gly Cys
200                 205                 210 acc gcg acg ctt tcc gcg gga gac aag tgg agc gac cgc tac aac ctg        816
Thr Ala Thr Leu Ser Ala Gly Asp Lys Trp Ser Asp Arg Tyr Asn Leu
215                 220                 225                 230 aac gtc tcc gtc tcc ggc gcc ggc aac tgg acc gtc acg atg aag gtc        864
Asn Val Ser Val Ser Gly Ala Gly Asn Trp Thr Val Thr Met Lys Val
                235                 240                 245 ccc tcg ccc gag aag gtg ctg tcc acc tgg aac gtg agc gcc gcc tac        912
Pro Ser Pro Glu Lys Val Leu Ser Thr Trp Asn Val Ser Ala Ala Tyr
            250                 255                 260 ccg gac agc cag acc ctc gtg gcc aag tcc aac ggc agc ggc agc aac        960
Pro Asp Ser Gln Thr Leu Val Ala Lys Ser Asn Gly Ser Gly Ser Asn
        265                 270                 275 tgg ggg gcg acc atc cag acc aac ggc tcc tgg acg tgg ccc acg gtc       1008
Trp Gly Ala Thr Ile Gln Thr Asn Gly Ser Trp Thr Trp Pro Thr Val
    280                 285                 290 acc tgc agc gcc ggc tga                                               1026
Thr Cys Ser Ala Gly
295

<210> SEQ ID NO 83
<211> LENGTH: 341
<212> TYPE: PRT
```

<213> ORGANISM: Streptomyces beijiangensis

<400> SEQUENCE: 83

```
Met Ser Ala Pro Val Pro Leu Pro Arg Arg Arg Pro Gly Arg Phe
        -40             -35             -30
Met Thr Leu Leu Arg Ser Ser Trp Ala Ile Ala Leu Ala Ala Val Ala
    -25             -20             -15
Val Leu Leu Leu Pro Asn Ala Ala Ser Ala Asp Thr Val Val Asn Ser
-10              -5              -1  1               5
Asn Gln Thr Gly Thr Asn Asn Gly Tyr Tyr Tyr Ser His Trp Ser Asp
            10              15              20
Gly Gly Gly Ser Val Ser Met Thr Leu Gly Ser Gly Asn Tyr Gly
            25              30              35
Tyr Gln Trp Ser Asn Val Gly Asn Phe Val Gly Gly Lys Gly Trp Ser
    40              45              50
Thr Gly Gly Arg Lys Ser Val Asn Tyr Ser Gly Ser Phe Asn Pro Ser
55              60              65              70
Gly Asn Ala Tyr Leu Ala Leu Tyr Gly Trp Thr Thr Asn Pro Leu Val
            75              80              85
Glu Tyr Tyr Val Val Glu Asn Phe Gly Thr Tyr Arg Pro Thr Gly Thr
            90              95              100
Phe Lys Gly Thr Val Thr Ser Asp Gly Gly Thr Tyr Asp Ile Tyr Glu
        105             110             115
Thr Thr Arg Val Asn Gln Pro Ser Ile Glu Gly Thr Lys Thr Phe Lys
    120             125             130
Gln Tyr Trp Ser Val Arg Gln Ser Lys Arg Thr Gly Gly Thr Ile Thr
135             140             145             150
Thr Gly Asn His Phe Asp Ala Trp Ser Ser His Gly Met Ser Met Gly
            155             160             165
Ser Phe Asn Tyr Met Ile Met Ala Thr Glu Gly Tyr Gln Ser Ser Gly
            170             175             180
Ser Ser Asn Ile Thr Val Ser Glu Gly Ser Ser Gly Gly Thr Gly
        185             190             195
Gly Gly Gly Thr Gly Gly Thr Gly Gly Gly Ser Gly Gly Cys
    200             205             210
Thr Ala Thr Leu Ser Ala Gly Asp Lys Trp Ser Asp Arg Tyr Asn Leu
215             220             225             230
Asn Val Ser Val Ser Gly Ala Gly Asn Trp Thr Val Thr Met Lys Val
            235             240             245
Pro Ser Pro Glu Lys Val Leu Ser Thr Trp Asn Val Ser Ala Ala Tyr
            250             255             260
Pro Asp Ser Gln Thr Leu Val Ala Lys Ser Asn Gly Ser Gly Ser Asn
        265             270             275
Trp Gly Ala Thr Ile Gln Thr Asn Gly Ser Trp Thr Trp Pro Thr Val
    280             285             290
Thr Cys Ser Ala Gly
295
```

<210> SEQ ID NO 84
<211> LENGTH: 299
<212> TYPE: PRT
<213> ORGANISM: Streptomyces beijiangensis

<400> SEQUENCE: 84

Asp Thr Val Val Asn Ser Asn Gln Thr Gly Thr Asn Asn Gly Tyr Tyr

```
  1               5                  10                 15
Tyr Ser His Trp Ser Asp Gly Gly Ser Val Ser Met Thr Leu Gly
                20                 25                 30

Ser Gly Gly Asn Tyr Gly Tyr Gln Trp Ser Asn Val Gly Asn Phe Val
            35                 40                 45

Gly Gly Lys Gly Trp Ser Thr Gly Gly Arg Lys Ser Val Asn Tyr Ser
 50                 55                 60

Gly Ser Phe Asn Pro Ser Gly Asn Ala Tyr Leu Ala Leu Tyr Gly Trp
 65                 70                 75                 80

Thr Thr Asn Pro Leu Val Glu Tyr Tyr Val Glu Asn Phe Gly Thr
                85                 90                 95

Tyr Arg Pro Thr Gly Thr Phe Lys Gly Thr Val Thr Ser Asp Gly Gly
             100                105                110

Thr Tyr Asp Ile Tyr Glu Thr Thr Arg Val Asn Gln Pro Ser Ile Glu
            115                120                125

Gly Thr Lys Thr Phe Lys Gln Tyr Trp Ser Val Arg Gln Ser Lys Arg
            130                135                140

Thr Gly Gly Thr Ile Thr Thr Gly Asn His Phe Asp Ala Trp Ser Ser
145                150                155                160

His Gly Met Ser Met Gly Ser Phe Asn Tyr Met Ile Met Ala Thr Glu
                165                170                175

Gly Tyr Gln Ser Ser Gly Ser Ser Asn Ile Thr Val Ser Glu Gly Ser
            180                185                190

Ser Gly Gly Gly Thr Gly Gly Gly Thr Gly Gly Thr Gly Gly
            195                200                205

Gly Gly Ser Gly Gly Cys Thr Ala Thr Leu Ser Ala Gly Asp Lys Trp
 210                215                220

Ser Asp Arg Tyr Asn Leu Asn Val Ser Val Ser Gly Ala Gly Asn Trp
225                230                235                240

Thr Val Thr Met Lys Val Pro Ser Pro Glu Lys Val Leu Ser Thr Trp
                245                250                255

Asn Val Ser Ala Ala Tyr Pro Asp Ser Gln Thr Leu Val Ala Lys Ser
            260                265                270

Asn Gly Ser Gly Ser Asn Trp Gly Ala Thr Ile Gln Thr Asn Gly Ser
            275                280                285

Trp Thr Trp Pro Thr Val Thr Cys Ser Ala Gly
            290                295
```

<210> SEQ ID NO 85
<211> LENGTH: 1005
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(1002)
<220> FEATURE:
<221> NAME/KEY: sig_peptide
<222> LOCATION: (1)..(81)
<220> FEATURE:
<221> NAME/KEY: mat_peptide
<222> LOCATION: (82)..(1002)

<400> SEQUENCE: 85

```
atg aag aaa ccg ttg ggg aaa att gtc gca agc acc gca cta ctc att     48
Met Lys Lys Pro Leu Gly Lys Ile Val Ala Ser Thr Ala Leu Leu Ile
        -25                 -20                 -15
```

-continued

| | | | | | | | | | | | | | | | | |
|---|---|---|---|---|---|---|---|---|---|---|---|---|---|---|---|---|
| tct | gtt | gct | ttt | agt | tca | tcg | ata | gca | tca | gca | cat | cat | cat | cac | cat | 96 |
| Ser | Val | Ala | Phe | Ser | Ser | Ser | Ile | Ala | Ser | Ala | His | His | His | His | His | |
| | -10 | | | | -5 | | | | | -1 | 1 | | | | 5 | |
| cat | cct | agg | gac | acc | gtc | gtc | aac | tcg | aac | cag | acc | ggc | acc | aac | aac | 144 |
| His | Pro | Arg | Asp | Thr | Val | Val | Asn | Ser | Asn | Gln | Thr | Gly | Thr | Asn | Asn | |
| | | | | 10 | | | | | 15 | | | | | 20 | | |
| ggt | tac | tac | tac | tcg | cac | tgg | agc | gat | ggc | ggc | ggc | tcg | gtg | tcg | atg | 192 |
| Gly | Tyr | Tyr | Tyr | Ser | His | Trp | Ser | Asp | Gly | Gly | Gly | Ser | Val | Ser | Met | |
| | | | | 25 | | | | | 30 | | | | | 35 | | |
| acg | ctg | ggc | tcg | ggc | ggc | aac | tac | ggc | tac | cag | tgg | agc | aac | gtc | gga | 240 |
| Thr | Leu | Gly | Ser | Gly | Gly | Asn | Tyr | Gly | Tyr | Gln | Trp | Ser | Asn | Val | Gly | |
| | | | 40 | | | | | 45 | | | | | 50 | | | |
| aac | ttc | gtc | ggc | ggc | aag | ggg | tgg | agc | acc | gga | cgc | aag | tcc | gtg | | 288 |
| Asn | Phe | Val | Gly | Gly | Lys | Gly | Trp | Ser | Thr | Gly | Arg | Lys | Ser | Val | | |
| | 55 | | | | | 60 | | | | | 65 | | | | | |
| aac | tac | tcc | ggc | agt | ttc | aac | ccg | tcg | ggc | aac | gcc | tac | ctc | gcg | ctc | 336 |
| Asn | Tyr | Ser | Gly | Ser | Phe | Asn | Pro | Ser | Gly | Asn | Ala | Tyr | Leu | Ala | Leu | |
| 70 | | | | | 75 | | | | | 80 | | | | | 85 | |
| tac | ggc | tgg | acc | acc | aac | ccg | ctg | gtc | gag | tac | tac | gtc | gtc | gag | aac | 384 |
| Tyr | Gly | Trp | Thr | Thr | Asn | Pro | Leu | Val | Glu | Tyr | Tyr | Val | Val | Glu | Asn | |
| | | | | 90 | | | | | 95 | | | | | 100 | | |
| ttc | ggc | acg | tac | cgc | ccc | acc | ggc | acc | ttc | aag | ggc | acg | gtc | acc | agc | 432 |
| Phe | Gly | Thr | Tyr | Arg | Pro | Thr | Gly | Thr | Phe | Lys | Gly | Thr | Val | Thr | Ser | |
| | | | | 105 | | | | | 110 | | | | | 115 | | |
| gac | gga | ggc | acc | tac | gac | atc | tat | gag | acg | acc | cgg | gtg | aac | cag | ccc | 480 |
| Asp | Gly | Gly | Thr | Tyr | Asp | Ile | Tyr | Glu | Thr | Thr | Arg | Val | Asn | Gln | Pro | |
| | | | 120 | | | | | 125 | | | | | 130 | | | |
| tcg | atc | gag | ggc | acc | aag | acc | ttc | aag | cag | tac | tgg | agc | gtc | cgc | cag | 528 |
| Ser | Ile | Glu | Gly | Thr | Lys | Thr | Phe | Lys | Gln | Tyr | Trp | Ser | Val | Arg | Gln | |
| | 135 | | | | | 140 | | | | | 145 | | | | | |
| tcg | aag | cgg | acg | ggg | ggc | acc | atc | acc | acg | ggc | aac | cac | ttc | gac | gcc | 576 |
| Ser | Lys | Arg | Thr | Gly | Gly | Thr | Ile | Thr | Thr | Gly | Asn | His | Phe | Asp | Ala | |
| 150 | | | | | 155 | | | | | 160 | | | | | 165 | |
| tgg | tcg | agc | cac | ggc | atg | agc | atg | ggt | tcc | ttc | aac | tac | atg | atc | atg | 624 |
| Trp | Ser | Ser | His | Gly | Met | Ser | Met | Gly | Ser | Phe | Asn | Tyr | Met | Ile | Met | |
| | | | | 170 | | | | | 175 | | | | | 180 | | |
| gcg | acc | gag | ggc | tac | cag | agc | agc | ggc | agc | tcc | aac | atc | acc | gtc | agc | 672 |
| Ala | Thr | Glu | Gly | Tyr | Gln | Ser | Ser | Gly | Ser | Ser | Asn | Ile | Thr | Val | Ser | |
| | | | 185 | | | | | 190 | | | | | 195 | | | |
| gag | ggc | agt | tcc | ggt | ggc | ggg | acg | ggc | ggt | ggc | ggc | acg | ggc | ggc | ggt | 720 |
| Glu | Gly | Ser | Ser | Gly | Gly | Gly | Thr | Gly | Gly | Gly | Gly | Thr | Gly | Gly | Gly | |
| | 200 | | | | | 205 | | | | | 210 | | | | | |
| acg | ggc | ggc | ggc | ggc | tcc | ggc | ggc | tgc | acc | gcg | acg | ctt | tcc | gcg | gga | 768 |
| Thr | Gly | Gly | Gly | Gly | Ser | Gly | Gly | Cys | Thr | Ala | Thr | Leu | Ser | Ala | Gly | |
| 215 | | | | | 220 | | | | | 225 | | | | | | |
| gac | aag | tgg | agc | gac | cgc | tac | aac | ctg | aac | gtc | tcc | gtc | tcc | ggc | gcc | 816 |
| Asp | Lys | Trp | Ser | Asp | Arg | Tyr | Asn | Leu | Asn | Val | Ser | Val | Ser | Gly | Ala | |
| 230 | | | | 235 | | | | | 240 | | | | | 245 | | |
| ggc | aac | tgg | acc | gtc | acg | atg | aag | gtc | ccc | tcg | ccc | gag | aag | gtg | ctg | 864 |
| Gly | Asn | Trp | Thr | Val | Thr | Met | Lys | Val | Pro | Ser | Pro | Glu | Lys | Val | Leu | |
| | | | 250 | | | | | 255 | | | | | 260 | | | |
| tcc | acc | tgg | aac | gtg | agc | gcc | gcc | tac | ccg | gac | agc | cag | acc | ctc | gtg | 912 |
| Ser | Thr | Trp | Asn | Val | Ser | Ala | Ala | Tyr | Pro | Asp | Ser | Gln | Thr | Leu | Val | |
| | | | 265 | | | | | 270 | | | | | 275 | | | |
| gcc | aag | tcc | aac | ggc | agc | ggc | agc | aac | tgg | ggg | gcg | acc | atc | cag | acc | 960 |
| Ala | Lys | Ser | Asn | Gly | Ser | Gly | Ser | Asn | Trp | Gly | Ala | Thr | Ile | Gln | Thr | |
| | | 280 | | | | | 285 | | | | | 290 | | | | |
| aac | ggc | tcc | tgg | acg | tgg | ccc | acg | gtc | acc | tgc | agc | gcc | ggc | tga | | 1005 |
| Asn | Gly | Ser | Trp | Thr | Trp | Pro | Thr | Val | Thr | Cys | Ser | Ala | Gly | | | |
| | 295 | | | | | 300 | | | | | 305 | | | | | |

```
<210> SEQ ID NO 86
<211> LENGTH: 334
<212> TYPE: PRT
<213> ORGANISM: Artificial Sequence
<220> FEATURE:
<223> OTHER INFORMATION: Synthetic Construct

<400> SEQUENCE: 86
```

Met Lys Lys Pro Leu Gly Lys Ile Val Ala Ser Thr Ala Leu Leu Ile
        -25             -20                 -15

Ser Val Ala Phe Ser Ser Ile Ala Ser Ala His His His His His
        -10              -5              -1   1               5

His Pro Arg Asp Thr Val Val Asn Ser Asn Gln Thr Gly Thr Asn Asn
                 10                  15                  20

Gly Tyr Tyr Tyr Ser His Trp Ser Asp Gly Gly Ser Val Ser Met
             25                  30                  35

Thr Leu Gly Ser Gly Gly Asn Tyr Gly Tyr Gln Trp Ser Asn Val Gly
         40                  45                  50

Asn Phe Val Gly Gly Lys Gly Trp Ser Thr Gly Arg Lys Ser Val
 55                  60                  65

Asn Tyr Ser Gly Ser Phe Asn Pro Ser Gly Asn Ala Tyr Leu Ala Leu
 70                  75                  80                  85

Tyr Gly Trp Thr Thr Asn Pro Leu Val Glu Tyr Tyr Val Val Glu Asn
                 90                  95                 100

Phe Gly Thr Tyr Arg Pro Thr Gly Thr Phe Lys Gly Thr Val Thr Ser
                105                 110                 115

Asp Gly Gly Thr Tyr Asp Ile Tyr Glu Thr Thr Arg Val Asn Gln Pro
            120                 125                 130

Ser Ile Glu Gly Thr Lys Thr Phe Lys Gln Tyr Trp Ser Val Arg Gln
        135                 140                 145

Ser Lys Arg Thr Gly Gly Thr Ile Thr Thr Gly Asn His Phe Asp Ala
150                 155                 160                 165

Trp Ser Ser His Gly Met Ser Met Gly Ser Phe Asn Tyr Met Ile Met
                170                 175                 180

Ala Thr Glu Gly Tyr Gln Ser Ser Gly Ser Ser Asn Ile Thr Val Ser
            185                 190                 195

Glu Gly Ser Ser Gly Gly Thr Gly Gly Gly Thr Gly Gly
            200                 205                 210

Thr Gly Gly Gly Ser Gly Gly Cys Thr Ala Thr Leu Ser Ala Gly
        215                 220                 225

Asp Lys Trp Ser Asp Arg Tyr Asn Leu Asn Val Ser Val Ser Gly Ala
230                 235                 240                 245

Gly Asn Trp Thr Val Thr Met Lys Val Pro Ser Pro Glu Lys Val Leu
                250                 255                 260

Ser Thr Trp Asn Val Ser Ala Ala Tyr Pro Asp Ser Gln Thr Leu Val
                265                 270                 275

Ala Lys Ser Asn Gly Ser Gly Ser Asn Trp Gly Ala Thr Ile Gln Thr
            280                 285                 290

Asn Gly Ser Trp Thr Trp Pro Thr Val Thr Cys Ser Ala Gly
        295                 300                 305

```
<210> SEQ ID NO 87
<211> LENGTH: 307
<212> TYPE: PRT
<213> ORGANISM: Artificial Sequence
```

<220> FEATURE:
<223> OTHER INFORMATION: Mature sequence with His-tag

<400> SEQUENCE: 87

His His His His His Pro Arg Asp Thr Val Val Asn Ser Asn Gln
1               5                   10                  15

Thr Gly Thr Asn Asn Gly Tyr Tyr Ser His Trp Ser Asp Gly Gly
            20                  25                  30

Gly Ser Val Ser Met Thr Leu Gly Ser Gly Asn Tyr Gly Tyr Gln
        35                  40                  45

Trp Ser Asn Val Gly Asn Phe Val Gly Gly Lys Gly Trp Ser Thr Gly
50                  55                  60

Gly Arg Lys Ser Val Asn Tyr Ser Gly Ser Phe Asn Pro Ser Gly Asn
65                  70                  75                  80

Ala Tyr Leu Ala Leu Tyr Gly Trp Thr Thr Asn Pro Leu Val Glu Tyr
                85                  90                  95

Tyr Val Val Glu Asn Phe Gly Thr Tyr Arg Pro Thr Gly Thr Phe Lys
            100                 105                 110

Gly Thr Val Thr Ser Asp Gly Thr Tyr Asp Ile Tyr Glu Thr Thr
        115                 120                 125

Arg Val Asn Gln Pro Ser Ile Glu Gly Thr Lys Thr Phe Lys Gln Tyr
    130                 135                 140

Trp Ser Val Arg Gln Ser Lys Arg Thr Gly Gly Thr Ile Thr Thr Gly
145                 150                 155                 160

Asn His Phe Asp Ala Trp Ser Ser His Gly Met Ser Met Gly Ser Phe
                165                 170                 175

Asn Tyr Met Ile Met Ala Thr Glu Gly Tyr Gln Ser Ser Gly Ser Ser
            180                 185                 190

Asn Ile Thr Val Ser Glu Gly Ser Gly Gly Thr Gly Gly Gly
        195                 200                 205

Gly Thr Gly Gly Thr Gly Gly Gly Ser Gly Gly Cys Thr Ala
    210                 215                 220

Thr Leu Ser Ala Gly Asp Lys Trp Ser Asp Arg Tyr Asn Leu Asn Val
225                 230                 235                 240

Ser Val Ser Gly Ala Gly Asn Trp Thr Val Thr Met Lys Val Pro Ser
                245                 250                 255

Pro Glu Lys Val Leu Ser Thr Trp Asn Val Ser Ala Tyr Pro Asp
            260                 265                 270

Ser Gln Thr Leu Val Ala Lys Ser Asn Gly Ser Gly Ser Asn Trp Gly
        275                 280                 285

Ala Thr Ile Gln Thr Asn Gly Ser Trp Thr Trp Pro Thr Val Thr Cys
290                 295                 300

Ser Ala Gly
305

<210> SEQ ID NO 88
<211> LENGTH: 188
<212> TYPE: PRT
<213> ORGANISM: Fusarium oxysporum

<400> SEQUENCE: 88

Thr Gln Pro Thr Thr Gly Thr Ser Gly Gly Tyr Tyr Phe Ser Phe Trp
1               5                   10                  15

Thr Asp Thr Pro Asn Ser Val Thr Tyr Thr Asn Gly Asn Gly Gly Gln
            20                  25                  30

Phe Ser Met Gln Trp Ser Gly Asn Gly Asn His Val Gly Lys Gly
            35                  40                  45

Trp Met Pro Gly Thr Ser Arg Thr Ile Lys Tyr Ser Gly Ser Tyr Asn
 50                  55                  60

Pro Asn Gly Asn Ser Tyr Leu Ala Val Tyr Gly Trp Thr Arg Asn Pro
 65                  70                  75                  80

Leu Ile Glu Tyr Tyr Ile Val Glu Asn Phe Gly Thr Tyr Asn Pro Ser
                    85                  90                  95

Ser Gly Gly Gln Lys Lys Gly Glu Val Asn Val Asp Gly Ser Val Tyr
                100                 105                 110

Asp Ile Tyr Val Ser Thr Arg Val Asn Ala Pro Ser Ile Asp Gly Asn
            115                 120                 125

Lys Thr Phe Gln Gln Tyr Trp Ser Val Arg Arg Asn Lys Arg Ser Ser
130                 135                 140

Gly Ser Val Asn Thr Gly Ala His Phe Gln Ala Trp Lys Asn Val Gly
145                 150                 155                 160

Leu Asn Leu Gly Thr His Asp Tyr Gln Ile Leu Ala Val Glu Gly Tyr
                165                 170                 175

Tyr Ser Ser Gly Ser Ala Ser Met Thr Val Ser Gln
            180                 185

<210> SEQ ID NO 89
<211> LENGTH: 189
<212> TYPE: PRT
<213> ORGANISM: Aspergillus clavatus

<400> SEQUENCE: 89

Ala Gly Thr Pro Ser Ser Thr Gly Trp Asn Asn Gly Tyr Tyr Tyr Ser
 1                   5                  10                  15

Phe Trp Thr Asp Asn Gly Gly Thr Val Asn Tyr Gln Asn Gly Asn Gly
                    20                  25                  30

Gly Ser Tyr Ser Val Gln Trp Lys Asp Thr Gly Asn Phe Val Gly Gly
            35                  40                  45

Lys Gly Trp Asn Pro Gly Ser Ala Arg Thr Ile Asn Tyr Ser Gly Ser
 50                  55                  60

Phe Asn Pro Ser Gly Asn Ala Tyr Leu Thr Val Tyr Gly Trp Thr Thr
 65                  70                  75                  80

Asn Pro Leu Val Glu Tyr Tyr Ile Val Glu Asn Tyr Gly Thr Tyr Asn
                    85                  90                  95

Pro Gly Asn Gly Gly Thr Tyr Arg Gly Ser Val Tyr Ser Asp Gly Ala
                100                 105                 110

Asn Tyr Asn Ile Tyr Thr Ala Thr Arg Tyr Asn Ala Pro Ser Ile Glu
            115                 120                 125

Gly Asp Lys Thr Phe Thr Gln Tyr Trp Ser Val Arg Gln Ser Lys Arg
130                 135                 140

Thr Gly Gly Thr Val Thr Thr Ala Asn His Phe Asn Ala Trp Ala Gln
145                 150                 155                 160

Leu Gly Met Ser Leu Gly Thr His Asn Tyr Gln Ile Val Ala Thr Glu
                165                 170                 175

Gly Tyr Gln Ser Ser Gly Ser Ser Ile Thr Val Tyr
            180                 185

<210> SEQ ID NO 90
<211> LENGTH: 27
<212> TYPE: PRT
<213> ORGANISM: Artificial Sequence -continued

```
<220> FEATURE:
<223> OTHER INFORMATION: Bacillus lentus secretion signal

<400> SEQUENCE: 90

Met Lys Lys Pro Leu Gly Lys Ile Val Ala Ser Thr Ala Leu Leu Ile
1               5                   10                  15

Ser Val Ala Phe Ser Ser Ser Ile Ala Ser Ala
            20                  25

<210> SEQ ID NO 91
<211> LENGTH: 8
<212> TYPE: PRT
<213> ORGANISM: Artificial Sequence
<220> FEATURE:
<223> OTHER INFORMATION: His-tag RHHHHHHP

<400> SEQUENCE: 91

Arg His His His His His His Pro
1               5

<210> SEQ ID NO 92
<211> LENGTH: 8
<212> TYPE: PRT
<213> ORGANISM: Artificial Sequence
<220> FEATURE:
<223> OTHER INFORMATION: His-tag HHHHHHPR

<400> SEQUENCE: 92

His His His His His His Pro Arg
1               5

<210> SEQ ID NO 93
<211> LENGTH: 558
<212> TYPE: PRT
<213> ORGANISM: Humicola insolens
<220> FEATURE:
<221> NAME/KEY: signal
<222> LOCATION: (1)..(18)
<220> FEATURE:
<221> NAME/KEY: mat_peptide
<222> LOCATION: (19)..(558)

<400> SEQUENCE: 93

Met Leu Gly Leu Lys Val Leu Cys Leu Ser Ala Val Val Gly Thr Ala
            -15                 -10                 -5

Val Ser Val Pro His Ala Gly Asn Leu Pro Arg Gln Ala Ser Thr Phe
    -1  1               5                   10

Thr Asn Pro Val Leu Trp Glu Asp His Pro Asp Leu Glu Val Phe Arg
15                  20                  25                  30

Val Gly Ser Val Phe Tyr Tyr Ser Ser Thr Phe Ala Tyr Ser Pro
                35                  40                  45

Gly Ala Pro Val Leu Lys Ser Tyr Asp Leu Val His Trp Thr Pro Val
                50                  55                  60

Thr His Ser Val Pro Arg Leu Asn Phe Gly Ser Asn Tyr Asp Leu Pro
                65                  70                  75

Ser Gly Thr Pro Gly Ala Tyr Val Lys Gly Ile Trp Ala Ser Thr Leu
                80                  85                  90

Arg Tyr Arg Arg Ser Asn Asp Arg Phe Tyr Trp Tyr Gly Cys Val Glu
95                  100                 105                 110

Gly Arg Thr Tyr Leu Trp Thr Ser Pro Gly Gly Asn Ala Leu Ala Asn
                115                 120                 125

Asn Gly Glu Val Pro Pro Ser Ala Trp Asn Trp Gln His Thr Ala Thr
```

-continued

```
                130                 135                 140
Ile Asp Asn Cys Tyr Tyr Asp Ala Gly Leu Leu Ile Asp Asp Asp
            145                 150                 155
Thr Met Tyr Ile Ala Tyr Gly Asn Pro Thr Ile Asn Val Ala Gln Leu
        160                 165                 170
Ser Pro Asp Gly Thr Arg Gln Val Arg Val Gln Gln Arg Val Tyr Ala
175                 180                 185                 190
His Pro Gln Gly Gln Thr Val Glu Gly Ala Arg Met Tyr Lys Ile Arg
                        195                 200                 205
Gly Asn Tyr Tyr Ile Leu Val Thr Arg Pro Ala Asp Ala Glu Tyr Val
                210                 215                 220
Leu Arg Ser Thr Thr Gly Ser Pro Phe Gly Pro Tyr Glu Ala Arg Thr
            225                 230                 235
Leu Val Ser Arg Ile Gln Gly Pro Leu Ala Asn Ala Gly Phe Ala His
        240                 245                 250
Gln Gly Gly Ile Val Asp Ala Pro Asp Gly Thr Trp His Tyr Val Ala
255                 260                 265                 270
Phe Met Asp Ala Tyr Pro Gly Gly Arg Ile Pro Val Val Ala Pro Leu
                    275                 280                 285
Arg Trp Thr Ala Asp Gly Trp Pro Glu Val Val Thr Asp Ser Gln Gly
                290                 295                 300
Arg Trp Gly Thr Ser Tyr Pro Ile Pro Val Arg Gly Ala Lys Asn Ala
            305                 310                 315
Thr Glu Gly Leu Ala Ser Thr Asp Leu Asp Glu Phe Arg Gly Thr Arg
        320                 325                 330
Phe Ser Glu His Trp Glu Trp Asn His Asn Pro Asp Thr Ser Lys Phe
335                 340                 345                 350
Thr Leu Leu Gly Gly Asn Glu Gly Gly Leu Ile Leu Arg Thr Ala Thr
                    355                 360                 365
Val Thr Gly Asp Leu Phe Ala Ala Arg Asn Thr Leu Thr Arg Arg Ile
                370                 375                 380
Ala Gly Pro Lys Ala Ser Gly Ile Phe Arg Leu Asp Val Arg Gly Met
            385                 390                 395
Arg Asp Gly Asp Arg Ala Gly Ala Val Leu Phe Arg Asp Arg Ala Ala
        400                 405                 410
Tyr Ile Gly Val Trp Lys Gln Gly Asn Glu Ala Arg Ile Val Met Val
415                 420                 425                 430
Asp Asp Leu Arg Leu Asn Glu Asp Gly Trp Arg Thr Ala Ser Thr Gly
                    435                 440                 445
Arg Val Ala Ala Asn Gly Pro Val Ile Asp Thr Asn Ala Gln Gln Asp
                450                 455                 460
Ile Trp Leu Arg Ile Asp Ala Asp Ile Thr Pro Ala Phe Gly Thr Asn
            465                 470                 475
Thr Glu Arg Thr Thr Thr Phe Tyr Tyr Ser Ile Asp Gly Gly Arg Thr
        480                 485                 490
Tyr Thr Arg Leu Gly Pro Ala Phe Ala Met Thr Asn Ser Trp Arg Tyr
495                 500                 505                 510
Phe Thr Gly Tyr Arg Phe Gly Val Phe Asn Phe Ser Thr Lys Ser Leu
                    515                 520                 525
Gly Gly Glu Val Lys Val Lys Gly Phe Lys Met Asn Met Ile
                530                 535                 540
```

<210> SEQ ID NO 94

-continued

```
<211> LENGTH: 643
<212> TYPE: PRT
<213> ORGANISM: Meripilus giganteus
<220> FEATURE:
<221> NAME/KEY: signal
<222> LOCATION: (1)..(16)
<220> FEATURE:
<221> NAME/KEY: mat_peptide
<222> LOCATION: (17)..(643)

<400> SEQUENCE: 94
```

Met Lys Leu Leu Phe Leu Leu Gly Ala Phe Val Ala Gln Cys Leu Ala
    -15                 -10                 -5                  -1

Val Thr Val Thr Val Asn Lys Asn Pro Ser His Thr Val Pro Ser Thr
1               5                   10                  15

Leu Tyr Gly Leu Met Phe Glu Asp Ile Asn His Ser Gly Asp Gly Gly
            20                  25                  30

Leu Tyr Ala Glu Leu Leu Gln Asn Arg Ala Phe Gln Gln Val Thr Pro
        35                  40                  45

Asn Thr Ala Ala Ala Leu Ala Ala Trp His Pro Ile Ser Asn Ala Lys
    50                  55                  60

Leu Ala Val Ile Gln Asp Pro Ser Pro Val Ser Asn Ala Leu Pro Asn
65                  70                  75                  80

Ser Leu Gln Phe Ser Val Pro Ser Gly Ser Ser Gly Arg Val Gly Phe
                85                  90                  95

Thr Asn Glu Gly Phe Trp Gly Ile Lys Val Asp Ser Thr Trp Thr Tyr
            100                 105                 110

Lys Ala Ser Leu Phe Phe Arg Phe Pro Thr Ser Ser Ser Phe Ser Gly
        115                 120                 125

Ala Leu Thr Val Gly Leu Gln Thr Asn Ala Gly Arg Val Leu Ala Gln
    130                 135                 140

Asn Ser Thr Gln Ile Arg Gly Thr Thr Thr Lys Trp Thr Gln Ile Asn
145                 150                 155                 160

Leu Glu Leu His Pro Thr Ala Ser Ala Pro Asp Val Ser Asn Ser Phe
                165                 170                 175

Phe Val Thr Ile Asp Gly Ala Ala Gly Ala Gly Gln Thr Ile Asn Phe
            180                 185                 190

Ala Met Phe Ser Leu Phe Pro Pro Thr Phe Lys Asn Arg Pro Asn Gly
        195                 200                 205

Leu Arg Ala Asp Ile Ala Glu Thr Leu Ala Glu Met Gly Pro Ser Phe
    210                 215                 220

Phe Arg Phe Pro Gly Gly Asn Asn Leu Glu Gly Gln Thr Thr Ala Thr
225                 230                 235                 240

Arg Trp Gln Trp Asn Ala Thr Val Gly Ser Leu Leu Asp Arg Pro Gly
                245                 250                 255

Arg Val Gly Asp Trp Gly Tyr Val Asn Thr Asp Gly Leu Gly Leu Leu
            260                 265                 270

Glu Tyr Leu Gln Phe Phe Glu Asp Thr Gly Met Glu Pro Ile Met Ala
        275                 280                 285

Val Trp Ala Gly Tyr Ser Leu Gly Gly Thr Ser Leu Ala Glu Asn Gln
    290                 295                 300

Leu Ala Pro Tyr Ile Gln Gln Ala Ile Asp Gln Ile Asn Phe Val Ile
305                 310                 315                 320

Gly Asp Pro Ala Lys Ser Ala Pro Ala Leu Arg Ala Ser Leu Gly
                325                 330                 335

His Pro Glu Pro Phe Thr Leu Arg Phe Val Glu Val Gly Asn Glu Asp

```
                340             345             350
Phe Phe Ala Ala Gly Ser Tyr Pro Tyr Arg Trp His Asp Phe Val Thr
            355             360             365
Ala Leu Gln Ala Gln Phe Pro Gln Ile Arg Phe Ile Ala Thr Thr Asn
        370             375             380
Ala Trp Asn Pro Val Leu Ser Pro Val Pro Gln Ser Tyr Asp Val His
385             390             395             400
Val Tyr Gln Thr Pro Thr Trp Phe Tyr Gln Asn Ala Phe Tyr Tyr Asp
                405             410             415
Gly Phe Gln Arg Asn Gly Thr Thr Tyr Phe Glu Gly Glu Tyr Ala Ala
            420             425             430
Ile Ser Thr Asn Ala Asn Asp Leu Phe Gly Thr Val Ala Asp Gly Arg
        435             440             445
Leu Ala Phe Pro Thr Val Gln Ser Ala Thr Gly Glu Ala Ala Phe Met
    450             455             460
Thr Gly Leu Glu Arg Asn Ser Asp Ile Val Phe Ala Ala Ser Tyr Ala
465             470             475             480
Pro Leu Leu Gln His Val Asn Ser Thr Gln Trp Thr Pro Asp Leu Val
                485             490             495
Ser Tyr Asp Ala Gly Ser Val Ile Lys Ser Thr Ser Phe Phe Ala Gln
            500             505             510
Lys Leu Phe Ala Leu Asn Lys Gly Asp Gln Tyr Leu Pro Ser Thr Leu
        515             520             525
Pro Thr Asn Gly Gly Thr Leu His Trp Ser Ile Thr Arg Ala Ser Ser
    530             535             540
Ser Gly Lys Thr Phe Ile Lys Ile Ala Asn Ala Gly Ser Ser Ala Gln
545             550             555             560
Ser Leu Thr Phe Gln Leu Thr Gln Phe Asn Ser Val Ser Ser Thr Gly
                565             570             575
Thr Leu Gln Val Leu Thr Gly Pro Glu Thr Ala Ser Asn Thr Pro Glu
            580             585             590
Ala Pro Gln Ala Ile Val Pro Lys Thr Ser Thr Ile Gly Thr Gly Lys
        595             600             605
Thr Phe Thr Tyr Asn Ala Pro Ala Phe Ser Val Ser Val Ile Thr Val
    610             615             620
Thr Thr Asn
625

<210> SEQ ID NO 95
<211> LENGTH: 1430
<212> TYPE: DNA
<213> ORGANISM: Talaroymces leycettanus

<400> SEQUENCE: 95
gccgactact cgggcaccta cggagtgacc accagcggca actccctccg cctcaacttc    60
gtcacccagg cgtcacagaa gaacgtcggc tcccgtcttt acctgatgga gaatgacaca   120
acctaccaga tcttcaagct gctgaaccag gagttcacct ttgatgtcga tgtgtccaac   180
ctgccgtaag tgacttacca tgaacccctg acgctatctt cttgttggct cccagctgac   240
tggccaattc aagctgcggc ttgaacggtg ctctctacct ggtggccatg gacgccgatg   300
gtggcatggc caagtacccc accaacaagg ctggtgccaa gtacggtacc gggtactgcg   360
actcccagtg tccccgcgac ctcaagttca tcaatggcga ggccaacgtc gagggctggc   420
agccgtcgtc caacgatccc aactctggca ttggcaacca cggatcctgc tgcgcggaga   480
```

```
tggatatctg ggaggccaac agcatctcca atgctgtcac tccccacccg tgcgacactc    540
ccggccaggt gatgtgcacc ggtaacaact gcggtggcac atacagcact actcgctatg    600
cgggcacttg cgatcccgac ggctgcgact tcaaccccta ccgcatgggc aaccacagct    660
tctacggccc taaacagatc gtcgatacca gctcgaagtt caccgtcgtg acgcagttcc    720
tcacggatga cggcacctcc accggcaccc tctctgaaat ccgccgcttc tatgtccaga    780
acggccaggt gatcccgaac tcggtgtcga ccatcagtgg cgtgagcggc aactccatca    840
ccaccgagtt ctgcactgcc cagaagcagg ccttcggcga cacggacgac ttctcaaagc    900
acggcggcct gtccggcatg agcgctgccc tctctcaggg tatggttctg gtcatgagtc    960
tgtgggatga tgtgagtttg atggacaaac atgcgcgttg acaaagagtc aagcagctga   1020
ctgagatgtt acagcacgcc gccaacatgc tctggctcga cagcacctac ccgaccaacg   1080
cgacctcctc caccccggt gccgcccgtg aacctgcga catctcgtcc ggtgtccctg    1140
cggatgtcga atccaacgac cccaacgcct acgtggtcta ctcgaacatc aaggttggtc   1200
ccatcggctc gaccttcagc agcagcggct ctggatcttc ttcctctagc tccaccacta   1260
ccacgaccac cgcttccca accaccacga cctcctccgc atcgagcacc ggcactggag    1320
tggcacagca ctggggccag tgtggtggac agggctggac cggccccaca acctgcgtca   1380
gcccttatac ttgccaggag ctgaaccctt actactacca gtgtctgtaa              1430

<210> SEQ ID NO 96
<211> LENGTH: 532
<212> TYPE: PRT
<213> ORGANISM: Talaromyces leycettanus

<400> SEQUENCE: 96

Met Ala Ser Leu Phe Ser Phe Lys Met Tyr Lys Ala Ala Leu Val Leu
1               5                   10                  15

Ser Ser Leu Leu Ala Ala Thr Gln Ala Gln Gln Ala Gly Thr Leu Thr
            20                  25                  30

Thr Glu Thr His Pro Ser Leu Thr Trp Gln Gln Cys Ser Ala Gly Gly
        35                  40                  45

Ser Cys Thr Thr Gln Asn Gly Lys Val Val Ile Asp Ala Asn Trp Arg
    50                  55                  60

Trp Val His Ser Thr Ser Gly Ser Asn Asn Cys Tyr Thr Gly Asn Thr
65                  70                  75                  80

Trp Asp Ala Thr Leu Cys Pro Asp Asp Val Thr Cys Ala Ala Asn Cys
                85                  90                  95

Ala Leu Asp Gly Ala Asp Tyr Ser Gly Thr Tyr Gly Val Thr Thr Ser
            100                 105                 110

Gly Asn Ser Leu Arg Leu Asn Phe Val Thr Gln Ala Ser Gln Lys Asn
        115                 120                 125

Val Gly Ser Arg Leu Tyr Leu Met Glu Asn Asp Thr Thr Tyr Gln Ile
    130                 135                 140

Phe Lys Leu Leu Asn Gln Glu Phe Thr Phe Asp Val Asp Val Ser Asn
145                 150                 155                 160

Leu Pro Cys Gly Leu Asn Gly Ala Leu Tyr Leu Val Ala Met Asp Ala
                165                 170                 175

Asp Gly Gly Met Ala Lys Tyr Pro Thr Asn Lys Ala Gly Ala Lys Tyr
            180                 185                 190

Gly Thr Gly Tyr Cys Asp Ser Gln Cys Pro Arg Asp Leu Lys Phe Ile
        195                 200                 205
```

Asn Gly Glu Ala Asn Val Gly Trp Gln Pro Ser Asn Asp Pro
     210                 215                 220

Asn Ser Gly Ile Gly Asn His Gly Ser Cys Cys Ala Glu Met Asp Ile
225                 230                 235                 240

Trp Glu Ala Asn Ser Ile Ser Asn Ala Val Thr Pro His Pro Cys Asp
                245                 250                 255

Thr Pro Gly Gln Val Met Cys Thr Gly Asn Asn Cys Gly Thr Tyr
             260                 265                 270

Ser Thr Thr Arg Tyr Ala Gly Thr Cys Asp Pro Asp Gly Cys Asp Phe
         275                 280                 285

Asn Pro Tyr Arg Met Gly Asn His Ser Phe Tyr Gly Pro Lys Gln Ile
290                 295                 300

Val Asp Thr Ser Ser Lys Phe Thr Val Val Thr Gln Phe Leu Thr Asp
305                 310                 315                 320

Asp Gly Thr Ser Thr Gly Thr Leu Ser Glu Ile Arg Arg Phe Tyr Val
                 325                 330                 335

Gln Asn Gly Gln Val Ile Pro Asn Ser Val Ser Thr Ile Ser Gly Val
                 340                 345                 350

Ser Gly Asn Ser Ile Thr Thr Glu Phe Cys Thr Ala Gln Lys Gln Ala
         355                 360                 365

Phe Gly Asp Thr Asp Asp Phe Ser Lys His Gly Gly Leu Ser Gly Met
370                 375                 380

Ser Ala Ala Leu Ser Gln Gly Met Val Leu Val Met Ser Leu Trp Asp
385                 390                 395                 400

Asp His Ala Ala Asn Met Leu Trp Leu Asp Ser Thr Tyr Pro Thr Asn
                 405                 410                 415

Ala Thr Ser Ser Thr Pro Gly Ala Ala Arg Gly Thr Cys Asp Ile Ser
                 420                 425                 430

Ser Gly Val Pro Ala Asp Val Glu Ser Asn Asp Pro Asn Ala Tyr Val
         435                 440                 445

Val Tyr Ser Asn Ile Lys Val Gly Pro Ile Gly Ser Thr Phe Ser Ser
450                 455                 460

Ser Gly Ser Gly Ser Ser Ser Ser Ser Thr Thr Thr Thr Thr
465                 470                 475                 480

Ala Ser Pro Thr Thr Thr Thr Ser Ser Ala Ser Ser Thr Gly Thr Gly
                 485                 490                 495

Val Ala Gln His Trp Gly Gln Cys Gly Gly Gln Gly Trp Thr Gly Pro
             500                 505                 510

Thr Thr Cys Val Ser Pro Tyr Thr Cys Gln Glu Leu Asn Pro Tyr Tyr
         515                 520                 525

Tyr Gln Cys Leu
    530

<210> SEQ ID NO 97
<211> LENGTH: 1898
<212> TYPE: DNA
<213> ORGANISM: Taloromyces leycettanus

<400> SEQUENCE: 97
atgcggtctc tcctggctct tgcccctacc ctgctcgcgc tgttgttca ggctcagcaa    60 accatgtggg gtcaatgtaa gttcttttca ctgcttacca tgtataatct ttgatatcaa   120
gcatcatatc tgactcacgt tttaggcggt ggtcagggct ggaccggacc taccatctgt   180
gtagcaggcg cgacatgcag cacacagaac ccttgtaagt cgggccttca tcaaaacttc   240

-continued

```
aacatcacca cctcgatgga gcaggagttg acctgatctt tacccttagg gtatgcgcag    300
tgcaccccag cacctaccgc gccgacgacc ttgcaaacaa caactacgac gagctcgaaa    360
tcgtccacga ccacgagctc gaagtcgtcc acgaccacag gtggaagtgg cggtggaact    420
acgacctcaa cgtcagccac catcaccgcg gctccatctg gtaacccata ctccggatac    480
cagctctatg tgaaccagga atactcgtcc gaggtgtacg cgtctgctat tccttccctt    540
accggcactc tggtcgcgaa ggcaagcgcc gcggcagagg tgccatcttt cctgtggctg    600
taagtttttt tgaccttgaa tgaacgccct gtcctctacg agtggccgca ggagctaatt    660
gagatgccaa tgaacaggga cactgcctcc aaggtgccac tgatgggcac ttacttgcag    720
gatatccagg cgaagaacgc tgctggcgcc aaccccccat atgccggtca attcgtggtt    780
tacgacttgc cggatcgtga ttgcgctgca ttggccagca atggagagta ctccattgct    840
aacaatggtg ttgccaacta caaggcttac atcgactcca tccgcgcgct tcttgttcaa    900
tactcgaacg tccatgtcat ccttgtgatc ggtgagctat tgcagtctcg ctttaaagca    960
tttgactaga tcaatgtcgc taatggtacc taccgcacag agcccgacag cttggccaac   1020
cttgtcacca acctgaatgt tcagaagtgt gctaatgctc agagtgctta cctggagtgc   1080
atcaactatg ccctcactca gttgaacctc aagaacgttg ctatgtacat cgatgctggt   1140
gcgtgaacct tccctagtca gcccaaaata actgaaataa agagacggag tgtactgatt   1200
gtcatgcagg tcatgctgga tggctcggct ggcccgccaa ccttagcccg gccgctcaac   1260
tctttgcttc cgtataccag aatgcaagct ccccagctgc cgttcgcggc ctggcaacca   1320
acgtggccaa ctataatgcc tggtcgatcg ccacttgccc atcttacacc caaggcgacc   1380
ccaactgcga cgagcagaaa tacatcaacg ctctggctcc attgcttcag caacagggat   1440
ggtcatcagt tcactttatc accgataccg gtaagtctgc ctgtcctgcc aaccatgcgt   1500
tcaagagcgt tgcaatccta accatgctgg tatcttccag gccgtaacgg tgtccagcct   1560
accaagcaga atgcctgggg tgactggtgc aacgttatcg gaaccggctt cggtgtccgt   1620
cccaccacca acactggcga tccattggag gatgctttcg tctgggtcaa gcctggtggt   1680
gagagtgatg gtacttccaa ctccacttcg cctcgctacg acgcccactg cggttacagt   1740
gatgctcttc agcctgctcc tgaggctggt acctggttcg aggtaagctt ctgcatactg   1800
agatcgagaa tcctgaaagg gttaacctgc taatgcttcg gtgtttgata taggcttact   1860
ttgagcaact ccttaccaac gccaacccct ctttctaa                           1898
```

<210> SEQ ID NO 98
<211> LENGTH: 464
<212> TYPE: PRT
<213> ORGANISM: Taloromyces leycettanus

<400> SEQUENCE: 98

```
Met Arg Ser Leu Leu Ala Leu Ala Pro Thr Leu Leu Ala Pro Val Val
1               5                   10                  15

Gln Ala Gln Gln Thr Met Trp Gly Gln Cys Gly Gly Gln Gly Trp Thr
            20                  25                  30

Gly Pro Thr Ile Cys Val Ala Gly Ala Thr Cys Ser Thr Gln Asn Pro
        35                  40                  45

Trp Tyr Ala Gln Cys Thr Pro Ala Pro Thr Ala Pro Thr Thr Leu Gln
    50                  55                  60

Thr Thr Thr Thr Thr Ser Ser Lys Ser Ser Thr Thr Ser Ser Lys
65                  70                  75                  80
```

```
Ser Ser Thr Thr Thr Gly Gly Ser Gly Gly Thr Thr Ser Thr
            85              90              95

Ser Ala Thr Ile Thr Ala Ala Pro Ser Gly Asn Pro Tyr Ser Gly Tyr
            100             105             110

Gln Leu Tyr Val Asn Gln Glu Tyr Ser Glu Val Tyr Ala Ser Ala
            115             120             125

Ile Pro Ser Leu Thr Gly Thr Leu Val Ala Lys Ala Ser Ala Ala Ala
130             135             140

Glu Val Pro Ser Phe Leu Trp Leu Asp Thr Ala Ser Lys Val Pro Leu
145             150             155             160

Met Gly Thr Tyr Leu Gln Asp Ile Gln Ala Lys Asn Ala Ala Gly Ala
            165             170             175

Asn Pro Pro Tyr Ala Gly Gln Phe Val Val Tyr Asp Leu Pro Asp Arg
            180             185             190

Asp Cys Ala Ala Leu Ala Ser Asn Gly Glu Tyr Ser Ile Ala Asn Asn
            195             200             205

Gly Val Ala Asn Tyr Lys Ala Tyr Ile Asp Ser Ile Arg Ala Leu Leu
            210             215             220

Val Gln Tyr Ser Asn Val His Val Ile Leu Val Ile Glu Pro Asp Ser
225             230             235             240

Leu Ala Asn Leu Val Thr Asn Leu Asn Val Gln Lys Cys Ala Asn Ala
            245             250             255

Gln Ser Ala Tyr Leu Glu Cys Ile Asn Tyr Ala Leu Thr Gln Leu Asn
            260             265             270

Leu Lys Asn Val Ala Met Tyr Ile Asp Ala Gly His Ala Gly Trp Leu
            275             280             285

Gly Trp Pro Ala Asn Leu Ser Pro Ala Ala Gln Leu Phe Ala Ser Val
            290             295             300

Tyr Gln Asn Ala Ser Ser Pro Ala Ala Val Arg Gly Leu Ala Thr Asn
305             310             315             320

Val Ala Asn Tyr Asn Ala Trp Ser Ile Ala Thr Cys Pro Ser Tyr Thr
            325             330             335

Gln Gly Asp Pro Asn Cys Asp Glu Gln Lys Tyr Ile Asn Ala Leu Ala
            340             345             350

Pro Leu Leu Gln Gln Gln Gly Trp Ser Ser Val His Phe Ile Thr Asp
            355             360             365

Thr Gly Arg Asn Gly Val Gln Pro Thr Lys Gln Asn Ala Trp Gly Asp
370             375             380

Trp Cys Asn Val Ile Gly Thr Gly Phe Gly Val Arg Pro Thr Thr Asn
385             390             395             400

Thr Gly Asp Pro Leu Glu Asp Ala Phe Val Trp Val Lys Pro Gly Gly
            405             410             415

Glu Ser Asp Gly Thr Ser Asn Ser Thr Ser Pro Arg Tyr Asp Ala His
            420             425             430

Cys Gly Tyr Ser Asp Ala Leu Gln Pro Ala Pro Glu Ala Gly Thr Trp
            435             440             445

Phe Glu Ala Tyr Phe Glu Gln Leu Leu Thr Asn Ala Asn Pro Ser Phe
450             455             460

<210> SEQ ID NO 99
<211> LENGTH: 3060
<212> TYPE: DNA
<213> ORGANISM: Aspergillus fumigatus
```

```
<400> SEQUENCE: 99
atgagattcg gttggctcga ggtggccgct ctgacggccg cttctgtagc caatgcccag      60
gtttgtgatg ctttcccgtc attgtttcgg atatagttga caatagtcat ggaaataatc     120
aggaattggc tttctctcca ccattctacc cttcgccttg gctgatggc  cagggagagt     180 gggcagatgc ccatcgacgc gccgtcgaga tcgtttctca gatgacactg gcggagaagg     240
ttaaccttac aacgggtact gggtggggttg cgactttttt gttgacagtg agctttcttc    300
actgaccatc tacacagatg gaaatggac  cgatgcgtcg gtcaaaccgg cagcgttccc     360
aggtaagctt gcaattctgc aacaacgtgc aagtgtagtt gctaaaacgc ggtggtgcag     420
acttggtatc aactggggtc tttgtggcca ggattcccct tgggtatcc  gtttctgtga     480 gctatacccg cggagtcttt cagtccttgt attatgtgct gatgattgtc tctgtatagc     540
tgacctcaac tccgccttcc ctgctggtac taatgtcgcc gcgacatggg acaagacact     600
cgcctacctt cgtggcaagg ccatgggtga ggaattcaac gacaagggcg tggacatttt     660 gctgggcct  gctgctggtc ctctcggcaa atacccggac ggcggcagaa tctgggaagg     720
cttctctcct gatccggttc tcactggtgt acttttcgcc gaaactatca agggtatcca     780
agacgcgggt gtgattgcta ctgccaagca ttacattctg aatgaacagg agcatttccg     840
acaggttggc gaggcccagg gatatggtta caacatcacg gagacgatca gctccaacgt     900
ggatgacaag accatgcacg agttgtacct ttggtgagta gttgacactg caaatgagga     960
ccttgattga tttgactgac ctggaatgca ggccctttgc agatgctgtg cgcggtaaga    1020
ttttccgtag acttgacctc gcgacgaaga aatcgctgac gaaccatcgt agctggcgtt    1080
ggcgctgtca tgtgttccta caatcaaatc aacaacagct acggttgtca aaacagtcaa    1140
actctcaaca agctcctcaa ggctgagctg gcttccaag  gcttcgtcat gagtgactgg    1200
agcgctcacc acagcggtgt cggcgctgcc ctcgctgggt tggatatgtc gatgcctgga    1260
gacatttcct tcgacgacgg actctccttc tggggcacga acctaactgt cagtgttctt    1320
aacggcaccg ttccagcctg gcgtgtcgat gacatggctg ttcgtatcat gaccgcgtac    1380
tacaaggttg gtcgtgaccg tcttcgtatt ccccctaact tcagctcctg acccgggat     1440 gagtacggct gggagcattc tgctgtctcc gagggagcct ggaccaaggt gaacgacttc    1500
gtcaatgtgc agcgcagtca ctctcagatc atccgtgaga ttggtgccgc tagtacagtg    1560
ctcttgaaga acacgggtgc tcttcctttg accggcaagg aggttaaagt gggtgttctc    1620
ggtgaagacg ctggttccaa cccgtggggt gctaacggct gccccgaccg cggctgtgat    1680
aacggcactc ttgctatggc ctggggtagt ggtactgcca acttcccta  ccttgtcacc    1740 cccgagcagg ctatccagcg agaggtcatc agcaacggcg gcaatgtctt tgctgtgact    1800
gataacgggg ctctcagcca gatggcagat gttgcatctc aatccaggtg agtgcgggct    1860
cttagaaaaa gaacgttctc tgaatgaagt tttttaacca ttgcgaacag cgtgtctttg    1920
gtgtttgtca acgccgactc tggagagggt ttcatcagtg tcgacggcaa cgagggtgac    1980
cgcaaaaatc tcactctgtg aagaacggc  gaggccgtca ttgacactgt tgtcagccac    2040
tgcaacaaca cgattgtggt tattcacagt gttgggcccg tcttgatcga ccggtggtat    2100
gataacccca acgtcactgc catcatctgg gccggcttgc ccggtcagga gagtggcaac    2160
tccctggtcg acgtgctcta tggccgcgtc aaccccagcg ccaagacccc gttcacctgg    2220
ggcaagactc gggagtctta cggggctccc ttgctcaccg agcctaacaa tggcaatggt    2280
gctccccagg atgatttcaa cgagggcgtc ttcattgact accgtcactt tgacaagcgc    2340
```

-continued

```
aatgagaccc ccatttatga gtttggccat ggcttgagct acaccacctt tggttactct      2400
caccttcggg ttcaggccct caatagttcg agttcggcat atgtcccgac tagcggagag      2460
accaagcctg cgccaaccta tggtgagatc ggtagtgccg ccgactacct gtatcccgag      2520
ggtctcaaaa gaattaccaa gtttatttac ccttggctca actcgaccga cctcgaggat      2580
tcttctgacg acccgaacta cggctgggag gactcggagt acattcccga aggcgctagg      2640
gatgggtctc ctcaaccct cctgaaggct ggcggcgctc ctggtggtaa ccctacccct      2700
tatcaggatc ttgttagggt gtcggccacc ataaccaaca ctggtaacgt cgccggttat      2760
gaagtccctc aattggtgag tgacccgcat gttccttgcg ttgcaatttg gctaactcgc      2820
ttctagtatg tttcactggg cggaccgaac gagcctcggg tcgttctgcg caagttcgac      2880
cgaatcttcc tggctcctgg ggagcaaaag gtttggacca cgactcttaa ccgtcgtgat      2940
ctcgccaatt gggatgtgga ggctcaggac tgggtcatca caaagtaccc caagaaagtg      3000
cacgtcggca gctcctcgcg taagctgcct ctgagagcgc ctctgccccg tgtctactag      3060
```

<210> SEQ ID NO 100
<211> LENGTH: 863
<212> TYPE: PRT
<213> ORGANISM: Aspergillus fumigatus

<400> SEQUENCE: 100

```
Met Arg Phe Gly Trp Leu Glu Val Ala Ala Leu Thr Ala Ala Ser Val
 1               5                  10                  15

Ala Asn Ala Gln Glu Leu Ala Phe Ser Pro Pro Phe Tyr Pro Ser Pro
            20                  25                  30

Trp Ala Asp Gly Gln Gly Glu Trp Ala Asp Ala His Arg Arg Ala Val
        35                  40                  45

Glu Ile Val Ser Gln Met Thr Leu Ala Glu Lys Val Asn Leu Thr Thr
    50                  55                  60

Gly Thr Gly Trp Glu Met Asp Arg Cys Val Gly Gln Thr Gly Ser Val
65                  70                  75                  80

Pro Arg Leu Gly Ile Asn Trp Gly Leu Cys Gly Gln Asp Ser Pro Leu
                85                  90                  95

Gly Ile Arg Phe Ser Asp Leu Asn Ser Ala Phe Pro Ala Gly Thr Asn
            100                 105                 110

Val Ala Ala Thr Trp Asp Lys Thr Leu Ala Tyr Leu Arg Gly Lys Ala
        115                 120                 125

Met Gly Glu Glu Phe Asn Asp Lys Gly Val Asp Ile Leu Leu Gly Pro
    130                 135                 140

Ala Ala Gly Pro Leu Gly Lys Tyr Pro Asp Gly Gly Arg Ile Trp Glu
145                 150                 155                 160

Gly Phe Ser Pro Asp Pro Val Leu Thr Gly Val Leu Phe Ala Glu Thr
                165                 170                 175

Ile Lys Gly Ile Gln Asp Ala Gly Val Ile Ala Thr Ala Lys His Tyr
            180                 185                 190

Ile Leu Asn Glu Gln Glu His Phe Arg Gln Val Gly Glu Ala Gln Gly
        195                 200                 205

Tyr Gly Tyr Asn Ile Thr Glu Thr Ile Ser Ser Asn Val Asp Asp Lys
    210                 215                 220

Thr Met His Glu Leu Tyr Leu Trp Pro Phe Ala Asp Ala Val Arg Ala
225                 230                 235                 240

Gly Val Gly Ala Val Met Cys Ser Tyr Asn Gln Ile Asn Asn Ser Tyr
```

```
                245                 250                 255
Gly Cys Gln Asn Ser Gln Thr Leu Asn Lys Leu Leu Lys Ala Glu Leu
                260                 265                 270

Gly Phe Gln Gly Phe Val Met Ser Asp Trp Ser Ala His His Ser Gly
            275                 280                 285

Val Gly Ala Ala Leu Ala Gly Leu Asp Met Ser Met Pro Gly Asp Ile
        290                 295                 300

Ser Phe Asp Asp Gly Leu Ser Phe Trp Gly Thr Asn Leu Thr Val Ser
305                 310                 315                 320

Val Leu Asn Gly Thr Val Pro Ala Trp Arg Val Asp Asp Met Ala Val
                325                 330                 335

Arg Ile Met Thr Ala Tyr Tyr Lys Val Gly Arg Asp Arg Leu Arg Ile
            340                 345                 350

Pro Pro Asn Phe Ser Ser Trp Thr Arg Asp Glu Tyr Gly Trp Glu His
        355                 360                 365

Ser Ala Val Ser Glu Gly Ala Trp Thr Lys Val Asn Asp Phe Val Asn
370                 375                 380

Val Gln Arg Ser His Ser Gln Ile Ile Arg Glu Ile Gly Ala Ala Ser
385                 390                 395                 400

Thr Val Leu Leu Lys Asn Thr Gly Ala Leu Pro Leu Thr Gly Lys Glu
                405                 410                 415

Val Lys Val Gly Val Leu Gly Glu Asp Ala Gly Ser Asn Pro Trp Gly
            420                 425                 430

Ala Asn Gly Cys Pro Asp Arg Gly Cys Asp Asn Gly Thr Leu Ala Met
        435                 440                 445

Ala Trp Gly Ser Gly Thr Ala Asn Phe Pro Tyr Leu Val Thr Pro Glu
    450                 455                 460

Gln Ala Ile Gln Arg Glu Val Ile Ser Asn Gly Gly Asn Val Phe Ala
465                 470                 475                 480

Val Thr Asp Asn Gly Ala Leu Ser Gln Met Ala Asp Val Ala Ser Gln
                485                 490                 495

Ser Ser Val Ser Leu Val Phe Val Asn Ala Asp Ser Gly Glu Gly Phe
            500                 505                 510

Ile Ser Val Asp Gly Asn Glu Gly Asp Arg Lys Asn Leu Thr Leu Trp
        515                 520                 525

Lys Asn Gly Glu Ala Val Ile Asp Thr Val Val Ser His Cys Asn Asn
    530                 535                 540

Thr Ile Val Val Ile His Ser Val Gly Pro Val Leu Ile Asp Arg Trp
545                 550                 555                 560

Tyr Asp Asn Pro Asn Val Thr Ala Ile Ile Trp Ala Gly Leu Pro Gly
                565                 570                 575

Gln Glu Ser Gly Asn Ser Leu Val Asp Val Leu Tyr Gly Arg Val Asn
            580                 585                 590

Pro Ser Ala Lys Thr Pro Phe Thr Trp Gly Lys Thr Arg Glu Ser Tyr
        595                 600                 605

Gly Ala Pro Leu Leu Thr Glu Pro Asn Asn Gly Asn Gly Ala Pro Gln
    610                 615                 620

Asp Asp Phe Asn Glu Gly Val Phe Ile Asp Tyr Arg His Phe Asp Lys
625                 630                 635                 640

Arg Asn Glu Thr Pro Ile Tyr Glu Phe Gly His Gly Leu Ser Tyr Thr
                645                 650                 655

Thr Phe Gly Tyr Ser His Leu Arg Val Gln Ala Leu Asn Ser Ser Ser
            660                 665                 670
```

```
Ser Ala Tyr Val Pro Thr Ser Gly Glu Thr Lys Pro Ala Pro Thr Tyr
        675                 680                 685

Gly Glu Ile Gly Ser Ala Ala Asp Tyr Leu Tyr Pro Glu Gly Leu Lys
        690                 695                 700

Arg Ile Thr Lys Phe Ile Tyr Pro Trp Leu Asn Ser Thr Asp Leu Glu
705                 710                 715                 720

Asp Ser Ser Asp Asp Pro Asn Tyr Gly Trp Glu Asp Ser Glu Tyr Ile
                725                 730                 735

Pro Glu Gly Ala Arg Asp Gly Ser Pro Gln Pro Leu Leu Lys Ala Gly
            740                 745                 750

Gly Ala Pro Gly Gly Asn Pro Thr Leu Tyr Gln Asp Leu Val Arg Val
        755                 760                 765

Ser Ala Thr Ile Thr Asn Thr Gly Asn Val Ala Gly Tyr Glu Val Pro
770                 775                 780

Gln Leu Tyr Val Ser Leu Gly Gly Pro Asn Glu Pro Arg Val Val Leu
785                 790                 795                 800

Arg Lys Phe Asp Arg Ile Phe Leu Ala Pro Gly Glu Gln Lys Val Trp
                805                 810                 815

Thr Thr Thr Leu Asn Arg Arg Asp Leu Ala Asn Trp Asp Val Glu Ala
            820                 825                 830

Gln Asp Trp Val Ile Thr Lys Tyr Pro Lys Lys Val His Val Gly Ser
        835                 840                 845

Ser Ser Arg Lys Leu Pro Leu Arg Ala Pro Leu Pro Arg Val Tyr
850                 855                 860

<210> SEQ ID NO 101
<211> LENGTH: 835
<212> TYPE: DNA
<213> ORGANISM: Penicillium sp. emersonii

<400> SEQUENCE: 101
atgctgtctt cgacgactcg caccctcgcc tttacaggcc ttgcgggcct tctgtccgct      60
cccctggtca aggcccatgg ctttgtccag ggcattgtca tcggtgacca attgtaagtc     120
cctctcttgc agttctgtcg attaactgct ggactgcttg cttgactccc tgctgactcc     180
caacagctac agcgggtaca tcgtcaactc gttccctac gaatccaacc caccccccgt      240
catcggctgg gccacgaccg ccaccgacct gggcttcgtc gacggcacag gataccaagg     300
cccggacatc atctgccacc ggaatgcgac gcccgcgccg ctgacagccc ccgtggccgc     360
cggcggcacc gtcgagctgc agtggacgcc gtggccggac agccaccacg gacccgtcat     420
cacctacctg gcgccgtgca cggcaactg ctcgaccgtc gacaagacga cgctggagtt      480
cttcaagatc gaccagcagg gcctgatcga cgacacgagc ccgccgggca cctgggcgtc     540
ggacaacctc atcgccaaca caatagctg gaccgtcacc attcccaaca gcgtcgcccc      600
cggcaactac gtcctgcgcc acgagatcat cgccctgcac tcggccaaca acaaggacgg     660
cgcccagaac taccccagt gcatcaacat cgaggtcacg ggcggcggct ccgacgcgcc      720
tgagggtact ctgggcgagg atctctacca tgacaccgac ccgggcattc tggtcgacat     780
ttacgagccc attgcgacgt ataccattcc ggggccgcct gagccgacgt tctag          835

<210> SEQ ID NO 102
<211> LENGTH: 253
<212> TYPE: PRT
<213> ORGANISM: Penicillium sp. Emersonii
```

<400> SEQUENCE: 102

Met Leu Ser Ser Thr Thr Arg Thr Leu Ala Phe Thr Gly Leu Ala Gly
1               5                   10                  15

Leu Leu Ser Ala Pro Leu Val Lys Ala His Gly Phe Val Gln Gly Ile
            20                  25                  30

Val Ile Gly Asp Gln Phe Tyr Ser Gly Tyr Ile Val Asn Ser Phe Pro
        35                  40                  45

Tyr Glu Ser Asn Pro Pro Val Ile Gly Trp Ala Thr Thr Ala Thr
    50                  55                  60

Asp Leu Gly Phe Val Asp Gly Thr Gly Tyr Gln Gly Pro Asp Ile Ile
65                  70                  75                  80

Cys His Arg Asn Ala Thr Pro Ala Pro Leu Thr Ala Pro Val Ala Ala
                85                  90                  95

Gly Gly Thr Val Glu Leu Gln Trp Thr Pro Trp Pro Ser His His
            100                 105                 110

Gly Pro Val Ile Thr Tyr Leu Ala Pro Cys Asn Gly Asn Cys Ser Thr
        115                 120                 125

Val Asp Lys Thr Thr Leu Glu Phe Phe Lys Ile Asp Gln Gln Gly Leu
    130                 135                 140

Ile Asp Asp Thr Ser Pro Pro Gly Thr Trp Ala Ser Asp Asn Leu Ile
145                 150                 155                 160

Ala Asn Asn Asn Ser Trp Thr Val Thr Ile Pro Asn Ser Val Ala Pro
                165                 170                 175

Gly Asn Tyr Val Leu Arg His Glu Ile Ile Ala Leu His Ser Ala Asn
            180                 185                 190

Asn Lys Asp Gly Ala Gln Asn Tyr Pro Gln Cys Ile Asn Ile Glu Val
        195                 200                 205

Thr Gly Gly Gly Ser Asp Ala Pro Glu Gly Thr Leu Gly Glu Asp Leu
    210                 215                 220

Tyr His Asp Thr Asp Pro Gly Ile Leu Val Asp Ile Tyr Glu Pro Ile
225                 230                 235                 240

Ala Thr Tyr Thr Ile Pro Gly Pro Pro Glu Pro Thr Phe
                245                 250

<210> SEQ ID NO 103
<211> LENGTH: 1520
<212> TYPE: DNA
<213> ORGANISM: Talaromyces leycettanus

<400> SEQUENCE: 103

```
atggtccatc tttcttccct ggccctggct ttggccgccg gctcgcagct gtatgtgatc      60
catgccatga ctcgagaagt gctcccaaaa ctgactccaa gtctcaatct tagtgcccaa     120
gctgcaggtc ttaacactgc tgccaaagcg attggaaagc tctatttcgg taccgcaacc     180
gacaacccgg agctgtccga cagcacatac atgcaggaga cggataacac cgatgatttc     240
ggccaactca ccccagctaa ctccatgaag gttcgctgac atcttagttc ccccccccctt     300
ttgggaatct gcgcggagat atgctgagcc ttcaaaacta gtgggatgcc accgagccct     360
ctcagaacac cttcaccttc accaacggtg atcagatcgc aaaccttgct aagagcaacg     420
gtcagatgct gagatgccac aacctggtgt ggtacaacca gttgcccagc tggggtaagc     480
aaccggttct gttaatatca tcagcgtgac cgcatcgatc gtattgcgcg gagattggaa     540
agatttgcaa gctaatgtca ctacagtcac cagcggatct tggaccaatg ccacgcttct     600
tgcggccatg aagaaccaca tcaccaacgt tgtgacccac tacaagggac agtgctacgc     660
```

-continued

```
ttgggatgtt gtcaacgaag gtacgtttcg attcggcttc cctcggaccg tatctgcagg    720
caaaaaggtc aatcaattga caatcgtgat ccccagctct caacgatgat ggcacctacc    780
gatccaatgt cttctatcag tacatcggcg aggcatacat tcccattgcc tttgcgaccg    840
ctgccgccgc cgatccaaac gcgaagctct actacaacga ctacaacatt gagtaccccg    900
gcgccaaggc caccgccgcc cagaacatcg tcaagatggt caaggcttac ggcgcgaaaa    960
tcgacggtgt cggtctgcaa tctcacttca tcgttggcag caccccctagc cagagctccc    1020 agcagagcaa catggctgct ttcaccgcgc tcggcgtcga ggtcgccatc accgaactgg    1080
atatccgcat gacgttgcct tccaccagtg ctctcttggc ccagcaatcc accgattacc    1140
agagcactgt gtcggcttgc gtgaacactc cgaagtgcat tggtatcacc ctctgggact    1200
ggaccgacaa gtactcctgg gttcccaaca ccttctccgg ccaaggtgac gcctgccccct   1260 gggattctaa ctaccagaag aagcctgcct actacggtat cttgactgcg ctcggaggca    1320
gcgcttccac ctccaccacc accactctgg tgacctccac caggacttcg actacgacca    1380
gcacttcggc cacctccacg tctactggcg ttgctcagca ctggggccag tgcggtggta    1440
tcggctggac agggccgact acctgcgcta gcccctacac ctgccaggaa ctgaatccct    1500
actactacca gtgcctgtaa                                                1520
```

<210> SEQ ID NO 104
<211> LENGTH: 405
<212> TYPE: PRT
<213> ORGANISM: Talaromyces leycettanus
<400> SEQUENCE: 104

```
Met Val His Leu Ser Ser Leu Ala Leu Ala Ala Gly Ser Gln
1               5                   10                  15

Leu Ala Gln Ala Ala Gly Leu Asn Thr Ala Ala Lys Ala Ile Gly Lys
            20                  25                  30

Leu Tyr Phe Gly Thr Ala Thr Asp Asn Pro Glu Leu Ser Asp Ser Thr
        35                  40                  45

Tyr Met Gln Glu Thr Asp Asn Thr Asp Asp Phe Gly Gln Leu Thr Pro
    50                  55                  60

Ala Asn Ser Met Lys Trp Asp Ala Thr Glu Pro Ser Gln Asn Thr Phe
65                  70                  75                  80

Thr Phe Thr Asn Gly Asp Gln Ile Ala Asn Leu Ala Lys Ser Asn Gly
                85                  90                  95

Gln Met Leu Arg Cys His Asn Leu Val Trp Tyr Asn Gln Leu Pro Ser
            100                 105                 110

Trp Val Thr Ser Gly Ser Trp Thr Asn Ala Thr Leu Leu Ala Ala Met
        115                 120                 125

Lys Asn His Ile Thr Asn Val Val Thr His Tyr Lys Gly Gln Cys Tyr
    130                 135                 140

Ala Trp Asp Val Val Asn Glu Ala Leu Asn Asp Asp Gly Thr Tyr Arg
145                 150                 155                 160

Ser Asn Val Phe Tyr Gln Tyr Ile Gly Glu Ala Tyr Ile Pro Ile Ala
                165                 170                 175

Phe Ala Thr Ala Ala Ala Ala Asp Pro Asn Ala Lys Leu Tyr Tyr Asn
            180                 185                 190

Asp Tyr Asn Ile Glu Tyr Pro Gly Ala Lys Ala Thr Ala Ala Gln Asn
        195                 200                 205

Ile Val Lys Met Val Lys Ala Tyr Gly Ala Lys Ile Asp Gly Val Gly
```

```
                    210                 215                 220
Leu Gln Ser His Phe Ile Val Gly Ser Thr Pro Ser Gln Ser Gln
225                 230                 235                 240

Gln Ser Asn Met Ala Ala Phe Thr Ala Leu Gly Val Glu Val Ala Ile
                245                 250                 255

Thr Glu Leu Asp Ile Arg Met Thr Leu Pro Ser Thr Ser Ala Leu Leu
                260                 265                 270

Ala Gln Gln Ser Thr Asp Tyr Gln Ser Thr Val Ser Ala Cys Val Asn
                275                 280                 285

Thr Pro Lys Cys Ile Gly Ile Thr Leu Trp Asp Trp Thr Asp Lys Tyr
            290                 295                 300

Ser Trp Val Pro Asn Thr Phe Ser Gly Gln Gly Asp Ala Cys Pro Trp
305                 310                 315                 320

Asp Ser Asn Tyr Gln Lys Lys Pro Ala Tyr Tyr Gly Ile Leu Thr Ala
                325                 330                 335

Leu Gly Gly Ser Ala Ser Thr Ser Thr Thr Thr Thr Leu Val Thr Ser
                340                 345                 350

Thr Arg Thr Ser Thr Thr Thr Ser Thr Ser Ala Thr Ser Thr Ser Thr
            355                 360                 365

Gly Val Ala Gln His Trp Gly Gln Cys Gly Gly Ile Gly Trp Thr Gly
            370                 375                 380

Pro Thr Thr Cys Ala Ser Pro Tyr Thr Cys Gln Glu Leu Asn Pro Tyr
385                 390                 395                 400

Tyr Tyr Gln Cys Leu
            405

<210> SEQ ID NO 105
<211> LENGTH: 1197
<212> TYPE: DNA
<213> ORGANISM: Trichophaea sacatta

<400> SEQUENCE: 105
atgcgtacct tctcgtctct tctcggtgtt gcccttctct tgggtgcagc taatgcccag    60
gtcgcggttt ggggacagtg tggtggcatt ggttactctg ctcgacaac ctgcgctgcg    120 ggaacgactt gtgttaagct gaacgactac tactcccaat gccaacccgg cggtaccact   180
ttgacaacca ccaccaaacc cgccaccact accactacca ccacggcaac ttctcccctca   240 tcttctcccg gattaaatgc cctggcacaa agagcggcc ggtacttcgg tagtgcaact    300
gacaacccag agctctccga tgcggcatac attgccatcc tgagcaacaa aaacgagttt   360
gggatcatca cgcctggaaa ctcgatgaaa tgggatgcta ctgaaccgtc ccgcgggagt   420
ttctcgttca ctggtggaca gcaaattgtt gattttgcgc agggcaatgg gcaggctatc   480
agaggccata ctcttgtctg gtactcccag ttgccgtcct gggttactag cggaaacttc   540
gataaagcta cattgacatc gatcatgcaa aatcacatta caactcttgt cagccactgg   600
aagggccagc tcgcctactg ggatgttgtc aacgaagcat tcaacgatga tggcactttc   660
cgtcaaaacg tgttctacac aaccattgga gaggactaca tccagctcgc cttcgaagcc   720
gcccgtgccg ccgaccccga cgcaaagctc tgcatcaacg actacaacat cgagggcact   780
ggagccaagt caacagccat gtacaatctc gtctcgaagc tgaaatccgc cggcgttccc   840
atcgactgta ttggtgttca gggacaccct catcgtcggtg aagttcccac caccatccaa   900
gcaaaccttg cccagtttgc gtctttgggt gtggatgtcg cgatcaccga gctagatatc   960
agaatgacgc tgccatctac gactgcattg ctccagcagc aggctaagga ttacgtctcg   1020
```

-continued

```
gttgttacag cctgcatgaa tgttcccagg tgtatcggta tcaccatctg ggactacact    1080
gataaatact cttgggtgcc acaaaccttc agcggccagg gcgatgcttg cccatgggat    1140
gccaacctgc agaagaagcc agcctactcc gctattgcgt ctgctcttgc ggcttga      1197
```

<210> SEQ ID NO 106
<211> LENGTH: 398
<212> TYPE: PRT
<213> ORGANISM: Trichophaea saccata

<400> SEQUENCE: 106

```
Met Arg Thr Phe Ser Ser Leu Leu Gly Val Ala Leu Leu Gly Ala
1               5                   10                  15

Ala Asn Ala Gln Val Ala Val Trp Gly Gln Cys Gly Gly Ile Gly Tyr
            20                  25                  30

Ser Gly Ser Thr Thr Cys Ala Ala Gly Thr Thr Cys Val Lys Leu Asn
        35                  40                  45

Asp Tyr Tyr Ser Gln Cys Gln Pro Gly Gly Thr Thr Leu Thr Thr Thr
    50                  55                  60

Thr Lys Pro Ala Thr Thr Thr Thr Thr Thr Ala Thr Ser Pro Ser
65                  70                  75                  80

Ser Ser Pro Gly Leu Asn Ala Leu Ala Gln Lys Ser Gly Arg Tyr Phe
                85                  90                  95

Gly Ser Ala Thr Asp Asn Pro Glu Leu Ser Asp Ala Ala Tyr Ile Ala
            100                 105                 110

Ile Leu Ser Asn Lys Asn Glu Phe Gly Ile Ile Thr Pro Gly Asn Ser
        115                 120                 125

Met Lys Trp Asp Ala Thr Glu Pro Ser Arg Gly Ser Phe Ser Phe Thr
    130                 135                 140

Gly Gly Gln Gln Ile Val Asp Phe Ala Gln Gly Asn Gly Gln Ala Ile
145                 150                 155                 160

Arg Gly His Thr Leu Val Trp Tyr Ser Gln Leu Pro Ser Trp Val Thr
                165                 170                 175

Ser Gly Asn Phe Asp Lys Ala Thr Leu Thr Ser Ile Met Gln Asn His
            180                 185                 190

Ile Thr Thr Leu Val Ser His Trp Lys Gly Gln Leu Ala Tyr Trp Asp
        195                 200                 205

Val Val Asn Glu Ala Phe Asn Asp Asp Gly Thr Phe Arg Gln Asn Val
    210                 215                 220

Phe Tyr Thr Thr Ile Gly Glu Asp Tyr Ile Gln Leu Ala Phe Glu Ala
225                 230                 235                 240

Ala Arg Ala Ala Asp Pro Thr Ala Lys Leu Cys Ile Asn Asp Tyr Asn
                245                 250                 255

Ile Glu Gly Thr Gly Ala Lys Ser Thr Ala Met Tyr Asn Leu Val Ser
            260                 265                 270

Lys Leu Lys Ser Ala Gly Val Pro Ile Asp Cys Ile Gly Val Gln Gly
        275                 280                 285

His Leu Ile Val Gly Glu Val Pro Thr Thr Ile Gln Ala Asn Leu Ala
    290                 295                 300

Gln Phe Ala Ser Leu Gly Val Asp Val Ala Ile Thr Glu Leu Asp Ile
305                 310                 315                 320

Arg Met Thr Leu Pro Ser Thr Thr Ala Leu Leu Gln Gln Gln Ala Lys
                325                 330                 335

Asp Tyr Val Ser Val Val Thr Ala Cys Met Asn Val Pro Arg Cys Ile
```

|     | 340 |     |     |     | 345 |     |     |     | 350 |     |     |
| --- | --- | --- | --- | --- | --- | --- | --- | --- | --- | --- | --- |

Gly Ile Thr Ile Trp Asp Tyr Thr Asp Lys Tyr Ser Trp Val Pro Gln
        355                 360                 365

Thr Phe Ser Gly Gln Gly Asp Ala Cys Pro Trp Asp Ala Asn Leu Gln
    370                 375                 380

Lys Lys Pro Ala Tyr Ser Ala Ile Ala Ser Ala Leu Ala Ala
385                 390                 395

<210> SEQ ID NO 107
<211> LENGTH: 2391
<212> TYPE: DNA
<213> ORGANISM: Talaromyces emersonii

<400> SEQUENCE: 107

| | | | | | |
|---|---|---|---|---|---|
| atgatgactc | ccacggcgat | tctcaccgca | gtggcggcgc | tcctgcccac | cgcgacatgg | 60 |
| gcacaggata | accaaaccta | tgccaattac | tcgtcgcagt | ctcagccgga | cctgtttccc | 120 |
| cggaccgtcg | cgaccatcga | cctgtccttc | cccgactgtg | agaatggccc | gctcagcacg | 180 |
| aacctggtgt | gcaacaaatc | ggccgatccc | tgggcccgag | ctgaggccct | catctcgctc | 240 |
| tttaccctcg | aagagctgat | taacaacacc | cagaacaccg | ctcctggcgt | gccccgtttg | 300 |
| ggtctgcccc | agtatcaggt | gtggaatgaa | gctctgcacg | gactggaccg | cgccaatttc | 360 |
| tcccattcgg | gcgaatacag | ctgggccacg | tccttcccca | tgcccatcct | gtcgatggcg | 420 |
| tccttcaacc | ggaccctcat | caaccagatt | gcctccatca | ttgcaacgca | agcccgtgcc | 480 |
| ttcaacaacg | ccggccgtta | cggccttgac | agctatgcgc | ccaacatcaa | tggcttccgc | 540 |
| agtcccctct | ggggccgtgg | acaggagacg | cctggtgagg | atgcgttctt | cttgagttcc | 600 |
| acctatgcgt | acgagtacat | cacaggcctg | cagggcggtg | tcgacccaga | gcatgtcaag | 660 |
| atcgtcgcga | cggcgaagca | cttcgccggc | tatgatctgg | agaactgggg | caacgtctct | 720 |
| cggctggggt | tcaatgctat | catcacgcag | caggatctct | ccgagtacta | cacccctcag | 780 |
| ttcctggcgt | ctgctcgata | cgccaagacg | cgcagcatca | tgtgctccta | caatgcagtg | 840 |
| aatggagtcc | caagctgtgc | caactccttc | ttcctccaga | cgcttctccg | agaaaacttt | 900 |
| gacttcgttg | acgacgggta | cgtctcgtcg | gattgcgacg | ccgtctacaa | cgtcttcaac | 960 |
| ccacacggtt | acgcccttaa | ccagtcggga | gccgctgcgg | actcgctcct | agcaggtacc | 1020 |
| gatatcgact | gtggtcagac | cttgccgtgg | cacctgaatg | agtccttcgt | agaaggatac | 1080 |
| gtctcccgcg | gtgatatcga | gaatccctc | accgtctct | actcaaacct | ggtgcgtctc | 1140 |
| ggctactttg | acggcaacaa | cagcgagtac | cgcaacctca | ctggaacga | cgtcgtgact | 1200 |
| acggacgcct | ggaacatctc | gtacgaggcc | gcggtggaag | gtatcaccct | gctcaagaac | 1260 |
| gacgaaacgc | tgccgctgtc | caagaaggtc | cgcagcattg | cgctcatcgg | tccttgggcc | 1320 |
| aatgccacgg | tgcagatgca | gggtaactac | tatgaacgc | caccgtatct | gatcagtccg | 1380 |
| ctggaagccg | ccaaggccag | tgggttcacg | gtcaactatg | cattcggtac | caacatctcg | 1440 |
| accgattcta | cccagtggtt | cgcggaagcc | atcgcggcgg | cgaagaagtc | ggacgtgatc | 1500 |
| atctacgccg | gtggtattga | caacacgatc | gaggcagagg | acaggaccg | cacggatctc | 1560 |
| aagtggccgg | ggaaccagct | ggatctgatc | gagcagctca | gccaggtggg | caagcccttg | 1620 |
| gtcgtcctgc | agatgggcgg | tggccaggtg | gattcgtcgt | cactcaaggc | caacaagaat | 1680 |
| gtcaacgctc | tggtgtgggg | tggctatccc | ggacagtcgg | gtggtgcggc | cctgtttgac | 1740 |
| atccttacgg | gcaagcgtgc | gccggccggt | cgtctggtga | gcacgcagta | cccggccgag | 1800 |

-continued

```
tatgcgacgc agttcccggc caacgacatg aacctgcgtc cgaacggcag caacccggga    1860
cagacataca tctggtacac gggcacgccc gtgtatgagt tcggccacgg tctgttctac    1920
acggagttcc aggagtcggc tgcggcgggc acgaacaaga cgtcgacttt cgacattctg    1980
gaccttttct ccaccccctca tccgggatac gagtacatcg agcaggttcc gttcatcaac    2040
gtgactgtgg acgtgaagaa cgtcggccac acgccatcgc cgtacacggg tctgttgttc    2100
gcgaacacga cagccgggcc caagccgtac ccgaacaaat ggctcgtcgg gttcgactgg    2160
ctgccgacga tccagccggg cgagactgcc aagttgacga tcccggtgcc gttgggcgcg    2220
attgcgtggg cggacgagaa cggcaacaag gtggtcttcc cgggcaacta cgaattggca    2280
ctgaacaatg agcgatcggt agtggtgtcg ttcacgctga cgggcgatgc ggcgactcta    2340
gagaaatggc ctttgtggga gcaggcggtt ccggggggtgc tgcagcaata a            2391
```

<210> SEQ ID NO 108
<211> LENGTH: 796
<212> TYPE: PRT
<213> ORGANISM: Talaromyces emersonii

<400> SEQUENCE: 108

```
Met Met Thr Pro Thr Ala Ile Leu Thr Ala Val Ala Ala Leu Leu Pro
1               5                   10                  15

Thr Ala Thr Trp Ala Gln Asp Asn Gln Thr Tyr Ala Asn Tyr Ser Ser
            20                  25                  30

Gln Ser Gln Pro Asp Leu Phe Pro Arg Thr Val Ala Thr Ile Asp Leu
        35                  40                  45

Ser Phe Pro Asp Cys Glu Asn Gly Pro Leu Ser Thr Asn Leu Val Cys
    50                  55                  60

Asn Lys Ser Ala Asp Pro Trp Ala Arg Ala Glu Ala Leu Ile Ser Leu
65                  70                  75                  80

Phe Thr Leu Glu Glu Leu Ile Asn Asn Thr Gln Asn Thr Ala Pro Gly
                85                  90                  95

Val Pro Arg Leu Gly Leu Pro Gln Tyr Gln Val Trp Asn Glu Ala Leu
            100                 105                 110

His Gly Leu Asp Arg Ala Asn Phe Ser His Ser Gly Glu Tyr Ser Trp
        115                 120                 125

Ala Thr Ser Phe Pro Met Pro Ile Leu Ser Met Ala Ser Phe Asn Arg
    130                 135                 140

Thr Leu Ile Asn Gln Ile Ala Ser Ile Ile Ala Thr Gln Ala Arg Ala
145                 150                 155                 160

Phe Asn Asn Ala Gly Arg Tyr Gly Leu Asp Ser Tyr Ala Pro Asn Ile
                165                 170                 175

Asn Gly Phe Arg Ser Pro Leu Trp Gly Arg Gly Gln Glu Thr Pro Gly
            180                 185                 190

Glu Asp Ala Phe Phe Leu Ser Ser Thr Tyr Ala Tyr Glu Tyr Ile Thr
        195                 200                 205

Gly Leu Gln Gly Gly Val Asp Pro Glu His Val Lys Ile Val Ala Thr
    210                 215                 220

Ala Lys His Phe Ala Gly Tyr Asp Leu Glu Asn Trp Gly Asn Val Ser
225                 230                 235                 240

Arg Leu Gly Phe Asn Ala Ile Ile Thr Gln Gln Asp Leu Ser Glu Tyr
                245                 250                 255

Tyr Thr Pro Gln Phe Leu Ala Ser Ala Arg Tyr Ala Lys Thr Arg Ser
            260                 265                 270
```

```
Ile Met Cys Ser Tyr Asn Ala Val Asn Gly Val Pro Ser Cys Ala Asn
275                 280                 285

Ser Phe Phe Leu Gln Thr Leu Leu Arg Glu Asn Phe Asp Phe Val Asp
290                 295                 300

Asp Gly Tyr Val Ser Ser Asp Cys Asp Ala Val Tyr Asn Val Phe Asn
305                 310                 315                 320

Pro His Gly Tyr Ala Leu Asn Gln Ser Gly Ala Ala Ala Asp Ser Leu
                325                 330                 335

Leu Ala Gly Thr Asp Ile Asp Cys Gly Gln Thr Leu Pro Trp His Leu
                340                 345                 350

Asn Glu Ser Phe Val Glu Gly Tyr Val Ser Arg Gly Asp Ile Glu Lys
                355                 360                 365

Ser Leu Thr Arg Leu Tyr Ser Asn Leu Val Arg Leu Gly Tyr Phe Asp
                370                 375                 380

Gly Asn Asn Ser Glu Tyr Arg Asn Leu Asn Trp Asn Asp Val Val Thr
385                 390                 395                 400

Thr Asp Ala Trp Asn Ile Ser Tyr Glu Ala Ala Val Glu Gly Ile Thr
                405                 410                 415

Leu Leu Lys Asn Asp Gly Thr Leu Pro Leu Ser Lys Lys Val Arg Ser
                420                 425                 430

Ile Ala Leu Ile Gly Pro Trp Ala Asn Ala Thr Val Gln Met Gln Gly
                435                 440                 445

Asn Tyr Tyr Gly Thr Pro Pro Tyr Leu Ile Ser Pro Leu Glu Ala Ala
                450                 455                 460

Lys Ala Ser Gly Phe Thr Val Asn Tyr Ala Phe Gly Thr Asn Ile Ser
465                 470                 475                 480

Thr Asp Ser Thr Gln Trp Phe Ala Glu Ala Ile Ala Ala Ala Lys Lys
                485                 490                 495

Ser Asp Val Ile Ile Tyr Ala Gly Gly Ile Asp Asn Thr Ile Glu Ala
                500                 505                 510

Glu Gly Gln Asp Arg Thr Asp Leu Lys Trp Pro Gly Asn Gln Leu Asp
                515                 520                 525

Leu Ile Glu Gln Leu Ser Gln Val Gly Lys Pro Leu Val Val Leu Gln
                530                 535                 540

Met Gly Gly Gly Gln Val Asp Ser Ser Ser Leu Lys Ala Asn Lys Asn
545                 550                 555                 560

Val Asn Ala Leu Val Trp Gly Gly Tyr Pro Gly Gln Ser Gly Gly Ala
                565                 570                 575

Ala Leu Phe Asp Ile Leu Thr Gly Lys Arg Ala Pro Ala Gly Arg Leu
                580                 585                 590

Val Ser Thr Gln Tyr Pro Ala Glu Tyr Ala Thr Gln Phe Pro Ala Asn
                595                 600                 605

Asp Met Asn Leu Arg Pro Asn Gly Ser Asn Pro Gly Gln Thr Tyr Ile
                610                 615                 620

Trp Tyr Thr Gly Thr Pro Val Tyr Glu Phe Gly His Gly Leu Phe Tyr
625                 630                 635                 640

Thr Glu Phe Gln Glu Ser Ala Ala Gly Thr Asn Lys Thr Ser Thr
                645                 650                 655

Phe Asp Ile Leu Asp Leu Phe Ser Thr Pro His Pro Gly Tyr Glu Tyr
                660                 665                 670

Ile Glu Gln Val Pro Phe Ile Asn Val Thr Val Asp Val Lys Asn Val
                675                 680                 685

Gly His Thr Pro Ser Pro Tyr Thr Gly Leu Leu Phe Ala Asn Thr Thr
```

```
                690           695           700
Ala Gly Pro Lys Pro Tyr Pro Asn Lys Trp Leu Val Gly Phe Asp Trp
705                 710                 715                 720

Leu Pro Thr Ile Gln Pro Gly Glu Thr Ala Lys Leu Thr Ile Pro Val
                725                 730                 735

Pro Leu Gly Ala Ile Ala Trp Ala Asp Glu Asn Gly Asn Lys Val Val
            740                 745                 750

Phe Pro Gly Asn Tyr Glu Leu Ala Leu Asn Asn Glu Arg Ser Val Val
        755                 760                 765

Val Ser Phe Thr Leu Thr Gly Asp Ala Ala Thr Leu Glu Lys Trp Pro
    770                 775                 780

Leu Trp Glu Gln Ala Val Pro Gly Val Leu Gln Gln
785                 790                 795
```

<210> SEQ ID NO 109
<211> LENGTH: 1507
<212> TYPE: DNA
<213> ORGANISM: Trichoderma reesei

<400> SEQUENCE: 109

```
atggcgccct cagttacact gccgttgacc acggccatcc tggccattgc ccggctcgtc    60
gccgcccagc aaccgggtac cagcaccccc gaggtccatc ccaagttgac aacctacaag   120
tgtacaaagt ccggggggtg cgtggcccag gacacctcgg tggtccttga ctggaactac   180
cgctggatgc acgacgcaaa ctacaactcg tgcaccgtca acggcggcgt caacaccacg   240
ctctgccctg acgaggcgac ctgtggcaag aactgcttca tcgagggcgt cgactacgcc   300
gcctcgggcg tcacgacctc gggcagcagc ctcaccatga accagtacat gcccagcagc   360
tctggcggct acagcagcgt ctctcctcgg ctgtatctcc tggactctga cggtgagtac   420
gtgatgctga agctcaacgg ccaggagctg agcttcgacg tcgacctctc tgctctgccg   480
tgtggagaga acggctcgct ctacctgtct cagatggacg agaacggggg cgccaaccag   540
tataacacgg ccggtgccaa ctacggcagc ggctactgcg atgctcagtg ccccgtccag   600
acatggagga acggcacccc caacactagc caccagggct ctgctgcaa cgagatggat   660
atcctggagg gcaactcgag ggcgaatgcc ttgacccctc actcttgcac ggccacggcc   720
tgcgactctg ccgttgcgg cttcaacccc tatggcagcg gctacaaaag gtgagcctga   780
tgccactact accccttcc tggcgctctc gcggttttcc atgctgacat ggttttccag   840
ctactacggc cccggagata ccgttgacac ctccaagacc ttcaccatca tcacccagtt   900
caacacggac aacggctcgc cctcgggcaa ccttgtgagc atcacccgca agtaccagca   960
aaacggcgtc gacatcccca cgcgcccagc cggcggcgac accatctcgt cctgccccgt  1020
cgcctcagcc tacggcggcc tcgccaccat gggcaaggcc ctgagcagcg gcatggtgct  1080
cgtgttcagc atttggaacg acaacagcca gtacatgaac tggctcgaca gcggcaacgc  1140
cggcccctgc agcagcaccg agggcaaccc atccaacatc ctggccaaca ccccaacac  1200
gcacgtcgtc ttctccaaca tccgctgggg agacattggg tctactacga actcgactgc  1260
gccccgccc ccgcctgcgt ccagcacgac gttttcgact acacggagga gctcgacgac  1320
ttcgagcagc ccgagctgca cgcagactca ctggggcag tgcggtggca ttgggtacag  1380
cgggtgcaag acgtgcacgt cgggcactac gtgccagtat agcaacgact gttcgtatcc  1440
ccatgcctga cggagtgat tttgagatgc taaccgctaa atacagact actcgcaatg  1500
cctttag                                                            1507
```

<210> SEQ ID NO 110
<211> LENGTH: 459
<212> TYPE: PRT
<213> ORGANISM: Trichoderma reseei

<400> SEQUENCE: 110

```
Met Ala Pro Ser Val Thr Leu Pro Leu Thr Thr Ala Ile Leu Ala Ile
1               5                   10                  15

Ala Arg Leu Val Ala Ala Gln Gln Pro Gly Thr Ser Thr Pro Glu Val
            20                  25                  30

His Pro Lys Leu Thr Thr Tyr Lys Cys Thr Lys Ser Gly Gly Cys Val
        35                  40                  45

Ala Gln Asp Thr Ser Val Val Leu Asp Trp Asn Tyr Arg Trp Met His
    50                  55                  60

Asp Ala Asn Tyr Asn Ser Cys Thr Val Asn Gly Gly Val Asn Thr Thr
65                  70                  75                  80

Leu Cys Pro Asp Glu Ala Thr Cys Gly Lys Asn Cys Phe Ile Glu Gly
                85                  90                  95

Val Asp Tyr Ala Ala Ser Gly Val Thr Thr Ser Gly Ser Ser Leu Thr
            100                 105                 110

Met Asn Gln Tyr Met Pro Ser Ser Gly Gly Tyr Ser Ser Val Ser
            115                 120                 125

Pro Arg Leu Tyr Leu Leu Asp Ser Asp Gly Glu Tyr Val Met Leu Lys
        130                 135                 140

Leu Asn Gly Gln Glu Leu Ser Phe Asp Val Asp Leu Ser Ala Leu Pro
145                 150                 155                 160

Cys Gly Glu Asn Gly Ser Leu Tyr Leu Ser Gln Met Asp Glu Asn Gly
                165                 170                 175

Gly Ala Asn Gln Tyr Asn Thr Ala Gly Ala Asn Tyr Gly Ser Gly Tyr
            180                 185                 190

Cys Asp Ala Gln Cys Pro Val Gln Thr Trp Arg Asn Gly Thr Leu Asn
        195                 200                 205

Thr Ser His Gln Gly Phe Cys Cys Asn Glu Met Asp Ile Leu Glu Gly
    210                 215                 220

Asn Ser Arg Ala Asn Ala Leu Thr Pro His Ser Cys Thr Ala Thr Ala
225                 230                 235                 240

Cys Asp Ser Ala Gly Cys Gly Phe Asn Pro Tyr Gly Ser Gly Tyr Lys
                245                 250                 255

Ser Tyr Tyr Gly Pro Gly Asp Thr Val Asp Thr Ser Lys Thr Phe Thr
            260                 265                 270

Ile Ile Thr Gln Phe Asn Thr Asp Asn Gly Ser Pro Ser Gly Asn Leu
        275                 280                 285

Val Ser Ile Thr Arg Lys Tyr Gln Gln Asn Gly Val Asp Ile Pro Ser
    290                 295                 300

Ala Gln Pro Gly Gly Asp Thr Ile Ser Ser Cys Pro Ser Ala Ser Ala
305                 310                 315                 320

Tyr Gly Gly Leu Ala Thr Met Gly Lys Ala Leu Ser Ser Gly Met Val
                325                 330                 335

Leu Val Phe Ser Ile Trp Asn Asp Asn Ser Gln Tyr Met Asn Trp Leu
            340                 345                 350

Asp Ser Gly Asn Ala Gly Pro Cys Ser Ser Thr Glu Gly Asn Pro Ser
        355                 360                 365

Asn Ile Leu Ala Asn Asn Pro Asn Thr His Val Val Phe Ser Asn Ile
```

```
                370             375             380
Arg Trp Gly Asp Ile Gly Ser Thr Thr Asn Ser Thr Ala Pro Pro
385                 390                 395                 400

Pro Pro Ala Ser Ser Thr Thr Phe Ser Thr Thr Arg Arg Ser Ser Thr
            405                 410                 415

Thr Ser Ser Ser Pro Ser Cys Thr Gln Thr His Trp Gly Gln Cys Gly
            420                 425                 430

Gly Ile Gly Tyr Ser Gly Cys Lys Thr Cys Thr Ser Gly Thr Thr Cys
            435                 440                 445

Gln Tyr Ser Asn Asp Tyr Tyr Ser Gln Cys Leu
            450                 455

<210> SEQ ID NO 111
<211> LENGTH: 1507
<212> TYPE: DNA
<213> ORGANISM: Tirchoderma reesei

<400> SEQUENCE: 111
atggcgccct cagttacact gccgttgacc acggccatcc tggccattgc ccggctcgtc      60
gccgcccagc aaccgggtac cagcaccccc gaggtccatc ccaagttgac aacctacaag     120
tgtacaaagt ccggggggtg cgtggcccag acacctcgg tggtccttga ctggaactac      180
cgctggatgc acgacgcaaa ctacaactcg tgcaccgtca acggcggcgt caacaccacg     240
ctctgccctg acgaggcgac ctgtggcaag aactgcttca tcgagggcgt cgactacgcc     300
gcctcgggcg tcacgacctc gggcagcagc ctcaccatga accagtacat gcccagcagc     360
tctggcggct acagcagcgt ctctcctcgg ctgtatctcc tggactctga cggtgagtac     420
gtgatgctga agctcaacgg ccaggagctg agcttcgacg tcgacctctc tgctctgccg     480
tgtggagaga acggctcgct ctacctgtct cagatggacg agaacggggg cgccaaccag     540
tataacacgg ccggtgccaa ctacggagc ggctactgcg atgctcagtg ccccgtccag      600
acatggagga acggcaccct caacactagc caccagggct tctgctgcaa cgagatggat     660
atcctggagg gcaactcgag ggcgaatgcc ttgaccccct cactcttgca ggccacggcc     720
tgcgactctg ccggttgcgg cttcaacccc tatggcagcg gctacaaaag gtgagcctga     780
tgccactact accccttcc tggcgctctc gcggttttcc atgctgacat ggttttccag      840
ctactacggc cccggagata ccgttgacac ctccaagacc ttcaccatca tcacccagtt     900
caacacggac aacggctcgc cctcgggcaa ccttgtgagc atcacccgca agtaccagca     960
aaacggcgtc gacatcccca cgcgcccagcc cggcggcgac accatctcgt cctgcccgtc    1020
cgcctcagcc tacggcggcc tcgccaccat gggcaaggcc ctgagcagcg gcatggtgct    1080
cgtgttcagc atttggaacg acaacagcca gtacatgaac tggctcgaca cgggcaacgc    1140
cggcccctgc agcagcaccg agggcaaccc atccaacatc ctggccaaca ccccaacac    1200
gcacgtcgtc ttctccaaca tccgctgggg agacattggg tctactacga actcgactgc    1260
gccccgccc ccgcctgcgt ccagcacgac gtttcgact acacggagga gctcgacgac    1320
ttcgagcagc ccgagctgca cgcagactca ctggggcag tgcggtggca ttgggtacag    1380
cgggtgcaag acgtgcacgt cgggcactac gtgccagtat agcaacgact gttcgtatcc    1440
ccatgcctga cgggagtgat tttgagatgc taaccgctaa aatacagact actcgcaatg    1500
cctttag                                                             1507

<210> SEQ ID NO 112
```

```
<211> LENGTH: 418
<212> TYPE: PRT
<213> ORGANISM: Trichoderma Reesei

<400> SEQUENCE: 112
```

| | | | | | | | | | | | | | | |
|---|---|---|---|---|---|---|---|---|---|---|---|---|---|---|
| Met | Asn | Lys | Ser | Val | Ala | Pro | Leu | Leu | Leu | Ala | Ala | Ser | Ile | Leu | Tyr |
| 1 | | | | 5 | | | | | 10 | | | | | 15 | |

| Gly | Gly | Ala | Ala | Ala | Gln | Gln | Thr | Val | Trp | Gly | Gln | Cys | Gly | Gly | Ile |
|---|---|---|---|---|---|---|---|---|---|---|---|---|---|---|---|
| | | | 20 | | | | | 25 | | | | | 30 | | |

| Gly | Trp | Ser | Gly | Pro | Thr | Asn | Cys | Ala | Pro | Gly | Ser | Ala | Cys | Ser | Thr |
|---|---|---|---|---|---|---|---|---|---|---|---|---|---|---|---|
| | | 35 | | | | | 40 | | | | | 45 | | | |

| Leu | Asn | Pro | Tyr | Tyr | Ala | Gln | Cys | Ile | Pro | Gly | Ala | Thr | Thr | Ile | Thr |
| 50 | | | | | 55 | | | | | 60 | | | | | |

| Thr | Ser | Thr | Arg | Pro | Pro | Ser | Gly | Pro | Thr | Thr | Thr | Arg | Ala | Thr |
| 65 | | | | 70 | | | | | 75 | | | | | 80 |

| Ser | Thr | Ser | Ser | Ser | Thr | Pro | Pro | Thr | Ser | Ser | Gly | Val | Arg | Phe | Ala |
| | | | | 85 | | | | | 90 | | | | | 95 | |

| Gly | Val | Asn | Ile | Ala | Gly | Phe | Asp | Phe | Gly | Cys | Thr | Thr | Asp | Gly | Thr |
| | | | 100 | | | | | 105 | | | | | 110 | | |

| Cys | Val | Thr | Ser | Lys | Val | Tyr | Pro | Pro | Leu | Lys | Asn | Phe | Thr | Gly | Ser |
| | | 115 | | | | | 120 | | | | | 125 | | | |

| Asn | Asn | Tyr | Pro | Asp | Gly | Ile | Gly | Gln | Met | Gln | His | Phe | Val | Asn | Asp |
| 130 | | | | | 135 | | | | | 140 | | | | | |

| Asp | Gly | Met | Thr | Ile | Phe | Arg | Leu | Pro | Val | Gly | Trp | Gln | Tyr | Leu | Val |
| 145 | | | | | 150 | | | | | 155 | | | | | 160 |

| Asn | Asn | Asn | Leu | Gly | Gly | Asn | Leu | Asp | Ser | Thr | Ser | Ile | Ser | Lys | Tyr |
| | | | | 165 | | | | | 170 | | | | | 175 | |

| Asp | Gln | Leu | Val | Gln | Gly | Cys | Leu | Ser | Leu | Gly | Ala | Tyr | Cys | Ile | Val |
| | | | 180 | | | | | 185 | | | | | 190 | | |

| Asp | Ile | His | Asn | Tyr | Ala | Arg | Trp | Asn | Gly | Gly | Ile | Ile | Gly | Gln | Gly |
| | | 195 | | | | | 200 | | | | | 205 | | | |

| Gly | Pro | Thr | Asn | Ala | Gln | Phe | Thr | Ser | Leu | Trp | Ser | Gln | Leu | Ala | Ser |
| 210 | | | | | 215 | | | | | 220 | | | | | |

| Lys | Tyr | Ala | Ser | Gln | Ser | Arg | Val | Trp | Phe | Gly | Ile | Met | Asn | Glu | Pro |
| 225 | | | | | 230 | | | | | 235 | | | | | 240 |

| His | Asp | Val | Asn | Ile | Asn | Thr | Trp | Ala | Ala | Thr | Val | Gln | Glu | Val | Val |
| | | | | 245 | | | | | 250 | | | | | 255 | |

| Thr | Ala | Ile | Arg | Asn | Ala | Gly | Ala | Thr | Ser | Gln | Phe | Ile | Ser | Leu | Pro |
| | | | 260 | | | | | 265 | | | | | 270 | | |

| Gly | Asn | Asp | Trp | Gln | Ser | Ala | Gly | Ala | Phe | Ile | Ser | Asp | Gly | Ser | Ala |
| | | 275 | | | | | 280 | | | | | 285 | | | |

| Ala | Ala | Leu | Ser | Gln | Val | Thr | Asn | Pro | Asp | Gly | Ser | Thr | Thr | Asn | Leu |
| 290 | | | | | 295 | | | | | 300 | | | | | |

| Ile | Phe | Asp | Val | His | Lys | Tyr | Leu | Asp | Ser | Asp | Asn | Ser | Gly | Thr | His |
| 305 | | | | | 310 | | | | | 315 | | | | | 320 |

| Ala | Glu | Cys | Thr | Thr | Asn | Asn | Ile | Asp | Gly | Ala | Phe | Ser | Pro | Leu | Ala |
| | | | | 325 | | | | | 330 | | | | | 335 | |

| Thr | Trp | Leu | Arg | Gln | Asn | Asn | Arg | Gln | Ala | Ile | Leu | Thr | Glu | Thr | Gly |
| | | | 340 | | | | | 345 | | | | | 350 | | |

| Gly | Gly | Asn | Val | Gln | Ser | Cys | Ile | Gln | Asp | Met | Cys | Gln | Gln | Ile | Gln |
| | | 355 | | | | | 360 | | | | | 365 | | | |

| Tyr | Leu | Asn | Gln | Asn | Ser | Asp | Val | Tyr | Leu | Gly | Tyr | Val | Gly | Trp | Gly |
| 370 | | | | | 375 | | | | | 380 | | | | | |

| Ala | Gly | Ser | Phe | Asp | Ser | Thr | Tyr | Val | Leu | Thr | Glu | Thr | Pro | Thr | Gly |

```
                385                 390                 395                 400

Ser Gly Asn Ser Trp Thr Asp Thr Ser Leu Val Ser Ser Cys Leu Ala
                    405                 410                 415

Arg Lys

<210> SEQ ID NO 113
<211> LENGTH: 1599
<212> TYPE: DNA
<213> ORGANISM: Aspergillus Fumigatus

<400> SEQUENCE: 113
atgctggcct ccaccttctc ctaccgcatg tacaagaccg cgctcatcct ggccgccctt      60
ctgggctctg gccaggctca gcaggtcggt acttcccagg cggaagtgca tccgtccatg     120
acctggcaga gctgcacggc tggcggcagc tgcaccacca caacggcaa ggtggtcatc      180 gacgcgaact ggcgttgggt gcacaaagtc ggcgactaca ccaactgcta caccggcaac     240
acctgggaca cgactatctg ccctgacgat gcgacctgcg catccaactg cgcccttgag     300
ggtgccaact acgaatccac ctatggtgtg accgccagcg gcaattccct ccgcctcaac     360
ttcgtcacca ccagccagca gaagaacatt ggctcgcgtc tgtacatgat gaaggacgac     420
tcgacctacg agatgtttaa gctgctgaac caggagttca ccttcgatgt cgatgtctcc     480
aacctcccct gcggtctcaa cggtgctctg tactttgtcg ccatggacgc cgacggtggc     540
atgtccaagt acccaaccaa caaggccggt gccaagtacg gtactggata ctgtgactcg     600
cagtgccctc gcgacctcaa gttcatcaac ggtcaggcca acgtcgaagg gtggcagccc     660
tcctccaacg atgccaatgc gggtaccggc aaccacgggt cctgctgcgc ggagatggat     720
atctgggagg ccaacagcat ctccacggcc ttcacccccc atccgtgcga cacgcccggc     780
caggtgatgt gcaccggtga tgcctgcggt ggcacctaca gctccgaccg ctacggcggc     840
acctgcgacc ccgacggatg tgatttcaac tccttccgcc agggcaacaa gaccttctac     900
ggccctggca tgaccgtcga caccaagagc aagtttaccg tcgtcaccca gttcatcacc     960
gacgacggca cctccagcgg caccctcaag gagatcaagc gcttctacgt gcagaacggc    1020
aaggtgatcc ccaactcgga gtcgacctgg accggcgtca gcggcaactc catcaccacc    1080
gagtactgca ccgcccagaa gagcctgttc caggaccaga acgtcttcga aaagcacggc    1140
ggcctcgagg gcatgggtgc tgccctcgcc agggtatgg ttctcgtcat gtccctgtgg    1200
gatgatcact cggccaacat gctctggctc gacagcaact acccgaccac tgcctcttcc    1260
accactcccg gcgtcgcccg tggtacctgc gacatctcct ccggcgtccc tgcggatgtc    1320
gaggcgaacc accccgacgc ctacgtcgtc tactccaaca tcaaggtcgg ccccatcggc    1380
tcgaccttca cagcggtgg ctcgaacccc ggtggcggaa ccaccacgac aactaccacc    1440
cagcctacta ccaccacgac cacggctgga aaccctggcg caccggagt cgcacagcac    1500 tatggccagt gtggtggaat cggatggacc ggacccacaa cctgtgccag cccttatacc    1560
tgccagaagc tgaatgatta ttactctcag tgcctgtag                           1599

<210> SEQ ID NO 114
<211> LENGTH: 532
<212> TYPE: PRT
<213> ORGANISM: Aspergillus fumigatus

<400> SEQUENCE: 114

Met Leu Ala Ser Thr Phe Ser Tyr Arg Met Tyr Lys Thr Ala Leu Ile
1               5                   10                  15
```

Leu Ala Ala Leu Leu Gly Ser Gly Gln Ala Gln Gln Val Gly Thr Ser
            20                  25                  30

Gln Ala Glu Val His Pro Ser Met Thr Trp Gln Ser Cys Thr Ala Gly
            35                  40                  45

Gly Ser Cys Thr Thr Asn Asn Gly Lys Val Val Ile Asp Ala Asn Trp
50                  55                  60

Arg Trp Val His Lys Val Gly Asp Tyr Thr Asn Cys Tyr Thr Gly Asn
65                  70                  75                  80

Thr Trp Asp Thr Thr Ile Cys Pro Asp Asp Ala Thr Cys Ala Ser Asn
                    85                  90                  95

Cys Ala Leu Glu Gly Ala Asn Tyr Glu Ser Thr Tyr Gly Val Thr Ala
            100                 105                 110

Ser Gly Asn Ser Leu Arg Leu Asn Phe Val Thr Thr Ser Gln Gln Lys
            115                 120                 125

Asn Ile Gly Ser Arg Leu Tyr Met Met Lys Asp Asp Ser Thr Tyr Glu
130                 135                 140

Met Phe Lys Leu Leu Asn Gln Glu Phe Thr Phe Asp Val Asp Val Ser
145                 150                 155                 160

Asn Leu Pro Cys Gly Leu Asn Gly Ala Leu Tyr Phe Val Ala Met Asp
                    165                 170                 175

Ala Asp Gly Gly Met Ser Lys Tyr Pro Thr Asn Lys Ala Gly Ala Lys
            180                 185                 190

Tyr Gly Thr Gly Tyr Cys Asp Ser Gln Cys Pro Arg Asp Leu Lys Phe
            195                 200                 205

Ile Asn Gly Gln Ala Asn Val Glu Gly Trp Gln Pro Ser Ser Asn Asp
            210                 215                 220

Ala Asn Ala Gly Thr Gly Asn His Gly Ser Cys Cys Ala Glu Met Asp
225                 230                 235                 240

Ile Trp Glu Ala Asn Ser Ile Ser Thr Ala Phe Thr Pro His Pro Cys
                    245                 250                 255

Asp Thr Pro Gly Gln Val Met Cys Thr Gly Asp Ala Cys Gly Gly Thr
            260                 265                 270

Tyr Ser Ser Asp Arg Tyr Gly Gly Thr Cys Asp Pro Asp Gly Cys Asp
            275                 280                 285

Phe Asn Ser Phe Arg Gln Gly Asn Lys Thr Phe Tyr Gly Pro Gly Met
290                 295                 300

Thr Val Asp Thr Lys Ser Lys Phe Thr Val Val Thr Gln Phe Ile Thr
305                 310                 315                 320

Asp Asp Gly Thr Ser Ser Gly Thr Leu Lys Glu Ile Lys Arg Phe Tyr
                    325                 330                 335

Val Gln Asn Gly Lys Val Ile Pro Asn Ser Glu Ser Trp Thr Gly
            340                 345                 350

Val Ser Gly Asn Ser Ile Thr Thr Glu Tyr Cys Thr Ala Gln Lys Ser
            355                 360                 365

Leu Phe Gln Asp Gln Asn Val Phe Glu Lys His Gly Gly Leu Glu Gly
            370                 375                 380

Met Gly Ala Ala Leu Ala Gln Gly Met Val Leu Val Met Ser Leu Trp
385                 390                 395                 400

Asp Asp His Ser Ala Asn Met Leu Trp Leu Asp Ser Asn Tyr Pro Thr
                    405                 410                 415

Thr Ala Ser Ser Thr Pro Gly Val Ala Arg Gly Thr Cys Asp Ile
            420                 425                 430

```
Ser Ser Gly Val Pro Ala Asp Val Glu Ala Asn His Pro Asp Ala Tyr
        435                 440                 445

Val Val Tyr Ser Asn Ile Lys Val Gly Pro Ile Gly Ser Thr Phe Asn
    450                 455                 460

Ser Gly Ser Asn Pro Gly Gly Thr Thr Thr Thr Thr Thr
465             470             475                 480

Gln Pro Thr Thr Thr Thr Thr Ala Gly Asn Pro Gly Gly Thr Gly
                485                 490                 495

Val Ala Gln His Tyr Gly Gln Cys Gly Gly Ile Gly Trp Thr Gly Pro
            500                 505                 510

Thr Thr Cys Ala Ser Pro Tyr Thr Cys Gln Lys Leu Asn Asp Tyr Tyr
            515                 520                 525

Ser Gln Cys Leu
    530

<210> SEQ ID NO 115
<211> LENGTH: 1713
<212> TYPE: DNA
<213> ORGANISM: Aspergillus fumigatus

<400> SEQUENCE: 115
atgaagcacc ttgcatcttc catcgcattg actctactgt tgcctgccgt gcaggcccag    60
cagaccgtat ggggccaatg tatgttctgg ctgtcactgg aataagactg tatcaactgc   120
tgatatgctt ctaggtggcg gccaaggctg gtctggcccg acgagctgtg ttgccggcgc   180
agcctgtagc acactgaatc cctgtatgtt agatatcgtc ctgagtggag acttatactg   240
acttccttag actacgctca gtgtatcccg ggagccaccg cgacgtccac caccctcacg   300
acgacgacgg cggcgacgac gacatcccag accaccacca aacctaccac gactggtcca   360
actacatccg cacccaccgt gaccgcatcc ggtaaccctt tcagcggcta ccagctgtat   420 gccaaccccct actactcctc cgaggtccat actctggcca tgccttctct gcccagctcg   480
ctgcagccca aggctagtgc tgttgctgaa gtgccctcat ttgtttggct gtaagtggcc   540
ttatcccaat actgagacca actctctgac agtcgtagcg acgttgccgc caaggtgccc   600
actatgggaa cctacctggc cgacattcag gccaagaaca aggccggcgc caaccctcct   660
atcgctggta tcttcgtggt ctacgacttg ccggaccgtg actgcgccgc tctggccagt   720
aatggcgagt actcaattgc caacaacggt gtggccaact acaaggcgta cattgacgcc   780
atccgtgctc agctggtgaa gtactctgac gttcacacca tcctcgtcat cggtaggccg   840
tacacctccg ttgcgcgccg cctttctctg acatcttgca gaacccgaca gcttggccaa   900
cctggtgacc aacctcaacg tcgccaaatg cgccaatgcg cagagcgcct acctggagtg   960
tgtcgactat gctctgaagc agctcaacct gccaacgtc gccatgtacc tcgacgcagg  1020
tatgcctcac ttcccgcatt ctgtatccct tccagacact aactcatcag gccatgcggg  1080
ctggctcgga tggcccgcca acttgggccc gccgcaaca ctcttcgcca agtctacac   1140 cgacgcgggt tccccgcgg ctgttcgtgg cctggccacc aacgtcgcca actacaacgc  1200
ctggtcgctc agtacctgcc ctcctacac ccagggagac cccaactgcg acgaagaa   1260 gtacatcaac gccatggcgc ctcttctcaa ggaagccggc ttcgatgccc acttcatcat  1320
ggatacctgt aagtgcttat tccaatcgcc gatgtgtgcc gactaatcaa tgtttcagcc  1380
cggaatggcg tccagcccac gaagcaaaac gcctgggggtg actggtgcaa cgtcatcggc  1440
accggcttcg gtgttcgccc ctcgactaac accggcgatc cgctccagga tgcctttgtg  1500
```

```
tggatcaagc ccggtggaga gagtgatggc acgtccaact cgacttcccc ccggtatgac    1560
gcgcactgcg gatatagtga tgctctgcag cctgctcctg aggctggtac ttggttccag    1620
gtatgtcatc cattagccag atgagggata agtgactgac ggacctaggc ctactttgag    1680
cagcttctga ccaacgctaa cccgtccttt taa                                 1713
```

<210> SEQ ID NO 116
<211> LENGTH: 454
<212> TYPE: PRT
<213> ORGANISM: Aspergillus fumigatus

<400> SEQUENCE: 116

```
Met Lys His Leu Ala Ser Ser Ile Ala Leu Thr Leu Leu Leu Pro Ala
1               5                   10                  15

Val Gln Ala Gln Gln Thr Val Trp Gly Gln Cys Gly Gly Gln Gly Trp
            20                  25                  30

Ser Gly Pro Thr Ser Cys Val Ala Gly Ala Ala Cys Ser Thr Leu Asn
        35                  40                  45

Pro Tyr Tyr Ala Gln Cys Ile Pro Gly Ala Thr Ala Thr Ser Thr Thr
    50                  55                  60

Leu Thr Thr Thr Thr Ala Ala Thr Thr Thr Ser Gln Thr Thr Thr Lys
65                  70                  75                  80

Pro Thr Thr Thr Gly Pro Thr Thr Ser Ala Pro Thr Val Thr Ala Ser
                85                  90                  95

Gly Asn Pro Phe Ser Gly Tyr Gln Leu Tyr Ala Asn Pro Tyr Tyr Ser
            100                 105                 110

Ser Glu Val His Thr Leu Ala Met Pro Ser Leu Pro Ser Ser Leu Gln
        115                 120                 125

Pro Lys Ala Ser Ala Val Ala Glu Val Pro Ser Phe Val Trp Leu Asp
    130                 135                 140

Val Ala Ala Lys Val Pro Thr Met Gly Thr Tyr Leu Ala Asp Ile Gln
145                 150                 155                 160

Ala Lys Asn Lys Ala Gly Ala Asn Pro Pro Ile Ala Gly Ile Phe Val
                165                 170                 175

Val Tyr Asp Leu Pro Asp Arg Asp Cys Ala Ala Leu Ala Ser Asn Gly
            180                 185                 190

Glu Tyr Ser Ile Ala Asn Asn Gly Val Ala Asn Tyr Lys Ala Tyr Ile
        195                 200                 205

Asp Ala Ile Arg Ala Gln Leu Val Lys Tyr Ser Asp Val His Thr Ile
    210                 215                 220

Leu Val Ile Glu Pro Asp Ser Leu Ala Asn Leu Val Thr Asn Leu Asn
225                 230                 235                 240

Val Ala Lys Cys Ala Asn Ala Gln Ser Ala Tyr Leu Glu Cys Val Asp
                245                 250                 255

Tyr Ala Leu Lys Gln Leu Asn Leu Pro Asn Val Ala Met Tyr Leu Asp
            260                 265                 270

Ala Gly His Ala Gly Trp Leu Gly Trp Pro Ala Asn Leu Gly Pro Ala
        275                 280                 285

Ala Thr Leu Phe Ala Lys Val Tyr Thr Asp Ala Gly Ser Pro Ala Ala
    290                 295                 300

Val Arg Gly Leu Ala Thr Asn Val Ala Asn Tyr Asn Ala Trp Ser Leu
305                 310                 315                 320

Ser Thr Cys Pro Ser Tyr Thr Gln Gly Asp Pro Asn Cys Asp Glu Lys
                325                 330                 335
```

```
Lys Tyr Ile Asn Ala Met Ala Pro Leu Leu Lys Glu Ala Gly Phe Asp
                340                 345                 350
Ala His Phe Ile Met Asp Thr Ser Arg Asn Gly Val Gln Pro Thr Lys
            355                 360                 365
Gln Asn Ala Trp Gly Asp Trp Cys Asn Val Ile Gly Thr Gly Phe Gly
370                 375                 380
Val Arg Pro Ser Thr Asn Thr Gly Asp Pro Leu Gln Asp Ala Phe Val
385                 390                 395                 400
Trp Ile Lys Pro Gly Gly Glu Ser Asp Gly Thr Ser Asn Ser Thr Ser
                405                 410                 415
Pro Arg Tyr Asp Ala His Cys Gly Tyr Ser Asp Ala Leu Gln Pro Ala
                420                 425                 430
Pro Glu Ala Gly Thr Trp Phe Gln Ala Tyr Phe Glu Gln Leu Leu Thr
            435                 440                 445
Asn Ala Asn Pro Ser Phe
            450

<210> SEQ ID NO 117
<211> LENGTH: 332
<212> TYPE: PRT
<213> ORGANISM: Aspergillus Niger
<220> FEATURE:
<221> NAME/KEY: SIGNAL
<222> LOCATION: (1)..(26)
<220> FEATURE:
<221> NAME/KEY: mat_peptide
<222> LOCATION: (27)..(332)

<400> SEQUENCE: 117

Met Lys Phe Phe Asn Ala Lys Gly Ser Leu Leu Ser Ser Gly Ile Tyr
        -25                 -20                 -15
Leu Ile Ala Leu Thr Pro Phe Val Asn Ala Lys Cys Ser Leu Pro Ser
-10                  -5                  -1  1               5
Ser Tyr Ser Trp Ser Ser Thr Asp Ala Leu Ala Thr Pro Lys Ser Gly
            10                  15                  20
Trp Thr Ala Leu Lys Asp Phe Thr Asp Val Val Ser Asp Gly Lys His
            25                  30                  35
Ile Val Tyr Ala Ser Thr Thr Asp Glu Ala Gly Asn Tyr Gly Ser Met
    40                  45                  50
Thr Phe Gly Ala Phe Ser Glu Trp Ser Asn Met Ala Ser Ala Ser Gln
55                  60                  65                  70
Thr Ala Thr Pro Phe Asn Ala Val Ala Pro Thr Leu Phe Tyr Phe Lys
                75                  80                  85
Pro Lys Ser Ile Trp Val Leu Ala Tyr Gln Trp Gly Ser Ser Thr Phe
                90                  95                  100
Thr Tyr Arg Thr Ser Gln Asp Pro Thr Asn Val Asn Gly Trp Ser Ser
            105                 110                 115
Glu Gln Ala Leu Phe Thr Gly Lys Leu Ser Asp Ser Ser Thr Gly Ala
        120                 125                 130
Ile Asp Gln Thr Val Ile Gly Asp Asp Thr Asn Met Tyr Leu Phe Phe
135                 140                 145                 150
Ala Gly Asp Asn Gly Lys Ile Tyr Arg Ser Ser Met Ser Ile Asp Glu
                155                 160                 165
Phe Pro Gly Ser Phe Gly Ser Gln Tyr Glu Glu Ile Leu Ser Gly Ala
            170                 175                 180
Thr Asn Asp Leu Phe Glu Ala Val Gln Val Tyr Thr Val Asp Gly Gly
        185                 190                 195
```

```
Glu Gly Asn Ser Lys Tyr Leu Met Ile Val Glu Ala Ile Gly Ser Thr
        200                 205                 210

Gly His Arg Tyr Phe Arg Ser Phe Thr Ala Ser Ser Leu Gly Gly Glu
215                 220                 225                 230

Trp Thr Ala Gln Ala Ala Ser Glu Asp Lys Pro Phe Ala Gly Lys Ala
                    235                 240                 245

Asn Ser Gly Ala Thr Trp Thr Glu Asp Ile Ser His Gly Asp Leu Val
                250                 255                 260

Arg Asn Asn Pro Asp Gln Thr Met Thr Val Asp Pro Cys Asn Leu Gln
            265                 270                 275

Leu Leu Tyr Gln Gly His Asp Pro Asn Ser Ser Gly Asp Tyr Asn Leu
        280                 285                 290

Leu Pro Trp Lys Pro Gly Val Leu Thr Leu Lys Gln
295                 300                 305

<210> SEQ ID NO 118
<211> LENGTH: 332
<212> TYPE: PRT
<213> ORGANISM: Aspergillus Niger
<220> FEATURE:
<221> NAME/KEY: SIGNAL
<222> LOCATION: (1)..(26)
<220> FEATURE:
<221> NAME/KEY: mat_peptide
<222> LOCATION: (27)..(332)

<400> SEQUENCE: 118

Met Lys Phe Leu Lys Ala Lys Gly Ser Leu Leu Ser Ser Gly Ile Tyr
    -25                 -20                 -15

Leu Ile Ala Leu Ala Pro Phe Val Asn Ala Lys Cys Ala Leu Pro Ser
-10                 -5              -1   1                   5

Thr Tyr Ser Trp Thr Ser Thr Asp Ala Leu Ala Thr Pro Lys Ser Gly
                10                  15                  20

Trp Thr Ala Leu Lys Asp Phe Thr Asp Val Val Ser Asn Gly Lys His
                25                  30                  35

Ile Val Tyr Ala Ser Thr Thr Asp Thr Gln Gly Asn Tyr Gly Ser Met
40                  45                  50

Gly Phe Gly Ala Phe Ser Asp Trp Ser Asp Met Ala Ser Ala Ser Gln
55                  60                  65                  70

Thr Ala Thr Ser Phe Ser Ala Val Ala Pro Thr Leu Phe Tyr Phe Gln
                75                  80                  85

Pro Lys Ser Ile Trp Val Leu Ala Tyr Gln Trp Gly Ser Ser Thr Phe
                90                  95                  100

Thr Tyr Arg Thr Ser Gln Asp Pro Thr Asn Val Asn Gly Trp Ser Ser
            105                 110                 115

Glu Gln Ala Leu Phe Thr Gly Lys Ile Ser Gly Ser Ser Thr Gly Ala
        120                 125                 130

Ile Asp Gln Thr Val Ile Gly Asp Thr Asn Met Tyr Leu Phe Phe
135                 140                 145                 150

Ala Gly Asp Asn Gly Lys Ile Tyr Arg Ser Ser Met Ser Ile Asn Asp
                155                 160                 165

Phe Pro Gly Ser Phe Gly Ser Gln Tyr Glu Ile Leu Ser Gly Ala
                170                 175                 180

Thr Asn Asp Leu Phe Glu Ala Val Gln Val Tyr Thr Val Asp Gly Gly
            185                 190                 195

Glu Gly Asp Ser Lys Tyr Leu Met Ile Val Glu Ala Ile Gly Ser Thr
```

```
            200               205               210
Gly His Arg Tyr Phe Arg Ser Phe Thr Ala Ser Ser Leu Gly Gly Glu
215                 220                 225                 230

Trp Thr Ala Gln Ala Ala Ser Glu Asp Gln Pro Phe Ala Gly Lys Ala
                235                 240                 245

Asn Ser Gly Ala Thr Trp Thr Asp Ile Ser His Gly Asp Leu Val
                250                 255                 260

Arg Asn Asn Pro Asp Gln Thr Met Thr Val Asp Pro Cys Asn Leu Gln
            265                 270                 275

Leu Leu Tyr Gln Gly His Asp Pro Asn Ser Asn Ser Asp Tyr Asn Leu
        280                 285                 290

Leu Pro Trp Lys Pro Gly Val Leu Thr Leu Lys Gln
295                 300                 305
```

<210> SEQ ID NO 119
<211> LENGTH: 319
<212> TYPE: PRT
<213> ORGANISM: Aspergillus Niger
<220> FEATURE:
<221> NAME/KEY: SIGNAL
<222> LOCATION: (1)..(19)
<220> FEATURE:
<221> NAME/KEY: mat_peptide
<222> LOCATION: (20)..(319)

<400> SEQUENCE: 119

```
Met Val Gln Ile Lys Val Ala Ala Leu Ala Met Leu Phe Ala Ser Gln
                -15                 -10                 -5

Val Leu Ser Glu Pro Ile Glu Pro Arg Gln Ala Ser Val Ser Ile Asp
        -1   1                 5                  10

Thr Lys Phe Lys Ala His Gly Lys Lys Tyr Leu Gly Asn Ile Gly Asp
        15                  20                  25

Gln Tyr Thr Leu Thr Lys Asn Ser Lys Thr Pro Ala Ile Ile Lys Ala
30                  35                  40                  45

Asp Phe Gly Ala Leu Thr Pro Glu Asn Ser Met Lys Trp Asp Ala Thr
                50                  55                  60

Glu Pro Ser Arg Gly Gln Phe Ser Phe Ser Gly Ser Asp Tyr Leu Val
                65                  70                  75

Asn Phe Ala Gln Ser Asn Asn Lys Leu Ile Arg Gly His Thr Leu Val
                80                  85                  90

Trp His Ser Gln Leu Pro Ser Trp Val Gln Ser Ile Thr Asp Lys Asn
        95                  100                 105

Thr Leu Ile Glu Val Met Glu Asn His Ile Thr Thr Val Met Gln His
110                 115                 120                 125

Tyr Lys Gly Lys Ile Tyr Ala Trp Asp Val Val Asn Glu Ile Phe Asn
                130                 135                 140

Glu Asp Gly Ser Leu Arg Asp Ser Val Phe Tyr Lys Val Ile Gly Glu
                145                 150                 155

Asp Tyr Val Arg Ile Ala Phe Glu Thr Ala Arg Ala Ala Asp Pro Asn
                160                 165                 170

Ala Lys Leu Tyr Ile Asn Asp Tyr Asn Leu Asp Ser Ala Ser Tyr Pro
            175                 180                 185

Lys Leu Thr Gly Met Val Ser His Val Lys Lys Trp Ile Ala Ala Gly
190                 195                 200                 205

Ile Pro Ile Asp Gly Ile Gly Ser Gln Thr His Leu Ser Ala Ala Leu
                210                 215                 220
```

-continued

```
Asn Ala Leu Ala Gly Ala Gly Thr Lys Glu Ile Ala Val Thr Glu Leu
            225             230                 235

Asp Ile Ala Gly Ala Ser Ser Thr Asp Tyr Val Glu Val Val Glu Ala
        240             245             250

Cys Leu Asn Gln Pro Lys Cys Ile Gly Ile Thr Val Trp Gly Val Ala
    255             260             265

Asp Pro Asp Ser Trp Arg Ser Ser Thr Pro Leu Leu Phe Asp Ser
270             275             280             285

Asn Tyr Asn Pro Lys Pro Ala Tyr Thr Ala Ile Ala Asn Ala Leu
            290             295             300
```

WET MILLING PROCESS

CROSS-REFERENCE TO RELATED APPLICATIONS

This application is a 35 U.S.C. 371 national application of PCT/CN2016/107282 filed Nov. 25, 2016 which claims priority or the benefit of International application no. PCT/CN2015/095621 filed Nov. 26, 2015, the contents of which are fully incorporated herein by reference.

REFERENCE TO A SEQUENCE LISTING

This application contains a Sequence Listing in computer readable form, which is incorporated herein by reference. The name of the file containing the Sequence Listing is SQ.txt, which was created on Sep. 14, 2018 and has 414,043 bytes.

BACKGROUND OF THE INVENTION

Field of the Invention

The present invention relates to an improved process of treating crop kernels to provide a starch product of high quality suitable for conversion of starch into mono- and oligosaccharides, ethanol, sweeteners, etc. Further, the invention also relates to an enzyme composition comprising one or more enzyme activities suitable for the process of the invention and to the use of the composition of the invention.

Description of the Related Art

Before starch, which is an important constituent in the kernels of most crops, such as corn, wheat, rice, sorghum bean, barley or fruit hulls, can be used for conversion of starch into saccharides, such as dextrose, fructose; alcohols, such as ethanol; and sweeteners, the starch must be made available and treated in a manner to provide a high purity starch. If starch contains more than 0.5% impurities, including the proteins, it is not suitable as starting material for starch conversion processes. To provide such pure and high quality starch product starting out from the kernels of crops, the kernels are often milled, as will be described further below.

Wet milling is often used for separating corn kernels into its four basic components: starch, germ, fiber and protein.

Typically wet milling processes comprise four basic steps. First the kernels are soaked or steeped for about 30 minutes to about 48 hours to begin breaking the starch and protein bonds. The next step in the process involves a coarse grind to break the pericarp and separate the germ from the rest of the kernel. The remaining slurry consisting of fiber, starch and protein is finely ground and screened to separate the fiber from the starch and protein. The starch is separated from the remaining slurry in hydrocyclones. The starch then can be converted to syrup or alcohol, or dried and sold as corn starch or chemically or physically modified to produce modified corn starch.

The use of enzymes has been suggested for the steeping step of wet milling processes. The commercial enzyme product Steepzyme@ (available from Novozymes A/S) has been shown suitable for the first step in wet milling processes, i.e., the steeping step where corn kernels are soaked in water.

More recently, "enzymatic milling", a modified wet-milling process that uses proteases to significantly reduce the total processing time during corn wet milling and eliminates the need for sulfur dioxide as a processing agent, has been developed. Johnston et al., *Cereal Chem,* 81, p. 626-632 (2004).

U.S. Pat. No. 6,566,125 discloses a method for obtaining starch from maize involving soaking maize kernels in water to produce soaked maize kernels, grinding the soaked maize kernels to produce a ground maize slurry, and incubating the ground maize slurry with enzyme (e.g., protease).

U.S. Pat. No. 5,066,218 discloses a method of milling grain, especially corn, comprising cleaning the grain, steeping the grain in water to soften it, and then milling the grain with a cellulase enzyme.

WO 2002/000731 discloses a process of treating crop kernels, comprising soaking the kernels in water for 1-12 hours, wet milling the soaked kernels and treating the kernels with one or more enzymes including an acidic protease.

WO 2002/000911 discloses a process of starch gluten separation, comprising subjecting mill starch to an acidic protease.

WO 2002/002644 discloses a process of washing a starch slurry obtained from the starch gluten separation step of a milling process, comprising washing the starch slurry with an aqueous solution comprising an effective amount of acidic protease.

There remains a need for improvement of processes for providing starch suitable for conversion into mono- and oligo-saccharides, ethanol, sweeteners, etc.

SUMMARY OF THE INVENTION

The invention provides a process for treating crop kernels, comprising the steps of a) soaking kernels in water to produce soaked kernels; b) grinding the soaked kernels; c) treating the soaked kernels in the presence of one or more GH62 polypeptides having arabinofuranosidase activity, wherein step c) is performed before, during or after step b).

In one embodiment, the invention provides a process for treating crop kernels, comprising the steps of a) soaking kernels in water to produce soaked kernels; b) grinding the soaked kernels; c) treating the soaked kernels in the presence of one or more GH62 polypeptides having arabinofuranosidase activity and one or more GH10 or GH11 polypeptides having xylanase activity, wherein step c) is performed before, during or after step b).

In one embodiment, the invention provides the use of a GH62 polypeptide having arabinofuranosidase activity to enhance the wet milling benefit of one or more enzymes.

The invention provides a process for treating crop kernels, comprising the steps of a) soaking kernels in water to produce soaked kernels; b) grinding the soaked kernels; c) treating the soaked kernels in the presence of one or more GH43 polypeptides having arabinofuranosidase activity, wherein step c) is performed before, during or after step b).

In one embodiment, the invention provides a process for treating crop kernels, comprising the steps of a) soaking kernels in water to produce soaked kernels; b) grinding the soaked kernels; c) treating the soaked kernels in the presence of one or more GH43 polypeptides having arabinofuranosidase activity and one or more GH10 or GH11 polypeptides having xylanase activity, wherein step c) is performed before, during or after step b).

In one embodiment, step c) mentioned above is performed during fiber washing step.

In one embodiment, the invention provides the use of a GH43 polypeptide having arabinofuranosidase activity to enhance the wet milling benefit of one or more enzymes.

Definitions

Auxiliary Activity 9 polypeptide: The term "Auxiliary Activity 9 polypeptide" or "AA9 polypeptide" means a polypeptide classified as a lytic polysaccharide monooxygenase (Quinlan et al., 2011, *Proc. Natl. Acad. Sci. USA* 208: 15079-15084; Phillips et al., 2011, *ACS Chem. Biol.* 6: 1399-1406; Lin et al., 2012, *Structure* 20: 1051-1061). AA9 polypeptides were formerly classified into the glycoside hydrolase Family 61 (GH61) according to Henrissat, 1991, *Biochem. J.* 280: 309-316, and Henrissat and Bairoch, 1996, *Biochem. J.* 316: 695-696.

AA9 polypeptides enhance the hydrolysis of a cellulosic material by an enzyme having cellulolytic activity. Cellulolytic enhancing activity can be determined by measuring the increase in reducing sugars or the increase of the total of cellobiose and glucose from the hydrolysis of a cellulosic material by cellulolytic enzyme under the following conditions: 1-50 mg of total protein/g of cellulose in pretreated corn stover (PCS), wherein total protein is comprised of 50-99.5% w/w cellulolytic enzyme protein and 0.5-50% w/w protein of an AA9 polypeptide for 1-7 days at a suitable temperature, such as 40° C.-80° C., e.g., 40° C., 45° C., 50° C., 55° C., 60° C., 65° C., 70° C., 75° C., or 80° C., and a suitable pH, such as 4-9, e.g., 4.0, 4.5, 5.0, 5.5, 6.0, 6.5, 7.0, 7.5, 8.0, 8.5, or 9.0, compared to a control hydrolysis with equal total protein loading without cellulolytic enhancing activity (1-50 mg of cellulolytic protein/g of cellulose in PCS).

AA9 polypeptide enhancing activity can be determined using a mixture of CELLUCLAST® 1.5 L (Novozymes A/S, Bagsværd, Denmark) and beta-glucosidase as the source of the cellulolytic activity, wherein the beta-glucosidase is present at a weight of at least 2-5% protein of the cellulase protein loading. In one aspect, the beta-glucosidase is an *Aspergillus oryzae* beta-glucosidase (e.g., recombinantly produced in *Aspergillus oryzae* according to WO 02/095014). In another aspect, the beta-glucosidase is an *Aspergillus fumigatus* beta-glucosidase (e.g., recombinantly produced in *Aspergillus oryzae* as described in WO 02/095014).

AA9 polypeptide enhancing activity can also be determined by incubating an AA9 polypeptide with 0.5% phosphoric acid swollen cellulose (PASC), 100 mM sodium acetate pH 5, 1 mM $MnSO_4$, 0.1% gallic acid, 0.025 mg/ml of *Aspergillus fumigatus* beta-glucosidase, and 0.01% TRITON® X-100 (4-(1,1,3,3-tetramethylbutyl)phenyl-polyethylene glycol) for 24-96 hours at 40° C. followed by determination of the glucose released from the PASC.

AA9 polypeptide enhancing activity can also be determined according to WO 2013/028928 for high temperature compositions.

AA9 polypeptides enhance the hydrolysis of a cellulosic material catalyzed by enzyme having cellulolytic activity by reducing the amount of cellulolytic enzyme required to reach the same degree of hydrolysis preferably at least 1.01-fold, e.g., at least 1.05-fold, at least 1.10-fold, at least 1.25-fold, at least 1.5-fold, at least 2-fold, at least 3-fold, at least 4-fold, at least 5-fold, at least 10-fold, or at least 20-fold.

The AA9 polypeptide can also be used in the presence of a soluble activating divalent metal cation according to WO 2008/151043 or WO 2012/122518, e.g., manganese or copper.

The AA9 polypeptide can be used in the presence of a dioxy compound, a bicylic compound, a heterocyclic compound, a nitrogen-containing compound, a quinone compound, a sulfur-containing compound, or a liquor obtained from a pretreated cellulosic or hemicellulosic material such as pretreated corn stover (WO 2012/021394, WO 2012/021395, WO 2012/021396, WO 2012/021399, WO 2012/021400, WO 2012/021401, WO 2012/021408, and WO 2012/021410).

Allelic variant: The term "allelic variant" means any of two or more alternative forms of a gene occupying the same chromosomal locus. Allelic variation arises naturally through mutation, and may result in polymorphism within populations. Gene mutations can be silent (no change in the encoded polypeptide) or may encode polypeptides having altered amino acid sequences. An allelic variant of a polypeptide is a polypeptide encoded by an allelic variant of a gene.

Arabinofuranosidase: The term "arabinofuranosidase" means an alpha-L-arabinofuranoside arabinofuranohydrolase (EC 3.2.1.55) that catalyzes the hydrolysis of terminal non-reducing alpha-L-arabinofuranoside residues in alpha-L-arabinosides. The enzyme acts on alpha-L-arabinofuranosides, alpha-L-arabinans containing (1,3)- and/or (1,2)- and/or (1,5)-linkages, arabinoxylans, and arabinogalactans. Alpha-L-arabinofuranosidase is also known as arabinosidase, alpha-arabinosidase, alpha-L-arabinosidase, alpha-arabinofuranosidase, polysaccharide alpha-L-arabinofuranosidase, alpha-L-arabinofuranoside hydrolase, L-arabinosidase, or alpha-L-arabinanase. Arabinofuranosidase activity can be determined using 5 mg of medium viscosity wheat arabinoxylan (Megazyme International Ireland, Ltd., Bray, Co. Wicklow, Ireland) per ml of 100 mM sodium acetate pH 5 in a total volume of 200 µl for 30 minutes at 40° C. followed by arabinose analysis by AMINEX® HPX-87H column chromatography (Bio-Rad Laboratories, Inc., Hercules, Calif., USA).

The arabinofuranosidase of the present invention have at least 50% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO: 42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66 and SEQ ID NO: 69. In a preferred embodiment, the arabinofuranosidase of the present invention have at least 70% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO: 42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66, SEQ ID NO: 69, SEQ ID NO: 117 and SEQ ID NO: 118. In a more preferred embodiment, the arabinofuranosidase of the present invention have at least 80% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO:

42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66, SEQ ID NO: 69, SEQ ID NO: 117 and SEQ ID NO: 118. In an even more preferred embodiment, the arabinofuranosidase of the present invention have at least 90% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO: 42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66, SEQ ID NO: 69, SEQ ID NO: 117 and SEQ ID NO: 118. In a most preferred embodiment, the arabinofuranosidase of the present invention have at least 95% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO: 42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66, SEQ ID NO: 69, SEQ ID NO: 117 and SEQ ID NO: 118.

Arabinoxylan-containing material: The term "Arabinoxylan-containing material" means any material containing arabinoxylan. Arabinoxylan is a hemicellulose found in both the primary and secondary cell walls of plants, including woods and cereal grains, consisting of copolymers of two pentose sugars, arabinose and xylose. The arabinoxylan chain contains a large number of 1,4-linked xylose units. Many xylose units are substituted with 2-, 3- or 2,3-substituted arabinose residues.

Examples of arabinoxylan-containing material are forage, roughage, seeds and grains (either whole or prepared by crushing, milling, etc from e.g. corn, oats, rye, barley, wheat), trees or hard woods (such as poplar, willow, *eucalyptus*, palm, maple, birch), bamboo, herbaceous and/or woody energy crops, agricultural food and feed crops, animal feed products, cassava peels, cocoa pods, sugar cane, sugar beet, locust bean pulp, vegetable or fruit pomaces, wood waste, bark, shavings, sawdust, wood pulp, pulping liquor, waste paper, cardboard, construction and demolition wood waste, industrial or municipal waste water solids or sludge, manure, by-product from brewing and/or fermentation processes, wet distillers grain, dried distillers grain, spent grain, vinasse and bagasse.

Forage as defined herein also includes roughage. Forage is fresh plant material such as hay and silage from forage plants, grass and other forage plants, grass and other forage plants, seaweed, sprouted grains and legumes, or any combination thereof. Examples of forage plants are Alfalfa (Lucerne), birdsfoot trefoil, *brassica* (e.g. kale, rapeseed (canola), rutabaga (swede), turnip), clover (e.g. alsike clover, red clover, subterranean clover, white clover), grass (e.g. Bermuda grass, brome, false oat grass, fescue, heath grass, meadow grasses, *miscanthus*, orchard grass, ryegrass, switchgrass, Timothy-grass), corn (maize), hemp, millet, barley, oats, rye, sorghum, soybeans and wheat and vegetables such as beets. Crops suitable for ensilage are the ordinary grasses, clovers, alfalfa, vetches, oats, rye and maize. Forage further includes crop residues from grain production (such as corn stover; straw from wheat, barley, oat, rye and other grains); residues from vegetables like beet tops; residues from oilseed production like stems and leaves form soy beans, rapeseed and other legumes; and fractions from the refining of grains for animal or human consumption or from fuel production or other industries.

Roughage is generally dry plant material with high levels of fiber, such as fiber, bran, husks from seeds and grains and crop residues (such as stover, copra, straw, chaff, sugar beet waste).

Preferred sources of arabinoxylan-containing materials are forage, roughage, seeds and grains, sugar cane, sugar beet and wood pulp.

Beta-glucosidase: The term "beta-glucosidase" means a beta-D-glucoside glucohydrolase (E.C. 3.2.1.21) that catalyzes the hydrolysis of terminal non-reducing beta-D-glucose residues with the release of beta-D-glucose. Beta-glucosidase activity can be determined using p-nitrophenyl-beta-D-glucopyranoside as substrate according to the procedure of Venturi et al., 2002, *J. Basic Microbiol.* 42: 55-66. One unit of beta-glucosidase is defined as 1.0 µmole of p-nitrophenolate anion produced per minute at 25° C., pH 4.8 from 1 mM p-nitrophenyl-beta-D-glucopyranoside as substrate in 50 mM sodium citrate containing 0.01% TWEEN® 20.

Beta-xylosidase: The term "beta-xylosidase" means a beta-D-xyloside xylohydrolase (E.C. 3.2.1.37) that catalyzes the exo-hydrolysis of short beta (1→4)-xylooligosaccharides to remove successive D-xylose residues from non-reducing termini. Beta-xylosidase activity can be determined using 1 mM p-nitrophenyl-beta-D-xyloside as substrate in 100 mM sodium citrate containing 0.01% TWEEN® 20 at pH 5, 40° C. One unit of beta-xylosidase is defined as 1.0 µmole of p-nitrophenolate anion produced per minute at 40° C., pH 5 from 1 mM p-nitrophenyl-beta-D-xyloside in 100 mM sodium citrate containing 0.01% TWEEN® 20. cDNA: The term "cDNA" means a DNA molecule that can be prepared by reverse transcription from a mature, spliced, mRNA molecule obtained from a eukaryotic or prokaryotic cell. cDNA lacks intron sequences that may be present in the corresponding genomic DNA. The initial, primary RNA transcript is a precursor to mRNA that is processed through a series of steps, including splicing, before appearing as mature spliced mRNA.

Cellobiohydrolase: The term "cellobiohydrolase" means a 1,4-beta-D-glucan cellobiohydrolase (E.C. 3.2.1.91 and E.C. 3.2.1.176) that catalyzes the hydrolysis of 1,4-beta-D-glucosidic linkages in cellulose, cellooligosaccharides, or any beta-1,4-linked glucose containing polymer, releasing cellobiose from the reducing end (cellobiohydrolase I) or non-reducing end (cellobiohydrolase II) of the chain (Teeri, 1997, *Trends in Biotechnology* 15: 160-167; Teeri et al., 1998, *Biochem. Soc. Trans.* 26: 173-178). Cellobiohydrolase activity can be determined according to the procedures described by Lever et al., 1972, *Anal. Biochem.* 47: 273-279; van Tilbeurgh et al., 1982, *FEBS Letters* 149: 152-156; van Tilbeurgh and Claeyssens, 1985, *FEBS Letters* 187: 283-288; and Tomme et al., 1988, *Eur. J. Biochem.* 170: 575-581.

Cellulolytic enzyme or cellulase: The term "cellulolytic enzyme" or "cellulase" means one or more (e.g., several) enzymes that hydrolyze a cellulosic material. Such enzymes include endoglucanase(s), cellobiohydrolase(s), beta-glucosidase(s), or combinations thereof. The two basic approaches for measuring cellulolytic enzyme activity include: (1) measuring the total cellulolytic enzyme activity, and (2) measuring the individual cellulolytic enzyme activities (endoglucanases, cellobiohydrolases, and beta-glucosidases) as reviewed in Zhang et al., 2006, *Biotechnology Advances* 24: 452-481. Total cellulolytic enzyme activity can be measured using insoluble substrates, including Whatman No 1 filter paper, microcrystalline cellulose, bacterial cellulose, algal cellulose, cotton, pretreated lignocellulose, etc. The most common total cellulolytic activity assay is the filter paper assay using Whatman No 1 filter paper as the substrate. The assay was established by the International Union of Pure and Applied Chemistry (IUPAC) (Ghose, 1987, *Pure Appl. Chem.* 59: 257-68).

Cellulolytic enzyme activity can be determined by measuring the increase in production/release of sugars during hydrolysis of a cellulosic material by cellulolytic enzyme(s) under the following conditions: 1-50 mg of cellulolytic enzyme protein/g of cellulose in pretreated corn stover (PCS) (or other pretreated cellulosic material) for 3-7 days at a suitable temperature such as 40° C.–80° C., e.g., 40° C., 45° C., 50° C., 55° C., 60° C., 65° C., 70° C., 75° C., or 80° C., and a suitable pH, such as 4-9, e.g., 4.0, 4.5, 5.0, 5.5, 6.0, 6.5, 7.0, 7.5, 8.0, 8.5, or 9.0, compared to a control hydrolysis without addition of cellulolytic enzyme protein. Typical conditions are 1 ml reactions, washed or unwashed PCS, 5% insoluble solids (dry weight), 50 mM sodium acetate pH 5, 1 mM $MnSO_4$, 50° C., 55° C., or 60° C., 72 hours, sugar analysis by AMINEX® HPX-87H column chromatography (Bio-Rad Laboratories, Inc., Hercules, Calif., USA).

Cellulosic material: The term "cellulosic material" means any material containing cellulose. Cellulose is a homopolymer of anyhdrocellobiose and thus a linear beta-(1-4)-D-glucan, while hemicelluloses include a variety of compounds, such as xylans, xyloglucans, arabinoxylans, and mannans in complex branched structures with a spectrum of substituents. Although generally polymorphous, cellulose is found in plant tissue primarily as an insoluble crystalline matrix of parallel glucan chains. Hemicelluloses usually hydrogen bond to cellulose, as well as to other hemicelluloses, which help stabilize the cell wall matrix.

Coding sequence: The term "coding sequence" means a polynucleotide, which directly specifies the amino acid sequence of a polypeptide. The boundaries of the coding sequence are generally determined by an open reading frame, which begins with a start codon such as ATG, GTG, or TTG and ends with a stop codon such as TAA, TAG, or TGA. The coding sequence may be a genomic DNA, cDNA, synthetic DNA, or a combination thereof.

Control sequences: The term "control sequences" means nucleic acid sequences necessary for expression of a polynucleotide encoding a mature polypeptide of the present invention. Each control sequence may be native (i.e., from the same gene) or foreign (i.e., from a different gene) to the polynucleotide encoding the polypeptide or native or foreign to each other. Such control sequences include, but are not limited to, a leader, polyadenylation sequence, propeptide sequence, promoter, signal peptide sequence, and transcription terminator. At a minimum, the control sequences include a promoter, and transcriptional and translational stop signals. The control sequences may be provided with linkers for the purpose of introducing specific restriction sites facilitating ligation of the control sequences with the coding region of the polynucleotide encoding a polypeptide.

Crop kernels: The term "crop kernels" includes kernels from, e.g., corn (maize), rice, barley, sorghum bean, fruit hulls, and wheat. Corn kernels are exemplary. A variety of corn kernels are known, including, e.g., dent corn, flint corn, pod corn, striped maize, sweet corn, waxy corn and the like. In an embodiment, the corn kernel is yellow dent corn kernel. Yellow dent corn kernel has an outer covering referred to as the "Pericarp" that protects the germ in the kernels. It resists water and water vapour and is undesirable to insects and microorganisms. The only area of the kernels not covered by the "Pericarp" is the "Tip Cap", which is the attachment point of the kernel to the cob.

Dry solids: The term "dry solids" is the total solids of a slurry in percent on a dry weight basis.

Endoglucanase: The term "endoglucanase" means a 4-(1, 3;1,4)-beta-D-glucan 4-glucanohydrolase (E.C. 3.2.1.4) that catalyzes endohydrolysis of 1,4-beta-D-glycosidic linkages in cellulose, cellulose derivatives (such as carboxymethyl cellulose and hydroxyethyl cellulose), lichenin, beta-1,4 bonds in mixed beta-1,3-1,4 glucans such as cereal beta-D-glucans or xyloglucans, and other plant material containing cellulosic components. Endoglucanase activity can be determined by measuring reduction in substrate viscosity or increase in reducing ends determined by a reducing sugar assay (Zhang et al., 2006, *Biotechnology Advances* 24: 452-481). Endoglucanase activity can also be determined using carboxymethyl cellulose (CMC) as substrate according to the procedure of Ghose, 1987, *Pure and Appl. Chem.* 59: 257-268, at pH 5, 40° C.

Expression: The term "expression" includes any step involved in the production of a polypeptide including, but not limited to, transcription, post-transcriptional modification, translation, post-translational modification, and secretion.

Expression vector: The term "expression vector" means a linear or circular DNA molecule that comprises a polynucleotide encoding a polypeptide and is operably linked to control sequences that provide for its expression.

Fragment: The term "fragment" means a polypeptide having one or more (e.g., several) amino acids absent from the amino and/or carboxyl terminus of a mature polypeptide, wherein the fragment has enzyme activity. In one aspect, a fragment contains at least 85%, e.g., at least 90% or at least 95% of the amino acid residues of the mature polypeptide of an enzyme.

Germ: The "Germ" is the only living part of the corn kernel. It contains the essential genetic information, enzymes, vitamins, and minerals for the kernel to grow into a corn plant. In yellow dent corn, about 25 percent of the germ is corn oil. The endosperm covered or surrounded by the germ comprises about 82 percent of the kernel dry weight and is the source of energy (starch) and protein for the germinating seed. There are two types of endosperm, soft and hard. In the hard endosperm, starch is packed tightly together. In the soft endosperm, the starch is loose.

Grind or grinding: The term "grinding" means any process that breaks the pericarp and opens the crop kernel.

Hemicellulolytic enzyme or hemicellulase: The term "hemicellulolytic enzyme" or "hemicellulase" means one or more (e.g., several) enzymes that hydrolyze a hemicellulosic material. See, for example, Shallom and Shoham, 2003, *Current Opinion In Microbiology* 6(3): 219-228). Hemicellulases are key components in the degradation of plant biomass. Examples of hemicellulases include, but are not limited to, an acetylmannan esterase, an acetylxylan esterase, an arabinanase, an arabinofuranosidase, a coumaric acid esterase, a feruloyl esterase, a galactosidase, a glucuronidase, a glucuronoyl esterase, a mannanase, a mannosidase, a xylanase, and a xylosidase. The substrates for these enzymes, hemicelluloses, are a heterogeneous group of branched and linear polysaccharides that are bound via hydrogen bonds to the cellulose microfibrils in the plant cell wall, crosslinking them into a robust network. Hemicelluloses are also covalently attached to lignin, forming together with cellulose a highly complex structure. The variable structure and organization of hemicelluloses require the concerted action of many enzymes for its complete degradation. The catalytic modules of hemicellulases are either glycoside hydrolases (GHs) that hydrolyze glycosidic bonds, or carbohydrate esterases (CEs), which hydrolyze ester linkages of acetate or ferulic acid side groups. These catalytic modules, based on homology of their primary sequence, can be assigned into GH and CE families. Some families, with an overall similar fold, can be further grouped into clans, marked alphabetically (e.g., GH-A). A most informative and updated classification of these and other carbohydrate active enzymes is available in the Carbohydrate-Active Enzymes (CAZy) database. Hemicellulolytic enzyme activities can be measured according to Ghose and Bisaria, 1987, *Pure & Appl. Chem.* 59: 1739-1752, at a suitable temperature such as 40° C.–80° C., e.g., 40° C., 45° C., 50° C., 55° C., 60° C., 65° C., 70° C., 75° C., or 80° C., and a suitable pH such as 4-9, e.g., 4.0, 4.5, 5.0, 5.5, 6.0, 6.5, 7.0, 7.5, 8.0, 8.5, or 9.0.

Highly branched xylan: The term "highly branched xylan" means that more than 50% of xylosyl units in the arabinoxylan backbone are substituted. This is preferably calculated from linkage analysis as performed in Huismann et al. Carbohydrate Polymers, 2000, 42:269-279.

Host cell: The term "host cell" means any cell type that is susceptible to transformation, transfection, transduction, or the like with a nucleic acid construct or expression vector comprising a polynucleotide of the present invention. The term "host cell" encompasses any progeny of a parent cell that is not identical to the parent cell due to mutations that occur during replication.

Isolated: The term "isolated" means a substance in a form or environment that does not occur in nature. Non-limiting examples of isolated substances include (1) any non-naturally occurring substance, (2) any substance including, but not limited to, any enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated (e.g., recombinant production in a host cell; multiple copies of a gene encoding the substance; and use of a stronger promoter than the promoter naturally associated with the gene encoding the substance).

Milled: The term "milled" refers to plant material which has been broken down into smaller particles, e.g., by crushing, fractionating, grinding, pulverizing, etc.

Mature polypeptide: The term "mature polypeptide" means a polypeptide in its final form following translation and any post-translational modifications, such as N-terminal processing, C-terminal truncation, glycosylation, phosphorylation, etc.

In one aspect, the mature polypeptide is amino acids 1 to 302 of SEQ ID NO: 8 and amino acids −26 to −1 of SEQ ID NO: 2 are a signal peptide. In another aspect, the mature polypeptide is amino acids 1 to 302 of SEQ ID NO: 9.

In one aspect, the mature polypeptide is amino acids 1 to 303 of SEQ ID NO: 11 and amino acids −26 to −1 of SEQ ID NO: 11 are a signal peptide. In another aspect, the mature polypeptide is amino acids 1 to 303 of SEQ ID NO: 12.

In one aspect, the mature polypeptide is amino acids 1 to 382 of SEQ ID NO: 14 and amino acids −21 to −1 of SEQ ID NO: 15 is a signal peptide. In another aspect, the mature polypeptide is amino acids 1 to 382 of SEQ ID NO: 15.

In one aspect, the mature polypeptide is amino acids 1 to 378 of SEQ ID NO: 17 and amino acids −17 to −1 of SEQ ID NO: 17 are a signal peptide. In another aspect, the mature polypeptide is amino acids 1 to 378 of SEQ ID NO: 18.

In one aspect, the mature polypeptide is amino acids 1 to 311 of SEQ ID NO: 20 and amino acids −20 to −1 of SEQ ID NO: 20 are a signal peptide. In another aspect, the mature polypeptide is amino acids 1 to 311 of SEQ ID NO: 21.

In one aspect, the mature polypeptide is amino acids 1 to 302 of SEQ ID NO: 23 and amino acids −29 to −1 of SEQ ID NO: 23 are a signal peptide. In another aspect, the mature polypeptide is amino acids 1 to 302 of SEQ ID NO: 24.

In one aspect, the mature polypeptide is amino acids 1 to 309 of SEQ ID NO: 26 and amino acids −16 to −1 of SEQ ID NO: 26 are a signal peptide. In another aspect, the mature polypeptide is amino acids 1 to 309 of SEQ ID NO: 27.

In one aspect, the mature polypeptide is amino acids 1 to 438 of SEQ ID NO: 29 and amino acids −36 to −1 of SEQ ID NO: 29 are a signal peptide. In another aspect, the mature polypeptide is amino acids 1 to 438 of SEQ ID NO: 30. In one aspect, the mature polypeptide is amino acids 1 to 446 of SEQ ID NO: 32 and amino acids −27 to −1 of SEQ ID NO: 32 are a signal peptide. In another aspect, the mature polypeptide is amino acids 1 to 446 of SEQ ID NO: 33.

In one aspect, the mature polypeptide is amino acids 1 to 438 of SEQ ID NO: 35 and amino acids −36 to −1 of SEQ ID NO: 35 are a signal peptide. In another aspect, the mature polypeptide is amino acids 1 to 438 of SEQ ID NO: 36. In one aspect, the mature polypeptide is amino acids 1 to 446 of SEQ ID NO: 38 and amino acids −27 to −1 of SEQ ID NO: 38 are a signal peptide. In another aspect, the mature polypeptide is amino acids 1 to 446 of SEQ ID NO: 39.

In one aspect, the mature polypeptide is amino acids 1 to 318 of SEQ ID NO: 41 and amino acids −18 to −1 of SEQ ID NO: 41 are a signal peptide. In another aspect, the mature polypeptide is amino acids 1 to 318 of SEQ ID NO: 42. In one aspect, the mature polypeptide is amino acids 1 to 326 of SEQ ID NO: 44 and amino acids −18 to −1 of SEQ ID NO: 44 are a signal peptide. In another aspect, the mature polypeptide is amino acids 1 to 326 of SEQ ID NO: 45.

In one aspect, the mature polypeptide is amino acids 1 to 302 of SEQ ID NO: 47 and amino acids −25 to −1 of SEQ ID NO: 47 are a signal peptide. In another aspect, the mature polypeptide is amino acids 1 to 302 of SEQ ID NO: 48. In one aspect, the mature polypeptide is amino acids 1 to 311 of SEQ ID NO: 50 and amino acids −25 to −1 of SEQ ID NO: 50 are a signal peptide. In another aspect, the mature polypeptide is amino acids 1 to 311 of SEQ ID NO: 51.

In one aspect, the mature polypeptide is amino acids 1 to 364 of SEQ ID NO: 53 and amino acids −24 to −1 of SEQ ID NO: 53 are a signal peptide. In another aspect, the mature polypeptide is amino acids 1 to 364 of SEQ ID NO: 54. In one aspect, the mature polypeptide is amino acids 1 to 373 of SEQ ID NO: 56 and amino acids −24 to −1 of SEQ ID NO: 56 are a signal peptide. In another aspect, the mature polypeptide is amino acids 1 to 373 of SEQ ID NO: 57.

In one aspect, the mature polypeptide is amino acids 1 to 436 of SEQ ID NO: 59 and amino acids −31 to −1 of SEQ ID NO: 59 are a signal peptide. In another aspect, the mature polypeptide is amino acids 1 to 436 of SEQ ID NO: 60. In one aspect, the mature polypeptide is amino acids 1 to 444 of SEQ ID NO: 62 and amino acids −27 to −1 of SEQ ID NO: 62 are a signal peptide. In another aspect, the mature polypeptide is amino acids 1 to 444 of SEQ ID NO: 63.

In one aspect, the mature polypeptide is amino acids 1 to 302 of SEQ ID NO: 65 and amino acids −19 to −1 of SEQ ID NO: 65 are a signal peptide. In another aspect, the mature polypeptide is amino acids 1 to 302 of SEQ ID NO: 66. In one aspect, the mature polypeptide is amino acids 1 to 311 of SEQ ID NO: 68 and amino acids −19 to −1 of SEQ ID NO: 68 are a signal peptide. In another aspect, the mature polypeptide is amino acids 1 to 311 of SEQ ID NO: 69.

In one aspect, the mature polypeptide is amino acids 1 to 183 of SEQ ID NO: 77 and amino acids −27 to −1 of SEQ ID NO: 77 are a signal peptide. In another aspect, the mature polypeptide is amino acids 1 to 302 of SEQ ID NO: 78. In one aspect, the mature polypeptide is amino acids 1 to 181 of SEQ ID NO: 80 and amino acids −27 to −1 of SEQ ID NO: 80 are a signal peptide. In another aspect, the mature polypeptide is amino acids 1 to 181 of SEQ ID NO: 81.

In one aspect, the mature polypeptide is amino acids 1 to 299 of SEQ ID NO: 83 and amino acids −42 to −1 of SEQ ID NO: 83 are a signal peptide. In another aspect, the mature polypeptide is amino acids 1 to 299 of SEQ ID NO: 84. In one aspect, the mature polypeptide is amino acids 1 to 307 of SEQ ID NO: 86 and amino acids −27 to −1 of SEQ ID NO: 86 are a signal peptide. In another aspect, the mature polypeptide is amino acids 1 to 307 of SEQ ID NO: 87.

In one aspect, the mature polypeptide is amino acids 1 to 306 of SEQ ID NO: 117 and amino acids −26 to −1 of SEQ ID NO: 117 are a signal peptide.

In one aspect, the mature polypeptide is amino acids 1 to 306 of SEQ ID NO: 118 and amino acids −26 to −1 of SEQ ID NO: 118 are a signal peptide.

In one aspect, the mature polypeptide is amino acids 1 to 300 of SEQ ID NO: 119 and amino acids −19 to −1 of SEQ ID NO: 119 are a signal peptide.

In one aspect, the mature polypeptide of a cellobiohydrolase I is amino acids 26 to 532 of SEQ ID NO: 96 based on the SignalP 3.0 program (Bendtsen et al., 2004, *J. Mol. Biol.* 340: 783-795) that predicts amino acids 1 to 25 of SEQ ID NO: 96 are a signal peptide. In another aspect, the mature polypeptide of a cellobiohydrolase II is amino acids 19 to 464 of SEQ ID NO: 98 based on the SignalP 3.0 program that predicts amino acids 1 to 18 of SEQ ID NO: 98 are a signal peptide. In another aspect, the mature polypeptide of a beta-glucosidase is amino acids 20 to 863 of SEQ ID NO: 100 based on the SignalP 3.0 program that predicts amino acids 1 to 19 of SEQ ID NO: 100 are a signal peptide. In another aspect, the mature polypeptide of an AA9 polypeptide is amino acids 26 to 253 of SEQ ID NO: 102 based on the SignalP 3.0 program that predicts amino acids 1 to 25 of SEQ ID NO: 102 are a signal peptide. In another aspect, the mature polypeptide of a GH10 xylanase is amino acids 21 to 405 of SEQ ID NO: 104 based on the SignalP 3.0 program that predicts amino acids 1 to 20 of SEQ ID NO: 104 are a signal peptide. In another aspect, the mature polypeptide of a GH10 xylanase is amino acids 20 to 398 of SEQ ID NO: 106 based on the SignalP 3.0 program that predicts amino acids 1 to 19 of SEQ ID NO: 106 are a signal peptide. In another aspect, the mature polypeptide of a beta-xylosidase is amino acids 22 to 796 of SEQ ID NO: 108 based on the SignalP 3.0 program that predicts amino acids 1 to 21 of SEQ ID NO: 108 are a signal peptide. In another aspect, the mature polypeptide of an endoglucanase I is amino acids 23 to 459 of SEQ ID NO: 110 based on the SignalP 3.0 program that predicts amino acids 1 to 22 of SEQ ID NO: 110 are a signal peptide. In another aspect, the mature polypeptide of an endoglucanase II is amino acids 22 to 418 of SEQ ID NO: 112 based on the SignalP 3.0 program that predicts amino acids 1 to 21 of SEQ ID NO: 112 are a signal peptide. In one aspect, the mature polypeptide of an *A. fumigatus* cellobiohydrolase I is amino acids 27 to 532 of SEQ ID NO: 114 based on the SignalP 3.0 program (Bendtsen et al., 2004, *J. Mol. Biol.* 340: 783-795) that predicts amino acids 1 to 26 of SEQ ID NO: 114 are a signal peptide. In another aspect, the mature polypeptide of an *A. fumigatus* cellobiohydrolase II is amino acids 20 to 454 of SEQ ID NO: 116 based on the SignalP 3.0 program that predicts amino acids 1 to 19 of SEQ ID NO: 116 are a signal peptide.

It is known in the art that a host cell may produce a mixture of two of more different mature polypeptides (i.e., with a different C-terminal and/or N-terminal amino acid) expressed by the same polynucleotide. It is also known in the art that different host cells process polypeptides differently, and thus, one host cell expressing a polynucleotide may produce a different mature polypeptide (e.g., having a different C-terminal and/or N-terminal amino acid) as compared to another host cell expressing the same polynucleotide.

Mature polypeptide coding sequence: The term "mature polypeptide coding sequence" means a polynucleotide that encodes a mature polypeptide. In one aspect, the mature polypeptide coding sequence is nucleotides 79 to 987 of SEQ ID NO: 10 and nucleotides 1 to 78 of SEQ ID NO: 10 encodes a signal peptide.

In one aspect, the mature polypeptide coding sequence is the joined sequence of nucleotides 49 to 70 and nucleotides 123 to 1027 of SEQ ID NO: 25 or the cDNA sequence thereof and nucleotides 1 to 48 of SEQ ID NO: 25 encode a signal peptide.

In one aspect, the mature polypeptide coding sequence is nucleotides 109 to 1422 of SEQ ID NO: 28 and nucleotides 1 to 108 of SEQ ID NO: 28 encodes a signal peptide.

In one aspect, the mature polypeptide coding sequence is nucleotides 82 to 1419 of SEQ ID NO: 31 and nucleotides 1 to 81 of SEQ ID NO: 31 encodes a signal peptide.

In one aspect, the mature polypeptide coding sequence is nucleotides 109 to 1422 of SEQ ID NO: 34 and nucleotides 1 to 108 of SEQ ID NO: 34 encodes a signal peptide.

In one aspect, the mature polypeptide coding sequence is nucleotides 82 to 1419 of SEQ ID NO: 37 and nucleotides 1 to 81 of SEQ ID NO: 37 encodes a signal peptide.

In one aspect, the mature polypeptide coding sequence is nucleotides 76 to 981 of SEQ ID NO: 46 and nucleotides 1 to 75 of SEQ ID NO: 46 encodes a signal peptide.

In one aspect, the mature polypeptide coding sequence is nucleotides 76 to 1008 of SEQ ID NO: 49 and nucleotides 1 to 75 of SEQ ID NO: 49 encodes a signal peptide.

In one aspect, the mature polypeptide coding sequence is the joined sequence of nucleotides 73 to 318, nucleotides 470 to 1298 and nucleotides 1392 to 1408 of SEQ ID NO: 52 and nucleotides 1 to 72 of SEQ ID NO: 52 encodes a signal peptide.

In one aspect, the mature polypeptide coding sequence is the joined sequence of nucleotides 73 to 318, nucleotides 470 to 1298 and nucleotides 1392 to 1435 of SEQ ID NO: 55 and nucleotides 1 to 72 of SEQ ID NO: 55 encodes a signal peptide.

In one aspect, the mature polypeptide coding sequence is nucleotides 94 to 1401 of SEQ ID NO: 58 and nucleotides 1 to 93 of SEQ ID NO: 58 encodes a signal peptide.

In one aspect, the mature polypeptide coding sequence is nucleotides 82 to 1413 of SEQ ID NO: 61 and nucleotides 1 to 81 of SEQ ID NO: 61 encodes a signal peptide.

In one aspect, the mature polypeptide coding sequence is the joined sequence of nucleotides 58 to 330, nucleotides 403 to 655, nucleotides 795 to 948 and nucleotides 1100 to 1325 of SEQ ID NO: 64 and nucleotides 1 to 57 of SEQ ID NO: 64 encodes a signal peptide.

In one aspect, the mature polypeptide coding sequence is the joined sequence of nucleotides 58 to 330, nucleotides 403 to 655, nucleotides 795 to 948 and nucleotides 1100 to 1352 of SEQ ID NO: 67 and nucleotides 1 to 57 of SEQ ID NO: 67 encodes a signal peptide.

In one aspect, the mature polypeptide coding sequence is nucleotides 127 to 1023 of SEQ ID NO: 83 and nucleotides 1 to 126 of SEQ ID NO: 83 encodes a signal peptide.

In one aspect, the mature polypeptide coding sequence of a cellobiohydrolase I is nucleotides 76 to 1727 of SEQ ID NO: 95 or the cDNA sequence thereof based on the SignalP 3.0 program (Bendtsen et al., 2004, supra) that predicts nucleotides 1 to 75 of SEQ ID NO: 95 encode a signal peptide. In another aspect, the mature polypeptide coding sequence of a cellobiohydrolase II is nucleotides 55 to 1895 of SEQ ID NO: 97 or the cDNA sequence thereof based on the SignalP 3.0 program that predicts nucleotides 1 to 54 of SEQ ID NO: 97 encode a signal peptide. In another aspect, the mature polypeptide coding sequence of a beta-glucosidase is nucleotides 58 to 3057 of SEQ ID NO: 99 or the cDNA sequence thereof based on the SignalP 3.0 program that predicts nucleotides 1 to 57 of SEQ ID NO: 99 encode a signal peptide. In another aspect, the mature polypeptide coding sequence of an AA9 polypeptide is nucleotides 76 to 832 of SEQ ID NO: 101 or the cDNA sequence thereof based on the SignalP 3.0 program that predicts nucleotides 1 to 75 of SEQ ID NO: 101 encode a signal peptide. In another aspect, the mature polypeptide coding sequence of a GH10 xylanase is nucleotides 124 to 1517 of SEQ ID NO: 103 or the cDNA sequence thereof based on the SignalP 3.0 program that predicts nucleotides 1 to 123 of SEQ ID NO: 103 encode a signal peptide. In another aspect, the mature polypeptide coding sequence of a GH10 xylanase is nucleotides 58 to 1194 of SEQ ID NO: 105 based on the SignalP 3.0 program that predicts nucleotides 1 to 57 of SEQ ID NO: 105 encode a signal peptide. In another aspect, the mature polypeptide coding sequence of a beta-xylosidase is nucleotides 64 to 2388 of SEQ ID NO: 107 based on the SignalP 3.0 program that predicts nucleotides 1 to 63 of SEQ ID NO: 107 encode a signal peptide. In another aspect, the mature polypeptide coding sequence of an endoglucanase I is nucleotides 67 to 1504 of SEQ ID NO: 109 or the cDNA sequence thereof based on the SignalP 3.0 program that predicts nucleotides 1 to 66 of SEQ ID NO: 109 encode a signal peptide. In another aspect, the mature polypeptide coding sequence of an endoglucanase II is nucleotides 64 to 1504 of SEQ ID NO: 111 based on the SignalP 3.0 program that predicts nucleotides 1 to 63 of SEQ ID NO: 111 encode a signal peptide. In one aspect, the mature polypeptide coding sequence of an *A. fumigatus* cellobiohydrolase I is nucleotides 79 to 1596 of SEQ ID NO: 113 based on the SignalP 3.0 program (Bendtsen et al., 2004, supra) that predicts nucleotides 1 to 78 of SEQ ID NO: 113 encode a signal peptide. In another aspect, the mature polypeptide coding sequence of an *A. fumigatus* cellobiohydrolase II is nucleotides 58 to 1700 of SEQ ID NO: 115 or the cDNA sequence thereof based on the SignalP 3.0 program that predicts nucleotides 1 to 57 of SEQ ID NO: 115 encode a signal peptide.

Nucleic acid construct: The term "nucleic acid construct" means a nucleic acid molecule, either single- or double-stranded, which is isolated from a naturally occurring gene or is modified to contain segments of nucleic acids in a manner that would not otherwise exist in nature or which is synthetic, which comprises one or more control sequences.

Oligosaccharide: The term "oligosaccharide" is a compound having 2 to 10 monosaccharide units.

Operably linked: The term "operably linked" means a configuration in which a control sequence is placed at an appropriate position relative to the coding sequence of a polynucleotide such that the control sequence directs expression of the coding sequence.

Protease: The term "proteolytic enzyme" or "protease" means one or more (e.g., several) enzymes that break down the amide bond of a protein by hydrolysis of the peptide bonds that link amino acids together in a polypeptide chain. A protease may include, e.g., a metalloprotease, a trypsin-like serine protease, a subtilisin-like serine protease, and aspartic protease.

Sequence Identity: The relatedness between two amino acid sequences or between two nucleotide sequences is described by the parameter "sequence identity".

For purposes of the present invention, the degree of sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 3.0.0 or later. Version 6.1.0 was used. The optional parameters used are gap open penalty of 10, gap extension penalty of 0.5, and the EBLOSUM62 (EMBOSS version of BLOSUM62) substitution matrix. The output of Needle labelled "longest identity" (obtained using the –nobrief option) is used as the percent identity and is calculated as follows:

(Identical Residues×100)/(Length of Alignment–
Total Number of Gaps in Alignment)

For purposes of the present invention, the degree of sequence identity between two deoxyribonucleotide sequences is determined using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), preferably version 3.0.0 or later. Version 6.1.0 was used. The optional parameters used are gap open penalty of 10, gap extension penalty of 0.5, and the EDNAFULL (EMBOSS version of NCBI NUC4.4) substitution matrix. The output of Needle labelled "longest identity" (obtained using the –nobrief option) is used as the percent identity and is calculated as follows:

(Identical Deoxyribonucleotides×100)/(Length of
Alignment –Total Number of Gaps in Alignment)

Starch: The term "starch" means any material comprised of complex polysaccharides of plants, composed of glucose units that occurs widely in plant tissues in the form of storage granules, consisting of amylose and amylopectin, and represented as $(C_6H_{10}O_5)_n$, where n is any number.

Steep or steeping: The term "steeping" means soaking the crop kernel with water and optionally SO2.

Stringency conditions: The different stringency conditions are defined as follows.

The term "very low stringency conditions" means for probes of at least 100 nucleotides in length, prehybridization and hybridization at 42° C. in 5×SSPE, 0.3% SDS, 200 micrograms/ml sheared and denatured salmon sperm DNA, and 25% formamide, following standard Southern blotting procedures for 12 to 24 hours. The carrier material is finally washed three times each for 15 minutes using 2.0×SSC, 0.2% SDS at 60° C.

The term "low stringency conditions" means for probes of at least 100 nucleotides in length, prehybridization and hybridization at 42° C. in 5×SSPE, 0.3% SDS, 200 micrograms/ml sheared and denatured salmon sperm DNA, and 25% formamide, following standard Southern blotting procedures for 12 to 24 hours. The carrier material is finally washed three times each for 15 minutes using 1.0×SSC, 0.2% SDS at 60° C.

The term "medium stringency conditions" means for probes of at least 100 nucleotides in length, prehybridization and hybridization at 42° C. in 5×SSPE, 0.3% SDS, 200 micrograms/ml sheared and denatured salmon sperm DNA, and 35% formamide, following standard Southern blotting procedures for 12 to 24 hours. The carrier material is finally washed three times each for 15 minutes using 1.0×SSC, 0.2% SDS at 65° C.

The term "medium-high stringency conditions" means for probes of at least 100 nucleotides in length, prehybridization and hybridization at 42° C. in 5×SSPE, 0.3% SDS, 200 micrograms/ml sheared and denatured salmon sperm DNA, and 35% formamide, following standard Southern blotting procedures for 12 to 24 hours. The carrier material is finally washed three times each for 15 minutes using 1.0×SSC, 0.2% SDS at 70° C.

The term "high stringency conditions" means for probes of at least 100 nucleotides in length, prehybridization and hybridization at 42° C. in 5×SSPE, 0.3% SDS, 200 micrograms/ml sheared and denatured salmon sperm DNA, and 50% formamide, following standard Southern blotting procedures for 12 to 24 hours. The carrier material is finally washed three times each for 15 minutes using 0.5×SSC, 0.2% SDS at 70° C.

The term "very high stringency conditions" means for probes of at least 100 nucleotides in length, prehybridization and hybridization at 42° C. in 5×SSPE, 0.3% SDS, 200 micrograms/ml sheared and denatured salmon sperm DNA, and 50% formamide, following standard Southern blotting procedures for 12 to 24 hours. The carrier material is finally washed three times each for 15 minutes using 0.5×SSC, 0.2% SDS at 75° C.

Subsequence: The term "subsequence" means a polynucleotide having one or more (e.g., several) nucleotides absent from the 5' and/or 3' end of a mature polypeptide coding sequence; wherein the subsequence encodes a fragment having arabinofuranosidase or xylanase activity.

Substantially pure polypeptide: The term "substantially pure polypeptide" means a preparation that contains at most 10%, at most 8%, at most 6%, at most 5%, at most 4%, at most 3%, at most 2%, at most 1%, and at most 0.5% by weight of other polypeptide material with which it is natively or recombinantly associated. Preferably, the polypeptide is at least 92% pure, e.g., at least 94% pure, at least 95% pure, at least 96% pure, at least 97% pure, at least 98% pure, at least 99%, at least 99.5% pure, and 100% pure by weight of the total polypeptide material present in the preparation. The polypeptides of the present invention are preferably in a substantially pure form. This can be accomplished, for example, by preparing the polypeptide by well-known recombinant methods or by classical purification methods.

Variant: The term "variant" means a polypeptide having xylanase or arabinofuranosidase activity comprising an alteration, i.e., a substitution, insertion, and/or deletion of one or more (several) amino acid residues at one or more (several) positions. A substitution means a replacement of an amino acid occupying a position with a different amino acid; a deletion means removal of an amino acid occupying a position; and an insertion means adding 1-3 amino acids adjacent to an amino acid occupying a position.

Wet milling benefit: The term "wet milling benefit" means one or more of improved starch yield and/or purity, improved gluten quality and/or yield, improved fiber, gluten, or steep water filtration, dewatering and evaporation, easier germ separation and/or better post-saccharification filtration, and process energy savings thereof.

Xylan degrading activity or xylanolytic activity: The term "xylan degrading activity" or "xylanolytic activity" means a biological activity that hydrolyzes xylan-containing material. The two basic approaches for measuring xylanolytic activity include: (1) measuring the total xylanolytic activity, and (2) measuring the individual xylanolytic activities (e.g., endoxylanases, beta-xylosidases, arabinofuranosidases, alpha-glucuronidases, acetylxylan esterases, feruloyl esterases, and alpha-glucuronyl esterases). Recent progress in assays of xylanolytic enzymes was summarized in several publications including Biely and Puchard, 2006, *Journal of the Science of Food and Agriculture* 86(11): 1636-1647; Spanikova and Biely, 2006, *FEBS Letters* 580(19): 4597-4601; Herrmann et al., 1997, *Biochemical Journal* 321: 375-381.

Total xylan degrading activity can be measured by determining the reducing sugars formed from various types of xylan, including, for example, oat spelt, beechwood, and larchwood xylans, or by photometric determination of dyed xylan fragments released from various covalently dyed xylans. A common total xylanolytic activity assay is based on production of reducing sugars from polymeric 4-O-methyl glucuronoxylan as described in Bailey et al., 1992, Interlaboratory testing of methods for assay of xylanase activity, *Journal of Biotechnology* 23(3): 257-270. Xylanase activity can also be determined with 0.2% AZCL-arabinoxylan as substrate in 0.01% TRITON® X-100 and 200 mM sodium phosphate pH 6 at 37° C. One unit of xylanase activity is defined as 1.0 μmole of azurine produced per minute at 37° C., pH 6 from 0.2% AZCL-arabinoxylan as substrate in 200 mM sodium phosphate pH 6.

Xylan degrading activity can be determined by measuring the increase in hydrolysis of birchwood xylan (Sigma Chemical Co., Inc., St. Louis, Mo., USA) by xylan-degrading enzyme(s) under the following typical conditions: 1 ml reactions, 5 mg/ml substrate (total solids), 5 mg of xylanolytic protein/g of substrate, 50 mM sodium acetate pH 5, 50° C., 24 hours, sugar analysis using p-hydroxybenzoic acid hydrazide (PHBAH) assay as described by Lever, 1972, *Anal. Biochem.* 47: 273-279.

Xylanase: The term "xylanase" means a 1,4-beta-D-xylan-xylohydrolase (E.C. 3.2.1.8) that catalyses the endohydrolysis of 1,4-beta-D-xylosidic linkages in xylans. Xylanase activity can be determined with 0.2% AZCL-arabinoxylan as substrate in 0.01% TRITON® X-100 and 200 mM sodium phosphate pH 6 at 37° C. One unit of xylanase activity is defined as 1.0 μmole of azurine produced per minute at 37° C., pH 6 from 0.2% AZCL-arabinoxylan as substrate in 200 mM sodium phosphate pH 6.

Nomenclature

For purposes of the present invention, the nomenclature [Y/F] means that the amino acid at this position may be a tyrosine (Try, Y) or a phenylalanine (Phe, F). Likewise the nomenclature [V/G/A/I] means that the amino acid at this position may be a valine (Val, V), glycine (Gly, G), alanine (Ala, A) or isoleucine (lie, I), and so forth for other combinations as described herein. Unless otherwise limited further, the amino acid X is defined such that it may be any of the 20 natural amino acids.

DETAILED DESCRIPTION OF THE INVENTION

Accordingly, it is an object of the invention to provide improved processes of treating crop kernels to provide starch of high quality.

In one embodiment, the enzyme compositions useful in the processes of the invention provide benefits including, improving starch yield and/or purity, improving gluten quality and/or yield, improving fiber, gluten, or steep water filtration, dewatering and evaporation, easier germ separation and/or better post-saccharification filtration, and process energy savings thereof.

Moreover, the present inventors have surprisingly found that the enzymes useful according to the invention provide reduction in fiber mass and lower protein content of the fiber due to better separation of both starch and protein fractions from the fiber fraction. Separating starch and gluten from fiber is valuable to the industry because fiber is the least valuable product of the wet milling process, and higher purity starch and protein is desirable.

Surprisingly, the present inventors have discovered that replacing some of the protease activity in an enzyme composition can provide an improvement over an otherwise similar composition containing predominantly protease activity alone. This can provide a benefit to the industry, e.g., on the basis of cost and ease of use.

The Milling Process

The kernels are milled in order to open up the structure and to allow further processing and to separate the kernels into the four main constituents: starch, germ, fiber and protein.

In one embodiment, a wet milling process is used. Wet milling gives a very good separation of germ and meal (starch granules and protein) and is often applied at locations where there is a parallel production of syrups.

The inventors of the present invention have surprisingly found that the quality of the starch final product may be improved by treating crop kernels in the processes as described herein.

The processes of the invention result in comparison to traditional processes in a higher starch quality, in that the final starch product is more pure and/or a higher yield is obtained and/or less process time is used. Another advantage may be that the amount of chemicals, such as SO2 and NaHSO3, which need to be used, may be reduced or even fully removed.

Wet Milling

Starch is formed within plant cells as tiny granules insoluble in water. When put in cold water, the starch granules may absorb a small amount of the liquid and swell. At temperatures up to about 50° C. to 75° C. the swelling may be reversible. However, with higher temperatures an irreversible swelling called "gelatinization" begins. Granular starch to be processed according to the present invention may be a crude starch-containing material comprising (e.g., milled) whole grains including non-starch fractions such as germ residues and fibers. The raw material, such as whole grains, may be reduced in particle size, e.g., by wet milling, in order to open up the structure and allowing for further processing. Wet milling gives a good separation of germ and meal (starch granules and protein) and is often applied at locations where the starch hydrolyzate is used in the production of, e.g., syrups.

In an embodiment the particle size is reduced to between 0.05-3.0 mm, preferably 0.1-0.5 mm, or so that at least 30%, preferably at least 50%, more preferably at least 70%, even more preferably at least 90% of the starch-containing material fits through a sieve with a 0.05-3.0 mm screen, preferably 0.1-0.5 mm screen.

More particularly, degradation of the kernels of corn and other crop kernels into starch suitable for conversion of starch into mono- and oligo-saccharides, ethanol, sweeteners, etc. consists essentially of four steps:
1. Steeping and germ separation,
2. Fiber washing and drying,
3. Starch gluten separation, and
4. Starch washing.

1. Steeping and Germ Separation

Corn kernels are softened by soaking in water for between about 30 minutes to about 48 hours, preferably 30 minutes to about 15 hours, such as about 1 hour to about 6 hours at a temperature of about 50° C., such as between about 45° C. to 60° C. During steeping, the kernels absorb water, increasing their moisture levels from 15 percent to 45 percent and more than doubling in size. The optional addition of e.g. 0.1 percent sulfur dioxide (SO2) and/or NaHSO3 to the water prevents excessive bacteria growth in the warm environment. As the corn swells and softens, the mild acidity of the steepwater begins to loosen the gluten bonds within the corn and release the starch. After the corn kernels are steeped they are cracked open to release the germ. The germ contains the valuable corn oil. The germ is separated from the heavier density mixture of starch, hulls and fiber essentially by "floating" the germ segment free of the other substances under closely controlled conditions. This method serves to eliminate any adverse effect of traces of corn oil in later processing steps.

In an embodiment of the invention the kernels are soaked in water for 2-10 hours, preferably about 3-5 hours at a temperature in the range between 40 and 60° C., preferably around 50° C.

In one embodiment, 0.01-1%, preferably 0.05-0.3%, especially 0.1% SO2 and/or NaHSO3 may be added during soaking.

2. Fiber Washing and Drying

To get maximum starch recovery, while keeping any fiber in the final product to an absolute minimum, it is necessary to wash the free starch from the fiber during processing. The fiber is collected, slurried and screened to reclaim any residual starch or protein.

3. Starch Gluten Separation

The starch-gluten suspension from the fiber-washing step, called mill starch, is separated into starch and gluten. Gluten has a low density compared to starch. By passing mill starch through a centrifuge, the gluten is readily spun out.

4. Starch Washing

The starch slurry from the starch separation step contains some insoluble protein and much of solubles. They have to be removed before a top quality starch (high purity starch) can be made. The starch, with just one or two percent protein remaining, is diluted, washed 8 to 14 times, re-diluted and washed again in hydroclones to remove the last trace of protein and produce high quality starch, typically more than 99.5% pure.

Products

Wet milling can be used to produce, without limitation, corn steep liquor, corn gluten feed, germ, corn oil, corn gluten meal, corn starch, modified corn starch, syrups such as corn syrup, and corn ethanol.

Polypeptides Having Arabinofuranosidase Activity

Preferred embodiments of the aspect of the invention relating to the GH62 polypeptide having arabinofuranosidase activity are disclosed herein below. Additional details of preferred GH62 polypeptides having arabinofuranosidase activity are found in PCT/CN2015/071015 filed 19 Jan. 2015.

In an embodiment, the GH62 polypeptide having arabinofuranosidase activity has a sequence identity to the mature polypeptide of SEQ ID NO: 8 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 9 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 11 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 12 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 14 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 15 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 17 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has sequence identity to SEQ ID NO: 18 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, GH62 polypeptide having arabinofuranosidase activity has a sequence identity to the mature polypeptide of SEQ ID NO: 20 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 21 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, GH62 polypeptide having arabinofuranosidase activity has a sequence identity to the mature polypeptide of SEQ ID NO: 23 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 24 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, GH62 polypeptide having arabinofuranosidase activity has a sequence identity to the mature polypeptide of SEQ ID NO: 26 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 27 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, GH62 polypeptide having arabinofuranosidase activity has a sequence identity to the mature polypeptide of SEQ ID NO: 29 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 30 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 35 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 36 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 41 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide has arabinofuranosidase activity having a sequence identity to SEQ ID NO: 42 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 47 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide has arabinofuranosidase activity having a sequence identity to SEQ ID NO: 48 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 53 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 54 of at least 80% of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 59 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 60 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 65 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 66 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 117 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 118 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

Sources of Polypeptides

A polypeptide having arabinofuranosidase or xylanase activity of the present invention may be obtained from microorganisms of any genus. For purposes of the present invention, the term "obtained from" as used herein in connection with a given source shall mean that the polypeptide encoded by a polynucleotide is produced by the source or by a strain in which the polynucleotide from the source has been inserted. In one aspect, the polypeptide obtained from a given source is secreted extracellularly.

The polypeptide may be a fungal polypeptide. In one embodiment, the polypeptide is from a fungus of the order Eurotiales, or from the family Aspergillaceae, or from the genus *Penicillium* or from the species *Penicillium aurantiogriseum, Penicillium oxalicum* or *Penicillium capsulatum*.

In one embodiment, the polypeptide is from a fungus of the order Eurotiales, or from the family Aspergillaceae, or from the genus *Aspergillus* or from the species *Aspergillus clavatus* or *Aspergillus wentii* or *Aspergillus niger*.

In one embodiment, the polypeptide is from a fungus of the order Eurotiales, or from the family Aspergillaceae, or from the genus *Neosartorya* or from the species *Neosartorya fischeri*.

In one embodiment, the polypeptide is from a fungus of the order Eurotiales, or from the family Trichocomaceae, or from the genus *Talaromyces* or from the species *Talaromyces pinophilus*.

In one embodiment, the polypeptide is from a fungus of the order Ustilaginales, or from the family Ustilaginaceae, or from the genus *Ustilago* or from the species *Ustilago maydis*.

In one embodiment, the polypeptide is from a fungus of the phylum Ascomycota, or from the genus *Acrophialophora* or from the species *Acrophialophora fusispora*.

The polypeptide may be a bacterial polypeptide. In one embodiment, the polypeptide is from a bacterium of the order Actinomycetales, or from the family Streptomycetaceae, or from the genus *Streptomyces* or from the species *Streptomyces nitrosporeus* or *Streptomyces beijiangensis*.

In one embodiment, the polypeptide is from a bacterium of the order Actinomycetales, or from the family Streptosporangiaceae, or from the genus *Streptosporangium* or from the species *Streptosporangium* sp-60756.

It will be understood that for the aforementioned species, the invention encompasses both the perfect and imperfect states, and other taxonomic equivalents, e.g., anamorphs, regardless of the species name by which they are known. Those skilled in the art will readily recognize the identity of appropriate equivalents.

Strains of these species are readily accessible to the public in a number of culture collections, such as the American Type Culture Collection (ATCC), Deutsche Sammlung von Mikroorganismen und Zellkulturen GmbH (DSMZ), Centraalbureau Voor Schimmelcultures (CBS), and *Agricultural Research* Service Patent Culture Collection, Northern Regional Research Center (NRRL).

The polypeptide may be identified and obtained from other sources including microorganisms isolated from nature (e.g., soil, composts, water, etc.) or DNA samples obtained directly from natural materials (e.g., soil, composts, water, etc.) using the above-mentioned probes. Techniques for isolating microorganisms and DNA directly from natural habitats are well known in the art. A polynucleotide encoding the polypeptide may then be obtained by similarly screening a genomic DNA or cDNA library of another microorganism or mixed DNA sample. Once a polynucleotide encoding a polypeptide has been detected with the probe(s), the polynucleotide can be isolated or cloned by utilizing techniques that are known to those of ordinary skill in the art (see, e.g., Sambrook et al., 1989, supra).

Enzyme Compositions

Preferably, the compositions are enriched in the polypeptides useful according to the invention. The term "enriched" indicates that the enzymatic activity of the composition has been increased, e.g., with an enrichment factor of at least 1.1, such as at least 1.2, at least 1.3, at least 1.4, at least 1.5, at least 2.0, at least 3.0, at least 4.0, at least 5.0, at least 10. In an embodiment, the composition comprises the polypeptides of the first aspect of the invention and one or more formulating agents, as described in the 'formulating agent' section below.

The compositions may comprise a polypeptide of the present invention as the major enzymatic component, e.g., a mono-component composition. Such a composition may further comprise a formulating agent, as described in the 'formulating agent' section below.

Alternatively, the compositions may comprise multiple enzymatic activities, such as one or more (e.g., several) enzymes selected from the group consisting of phytase, xylanase, galactanase, alpha-galactosidase, protease, phospholipase, glucoronidase, lysophospholipase, amylase, beta-glucanase, arabinofuranosidase, beta-xylosidase, endo-1,4-beta-xylanase acetyl xylan esterase, feruloyl esterase, cellulase, cellobiohydrolase, beta-glycosidase, pullulanase, or any mixture thereof. Additional cellulolytic activities are particularly contemplated, as further outlined below.

Where arabinofuranosidase and xylanase activity are contemplated, it is at present contemplated that the xylanase is used in one or more of the following amounts (dosage ranges): 0.01-200; 0.05-100; 0.1-50; 0.2-20; 0.1-1; 0.2-2; 0.5-5; or 1-10 wherein all these ranges are mg xylanase protein per kg substrate (ppm). It is at present contemplated that the arabinofuranosidase is administered in one or more of the following amounts (dosage ranges): 0.01-200; 0.05-100; 0.1-50; 0.2-20; 0.1-1; 0.2-2; 0.5-5; or 1-10 wherein all these ranges are mg arabinofuranosidase protein per kg substrate (ppm). It is further contemplated that the ratio of the GH10 or 11 xylanase to GH62 arabinofuranosidase is in the range of 100:1 to 1:100 xylanase: arabinofuranosidase such as the ranges 50:1 to 1:50, 50:1 to 1:10, 25:1 to 1:5, 10:1 to 1:2 or such as 10:1 to 1:50, 5:1 to 1:25, 2:1 to 1:10 xylanase: arabinofuranosidase.

Formulating Agent

The enzyme of the invention may be formulated as a liquid or a solid. For a liquid formulation, the formulating agent may comprise a polyol (such as e.g. glycerol, ethylene glycol or propylene glycol), a salt (such as e.g. sodium chloride, sodium benzoate, potassium sorbate) or a sugar or sugar derivative (such as e.g. dextrin, glucose, sucrose, and sorbitol). Thus in one embodiment, the composition is a liquid composition comprising the polypeptide of the invention and one or more formulating agents selected from the list consisting of glycerol, ethylene glycol, 1,2-propylene glycol, 1,3-propylene glycol, sodium chloride, sodium benzoate, potassium sorbate, dextrin, glucose, sucrose, and sorbitol.

For a solid formulation, the formulation may be for example as a granule, spray dried powder or agglomerate. The formulating agent may comprise a salt (organic or inorganic zinc, sodium, potassium or calcium salts such as e.g. such as calcium acetate, calcium benzoate, calcium carbonate, calcium chloride, calcium citrate, calcium sorbate, calcium sulfate, potassium acetate, potassium benzoate, potassium carbonate, potassium chloride, potassium citrate, potassium sorbate, potassium sulfate, sodium acetate, sodium benzoate, sodium carbonate, sodium chloride, sodium citrate, sodium sulfate, zinc acetate, zinc benzoate, zinc carbonate, zinc chloride, zinc citrate, zinc sorbate, zinc sulfate), starch or a sugar or sugar derivative (such as e.g. sucrose, dextrin, glucose, lactose, sorbitol).

In an embodiment, the solid composition is in granulated form. The granule may have a matrix structure where the components are mixed homogeneously. However, the granule typically comprises a core particle and one or more coatings, which typically are salt and/or wax coatings. The core particle can either be a homogeneous blend of xylanase of the invention optionally combined with one or more additional enzymes and optionally together with one or more salts or an inert particle with the xylanase of the invention optionally combined with one or more additional enzymes applied onto it.

In an embodiment, the material of the core particles are selected from the group consisting of inorganic salts (such as calcium acetate, calcium benzoate, calcium carbonate, calcium chloride, calcium citrate, calcium sorbate, calcium sulfate, potassium acetate, potassium benzoate, potassium carbonate, potassium chloride, potassium citrate, potassium sorbate, potassium sulfate, sodium acetate, sodium benzoate, sodium carbonate, sodium chloride, sodium citrate, sodium sulfate, zinc acetate, zinc benzoate, zinc carbonate, zinc chloride, zinc citrate, zinc sorbate, zinc sulfate), starch or a sugar or sugar derivative (such as e.g. sucrose, dextrin, glucose, lactose, sorbitol), sugar or sugar derivative (such as e.g. sucrose, dextrin, glucose, lactose, sorbitol), small organic molecules, starch, flour, cellulose and minerals.

The salt coating is typically at least 1 μm thick and can either be one particular salt or a mixture of salts, such as $Na_2SO_4$, $K_2SO_4$, $MgSO_4$ and/or sodium citrate. Other examples are those described in e.g. WO 2008/017659, WO 2006/034710, WO 1997/05245, WO 1998/54980, WO 1998/55599, WO 2000/70034 or polymer coating such as described in WO 2001/00042.

In another embodiment, the composition is a solid composition comprising the xylanase of the invention and one or more formulating agents selected from the list consisting of sodium chloride, sodium benzoate, potassium sorbate, sodium sulfate, potassium sulfate, magnesium sulfate, sodium thiosulfate, calcium carbonate, sodium citrate, dextrin, glucose, sucrose, sorbitol, lactose, starch and cellulose. In a preferred embodiment, the formulating agent is selected from one or more of the following compounds: sodium sulfate, dextrin, cellulose, sodium thiosulfate and calcium carbonate. In a preferred embodiment, the solid composition is in granulated form. In an embodiment, the solid composition is in granulated form and comprises a core particle, an enzyme layer comprising the xylanase of the invention and a salt coating.

In a further embodiment, the formulating agent is selected from one or more of the following compounds: glycerol, ethylene glycol, 1, 2-propylene glycol or 1, 3-propylene glycol, sodium chloride, sodium benzoate, potassium sorbate, sodium sulfate, potassium sulfate, magnesium sulfate, sodium thiosulfate, calcium carbonate, sodium citrate, dextrin, glucose, sucrose, sorbitol, lactose, starch and cellulose. In a preferred embodiment, the formulating agent is selected from one or more of the following compounds: 1, 2-propylene glycol, 1, 3-propylene glycol, sodium sulfate, dextrin, cellulose, sodium thiosulfate and calcium carbonate.

Plant Based Material from the Sub-Family Panicoideae

In one embodiment, the plant based material from the sub-family Panicoideae is from the tribe Andropogoneae such as the rank *Andropogon* or *Andropterum* or *Apluda* or *Apocopis* or *Arthraxon* or *Bothriochloa* or *Capillipedium* or *Chionachne* or *Chrysopogon* or *Coelorachis* or *Coix* or *Cymbopogon* or *Dichanthium* or *Diheteropogon* or *Dimeria* or *Elionurus* or *Eremochloa* or *Euclasta* or *Eulalia* or *Germainia* or *Hemarthria* or *Heteropholis* or *Heteropogon* or *Hyparrhenia* or *Hyperthelia* or *Imperata* or *Ischaemum* or *Iseilema* or *Kerriochloa* or *Microstegium* or *Miscanthidium* or *Miscanthus* or *Mnesithea* or *Ophiuros* or *Oxyrhachis* or *Phacelurus* or *Pholiurus* or *Pogonatherum* or *Polytoca* or *Polytrias* or *Pseudopogonatherum* or *Pseudosorghum* or *Rhytachne* or *Rottboellia* or *Saccharum* or *Sarga* or *Schizachyrium* or *Sehima* or *Sorghastrum* or *Sorghum* or *Spodiopogon* or *Thaumastochloa* or *Thelepogon* or *Themeda* or *Trachypogon* or *Triarrhena* or *Tripsacum* or *Urelytrum* or *Vetiveria* or *Vossia* or *Xerochloa* or *Zea*.

In a preferred embodiment, the plant based material from the sub-family Panicoideae is from the rank *Zea*, such as the species *Zea diploperennis*, *Zea luxurians*, *Zea mays*, *Zea nicaraguensis* or *Zea perennis*.

In a preferred embodiment, the plant based material from the sub-family Panicoideae is from the rank *Sorghum*, such as the species *Sorghum* amplum, *Sorghum* angustum, *Sorghum* arundinaceum, *Sorghum* australiense, *Sorghum* bicolor, *Sorghum* brachypodum, *Sorghum* bulbosum, *Sorghum* ecarinatum, *Sorghum* exstans, *Sorghum* grande, *Sorghum* halepense, *Sorghum* hybrid cultivar, *Sorghum* interjectum, *Sorghum* intrans, *Sorghum* laxiflorum, *Sorghum* leiocladum, *Sorghum* macrospermum, *Sorghum* matarankense, *Sorghum* nitidum, *Sorghum* plumosum, *Sorghum* propinquum, *Sorghum* purpureosericeum, *Sorghum* stipoideum, *Sorghum* sudanense, *Sorghum* timorense, *Sorghum* versicolor, *Sorghum* sp. 'Silk' or *Sorghum* sp. as defined in WO2007/002267.

In another embodiment, the plant based material from the sub-family Panicoideae is from the tribe Paniceae such as the rank *Acritochaete, Acroceras, Alexfloydia, Alloteropsis, Amphicarpum, Ancistrachne, Anthephora, Brachiaria, Calyptochloa, Cenchrus, Chaetium, Chaetopoa, Chamaeraphis, Chlorocalymma, Cleistochloa, Cyphochlaena, Cyrtococcum, Dichanthelium, Digitaria, Dissochondrus, Echinochloa, Entolasia, Eriochloa, Homopholis, Hygrochloa, Hylebates, Ixophorus, Lasiacis, Leucophrys, Louisiella, Megaloprotachne, Megathyrsus, Melinis, Microcalamus, Moorochloa, Neurachne, Odontelytrum, Oplismenus, Ottochloa, Panicum, Paractaenum, Paraneurachne, Paratheria, Parodiophyllochloa, Paspalidium, Pennisetum, Plagiosetum, Poecilostachys, Pseudechinolaena, Pseudochaetochloa, Pseudoraphis, Rupichloa, Sacciolepis, Scutachne, Setaria, Setariopsis, Snowdenia, Spinifex, Stenotaphrum, Stereochlaena, Thrasya, Thuarea, Thyridolepis, Tricholaena*, unclassified Paniceae, *Uranthoecium, Urochloa, Walwhalleya, Whiteochloa, Yakirra, Yvesia, Zuloagaea* or *Zygochloa*.

In a preferred embodiment, the plant based material from the sub-family Panicoideae is from the rank *Panicum*, such as the species *Panicum adenophorum, Panicum* aff. *aquaticum* JKT-2012, *Panicum amarum, Panicum antidotale, Panicum aquaticum, Panicum arctum, Panicum arundinariae, Panicum atrosanguineum, Panicum auricomum, Panicum auritum, Panicum bartlettii, Panicum bergii, Panicum bisulcatum, Panicum boliviense, Panicum brazzavillense, Panicum brevifolium, Panicum caaguazuense, Panicum campestre, Panicum capillare, Panicum cayennense, Panicum cayoense, Panicum cervicatum, Panicum chloroleucum, Panicum claytonii, Panicum coloratum, Panicum cyanescens, Panicum decompositum, Panicum deustum, Panicum dichotomiflorum, Panicum dinklagei, Panicum distichophyllum, Panicum dregeanum, Panicum elephantipes, Panicum fauriei, Panicum flexile, Panicum fluviicola, Panicum gouinii, Panicum gracilicaule, Panicum granuliferum, Panicum guatemalense, Panicum hallii, Panicum heterostachyum, Panicum hirticaule, Panicum hirtum, Panicum hylaeicum, Panicum incumbens, Panicum infestum, Panicum italicum, Panicum laetum, Panicum laevinode, Panicum lanipes, Panicum larcomianum, Panicum longipedicellatum, Panicum machrisianum, Panicum malacotrichum, Panicum margaritiferum, Panicum micranthum, Panicum miliaceum, Panicum milioides, Panicum millegrana, Panicum mystasipum, Panicum natalense, Panicum nephelophilum, Panicum nervosum, Panicum notatum, Panicum olyroides, Panicum paludosum, Panicum pansum, Panicum pantrichum, Panicum parvifolium, Panicum parviglume, Panicum pedersenii, Panicum penicillatum, Panicum petersonii, Panicum phragmitoides, Panicum piauiense, Panicum pilosum, Panicum pleianthum, Panicum polycomum, Panicum polygonatum, Panicum pseudisachne, Panicum pygmaeum, Panicum pyrularium, Panicum queenslandicum, Panicum racemosum, Panicum repens, Panicum rhizogonum, Panicum rigidulum, Panicum rivale, Panicum rude, Panicum rudgei, Panicum schinzii, Panicum schwackeanum, Panicum sellowii, Panicum seminudum, Panicum stapfianum, Panicum stenodes, Panicum stramineum, Panicum subalbidum, Panicum subtiramulosum, Panicum sumatrense, Panicum tenellum, Panicum tenuifolium, Panicum trichanthum, Panicum trichidiachne, Panicum trichoides, Panicum tricholaenoides, Panicum tuerckheimii, Panicum turgidum, Panicum urvilleanum, Panicum validum, Panicum venezuelae, Panicum verrucosum, Panicum virgatum, Panicum wettsteinii, Panicum* sp., *Panicum* sp. *Christin* 16-200, *Panicum* sp. ELS-2011, *Panicum* sp. EM389 or *Panicum* sp. *Forest* 761.

In a further embodiment, the plant based material from the sub-family Panicoideae is maize (*Zea*), corn (*Zea*), sorghum (*Sorghum*), switchgrass (*Panicum virgatum*), millet (*Panicum miliaceum*), pearl millet (*Cenchrus violaceus* also called *Pennisetum glaucum*), foxtail millet (*Setaria italica* also called *Panicum italicum*) or in a processed form such as milled corn, milled maize, defatted maize, defatted destarched maize, milled sorghum, milled switchgrass, milled millet, milled foxtail millet, milled pearl millet, or any combination thereof.

In an embodiment, the plant based material from the sub-family Panicoideae is from the seed of the plant. In a preferred embodiment, the plant based material from the sub-family Panicoideae is from the seed of maize (*Zea*), corn (*Zea*), sorghum (*Sorghum*), switchgrass (*Panicum virgatum*), millet (*Panicum miliaceum*), pearl millet (*Cenchrus violaceus* also called *Pennisetum glaucum*), foxtail millet (*Setaria italica* also called *Panicum italicum*) or wherein the seed has been processed such as milled corn, milled maize, defatted maize, defatted destarched maize, milled sorghum, milled switchgrass, milled millet, milled foxtail millet, milled pearl millet, or any combination thereof.

Additional Enzymes

In an embodiment, enzymatic activities aside from or in addition to polypeptides having arabinofuranosidase activity useful according to the invention are contemplated. In particular, protease and additional cellulolytic activities are contemplated.

In an embodiment the invention comprises use of a GH62 polypeptide having arabinofuranosidase activity and a GH10 xylanase.

In an embodiment the invention comprises use of a GH62 polypeptide having arabinofuranosidase activity and a GH11 xylanase.

In an embodiment the invention comprises use of a GH43 polypeptide having arabinofuranosidase activity and a GH10 xylanase.

In an embodiment the invention comprises use of a GH43 polypeptide having arabinofuranosidase activity and a GH11 xylanase.

Proteases

The protease may be any protease. Suitable proteases include microbial proteases, such as fungal and bacterial proteases. Preferred proteases are acidic proteases, i.e., proteases characterized by the ability to hydrolyze proteins under acidic conditions below pH 7. Preferred proteases are acidic endoproteases. An acid fungal protease is preferred, but also other proteases can be used.

The acid fungal protease may be derived from *Aspergillus, Candida, Coriolus, Endothia, Enthomophtra, Irpex, Mucor, Penicillium, Rhizopus, Sclerotium,* and *Torulopsis*. In particular, the protease may be derived from *Aspergillus aculeatus* (WO 95/02044), *Aspergillus awamori* (Hayashida et al., 1977, Agric. Biol. Chem. 42(5), 927-933), *Aspergillus niger* (see, e.g., Koaze et al., 1964, Agr. Biol. Chem. Japan 28: 216), *Aspergillus saitoi* (see, e.g., Yoshida, 1954, J. Agr. Chem. Soc. Japan 28: 66), or *Aspergillus oryzae*, such as the pepA protease; and acidic proteases from *Mucor miehei* or *Mucor pusillus*.

In an embodiment the acidic protease is a protease complex from *A. oryzae* sold under the tradename Flavourzyme® (from Novozymes A/S) or an aspartic protease from *Rhizomucor miehei* or Spezyme® FAN or GC 106 from Genencor Int.

In a preferred embodiment the acidic protease is an aspartic protease, such as an aspartic protease derived from a strain of *Aspergillus*, in particular *A. aculeatus*, especially *A. aculeatus* CBD 101.43.

Preferred acidic proteases are aspartic proteases, which retain activity in the presence of an inhibitor selected from the group consisting of pepstatin, Pefabloc, PMSF, or EDTA. Protease I derived from *A. aculeatus* CBS 101.43 is such an acidic protease.

In a preferred embodiment the process of the invention is carried out in the presence of the acidic Protease I derived from *A. aculeatus* CBS 101.43 in an effective amount.

In another embodiment the protease is derived from a strain of the genus *Aspergillus*, such as a strain of *Aspergillus aculaetus*, such as *Aspergillus aculeatus* CBS 101.43, such as the one disclosed in WO 95/02044, or a protease having at least 80%, such as at least 85%, such as at least 90%, preferably at least 95%, such as at least 96%, such as 97%, such as at least 98%, such as at least 99% identity to protease of WO 95/02044. In one aspect, the protease differs by up to 10 amino acids, e.g., 1, 2, 3, 4, 5, 6, 7, 8, 9, or 10, from the mature polypeptide of WO 95/02044. In another embodiment, the present invention relates to variants of the mature polypeptide of WO 95/02044 comprising a substitution, deletion, and/or insertion at one or more (e.g., several) positions. In an embodiment, the number of amino acid substitutions, deletions and/or insertions introduced into the mature polypeptide of WO 95/02044 is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

The protease may be a neutral or alkaline protease, such as a protease derived from a strain of *Bacillus*. A particular protease is derived from *Bacillus amyloliquefaciens* and has the sequence obtainable at Swissprot as Accession No. P06832. The proteases may have at least 90% sequence identity to the amino acid sequence disclosed in the Swissprot Database, Accession No. P06832 such as at least 92%, at least 95%, at least 96%, at least 97%, at least 98%, or particularly at least 99% identity.

The protease may have at least 90% sequence identity to the amino acid sequence disclosed as sequence 1 in WO 2003/048353 such as at 92%, at least 95%, at least 96%, at least 97%, at least 98%, or particularly at least 99% identity.

The protease may be a papain-like protease selected from the group consisting of proteases within EC 3.4.22.* (cysteine protease), such as EC 3.4.22.2 (papain), EC 3.4.22.6 (chymopapain), EC 3.4.22.7 (asdepain), EC 3.4.22.14 (actinidain), EC 3.4.22.15 (cathepsin L), EC 3.4.22.25 (glycyl endopeptidase) and EC 3.4.22.30 (caricain).

In an embodiment, the protease is a protease preparation derived from a strain of *Aspergillus*, such as *Aspergillus oryzae*. In another embodiment the protease is derived from a strain of *Rhizomucor*, preferably *Rhizomucor miehei*. In another embodiment the protease is a protease preparation, preferably a mixture of a proteolytic preparation derived from a strain of *Aspergillus*, such as *Aspergillus oryzae*, and a protease derived from a strain of *Rhizomucor*, preferably *Rhizomucor miehei*.

Aspartic acid proteases are described in, for example, Handbook of Proteolytic Enzymes, Edited by A.J. Barrett, N.D. Rawlings and J.F. Woessner, Academic Press, San Diego, 1998, Chapter 270. Examples of aspartic acid proteases include, e.g., those disclosed in Berka et al., 1990, Gene 96: 313; Berka et al., 1993, Gene 125: 195-198; and Gomi et al., 1993, Biosci. Biotech. Biochem. 57: 1095-1100, which are hereby incorporated by reference.

The protease also may be a metalloprotease, which is defined as a protease selected from the group consisting of:

(a) proteases belonging to EC 3.4.24 (metalloendopeptidases); preferably EC 3.4.24.39 (acid metallo proteinases);

(b) metalloproteases belonging to the M group of the above Handbook;

(c) metalloproteases not yet assigned to clans (designation: Clan MX), or belonging to either one of clans MA, MB, MC, MD, ME, MF, MG, MH (as defined at pp. 989-991 of the above Handbook);

(d) other families of metalloproteases (as defined at pp. 1448-1452 of the above Handbook);

(e) metalloproteases with a HEXXH motif;

(f) metalloproteases with an HEFTH motif;

(g) metalloproteases belonging to either one of families M3, M26, M27, M32, M34, M35, M36, M41, M43, or M47 (as defined at pp. 1448-1452 of the above Handbook);

(h) metalloproteases belonging to the M28E family; and
(i) metalloproteases belonging to family M35 (as defined at pp. 1492-1495 of the above Handbook).

In other particular embodiments, metalloproteases are hydrolases in which the nucleophilic attack on a peptide bond is mediated by a water molecule, which is activated by a divalent metal cation. Examples of divalent cations are zinc, cobalt or manganese. The metal ion may be held in place by amino acid ligands. The number of ligands may be five, four, three, two, one or zero. In a particular embodiment the number is two or three, preferably three.

There are no limitations on the origin of the metalloprotease used in a process of the invention. In an embodiment the metalloprotease is classified as EC 3.4.24, preferably EC 3.4.24.39. In one embodiment, the metalloprotease is an acid-stable metalloprotease, e.g., a fungal acid-stable metalloprotease, such as a metalloprotease derived from a strain of the genus *Thermoascus*, preferably a strain of *Thermoascus aurantiacus*, especially *Thermoascus aurantiacus* CGMCC No. 0670 (classified as EC 3.4.24.39). In another embodiment, the metalloprotease is derived from a strain of the genus *Aspergillus*, preferably a strain of *Aspergillus oryzae*.

In one embodiment the metalloprotease has a degree of sequence identity to amino acids −159 to 177, or preferably amino acids +1 to 177 (the mature polypeptide) of Sequence Number 1 of WO 2010/008841 (a *Thermoascus aurantiacus* metalloprotease) of at least 80%, at least 82%, at least 85%, at least 90%, at least 95%, or at least 97%; and which have metalloprotease activity.

The *Thermoascus aurantiacus* metalloprotease is a preferred example of a metalloprotease suitable for use in a process of the invention. Another metalloprotease is derived from *Aspergillus oryzae* and comprises Sequence Number 11 disclosed in WO 2003/048353, or amino acids 23-353; 23-374; 23-397; 1-353; 1-374; 1-397; 177-353; 177-374; or 177-397 thereof, and Sequence Number 10 disclosed in WO 2003/048353.

Another metalloprotease suitable for use in a process of the invention is the *Aspergillus oryzae* metalloprotease comprising Sequence Number 5 of WO 2010/008841, or a metalloprotease is an isolated polypeptide which has a degree of identity to Sequence Number 5 of at least about 80%, at least 82%, at least 85%, at least 90%, at least 95%, or at least 97%; and which have metalloprotease activity. In particular embodiments, the metalloprotease consists of the amino acid sequence of Sequence Number 5.

In a particular embodiment, a metalloprotease has an amino acid sequence that differs by forty, thirty-five, thirty, twenty-five, twenty, or by fifteen amino acids from amino acids −159 to 177, or +1 to 177 of the amino acid sequences of the *Thermoascus aurantiacus* or *Aspergillus oryzae* metalloprotease.

In another embodiment, a metalloprotease has an amino acid sequence that differs by ten, or by nine, or by eight, or by seven, or by six, or by five amino acids from amino acids −159 to 177, or +1 to 177 of the amino acid sequences of these metalloproteases, e.g., by four, by three, by two, or by one amino acid.

In particular embodiments, the metalloprotease a) comprises or b) consists of
i) the amino acid sequence of amino acids −159 to 177, or +1 to 177 of Sequence Number 1 of WO 2010/008841;
ii) the amino acid sequence of amino acids 23-353, 23-374, 23-397, 1-353, 1-374, 1-397, 177-353, 177-374, or 177-397 of Sequence Number 3 of WO 2010/008841;
iii) the amino acid sequence of Sequence Number 5 of WO 2010/008841; or allelic variants, or fragments, of the sequences of i), ii), and iii) that have protease activity.

A fragment of amino acids −159 to 177, or +1 to 177 of Sequence Number 1 of WO 2010/008841 or of amino acids 23-353, 23-374, 23-397, 1-353, 1-374, 1-397, 177-353, 177-374, or 177-397 of Sequence Number 3 of WO 2010/008841; is a polypeptide having one or more amino acids deleted from the amino and/or carboxyl terminus of these amino acid sequences. In one embodiment a fragment contains at least 75 amino acid residues, or at least 100 amino acid residues, or at least 125 amino acid residues, or at least 150 amino acid residues, or at least 160 amino acid residues, or at least 165 amino acid residues, or at least 170 amino acid residues, or at least 175 amino acid residues.

In another embodiment, the metalloprotease is combined with another protease, such as a fungal protease, preferably an acid fungal protease.

In another embodiment, the protease is selected from the group consisting of
(a) proteases belonging to the EC 3.4.21. enzyme group; and/or
(b) proteases belonging to the EC 3.4.14. enzyme group; and/or
(c) Serine proteases of the peptidase family S53 that comprises two different types of peptidases: tripeptidyl aminopeptidases (exo-type) and endo-peptidases; as described in 1993, *Biochem. J.* 290:205-218 and in MEROPS protease database, release, 9.4 (31 Jan. 2011) (www.merops.ac.uk). The database is described in Rawlings, N.D., Barrett, A. J. and Bateman, A., 2010, "MEROPS: the peptidase database", *Nucl. Acids Res.* 38: D227-D233. See also PCT/CN2013/087861 filed 26 Nov. 2013.

Commercially available products include ALCALASE™, ESPERASE™, FLAWOURZYME™, NEUTRASE®, RENNILASE®, NOVOZYM™ FM 2.0 L, and iZyme BA (available from Novozymes A/S, Denmark) and GC106™ and SPEZYME™ FAN from Genencor International, Inc., USA.

The protease may be present in an amount of 0.0001-1 mg enzyme protein per g dry solids (DS) kernels, preferably 0.001 to 0.1 mg enzyme protein per g DS kernels.

In an embodiment, the protease is an acidic protease added in an amount of 1-20,000 HUT/100 g DS kernels, such as 1-10,000 HUT/100 g DS kernels, preferably 300-8,000 HUT/100 g DS kernels, especially 3,000-6,000 HUT/100 g DS kernels, or 4,000-20,000 HUT/100 g DS kernels acidic protease, preferably 5,000-10,000 HUT/100 g, especially from 6,000-16,500 HUT/100 g DS kernels.

Cellulolytic Compositions

In further embodiments, the invention relates to use of combinations with cellulolytic compositions.

Exemplary cellulolytic compositions are as described in e.g., WO 2015/081139 and PCT/US2015/034179.

In an embodiment the cellulolytic composition is derived from a strain of *Trichoderma*, such as a strain of *Trichoderma reesei*; a strain of *Humicola*, such as a strain of *Humicola insolens*, and/or a strain of *Chrysosporium*, such as a strain of *Chrysosporium lucknowense*.

In a preferred embodiment the cellulolytic composition is derived from a strain of *Trichoderma reesei*.

The cellulolytic composition may comprise one or more of the following polypeptides, including enzymes: GH61 polypeptide having cellulolytic enhancing activity, beta-glucosidase, beta-xylosidase, CBHI and CBHII, endoglucanase, xylanase, or a mixture of two, three, or four thereof. In an embodiment the cellulolytic composition comprises a GH61 polypeptide having cellulolytic enhancing activity and a beta-glucosidase.

In an embodiment, the cellulolytic composition comprises a GH61 polypeptide having cellulolytic enhancing activity and a beta-xylosidase.

In an embodiment, the cellulolytic composition comprises a GH61 polypeptide having cellulolytic enhancing activity and an endoglucanase.

In an embodiment, the cellulolytic composition comprises a GH61 polypeptide having cellulolytic enhancing activity and a xylanase.

In an embodiment, the cellulolytic composition comprises a GH61 polypeptide having cellulolytic enhancing activity, an endoglucanase, and a xylanase.

In an embodiment the cellulolytic composition comprises a GH61 polypeptide having cellulolytic enhancing activity, a beta-glucosidase, and a beta-xylosidase. In an embodiment the cellulolytic composition comprises a GH61 polypeptide having cellulolytic enhancing activity, a beta-glucosidase, and an endoglucanase. In an embodiment the cellulolytic composition comprises a GH61 polypeptide having cellulolytic enhancing activity, a beta-glucosidase, and a xylanase.

In an embodiment the cellulolytic composition comprises a GH61 polypeptide having cellulolytic enhancing activity, a beta-xylosidase, and an endoglucanase. In an embodiment the cellulolytic composition comprises a GH61 polypeptide having cellulolytic enhancing activity, a beta-xylosidase, and a xylanase.

In an embodiment the cellulolytic composition comprises a GH61 polypeptide having cellulolytic enhancing activity, a beta-glucosidase, a beta-xylosidase, and an endoglucanase. In an embodiment the cellulolytic composition comprises a GH61 polypeptide having cellulolytic enhancing activity, a beta-glucosidase, a beta-xylosidase, and a xylanase. In an embodiment the cellulolytic composition comprises a GH61 polypeptide having cellulolytic enhancing activity, a beta-glucosidase, an endoglucanase, and a xylanase.

In an embodiment the cellulolytic composition comprises a GH61 polypeptide having cellulolytic enhancing activity, a beta-xylosidase, an endoglucanase, and a xylanase.

In an embodiment the cellulolytic composition comprises a GH61 polypeptide having cellulolytic enhancing activity, a beta-glucosidase, a beta-xylosidase, an endoglucanase, and a xylanase.

In an embodiment the endoglucanase is an endoglucanase I.

In an embodiment the endoglucanase is an endoglucanase II.

In an embodiment, the cellulolytic composition comprises a GH61 polypeptide having cellulolytic enhancing activity, an endoglucanase I, and a xylanase.

In an embodiment, the cellulolytic composition comprises a GH61 polypeptide having cellulolytic enhancing activity, an endoglucanase II, and a xylanase.

In another embodiment the cellulolytic composition comprises a GH61 polypeptide having cellulolytic enhancing activity, a beta-glucosidase, and a CBHI.

In another embodiment the cellulolytic composition comprises a GH61 polypeptide having cellulolytic enhancing activity, a beta-glucosidase, a CBHI and a CBHII.

The cellulolytic composition may further comprise one or more enzymes selected from the group consisting of an esterase, an expansin, a laccase, a ligninolytic enzyme, a pectinase, a peroxidase, a protease, a swollenin, and a phytase.

Xylanase (GH10 and GH11 Polypeptides)

Exemplary embodiments relating to the GH10 or GH11 polypeptide having xylanase activity are disclosed herein below, alternatively referred to as Family 10 xylanase and Family 11 xylanase, respectively.

In an embodiment, the GH10 polypeptide having xylanase activity such as the xylanase from *Aspergillus aculeatus* (Xyl II) as disclosed in WO 1994/021785 as SEQ ID NO: 5 and disclosed herein as SEQ ID NO: 70.

In an embodiment, the GH10 polypeptide having xylanase activity has a sequence identity to SEQ ID NO: 70 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity such as the xylanase from *Clostridium acetobutylicum* as disclosed in *J. Bacteriol.* 2001, 183(16): 4823 as Swissprot:Q97TP5 and disclosed herein as SEQ ID NO: 71.

In an embodiment, the GH10 polypeptide having xylanase activity has a sequence identity to SEQ ID NO: 71 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity such as the xylanase from *Aspergillus aculeatus* as disclosed as SEQ ID NO: 8 in WO 2005/059084 and disclosed herein as SEQ ID NO: 72.

In an embodiment, the GH10 polypeptide having xylanase activity has a sequence identity to SEQ ID NO: 72 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Thermomyces lanuginosus* as disclosed as SEQ ID NO: 2 in WO1996/23062 and disclosed herein as SEQ ID NO: 73.

In an embodiment, the GH10 polypeptide having xylanase activity has a sequence identity to SEQ ID NO: 73 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Dictyoglomus thermophilum* as disclosed as SEQ ID NO: 305 in WO2011/057140 and disclosed herein as SEQ ID NO: 74.

In an embodiment, GH10 polypeptide having xylanase activity has a sequence identity to SEQ ID NO: 74 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Paenibacillus Pabuli* as disclosed as SEQ ID NO: 2 in WO2005/079585 and disclosed herein as SEQ ID NO: 75.

In an embodiment, the GH10 polypeptide having xylanase activity has a sequence identity to SEQ ID NO: 75 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Geobacillus stearothermophilus* as disclosed herein as SEQ ID NO: 78. In an embodiment, the composition comprises a GH10 polypeptide having xylanase activity having a sequence identity to the mature polypeptide of SEQ ID NO: 77 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity has a sequence identity to SEQ ID NO: 78 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Streptomyces beijiangensis* as disclosed herein as SEQ ID NO: 84. In an embodiment, the composition comprises a GH10 polypeptide having xylanase activity having a sequence identity to the mature polypeptide of SEQ ID NO: 83 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity has a sequence identity to SEQ ID NO: 84 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Fusarium oxysporum* called FoxXyn6 as disclosed as SEQ ID NO: 2 in WO2014/019220 and as disclosed herein as SEQ ID NO: 88.

In an embodiment, the composition comprises a GH10 polypeptide having xylanase activity having a sequence identity to SEQ ID NO: 88 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Fusarium oxysporum* called AclXyn5 as disclosed as SEQ ID NO: 7 in WO2014/020143 and as disclosed herein as SEQ ID NO: 89.

In an embodiment, the GH10 polypeptide having xylanase activity has a sequence identity to SEQ ID NO: 89 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity is the xylanase from *Cornyascus* such as *Corynascus thermophilus*, from *Scytalidium* such as *Scytalidium thermophilum*, from *Penicillium* such as *Penicillium oxalicum* as disclosed in WO 2013/075642, or a GH11 polypeptide having xylanase activity having a sequence identity of at least at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% to any of these.

In an embodiment, the GH10 polypeptide having xylanase activity includes the xylanase from *Talaromyces leycettanus* as disclosed in WO 2013/019827 and disclosed herein as SEQ ID NO: 104. In an embodiment, the GH10 polypeptide having xylanase activity has a sequence identity to SEQ ID NO: 104 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity includes the xylanase from *Trichophaea saccata* as disclosed in WO 2011/057083 and disclosed herein as SEQ ID NO: 106. In an embodiment, the GH10 polypeptide having xylanase activity has a sequence identity to SEQ ID NO: 106 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In one embodiment, the cellulolytic composition comprises a xylanase. In a preferred aspect, the xylanase is a Family 10 xylanase.

Examples of xylanases useful in the processes of the present invention include, but are not limited to, xylanases from *Aspergillus aculeatus* (GeneSeqP:AAR63790; WO 94/21785), *Aspergillus fumigatus* (WO 2006/078256), *Penicillium pinophilum* (WO 2011/041405), *Penicillium* sp. (WO 2010/126772), *Thielavia terrestris* NRRL 8126 (WO 2009/079210), and *Trichophaea saccata* GH10 (WO 2011/057083).

In one embodiment the GH10 xylanase is derived from the genus *Aspergillus*, such as a strain of *Aspergillus aculeatus*, such as the one described in WO 94/021785 as Sequence Number 5 (referred to as Xyl II; or a GH10 xylanase having at least 80%, such as at least 85%, such as at least 90%, preferably at least 95%, such as at least 96%, such as 97%, such as at least 98%, such as at least 99% identity to Sequence Number 5 in WO 94/021785. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one embodiment the GH10 xylanase is derived from the genus *Aspergillus*, such as a strain of *Aspergillus fumigatus*, such as described in WO 2006/078256 as Xyl III, or a GH10 xylanase having at least 80%, such as at least 85%, such as at least 90%, preferably at least 95%, such as at least 96%, such as 97%, such as at least 98%, such as at least 99% identity to Xyl III in WO 2006/078256. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In an embodiment, the GH10 polypeptide having xylanase activity such as the xylanase from *Aspergillus niger* as disclosed herein as SEQ ID NO: 119.

In an embodiment, the GH10 polypeptide having xylanase activity has a sequence identity to SEQ ID NO: 119 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

AA9 (GH61) Polypeptide Having Cellulolytic Enhancing Activity

The cellulolytic composition may in one embodiment comprise one or more AA9 (GH61) polypeptide having cellulolytic enhancing activity.

In one aspect, the AA9 (GH61) polypeptide is any AA9 polypeptide having cellulolytic enhancing activity. Examples of AA9 polypeptides include, but are not limited to, AA9 polypeptides from *Thielavia terrestris* (WO 2005/074647, WO 2008/148131, and WO 2011/035027), *Thermoascus aurantiacus* (WO 2005/074656 and WO 2010/065830), *Trichoderma reesei* (WO 2007/089290 and WO 2012/149344), *Myceliophthora thermophila* (WO 2009/085935, WO 2009/085859, WO 2009/085864, WO 2009/085868, WO 2009/033071, WO 2012/027374, and WO 2012/068236), *Aspergillus fumigatus* (WO 2010/138754), *Penicillium pinophilum* (WO 2011/005867), *Thermoascus* sp. (WO 2011/039319), *Penicillium* sp. (*emersonii*) (WO 2011/041397 and WO 2012/000892), *Thermoascus crustaceous* (WONO 2011/041504), *Aspergillus aculeatus* (WO 2012/125925), *Thermomyces lanuginosus* (WO 2012/113340, WO 2012/129699, WO 2012/130964, and WO 2012/129699), *Aurantiporus alborubescens* (WO 2012/122477), *Trichophaea saccata* (WO 2012/122477), *Penicillium thomii* (WO 2012/122477), *Talaromyces stipitatus* (WO 2012/135659), *Humicola insolens* (WO 2012/146171), *Malbranchea cinnamomea* (WO 2012/101206), *Talaromyces leycettanus* (WO 2012/101206), and *Chaetomium thermophilum* (WO 2012/101206), *Talaromyces emersonii* (WO 2012/000892), *Trametes versicolor* (WO 2012/092676 and WO 2012/093149), and *Talaromyces thermophilus* (WO 2012/129697 and WO 2012/130950); which are incorporated herein by reference in their entireties.

In another aspect, the AA9 polypeptide having cellulolytic enhancing activity is selected from the group consisting of: (i) an AA9 polypeptide having cellulolytic enhancing activity comprising or consisting of the mature polypeptide of SEQ ID NO: 102; (ii) an AA9 polypeptide having cellulolytic enhancing activity comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% sequence identity to the mature polypeptide of SEQ ID NO: 102; (iii) an AA9 polypeptide having cellulolytic enhancing activity encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 101; and (iv) an AA9 polypeptide having cellulolytic enhancing activity encoded by a polynucleotide that hybridizes under at least high stringency conditions, e.g., very high stringency conditions, with the mature polypeptide coding sequence of SEQ ID NO: 101 or the full-length complement thereof.

In another aspect, the *Penicillium* sp. (*emersonii*) AA9 polypeptide having cellulolytic enhancing activity or a homolog thereof is selected from the group consisting of: (i) an AA9 polypeptide having cellulolytic enhancing activity comprising or consisting of the mature polypeptide of SEQ ID NO: 102; (ii) an AA9 polypeptide having cellulolytic enhancing activity comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 102; (iii) an AA9 polypeptide having cellulolytic enhancing activity encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 101; and (iv) an AA9 polypeptide having cellulolytic enhancing activity encoded by a polynucleotide that hybridizes under at least high stringency conditions, e.g., very high stringency conditions, with the mature polypeptide coding sequence of SEQ ID NO: 101 or the full-length complement thereof.

In one embodiment GH61 polypeptide having cellulolytic enhancing activity, is derived from the genus *Thermoascus*, such as a strain of *Thermoascus aurantiacus*, such as the one described in WO 2005/074656 as Sequence Number 2; or a GH61 polypeptide having cellulolytic enhancing activity having at least 80%, such as at least 85%, such as at least 90%, preferably at least 95%, such as at least 96%, such as 97%, such as at least 98%, such as at least 99% identity to Sequence Number 2 in WO 2005/074656. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide comprising a substitution, deletion, and/ or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one embodiment, the GH61 polypeptide having cellulolytic enhancing activity, is derived from a strain derived from *Penicillium*, such as a strain of *Penicillium emersonii*, such as the one disclosed in WO 2011/041397, or a GH61 polypeptide having cellulolytic enhancing activity having at least 80%, such as at least 85%, such as at least 90%, preferably at least 95%, such as at least 96%, such as 97%, such as at least 98%, such as at least 99% identity to Sequence Number 2 in WO 2011/041397. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one embodiment the GH61 polypeptide having cellulolytic enhancing activity is derived from the genus Thielavia, such as a strain of Thielavia terrestris, such as the one described in WO 2005/074647 as Sequence Number 7 or Sequence Number 8; or one derived from a strain of Aspergillus, such as a strain of Aspergillus fumigatus, such as the one described in WO 2010/138754 as Sequence Number 2, or a GH61 polypeptide having cellulolytic enhancing activity having at least 80%, such as at least 85%, such as at least 90%, preferably at least 95%, such as at least 96%, such as 97%, such as at least 98%, such as at least 99% identity to any of these.

Endoglucanase

In one embodiment, the cellulolytic composition comprises an endoglucanase, such as an endoglucanase I or endoglucanase II.

Examples of bacterial endoglucanases that can be used in the processes of the present invention, include, but are not limited to, an *Acidothermus cellulolyticus* endoglucanase (WO 91/05039; WO 93/15186; U.S. Pat. No. 5,275,944; WO 96/02551; U.S. Pat. No. 5,536,655, WO 00/70031, WO 05/093050); *Thermobifida fusca* endoglucanase III (WO 05/093050); and *Thermobifida fusca* endoglucanase V (WO 05/093050).

Examples of fungal endoglucanases that can be used in the present invention, include, but are not limited to, a *Trichoderma reesei* endoglucanase I (Penttila et al., 1986, Gene 45: 253-263, *Trichoderma reesei* Cel7B endoglucanase I (GENBANK™ accession no. M15665), *Trichoderma reesei* endoglucanase II (Saloheimo, et al., 1988, Gene 63:11-22), *Trichoderma reesei* Cel5A endoglucanase II (GENBANK™ accession no. M19373), *Trichoderma reesei* endoglucanase III (Okada et al., 1988, Appl. Environ. Microbiol. 64: 555-563, GENBANK™ accession no. AB003694), *Trichoderma reesei* endoglucanase V (Saloheimo et al., 1994, Molecular Microbiology 13: 219-228, GENBANK™ accession no. Z33381), *Aspergillus aculeatus* endoglucanase (Ooi et al., 1990, Nucleic Acids Research 18: 5884), *Aspergillus kawachii* endoglucanase (Sakamoto et al., 1995, Current Genetics 27: 435-439), *Erwinia carotovara* endoglucanase (Saarilahti et al., 1990, Gene 90: 9-14), *Fusarium oxysporum* endoglucanase (GENBANK™ accession no. L29381), *Humicola grisea* var. *thermoidea* endoglucanase (GENBANK™ accession no. AB003107), *Melanocarpus albomyces* endoglucanase (GENBANK™ accession no. MAL515703), *Neurospora crassa* endoglucanase (GENBANK™ accession no. XM_324477), *Humicola insolens* endoglucanase V, *Myceliophthora thermophila* CBS 117.65 endoglucanase, basidiomycete CBS 495.95 endoglucanase, basidiomycete CBS 494.95 endoglucanase, *Thielavia terrestris* NRRL 8126 CEL6B endoglucanase, *Thielavia terrestris* NRRL 8126 CEL6C endoglucanase, *Thielavia terrestris* NRRL 8126 CEL7C endoglucanase, *Thielavia terrestris* NRRL 8126 CEL7E endoglucanase, *Thielavia terrestris* NRRL 8126 CEL7F endoglucanase, *Cladorrhinum foecundissimum* ATCC 62373 CEL7A endoglucanase, and *Trichoderma reesei* strain No. VTT-D-80133 endoglucanase (GENBANK™ accession no. M15665).

In one embodiment, the endoglucanase is an endoglucanase II, such as one derived from *Trichoderma*, such as a strain of *Trichoderma reesei*, such as the one described in WO 2011/057140 as Sequence Number 22; or an endoglucanase having at least 80%, such as at least 85%, such as at least 90%, preferably at least 95%, such as at least 96%, such as 97%, such as at least 98%, such as at least 99% identity to Sequence Number 22 in WO 2011/057140. In one aspect, the protease differs by up to 10 amino acids, e.g., 1, 2, 3, 4, 5, 6, 7, 8, 9, or 10, from the mature polypeptide 3. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one aspect, the endoglucanase I is selected from the group consisting of: (i) an endoglucanase I comprising or consisting of the mature polypeptide of SEQ ID NO: 110; (ii) an endoglucanase I comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 110; (iii) an endoglucanase I encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 109; and (iv) an endoglucanase I encoded by a polynucleotide that hybridizes under at least high stringency conditions, e.g., very high stringency conditions, with the mature polypeptide coding sequence of SEQ ID NO: 109 or the full-length complement thereof.

In another aspect, the endoglucanase II is selected from the group consisting of: (i) an endoglucanase II comprising or consisting of the mature polypeptide of SEQ ID NO: 112; (ii) an endoglucanase II comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 112; (iii) an endoglucanase II encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 111; and (iv) an endoglucanase II encoded by a polynucleotide that hybridizes under at least high stringency conditions, e.g., very high stringency conditions, with the mature polypeptide coding sequence of SEQ ID NO: 111 or the full-length complement thereof.

Beta-Xylosidase

Examples of beta-xylosidases useful in the processes of the present invention include, but are not limited to, beta-xylosidases from *Neurospora crassa* (SwissProt accession number Q7SOW4), *Trichoderma reesei* (UniProtKB/TrEMBL accession number Q92458), and *Talaromyces emersonii* (SwissProt accession number Q8X212).

In one embodiment the beta-xylosidase is derived from the genus *Aspergillus*, such as a strain of *Aspergillus fumigatus*, such as the one described in WO 2011/057140 as Sequence Number 206; or a beta-xylosidase having at least 80%, such as at least 85%, such as at least 90%, preferably at least 95%, such as at least 96%, such as 97%, such as at least 98%, such as at least 99% identity to Sequence Number 206 in WO 2011/057140. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide of SEQ ID NO: 6 comprising a substitution, deletion, and/or insertion at one or more (e.g., several) positions. In an embodiment, the number of amino acid substitutions, deletions and/or insertions introduced into the mature polypeptide of SEQ ID NO: 6 is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one embodiment the beta-xylosidase is derived from a strain of the genus *Aspergillus*, such as a strain of *Aspergillus fumigatus*, such as the one disclosed in U.S. provisional No. 61/526,833 or PCT/US12/052163 (Examples 16 and 17), or derived from a strain of *Trichoderma*, such as a strain of *Trichoderma reesei*, such as the mature polypeptide of Sequence Number 58 in WO 2011/057140 or a beta-xylosidase having at least 80%, such as at least 85%, such as at least 90%, preferably at least 95%, such as at least 96%, such as 97%, such as at least 98%, such as at least 99% identity thereto.

In another aspect, the *Talaromyces emersonii* beta-xylosidase or a homolog thereof is selected from the group consisting of (i) a beta-xylosidase comprising or consisting of the mature polypeptide of SEQ ID NO: 108; (ii) a beta-xylosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 108; (iii) a beta-xylosidase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 107; and (iv) a beta-xylosidase encoded by a polynucleotide that hybridizes under at least high stringency conditions, e.g., very high stringency conditions, with the mature polypeptide coding sequence of SEQ ID NO: 107 or the full-length complement thereof.

Beta-Glucosidase

The cellulolytic composition may in one embodiment comprise one or more beta-glucosidase. The beta-glucosidase may in one embodiment be one derived from a strain of the genus *Aspergillus*, such as *Aspergillus oryzae*, such as the one disclosed in WO 2002/095014 or the fusion protein having beta-glucosidase activity disclosed in WO 2008/057637, or *Aspergillus fumigatus*, such as the one disclosed in WO 2005/047499 or an *Aspergillus fumigatus* beta-glucosidase variant, such as disclosed in PCT application WO 2012/044915, such as the one with the following substitutions: F100D, S283G, N456E, F512Y.

In one embodiment the beta-glucosidase is derived from the genus *Aspergillus*, such as a strain of *Aspergillus fumigatus*, such as the one described in WO 2005/047499, or a beta-glucosidase having at least 80%, such as at least 85%, such as at least 90%, preferably at least 95%, such as at least 96%, such as 97%, such as at least 98%, such as at least 99% identity thereto.

In one embodiment the beta-glucosidase is derived from the genus *Aspergillus*, such as a strain of *Aspergillus fumigatus*, such as the one described in WO 2012/044915, or a beta-xylosidase having at least 80%, such as at least 85%, such as at least 90%, preferably at least 95%, such as at least 96%, such as 97%, such as at least 98%, such as at least 99% identity thereto.

In another aspect, the *Aspergillus fumigatus* beta-glucosidase or a homolog thereof is selected from the group consisting of (i) a beta-glucosidase comprising or consisting of the mature polypeptide of SEQ ID NO: 100; (ii) a beta-glucosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 100; (iii) a beta-glucosidase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to mature polypeptide coding sequence of SEQ ID NO: 99; and (iv) a beta-glucosidase encoded by a polynucleotide that hybridizes under at least high stringency conditions, e.g., very high stringency conditions, with the mature polypeptide coding sequence of SEQ ID NO: 99 or the full-length complement thereof.

Cellobiohydrolase I

The cellulolytic composition may in one embodiment may comprise one or more CBH I (cellobiohydrolase I). In one embodiment the cellulolytic composition comprises a cellobiohydrolase I (CBHI), such as one derived from a strain of the genus *Aspergillus*, such as a strain of *Aspergillus fumigatus*, such as the Cel7A CBHI disclosed in Sequence Number 2 in WO 2011/057140, or a strain of the genus *Trichoderma*, such as a strain of *Trichoderma reesei*.

In one embodiment the cellobiohydrolase I is derived from the genus *Aspergillus*, such as a strain of *Aspergillus fumigatus*, such as the one described in WO 2011/057140, or a CBHI having at least 80%, such as at least 85%, such as at least 90%, preferably at least 95%, such as at least 96%, such as 97%, such as at least 98%, such as at least 99% identity thereto.

In one aspect, the *Aspergillus fumigatus* cellobiohydrolase I or a homolog thereof is selected from the group consisting of: (i) a cellobiohydrolase I comprising or consisting of the mature polypeptide of SEQ ID NO: 114; (ii) a cellobiohydrolase I comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 114; (iii) a cellobiohydrolase I encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 113; and (iv) a cellobiohydrolase I encoded by a polynucleotide that hybridizes under at least high stringency conditions, e.g., very high stringency conditions, with the mature polypeptide coding sequence of SEQ ID NO: 113 or the full-length complement thereof.

Cellobiohydrolase II

The cellulolytic composition may in one embodiment comprise one or more CBH II (cellobiohydrolase II). In one embodiment the cellobiohydrolase II (CBHII), such as one derived from a strain of the genus *Aspergillus*, such as a strain of *Aspergillus fumigatus*, or a strain of the genus *Trichoderma*, such as *Trichoderma reesei*, or a strain of the genus *Thielavia*, such as a strain of *Thielavia terrestris*, such as cellobiohydrolase II CEL6A from *Thielavia terrestris*.

In one embodiment the cellobiohydrolyase II is derived from the genus *Aspergillus*, such as a strain of *Aspergillus fumigatus*, such as the one described in WO 2011/057140, or a CBHII having at least 80%, such as at least 85%, such as at least 90%, preferably at least 95%, such as at least 96%, such as 97%, such as at least 98%, such as at least 99% identity thereto.

In another aspect, the *Aspergillus fumigatus* cellobiohydrolase II or a homolog thereof is selected from the group consisting of: (i) a cellobiohydrolase II comprising or consisting of the mature polypeptide of SEQ ID NO: 116; (ii) a cellobiohydrolase II comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 116; (iii) a cellobiohydrolase II encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 115; and (iv) a cellobiohydrolase II encoded by a polynucleotide that hybridizes under at least high stringency conditions, e.g., very high stringency conditions, with the mature polypeptide coding sequence of SEQ ID NO: 115 or the full-length complement thereof.

Exemplary Cellulolytic Compositions

In particular, according to an embodiment, the present invention relates to use of enzyme compositions, comprising: (A) (i) a cellobiohydrolase I, (ii) a cellobiohydrolase II, and (iii) at least one enzyme selected from the group consisting of a beta-glucosidase or a variant thereof, an AA9 polypeptide having cellulolytic enhancing activity, a GH10 xylanase, and a beta-xylosidase; (B) (i) a GH10 xylanase and (ii) a beta-xylosidase; or (C) (i) a cellobiohydrolase I, (ii) a cellobiohydrolase II, (iii) a GH10 xylanase, and (iv) a beta-xylosidase;

wherein the cellobiohydrolase I is selected from the group consisting of: (i) a cellobiohydrolase I comprising or consisting of the mature polypeptide of SEQ ID NO: 96; (ii) a cellobiohydrolase I comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 96; (iii) a cellobiohydrolase I encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 95; and (iv) a cellobiohydrolase I encoded by a polynucleotide that hybridizes under at least high stringency conditions, e.g., very high stringency conditions, with the mature polypeptide coding sequence of SEQ ID NO: 95 or the full-length complement thereof;

wherein the cellobiohydrolase II is selected from the group consisting of: (i) a cellobiohydrolase II comprising or consisting of the mature polypeptide of SEQ ID NO: 98; (ii) a cellobiohydrolase II comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 98; (iii) a cellobiohydrolase II encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 97; and (iv) a cellobiohydrolase II encoded by a polynucleotide that hybridizes under at least high stringency conditions, e.g., very high stringency conditions, with the mature polypeptide coding sequence of SEQ ID NO: 97 or the full-length complement thereof;

wherein the beta-glucosidase is selected from the group consisting of: (i) a beta-glucosidase comprising or consisting of the mature polypeptide of SEQ ID NO: 100; (ii) a beta-glucosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 100; (iii) a beta-glucosidase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 99; and (iv) a beta-glucosidase encoded by a polynucleotide that hybridizes under at least high stringency conditions, e.g., very high stringency conditions, with the mature polypeptide coding sequence of SEQ ID NO: 99 or the full-length complement thereof;

wherein the xylanase is selected from the group consisting of: (i) a xylanase comprising or consisting of the mature polypeptide of SEQ ID NO: 104 or the mature polypeptide of SEQ ID NO: 106; (ii) a xylanase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 104 or the mature polypeptide of SEQ ID NO: 106; (iii) a xylanase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 103 or the mature polypeptide coding sequence of SEQ ID NO: 105; and (iv) a xylanase encoded by a polynucleotide that hybridizes under at least high stringency conditions, e.g., very high stringency conditions, with the mature polypeptide coding sequence of SEQ ID NO: 103 or the mature polypeptide coding sequence of SEQ ID NO: 105; or the full-length complement thereof; and wherein the beta-xylosidase is selected from the group consisting of (i) a beta-xylosidase comprising or consisting of the mature polypeptide of SEQ ID NO: 108; (ii) a beta-xylosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 108; (iii) a beta-xylosidase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 107; and (iv) a beta-xylosidase encoded by a polynucleotide that hybridizes under at least high stringency conditions, e.g., very high stringency conditions, with the mature polypeptide coding sequence of SEQ ID NO: 107 or the full-length complement thereof.

In particular, according to an embodiment, the present invention relates to use of enzyme compositions, comprising: (A) (i) an *Aspergillus fumigatus* cellobiohydrolase I; (ii) an *Aspergillus fumigatus* cellobiohydrolase II; (iii) an *Aspergillus fumigatus* beta-glucosidase or variant thereof; (iv) a *Penicillium* sp. AA9 polypeptide having cellulolytic enhancing activity; (v) a *Trichophaea saccata* GH10 xylanase; and (vi) a *Talaromyces emersonii* beta-xylosidase; or homologs thereof; (B) (i) an *Aspergillus fumigatus* cellobiohydrolase I; (ii) an *Aspergillus fumigatus* cellobiohydrolase II; (iii) a *Trichophaea saccata* GH10 xylanase; and (iv) a *Talaromyces emersonii* beta-xylosidase; or homologs thereof; or (C) (i) a *Trichophaea saccata* GH10 xylanase; and (ii) a *Talaromyces emersonii* beta-xylosidase; or homologs thereof.

In one embodiment, the amount of cellobiohydrolase I in an enzyme composition of the present invention is 5% to 60% of the total protein of the enzyme composition, e.g., 7.5% to 55%, 10% to 50%, 12.5% to 45%, 15% to 40%, 17.5% to 35%, and 20% to 30% of the total protein of the enzyme composition.

In another embodiment, the amount of cellobiohydrolase II in an enzyme composition of the present invention is 2.0-40% of the total protein of the enzyme composition, e.g., 3.0% to 35%, 4.0% to 30%, 5% to 25%, 6% to 20%, 7% to 15%, and 7.5% to 12% of the total protein of the enzyme composition.

In another embodiment, the amount of beta-glucosidase in an enzyme composition of the present invention is 0% to 30% of the total protein of the enzyme composition, e.g., 1% to 27.5%, 1.5% to 25%, 2% to 22.5%, 3% to 20%, 4% to 19%, % 4.5 to 18%, 5% to 17%, and 6% to 16% of the total protein of the enzyme composition.

In another embodiment, the amount of AA9 polypeptide in an enzyme composition of the present invention is 0% to 50% of the total protein of the enzyme composition, e.g., 2.5% to 45%, 5% to 40%, 7.5% to 35%, 10% to 30%, 12.5% to 25%, and 15% to 25% of the total protein of the enzyme composition.

In another embodiment, the amount of xylanase in an enzyme composition of the present invention is 0% to 30% of the total protein of the enzyme composition, e.g., 0.5% to 30%, 1.0% to 27.5%, 1.5% to 25%, 2% to 22.5%, 2.5% to 20%, 3% to 19%, 3.5% to 18%, and 4% to 17% of the total protein of the enzyme composition.

In another embodiment, the amount of beta-xylosidase in an enzyme composition of the present invention is 0% to 50% of the total protein of the enzyme composition, e.g., 0.5% to 30%, 1.0% to 27.5%, 1.5% to 25%, 2% to 22.5%, 2.5% to 20%, 3% to 19%, 3.5% to 18%, and 4% to 17% of the total protein of the enzyme composition.

In another embodiment, the amount of endoglucanase I in an enzyme composition of the present invention is 0.5% to 30% of the total protein of the enzyme composition, e.g., 1.0% to 25%, 2% to 20%, 4% to 25%, 5% to 20%, 16% to 15%, and 7% to 12% of the total protein of the enzyme composition.

In another embodiment, the amount of endoglucanase II in an enzyme composition of the present invention is 0.5% to 30% of the total protein of the enzyme composition, e.g., 1.0% to 25%, 2% to 20%, 4% to 25%, 5% to 20%, 16% to 15%, and 7% to 12% of the total protein of the enzyme composition.

As mentioned above the cellulolytic composition may comprise a number of different polypeptides, such as enzymes.

In an embodiment, the cellulolytic composition comprises a *Trichoderma reesei* cellulase preparation containing *Aspergillus oryzae* beta-glucosidase fusion protein (WO 2008/057637) and *Thermoascus aurantiacus* GH61A polypeptide (WO 2005/074656).

In an embodiment, the cellulolytic composition comprises a blend of an *Aspergillus aculeatus* GH10 xylanase (WO 94/021785) and a *Trichoderma reesei* cellulase preparation containing *Aspergillus fumigatus* beta-glucosidase (WO 2005/047499) and *Thermoascus aurantiacus* GH61A polypeptide (WO 2005/074656).

In an embodiment, the cellulolytic composition comprises a blend of an *Aspergillus fumigatus* GH10 xylanase (WO 2006/078256) and *Aspergillus fumigatus* beta-xylosidase (WO 2011/057140) with a *Trichoderma reesei* cellulase preparation containing *Aspergillus fumigatus* cellobiohydrolase I (WO 2011/057140), *Aspergillus fumigatus* cellobiohydrolase II (WO 2011/057140), *Aspergillus fumigatus* beta-glucosidase variant (WO 2012/044915), and *Penicillium* sp. (*emersonii*) GH61 polypeptide (WO 2011/041397).

In an embodiment the cellulolytic composition comprises a *Trichoderma reesei* cellulolytic enzyme composition, further comprising *Thermoascus aurantiacus* GH61A polypeptide having cellulolytic enhancing activity (WO 2005/074656) and *Aspergillus oryzae* beta-glucosidase fusion protein (WO 2008/057637).

In another embodiment the cellulolytic composition comprises a *Trichoderma reesei* cellulolytic enzyme composition, further comprising *Thermoascus aurantiacus* GH61A polypeptide having cellulolytic enhancing activity (Sequence Number 2 in WO 2005/074656) and *Aspergillus fumigatus* beta-glucosidase (Sequence Number 2 of WO 2005/047499).

In another embodiment the cellulolytic composition comprises a *Trichoderma reesei* cellulolytic enzyme composition, further comprising *Penicillium emersonii* GH61A polypeptide having cellulolytic enhancing activity disclosed in WO 2011/041397, *Aspergillus fumigatus* beta-glucosidase (Sequence Number 2 of WO 2005/047499) or a variant thereof with the following substitutions: F100D, S283G, N456E, F512Y.

In an embodiment, the cellulolytic composition comprises *Aspergillus aculeatus* Family 10 xylanase and cellulolytic composition derived from *Trichoderma reesei* RutC30.

In an embodiment, the cellulolytic composition comprises *Aspergillus aculeatus* Family 10 xylanase.

In an embodiment, the cellulolytic composition is derived from *Trichoderma reesei* RutC30.

In an embodiment, the cellulolytic composition comprises a blend of a *Trichophaea saccata* GH10 xylanase (WO 2011/057083) and *Talaromyces emersonii* beta-xylosidase with a *Trichoderma reesei* cellulase preparation containing *Aspergillus fumigatus* cellobiohydrolase I (WO 2011/057140), *Aspergillus fumigatus* cellobiohydrolase II (WO 2011/057140), *Aspergillus fumigatus* beta-glucosidase variant (WO 2012/044915), and *Penicillium* sp. (*emersonii*) GH61 polypeptide (WO 2011/041397).

In an embodiment, the cellulolytic composition comprises a *Trichoderma reesei* cellulase preparation containing *Trichophaea saccata* GH10 xylanase (WO 2011/057083) and *Talaromyces emersonii* beta-xylosidase.

In an embodiment, the cellulolytic composition comprises a *Talaromyces leycettanus* GH10 xylanase (WO 2013/019827).

In an embodiment, the cellulolytic composition comprises a *Trichophaea saccata* GH10 xylanase (WO 2011/057083).

In an embodiment, the cellulolytic composition is as described in PCT/US2015/034179.

The enzyme composition of the present invention may be in any form suitable for use, such as, for example, a crude fermentation broth with or without cells removed, a cell lysate with or without cellular debris, a semi-purified or purified enzyme composition, or a host cell, e.g., *Trichoderma* host cell, as a source of the enzymes.

The enzyme composition may be a dry powder or granulate, a non-dusting granulate, a liquid, a stabilized liquid, or a stabilized protected enzyme. Liquid enzyme compositions may, for instance, be stabilized by adding stabilizers such as a sugar, a sugar alcohol or another polyol, and/or lactic acid or another organic acid according to established processes.

According to the invention an effective amount of one or more of the following activities may also be present or added during treatment of the kernels: acetylxylan esterase, pentosanase, pectinase, arabinanase, arabinofurasidase, xyloglucanase, phytase activity.

It is believed that after the division of the kernels into finer particles the enzyme(s) can act more directly and thus more efficiently on cell wall and protein matrix of the kernels. Thereby the starch is washed out more easily in the subsequent steps.

Enzymatic Amount

Enzymes may be added in an effective amount, which can be adjusted according to the practitioner and particular process needs. In general, enzyme may be present in an amount of 0.0001-1 mg enzyme protein per g dry solids (DS) kernels, such as 0.001-0.1 mg enzyme protein per g DS kernels. In particular embodiments, the enzyme may be present in an amount of, e.g., 1 µg, 2.5 µg, 5 µg, 10 µg, 20 µg, 25 µg, 30 µg, 35 µg, 40 µg, 45 µg, 50 µg, 75 µg, 100 µg, 125 µg, 150 µg, 175 µg, 200 µg, 225 µg, 250 µg, 275 µg, 300 µg, 325 µg, 350 µg, 375 µg, 400 µg, 450 µg, 500 µg, 550 µg, 600 µg, 650 µg, 700 µg, 750 µg, 800 µg, 850 µg, 900 µg, 950 µg, 1000 µg enzyme protein per g DS kernels.

The present invention is further described by the following examples that should not be construed as limiting the scope of the invention.

Examples

Materials and Methods Enzymes

GH62 Arabinofuranosidase A: GH62 arabinofuranosidase from *Penicillium capsulatum* (WO 2006/125438).

GH62 Arabinofuranosidase B: GH62 arabinofuranosidase from *Penicillium oxalicum* (SEQ ID NO: 24).

GH62 Arabinofuranosidase C: GH62 arabinofuranosidase from *Talaromyces pinophilus* (SEQ ID NO: 27).

GH62 Arabinofuranosidase D: GH62 arabinofuranosidase derived from *Aspergillus niger* (SEQ ID NO: 117).

GH62 Arabinofuranosidase E: GH62 arabinofuranosidase derived from *Aspergillus niger* (SEQ ID NO: 118).

Enzymes having arabinofuranosidase activity are useful alone or in combination with, e.g., any of Celluclast, Cellulase A, Cellulase B, Cellulase C, Cellulase D, Cellulase E, Cellulase F, Cellulase G, Cellulase H, Cellulase J, Cellulase K, Cellulase L, Cellulase M, GH10 Xylanase A, Protease A, Protease B, Protease C and/or Protease D.

Celluclast: Cellulase derived from Celluclast 1.5 L, commercial product available in Novozymes A/S.

Cellulase A: A blend of an *Aspergillus aculeatus* GH10 xylanase (WO 94/021785) and a *Trichoderma reesei* cellulase preparation containing *Aspergillus fumigatus* beta-glucosidase (WO 2005/047499) and *Thermoascus aurantiacus* GH61A polypeptide (WO 2005/074656).

Cellulase B: A *Trichoderma reesei* cellulase preparation containing *Aspergillus oryzae* beta-glucosidase fusion protein (WO 2008/057637) and *Thermoascus aurantiacus* GH61A polypeptide (WO 2005/074656).

Cellulase C: A blend of an *Aspergillus fumigatus* GH10 xylanase (WO 2006/078256) and *Aspergillus fumigatus* beta-xylosidase (WO 2011/057140) with a *Trichoderma reesei* cellulase preparation containing *Aspergillus fumigatus* cellobiohydrolase I (WO 2011/057140), *Aspergillus fumigatus* cellobiohydrolase II (WO 2011/057140), *Aspergillus fumigatus* beta-glucosidase variant (WO 2012/044915), and *Penicillium* sp. (*emersonii*) GH61 polypeptide (WO 2011/041397).

Cellulase D: *Aspergillus aculeatus* GH10 xylanase (WO 94/021785).

Cellulase E: A *Trichoderma reesei* cellulase preparation containing *Aspergillus aculeatus* GH10 xylanase (WO 94/021785).

Cellulase F: A *Trichoderma reesei* cellulase preparation containing *Aspergillus fumigatus* GH10 xylanase (WO 2006/078256) and *Aspergillus fumigatus* beta-xylosidase (WO 2011/057140).

Cellulase G: A cellulolytic enzyme composition containing *Aspergillus aculeatus* Family 10 xylanase (WO 1994/021785) and cellulolytic enzyme composition derived from *Trichoderma reesei* RutC30.

Cellulase H: A cellulolytic composition derived from *Trichoderma reesei* RutC30.

Cellulase J: A blend of a *Trichophaea saccata* GH10 xylanase (WO 2011/057083) and *Talaromyces emersonii* beta-xylosidase with a *Trichoderma reesei* cellulase preparation containing *Aspergillus fumigatus* cellobiohydrolase I (WO 2011/057140), *Aspergillus fumigatus* cellobiohydrolase II (WO 2011/057140), *Aspergillus fumigatus* beta-glucosidase variant (WO 2012/044915), and *Penicillium* sp. (*emersonii*) GH61 polypeptide (WO 2011/041397).

Cellulase K: A *Trichoderma reesei* cellulase preparation containing *Trichophaea saccata* GH10 xylanase (WO 2011/057083) and *Talaromyces emersonii* beta-xylosidase.

Cellulase L: A *Trichoderma reesei* cellulase preparation containing a GH10 xylanase of SEQ ID NO: 104.

Cellulase M: A *Trichoderma reesei* cellulase preparation containing a GH10 xylanase of SEQ ID NO: 106.

Cellulase N: A *Trichoderma reesei* cellulase preparation containing a cellobiohydrolase I of SEQ ID NO: 96, a cellobiohydrolase II of SEQ ID NO: 98, a GH10 xylanase of SEQ ID NO: 104, and a beta-xylosidase of SEQ ID NO: 108.

Cellulase P: A *Trichoderma reesei* cellulase preparation containing a cellobiohydrolase I of SEQ ID NO: 96, a cellobiohydrolase II of SEQ ID NO: 98, a beta-glucosidase variant of SEQ ID NO: 100, and a AA9 (GH61) of SEQ ID NO: 102.

Cellulase Q: A *Trichoderma reesei* cellulase preparation containing a cellobiohydrolase I of SEQ ID NO: 96, a cellobiohydrolase II of SEQ ID NO: 98, and a AA9 (GH61) of SEQ ID NO: 102.

GH10 Xylanase A: GH10 xylanase derived from *Aspergillus niger* (SEQ ID NO: 119).

Protease I: Acidic protease from *Aspergillus aculeatus*, CBS 101.43 disclosed in WO 95/02044.

Protease A: *Aspergillus oryzae* aspergillopepsin A, disclosed in Gene, vol. 125, issue 2, pages 195-198 (30 Mar. 1993).

Protease B: A metalloprotease from *Thermoascus aurantiacus* (AP025) having the mature acid sequence shown as amino acids 1-177 SEQ ID NO: 2 in WO2003/048353-A1.

Protease C: *Rhizomucor miehei* derived aspartic endopeptidase produced in *Aspergillus oryzae* (Novoren™) available from Novozymes A/S, Denmark.

Protease D: S53 protease 3 from *Meripilus giganteus* disclosed in WO 2014/037438 (SEQ ID NO: 6).

Methods

Determination of Protease HUT Activity:

1 HUT is the amount of enzyme which, at 40° C. and pH 4.7 over 30 minutes forms a hydrolysate from digesting denatured hemoglobin equivalent in absorbency at 275 nm to a solution of 1.10 µg/ml tyrosine in 0.006 N HCl which absorbency is 0.0084. The denatured hemoglobin substrate is digested by the enzyme in a 0.5 M acetate buffer at the given conditions. Undigested hemoglobin is precipitated with trichloroacetic acid and the absorbance at 275 nm is measured of the hydrolysate in the supernatant.

Xylose Assay

A xylose standard curve from 0 to 125 µg xylose/mL was prepared from a stock solution of 2.5 mg xylose/mL (prepared by dissolving 0.125 g xylose in 50 mL de-ionised water).

Assay principle. The interconversion of the α- and β-anomeric forms of D-xylose is catalysed by xylose mutarotase (XMR) using the D-xylose assay kit from Megazyme International Ireland. The ß-D-xylose is oxidised by NAD+ to D-xylonic acid in the presence of ß-xylose dehydrogenase (ß-XDH) at pH 7.5. The amount of NADH formed in this reaction is stoichiometric with the amount of D-xylose and is measured by the increase in absorbance at 340 nm.

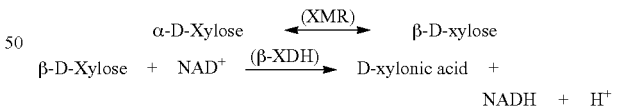

Example 1

The 10-g fiber assay generally includes incubating wet fiber samples obtained from wet-milling plant, in the presence of enzymes, at conditions relevant to the process (pH 3.5 to 4, Temp around 52° C.) and over a time period of between 1 to 4 hr. After incubation the fiber is transferred and pressed over a screen (typically 100 micron or smaller), where the filtrates consisting mainly of the separated starch and gluten are then collected. A number of washes are done over the screen, and the washings are collected together with the initial filtrate. The collected filtrate are then passed over a funnel filter (glass filter with 0.45 micron opening) to further separate the insoluble solids (starch and gluten) from the rest of the filtrates (mostly dissolved solids). These retained insoluble solids are washed and then oven dried to dryness. The insoluble dry mass is weighed and then analyzed for starch content.

10-g fiber assay is performed at pH 3.8, incubating at 52° C. for 1 hour at dose of 30 ug EP/g corn. Blends of GH62 Arabinofuranosidase B+Cellulase L, GH62 Arabinofuranosidase B+Cellulase M, GH62 Arabinofuranosidase C+Cellulase L, and GH62 Arabinofuranosidase C+Cellulase M are utilized. Release of starch+gluten (dry substance) from corn fiber at dose of 30 ug/g corn is measured.

More particularly according to an exemplary 10-g fiber assay, the below equipment and reagents are used to analyze pressed corn fiber sample (sourced from wet-milling plant), which is stored frozen and thawed prior to use, according to the steps in the table:

150-μm Opening Sieves and Catch pan (Retsch GmbH)
250 ml Erlenmeyer Flask with caps
150 ml Bottles
Glass Micro filter Paper (Whatman 150 mm-Diameter)
Vacuum Filtration apparatus
Small aluminum pans
2000 ml plastic beaker
600 ml glass beaker
Funnel
Moisture analyzer
Glass vials and caps for HPLC system
HPLC system
0.45 μm pore size polypropylene syringe filters (Whatman)
3 ml plastic syringes
Oven (Capable to heat to 105° C.)
Ice bath
Analytical balance
Rubber Spatula
0.4M HCl
1M Sodium Acetate buffer (pH 4)
1M Acetic Acid
1M pH 7 Sodium Acetate

| Step | Action |
|---|---|
| 1 | Determine moisture of ~1 g corn fiber using the Moisture balance<br>Collect the DS % |
| 2 | Weigh out items and record initial weights of<br>Flasks, Bottles, Small Aluminum pans, Glass Micro Filter paper |
| 3 | Determine the amount of fiber that needs to be weighed out for each replicate to obtain a dry solids of 5 grams |
| 4 | After adding the fiber into the flask, store them into the cold room until ready for use<br>Fiber can last about 2-3 days in the cold room |
| 6 | Add 98 ml of water to each flask of fiber to achieve desired % DS |
| 7 | Add 2 ml of buffer (1M pH 4.0 Sodium Acetate) to adjust pH to 4.0 (the final buffer concentration is 0.02M) |
| 8 | Add enzyme into the flask |
| 9 | Place flask into Incubator(New Brunswick Scientific/Innova 42) and set at 150 RPM @50° C. for 4 hours |
| 10 | After the incubation place the flask into ice bath to slow enzyme activity<br>Let flask sit in the ice bath for a minimum of 5 minutes |
| 11 | For each sample flask, pour out the content onto the 150 μm sieve with catch pan below |
| 12 | Measure about ~200 ml of tap water into a beaker and pour into the flask to rinse any remaining fiber, then pour the rinse water back into the beaker |
| 13 | Using the spatula, press the fiber against the screen to release water and insolubles into the catching pan. |
| 14 | Once a majority of the water has been pressed out, place the fiber back in the beaker containing the 200 ml of rinse water in Step 12 |
| 15 | Stir the fiber in the beaker with the spatula, then pour onto the 150 μm sieve<br>Considered $1^{st}$ Wash |
| 16 | Measure out ~200 ml of water into the rinse beaker |
| 17 | Press the fiber again with spatula until majority of water has been pressed out, then dump fiber back into the rinse beaker |
| 18 | Remove the sieve pan and pour the liquid from the catching pan into 1 Liter Plastic Bottle<br>Give a gentle swirl to the pan before pouring to get the sediments to go into the bottle |
| 19 | Repeat Steps 15 to 18 two more times (for a total of 3 wash steps)<br>At the end of the $3^{rd}$ wash, the fiber may be discarded unless saved for additional analysis. |
| 20 | Take the 1 L bottles containing the sieve-throughs to the Manifold Vacuum Filtration setup |
| 25 | After rinsing the filter funnels with tap water, place the preweighed glass filter paper into the funnel and spray DI water to keep filter in place |
| 27 | Turn on the vacuum, then pour the entire bottle content gradually into the funnel |
| 28 | As the samples are filtering, fill the emptied bottle with ~200 ml of DI water and pour into the<br>filter with the rest of sample<br>Turn the Vacuum off once the solution is filter through then add the DI water to the funnel and turn the Vacuum back on |
| 29 | Once the solution is finish before the filter dry out<br>Turn off the vacuum and pour the water into the funnel and turn the vacuum back on |
| 30 | This is removing the remaining solvents in the bottle and also rinsing the filter keeping the insolubles |
| 32 | To remove the filters use a metal spatula to lift the edge of filters up and to scrape any remaining insolubles off the sides. |
| 33 | Take the filter and fold twice and place them into the pre-weighed pan |
| 34 | Remember to weigh the pan now with the Filter paper |
| 35 | Place the pan into the 105° C. oven overnight to dry |
| 36 | Weigh out the pan with the dry filtered matter.<br>This weight is used to calculate insoluble solids yield. |

-continued

| Step | Action |
|---|---|
| 37 | Remove the filter from the pan taking care that no filtered solids are lost, then cut each into strips and further into small squares to go into the glass bottle<br>Make sure that you cut the filters into smaller pieces so that they can be remove once finish |
| 38 | Measure out 50 ml of 0.4M of HCL into each bottle<br>Let the filter paper sit in the solution for at least 2 hours; No more than 24 hours |
| 39 | Place into the autoclave for Residual Starch procedure<br>Autoclave needs to be set @230° F. for 80 minutes |
| 40 | Once autoclave is done let the bottle cool down before touching |
| 41 | Filter the solution into HPLC vials and send them off to be analyzed for glucose.<br>NOTE: The glucose concentrations are used to calculate the amount of starch in the insoluble solids |

Example 2

10-g fiber assay is performed at pH 4.0, incubating at 52° C. for 4 hour at doses of 35 ug EP/g corn, using a blend of Cellulase K, Cellulase L, or Cellulase N, in further combination with Protease D and GH62 Arabinofuranosidase C. Blend consists of 10% (w/w) Protease D, 10% (w/w) of GH62 Arabinofuranosidase C, and the remaining 80% (w/w) from Cellulase K/Cellulase L/Cellulase N. For comparison, a blend containing Cellulase K and GH62 Arabinofuranosidase C only (no GH62) was included. Release of starch+gluten (dry substance) from corn fiber at the specified doses below was measured.

| Treatments | Dose (ug enzyme protein/g corn) | Starch + Gluten Recovered |
|---|---|---|
| No Enzyme | 0 | 15.1% |
| Cellulase K + Protease D | 35 | 18.7% |
| Cellulase K + Protease D | 70 | 19.4% |
| Cellulase K + Protease D + GH62 Arabinofuranosidase C | 35 | 20.8% |
| Cellulase N + Protease D + GH62 Arabinofuranosidase C | 35 | 20.4% |
| Cellulase L + Protease D + GH62 Arabinofuranosidase C | 35 | 20.6% |

Example 3

10-g fiber assay is performed at pH 4.0, incubating at 52° C. for 4 hour at doses of 35 ug EP/g corn or 50 ug EP/g corn or 70 ug EP/g corn, using a blend of either Cellulase L or Cellulase N, in combination with Protease D and GH62 Arabinofuranosidase B. Blend consists of 10% (w/w) Protease D, 10% (w/w) of GH62 Arabinofuranosidase B, and the remaining 80% (w/w) from either Cellulase L or Cellulase N. For comparison, a blend containing no GH62 was included. Release of starch+gluten (dry substance) from corn fiber at the specified doses below was measured.

| Treatments | Dose (ug enzyme protein/g corn) | Starch + Gluten Recovered |
|---|---|---|
| Cellulase N + Protease D | 70 | 21.9% |
| Cellulase N + Protease D + GH62 Arabinofuranosidase B | 35 | 20.9% |
| Cellulose N + Protease D + GH62 Arabinofuranosidase B | 50 | 22.0% |
| Cellulose N + Protease D + GH62 Arabinofuranosidase B | 70 | 24.9% |
| Cellulose L + Protease D + GH62 Arabinofuranosidase B | 35 | 20.9% |
| Cellulose L + Protease D + GH62 Arabinofuranosidase B | 50 | 23.2% |

Example 4

The 10-g fiber assay generally includes incubating wet fiber samples obtained from wet-milling plant, in the presence of enzymes, at conditions relevant to the process (pH 3.5 to 4, Temp around 52° C.) and over a time period of between 1 to 4 hr. After incubation the fiber is transferred and pressed over a screen (typically 100 micron or smaller), where the filtrates consisting mainly of the separated starch and gluten are then collected. A number of washes are done over the screen, and the washings are collected together with the initial filtrate. The collected filtrate are then passed over a funnel filter (glass filter with 0.45 micron opening) to further separate the insoluble solids (starch and gluten) from the rest of the filtrates (mostly dissolved solids). These retained insoluble solids are washed and then oven dried to dryness. The insoluble dry mass is weighed and then analyzed for starch content.

10-g fiber assay is performed at pH 4.0, incubating at 52° C. for 4 hour at a dose of 35 ug EP/g corn, using a blend of Cellulase N, with or without inclusion of GH62 Arabinofuranosidase B, and with or without Protease D. Blend consists of 10% (w/w) Protease D when included, 10% (w/w) of GH62 Arabinofuranosidase B when included, and the remaining amount (80, 90 or 100% (w/w)) of Cellulase N. Release of starch+gluten (dry substance) from corn fiber was measured.

| Treatments | Starch + Gluten Recovered |
|---|---|
| No Enzyme | 9.81% |
| Cellulose N | 13.3% |
| Cellulose N + Protease D | 13.5% |
| Cellulose N + GH62 Arabinofuranosidase B | 20.5% |
| Cellulose N + Protease D + GH62 Arabinofuranosidase B | 19.2% |

Example 5

10-g fiber assay is performed at pH 3.8, incubating at 52° C. for 1 hour at dose of 35 ug EP/g corn, using a blend including Celluclast and GH10 Xylanase A, in combination with either GH62 Arabinofuranosidase D or GH62 Arabinofuranosidase E. Blend consists of 5% (w/w) GH62 Arabinofuranosidase D or GH62 Arabinofuranosidase E, 15% (w/w) of GH10 Xylanase A, and the remaining 80% (w/w) from Celluclast. For comparison, blend containing Celluclast and GH10 Xylanase D only (no GH62) was included. Release of starch+gluten (dry substance) from corn fiber at the specified doses below was measured.

| Treatments | Dose (ug enzyme protein/g corn) | Starch + Gluten Recovered |
|---|---|---|
| No Enzyme | 0 | 6.55% |
| Celluclast + GH10 Xylanase A | 35 | 8.90% |
| Celluclast + GH10 Xylanase A | 33.25 | 8.90% |
| Celluclast + GH10 Xylanase A + GH62 Arabinofuranosidase D | 35 | 10.57% |
| Celluclast + GH10 Xylanase A + GH62 Arabinofuranosidase E | 35 | 10.73% |

Therefore, the addition of GH62 Arabinofuranosidase D and GH62 Arabinofuranosidase E on top of Celluclast+ GH10 Xylanase A can significantly increase the yield of starch+gluten in corn wet-milling process.

Example 6

A full-scale industrial trial was conducted in a wet-mill facility milling 1400 MT of corn per day. The trial was conducted over a span of months, which can be roughly divided into a pre-enzyme baseline (Baseline 1), Blend 1 phase, post-Blend 1 baseline (Baseline 2), and Blend 2 phase. The enzymes that were tested and the relevant dose used are given in Table 1 below. The enzymes were directly added into the fiber washing stage, after the 3$^{rd}$ grind step.

TABLE 1

| Enzyme Blend | Enzyme | Dose (kg prod/ MT corn) | Total enzyme protein (mg protein/kg corn) |
|---|---|---|---|
| 1 | Cellulase F | 0.5 | 105 |
| 2 | A Trichoderma reesei cellulase preparation containing a GH10 xylanase of SEQ ID NO: 104 and a GH62 arabinofuranosidase of SEQ ID NO: 27. | 0.1 | 24 |

The main difference in composition between the two enzyme blends used in the trial was the addition of a GH62 arabinofuranosidase, and the source organism of the xylanase (Family GH10) used differed between these two blends.

Table 1 shows the difference in dose between these blends during the trial. Blend 1 was dosed four-folds higher in total enzyme proteins compared with Blend 2. Table 2 and 3 below shows the effect of enzyme addition in the process compared with their baselines, both in terms of fiber composition and the actual yields realized. These yield numbers and fiber composition were averaged over a two weeks' worth data where the conditions were relatively stable, and the overall residence time in the fiber wash was consistently around 80-90 minutes.

The combination of 4x lower dose and better performance of Blend 2 as judged from the higher reduction in starch in fiber (10 versus 6 percentage points difference) strongly points to the boosting effect of the GH62 in the blend. Both showed about the same reduction in protein and moisture in the fiber. As for realized yields, the better performance of Blend 2 is again shown by the higher starch yields realized (a difference of about 1 percentage points in starch yield). Gluten reduction between these enzymes was about the same (0.2 to 0.3 percentage points difference from baseline, with Blend 2 probably slightly better). This was shown as well when normalized to the protein content of the incoming corn (total recovery seems slightly better with Blend 2.

TABLE 2

| | Fiber Composition | | | |
|---|---|---|---|---|
| Fiber Stream Composition | Baseline 1 | Blend 1 | Baseline 2 (Post-Blend 1) | Blend 2 |
| Total starch (%) | 25.85 | 19.25 | 25.5 | 15.5 |
| Protein (%) | 11.44 | 10.35 | 11.2 | 10.7 |
| Moisture (%) | 61.5 | 56.95 | 62.2 | 57.3 |

TABLE 3

| Realized Yields/Energy Reduction | | | |
|---|---|---|---|
| Plant Metrics | Baseline | Blend 1 | Blend 2 |
| Starch Yield (%) | 70.3 | 70.9 | 72.1 |
| Gluten Yield (%) | 4.9 | 5.1 | 5.2 |
| Total Recovery Protein | 39% | 41% | 42% |
| Fiber dryer energy use (KWh/tn fiber) | 824 | 700 | 620 |

What is claimed is:

1. A process for treating crop kernels, comprising:
   a) soaking kernels in water to produce soaked kernels;
   b) grinding the soaked kernels to form ground kernels;
   c) separating the germ from the ground kernels to produce a slurry comprising fiber, starch and protein; and
   d) treating the slurry in a fiber washing step to separate fiber from the starch and protein in the presence of an effective amount of a GH62 polypeptide having arabinofuranosidase activity.

2. The process of claim 1, wherein step d) further comprises treating the slurry in the presence of a protease.

3. The process of claim 1, wherein step d) further comprises treating the slurry in the presence of a cellulolytic enzyme.

4. The process of claim 1, wherein step d) further comprises treating the slurry in the presence of an enzyme selected from the group consisting of an endoglucanase, a xylanase, a cellobiohydrolase I, a cellobiohydrolase II, a GH61, or a combination thereof.

5. The process of claim 4, wherein the enzyme is an endoglucanase.

6. The process of claim 4, wherein the enzyme is a xylanase.

7. The process of claim 1, wherein the kernels are soaked in water for about 2-10 hours.

8. The process of claim 1, wherein the soaking is carried out at a temperature between about 40° C. and about 60° C.

9. The process of claim 1, wherein the soaking is carried out at an acidic pH.

10. The process of claim 1, wherein the soaking is performed in the presence of between 0.01-1% SO2 and/or NaHSO3.

11. The process of claim 1, wherein the crop kernels are from corn (maize), rice, barley, sorghum bean, or fruit hulls, or wheat.

12. The process of claim 1, wherein the GH62 polypeptide having arabinofuranosidase activity is a *Penicillium, Talaromyces,* or *Aspergillus* GH62 polypeptide.

13. The process of claim 1, wherein step d) further comprises treating the slurry in the presence of a GH10 xylanase or a GH11 xylanase.

14. The process of claim 13, wherein the GH10 xylanase is a *Talaromyces, Trichophaea,* or *Aspergillus* GH10 xylanase.

15. The process of claim 1, further treating the slurry in the presence of a GH10 xylanase, an endoglucanase, a cellobiohydrolase I, a cellobiohydrolase II, and a GH61.

16. The process of claim 1, further comprising separating the starch from the protein.

17. The process of claim 16, further comprising washing the starch to produce a pure starch.

18. The process of claim 17, wherein the starch is 99.5% pure.

19. The process of claim 17, further comprising converting the starch to syrup or alcohol.

* * * * *